US010928979B2

(12) United States Patent
Sasaki et al.

(10) Patent No.: US 10,928,979 B2
(45) Date of Patent: Feb. 23, 2021

(54) INFORMATION APPARATUS CONTROL METHOD, COMPUTER-READABLE RECORDING MEDIUM, AND INFORMATION PROVIDING METHOD TO CONTROL DEVICES CONNECTED TO NETWORK VIA DEVICE ICONS DISPLAYED ON FLOOR PLAN

(71) Applicant: PANASONIC INTELLECTUAL PROPERTY CORPORATION OF AMERICA, Torrance, CA (US)

(72) Inventors: Takamitsu Sasaki, Osaka (JP); Eiichi Naito, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/547,040

(22) Filed: Aug. 21, 2019

(65) Prior Publication Data
US 2019/0377475 A1 Dec. 12, 2019

Related U.S. Application Data

(63) Continuation of application No. 15/708,541, filed on Sep. 19, 2017, now Pat. No. 10,437,419, which is a
(Continued)

(51) Int. Cl.
*G06F 3/0481* (2013.01)
*H04L 12/28* (2006.01)
(Continued)

(52) U.S. Cl.
CPC ........ *G06F 3/04817* (2013.01); *G06F 3/0482* (2013.01); *G06F 3/0484* (2013.01);
(Continued)

(58) Field of Classification Search
CPC .. G06F 3/04817; G06F 3/0488; G06F 3/0484; G06F 3/04847; G06F 3/0482;
(Continued)

(56) References Cited

U.S. PATENT DOCUMENTS 7,730,223 B1 6/2010 Bavor et al.
2001/0034754 A1 10/2001 Elwahab et al.
(Continued)

FOREIGN PATENT DOCUMENTS

JP 03-83480 4/1991
JP 03-106293 5/1991
(Continued)

OTHER PUBLICATIONS

International Search Report, dated Aug. 6, 2013 for Patent Application No. PCT/JP2013/003964.
(Continued)

*Primary Examiner* — John T Repsher, III
(74) *Attorney, Agent, or Firm* — Greenblum & Bernstein, P.L.C.

(57) ABSTRACT

A control method causes a computer of an information apparatus to: display on a display a display screen representing a floor plan including one or more rooms; using at least one memory that associates first information indicating a type of each of one or more device icons representing one or more target devices with second information indicating an attribute of each of the one or more rooms, display each of the one or more device icons in a room that corresponds to each of the one or more device icons in accordance with the type of each of the one or more device icons; and when it is determined that one device icon of the one or more device icons is a second type, the one device icon is displayed in a same room as a room in which the device icon of a first type is displayed.

19 Claims, 169 Drawing Sheets

Related U.S. Application Data continuation of application No. 14/580,819, filed on Dec. 23, 2014, now Pat. No. 9,804,739, which is a continuation of application No. PCT/JP2013/003964, filed on Jun. 25, 2013.

(60) Provisional application No. 61/806,528, filed on Mar. 29, 2013, provisional application No. 61/806,587, filed on Mar. 29, 2013, provisional application No. 61/806,608, filed on Mar. 29, 2013, provisional application No. 61/806,580, filed on Mar. 29, 2013, provisional application No. 61/806,604, filed on Mar. 29, 2013.

(51) Int. Cl.
  *H04L 29/08* (2006.01)
  *G06F 3/0488* (2013.01)
  *G06F 3/0484* (2013.01)
  *G06F 3/0482* (2013.01)
  *G08C 17/00* (2006.01)

(52) U.S. Cl.
  CPC ........ *G06F 3/0488* (2013.01); *G06F 3/04847* (2013.01); *G08C 17/00* (2013.01); *H04L 12/282* (2013.01); *H04L 67/025* (2013.01); *H04L 67/12* (2013.01)

(58) Field of Classification Search
  CPC ..... H04L 67/025; H04L 12/282; H04L 67/12; G08C 17/00
  See application file for complete search history.

(56) References Cited

U.S. PATENT DOCUMENTS

| | | |
|---|---|---|
| 2002/0091812 A1 | 7/2002 | Ando et al. |
| 2005/0131991 A1 | 6/2005 | Ogawa et al. |
| 2010/0205528 A1 | 8/2010 | Bavor et al. |
| 2011/0025519 A1 | 2/2011 | Donaldson et al. |
| 2011/0254683 A1* | 10/2011 | Soldan ............. H04N 21/43615 340/539.13 |
| 2012/0065791 A1* | 3/2012 | Besore ................. G06Q 50/06 700/291 |
| 2012/0253818 A1 | 10/2012 | Owada |
| 2014/0068486 A1* | 3/2014 | Sellers ................. H04L 12/282 715/771 |
| 2014/0167931 A1* | 6/2014 | Lee ..................... H04L 12/2818 340/12.5 |

FOREIGN PATENT DOCUMENTS

| | | |
|---|---|---|
| JP | 07-131542 | 5/1995 |
| JP | 11-69462 | 3/1999 |
| JP | 2002-140385 | 5/2002 |
| JP | 2002-189648 | 7/2002 |
| JP | 2002-291039 | 10/2002 |
| JP | 2003-284161 | 10/2003 |
| JP | 2005-198252 | 7/2005 |
| JP | 2005-301770 | 10/2005 |
| JP | 2012-213093 | 11/2012 |

OTHER PUBLICATIONS

Office Action issued in Japan Counterpart Patent Appl. No. 2015-507681, dated Mar. 22, 2016, along with an English translation thereof.

* cited by examiner

| ROOM ID | ROOM TYPE | ROOM COORDINATE |
|---------|-----------|-----------------|
| A | LIVING ROOM | (F,G,H,I,L,O,N) |
| B | BEDROOM | (J,K,M,L,I) |
| C | BATH | (A,B,G,F) |
| D | STAIRCASE | (H,I,R,Q) |
| ... | | |

FIG.34

| | 4701 | 4702 | 4703 | 4704 | 4705 | 4706 |
|---|---|---|---|---|---|---|
| 4700 | DEVICE ID | DEVICE TYPE | MODEL NUMBER | ARRANGEMENT | CAPABILITY INFORMATION | CONTROL COMMAND TRANSMISSION DESTINATION |
| | A | AIR CONDITIONER | CS-X403C | (X10,Y100,Z1) | TEMPERATURE CONTROL, AIR FLOW DIRECTION CONTROL, AND AIR FLOW AMOUNT CONTROL | DEVICE |
| | B | ILLUMINATION | HH-LC710A | (X30,Y150,Z1) | ON/OFF CONTROL AND DIMMER CONTROL | DEVICE |
| | C | REFRIGERATOR | NR-F557XV | (X50,Y200,Z1) | POWER CONSUMPTION STATE MANAGEMENT | SERVER |
| | ... | | | | | |

FIG.35

| DEVICE ID 3101 | DEVICE TYPE 3102 | MODEL NUMBER 3103 | ARRANGEMENT 3104 | CAPABILITY INFORMATION 3105 | CONTROL COMMAND TRANSMISSION DESTINATION 3106 | IP ADDRESS 3107 |
|---|---|---|---|---|---|---|
| A | AIR CONDITIONER | CS-X403C | (X10,Y100,Z1) | TEMPERATURE CONTROL, AIR FLOW DIRECTION CONTROL, AND AIR FLOW AMOUNT CONTROL | DEVICE | 192.168.0.5 |
| B | ILLUMINATION | HH-LC710A | (X30,Y150,Z1) | ON/OFF CONTROL AND DIMMER CONTROL | DEVICE | 192.168.0.6 |
| C | REFRIGERATOR | NR-F557XV | (X50,Y200,Z1) | POWER CONSUMPTION STATE MANAGEMENT | SERVER | 192.168.0.7 |
| ... | | | | | | |

3100

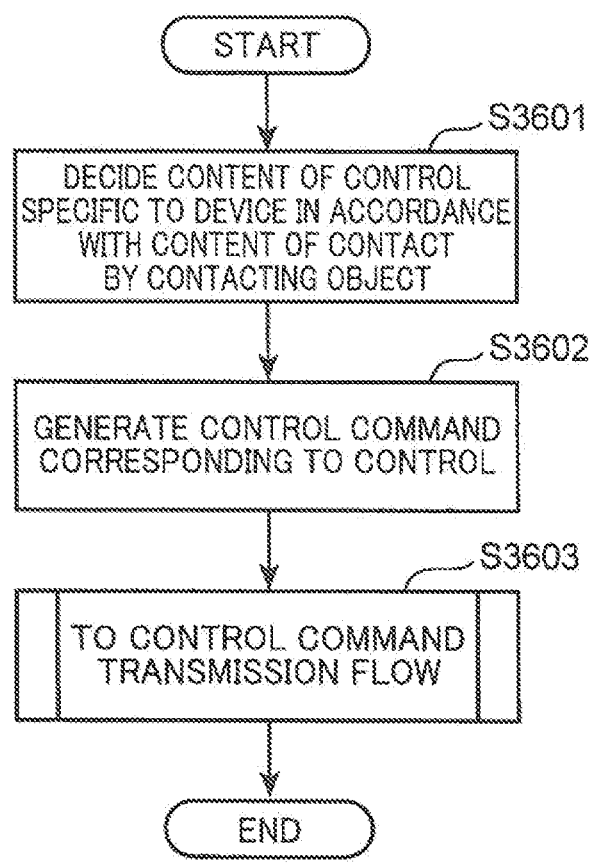

FIG. 68

| ROOM ID | ROOM TYPE | FLOOR LEVEL | DISPLAY POSITION |
|---|---|---|---|
| A | LIVING ROOM | FIRST FLOOR | FIRST CELL ON FIRST FLOOR |
| B | BEDROOM | SECOND FLOOR | FIRST CELL ON SECOND FLOOR |
| C | BATH | FIRST FLOOR | FOURTH CELL ON FIRST FLOOR |
| D | STAIRCASE | FIRST FLOOR<br>SECOND FLOOR | SEVENTH CELL ON FIRST FLOOR<br>SECOND CELL ON SECOND FLOOR |
| ... | | | |

FIG.70

| 4700 | | | | | |
|---|---|---|---|---|---|
| DEVICE ID 4701 | DEVICE TYPE 4702 | MODEL NUMBER 4703 | ARRANGEMENT 4704 | CAPABILITY INFORMATION 4705 | CONTROL COMMAND TRANSMISSION DESTINATION 4706 |
| A | AIR CONDITIONER | CS-X403C | LIVING ROOM | TEMPERATURE CONTROL, AIR FLOW DIRECTION CONTROL, AND AIR FLOW AMOUNT CONTROL | DEVICE |
| B | ILLUMINATION | HH-LC710A | LIVING ROOM | ON/OFF CONTROL AND DIMMER CONTROL | DEVICE |
| C | REFRIGERATOR | NR-F557XV | KITCHEN | POWER CONSUMPTION STATE MANAGEMENT | SERVER |
| ... | | | | | |

FIG.71

| DEVICE ID 3101 | DEVICE TYPE 3102 | MODEL NUMBER 3103 | ARRANGEMENT 3104 | CAPABILITY INFORMATION 3105 | CONTROL COMMAND TRANSMISSION DESTINATION 3106 | IP ADDRESS 3107 |
|---|---|---|---|---|---|---|
| A | AIR CONDITIONER | GS-X403C | LIVING ROOM | TEMPERATURE CONTROL, AIR FLOW DIRECTION CONTROL, AND AIR FLOW AMOUNT CONTROL | DEVICE | 192.168.0.5 |
| B | ILLUMINATION | HH-LC710A | LIVING ROOM | ON/OFF CONTROL AND DIMMER CONTROL | DEVICE | 192.168.0.6 |
| C | REFRIGERATOR | NR-F557XV | KITCHEN | POWER CONSUMPTION STATE MANAGEMENT | SERVER | 192.168.0.7 |
| ... | | | | | | |

3100

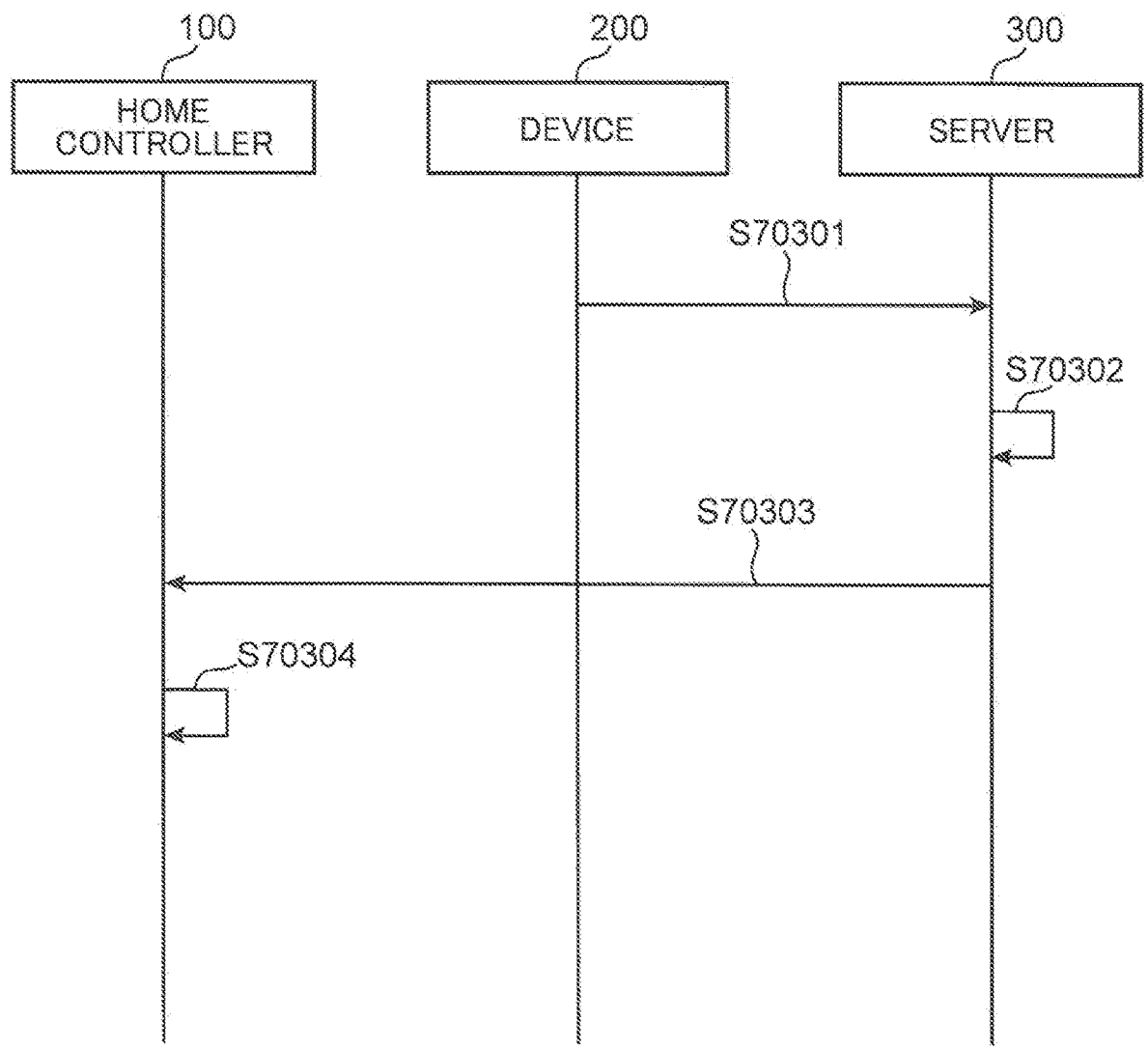

| DEVICE TYPE | ROOM TYPE |
|---|---|
| REFRIGERATOR | KITCHEN |
| TOILET SEAT APPARATUS | TOILET |
| AIR CONDITIONER | LIVING ROOM |
| AIR CONDITIONER | BEDROOM |
| TELEVISION SET | LIVING ROOM |
| TELEVISION SET | CHILD ROOM |
| TELEVISION SET | BEDROOM |
| ... | ... |

| DEVICE ID | DEVICE TYPE NAME |
|---|---|
| R | REFRIGERATOR |
| B | TOILET SEAT APPARATUS |
| A | AIR CONDITIONER |
| T | TELEVISION SET |
| ... | ... |

| ROOM ID | ROOM TYPE NAME |
|---|---|
| K | KITCHEN |
| T | TOILET |
| L | LIVING ROOM |
| S | BEDROOM |
| C | CHILD ROOM |
| ... | ... |

| DEVICE ID | ROOM ID |
|---|---|
| R | K |
| B | T |
| A | L |
| A | S |
| T | L |
| T | C |
| T | S |
| ... | ... |

| RESIDENCE ID | DEVICE ID | DEVICE TYPE | MODEL NUMBER | ROOM ID | ARRANGEMENT |
|---|---|---|---|---|---|
| H1 | A | AIR CONDITIONER | CS-X403C | A | (X10,Y90,Z1) |
| H1 | B | ILLUMINATION DEVICE | HH-LC710A | A | (X50,Y50,Z1) |
| H1 | T | TELEVISION SET | TH-L55WT5 | A | (X70,Y200,Z1) |
| ... | | | | | |

| RESIDENCE ID | DEVICE ID | DEVICE TYPE | PERFORMANCE |
|---|---|---|---|
| H1 | T1 | TELEVISION SET | 65v |

| DEVICE TYPE 906101 | ROOM TYPE 906102 |
|---|---|
| REFRIGERATOR | KITCHEN |
| TOILET SEAT APPARATUS | TOILET |
| AIR CONDITIONER | LIVING ROOM |
| AIR CONDITIONER | CHILD ROOM |
| AIR CONDITIONER | BEDROOM |
| TELEVISION SET | LIVING ROOM |
| TELEVISION SET | CHILD ROOM |
| TELEVISION SET | BEDROOM |
| ... | ... |

| DEVICE ID | DEVICE TYPE NAME |
|---|---|
| R | REFRIGERATOR |
| B | TOILET SEAT APPARATUS |
| A | AIR CONDITIONER |
| T | TELEVISION SET |
| ... | ... |

| ROOM ID | ROOM TYPE NAME |
|---|---|
| K | KITCHEN |
| T | TOILET |
| L | LIVING ROOM |
| S | BEDROOM |
| C | CHILD ROOM |
| ... | ... |

| DEVICE ID | ROOM ID |
|---|---|
| R | K |
| B | T |
| A | L |
| A | S |
| T | L |
| T | C |
| T | S |
| ... | ... |

| PERFORMANCE ID | PERFORMANCE | SMALLEST ROOM SIZE (m²) | LARGEST ROOM SIZE (m²) |
|---|---|---|---|
| 1 | 32v | 0 | 10 |
| 2 | 37v | 7 | 10 |
| 3 | 40v | 10 | 13 |
| 4 | 42v | 10 | 13 |
| 5 | 46v | 13 | 18 |
| 6 | 52v | 18 | 23 |
| 7 | 55v | 23 | 99 |
| 8 | 65v | 26 | 99 |

| RESIDENCE ID (90803) | VERTEX ID (90801) | VERTEX COORDINATES (90802) |
|---|---|---|
| H1 | A | (X0,Y0,Z1) |
| H1 | B | (X20,Y0,Z1) |
| H1 | C | (X40,Y0,Z1) |
| H1 | ... | |
| H1 | P | (X150,Y100,Z1) |

| RESIDENCE ID | ROOM ID | ROOM TYPE | SIZE (m²) | ROOM COORDINATES |
|---|---|---|---|---|
| H1 | A | LIVING ROOM | 40 | (F,G,H,I,L,O,N) |
| H1 | B | BEDROOM | 18 | (J,K,M,L,I) |
| H1 | C | BATHROOM | 4 | (A,B,G,F) |
| H1 | D | STAIRWAY | 3 | (H,I,R,Q) |
| H1 | F | KITCHEN | 6 | (F,S,T,U) |
| H1 | G | CHILD ROOM | 14 | (C,D,I,J) |
| H1 | ... | | | |

90904 — RESIDENCE ID
90901 — ROOM ID
90902 — ROOM TYPE
90903 — ROOM COORDINATES

FIG. 109

| | 90600 | | 90601 | | 90602 | | 90603 |
|---|---|---|---|---|---|---|---|
| | RESIDENCE ID | | DEVICE ID | | DEVICE TYPE | | PERFORMANCE |
| | H1 | | T2 | | TELEVISION SET | | 46v |

| PERFORMANCE ID | PERFORMANCE | SMALLEST ROOM SIZE (㎡) | LARGEST ROOM SIZE (㎡) |
|---|---|---|---|
| 1 | 2.2kW | 10 | 15 |
| 2 | 2.5kW | 12 | 17 |
| 3 | 2.8kW | 13 | 20 |
| 4 | 3.6kW | 17 | 25 |
| 5 | 4.0kW | 18 | 28 |
| 6 | 4.5kW | 20 | 31 |
| 7 | 5.0kW | 21 | 33 |
| 8 | 6.3kW | 26 | 38 |

| RESIDENCE ID 90600 | DEVICE ID 90601 | DEVICE TYPE 90602 | PERFORMANCE 90603 |
|---|---|---|---|
| H1 | L1 | ILLUMINATION DEVICE | 100w |
| H1 | L2 | ILLUMINATION DEVICE | 160w |

| PERFORMANCE ID | PERFORMANCE | SMALLEST ROOM SIZE (m²) | LARGEST ROOM SIZE (m²) |
|---|---|---|---|
| 1 | 40w | 0 | 7 |
| 2 | 62w | 7 | 10 |
| 3 | 72w | 10 | 13 |
| 4 | 100w | 13 | 17 |
| 5 | 160w | 17 | 23 |

FIG. 129

| RESIDENCE ID | DEVICE ID | DEVICE TYPE |
|---|---|---|
| H1 | M | MICROWAVE OVEN |

110500 — RESIDENCE ID
110501 — DEVICE ID
110502 — DEVICE TYPE

| DEVICE TYPE | ROOM TYPE |
|---|---|
| REFRIGERATOR | KITCHEN |
| TOILET SEAT APPARATUS | TOILET |
| AIR CONDITIONER | LIVING ROOM |
| AIR CONDITIONER | BEDROOM |
| TELEVISION SET | LIVING ROOM |
| TELEVISION SET | CHILD ROOM |
| TELEVISION SET | BEDROOM |
| ... | ... |

1106001

| DEVICE ID | DEVICE TYPE NAME |
|---|---|
| R | REFRIGERATOR |
| B | TOILET SEAT APPARATUS |
| A | AIR CONDITIONER |
| T | TELEVISION SET |
| ... | ... |

| ROOM ID | ROOM TYPE NAME |
|---|---|
| K | KITCHEN |
| T | TOILET |
| L | LIVING ROOM |
| S | BEDROOM |
| C | CHILD ROOM |
| ... | ... |

| DEVICE ID | ROOM ID |
|---|---|
| R | K |
| B | T |
| A | L |
| A | S |
| T | L |
| T | C |
| T | S |
| ... | ... |

Figure 133:
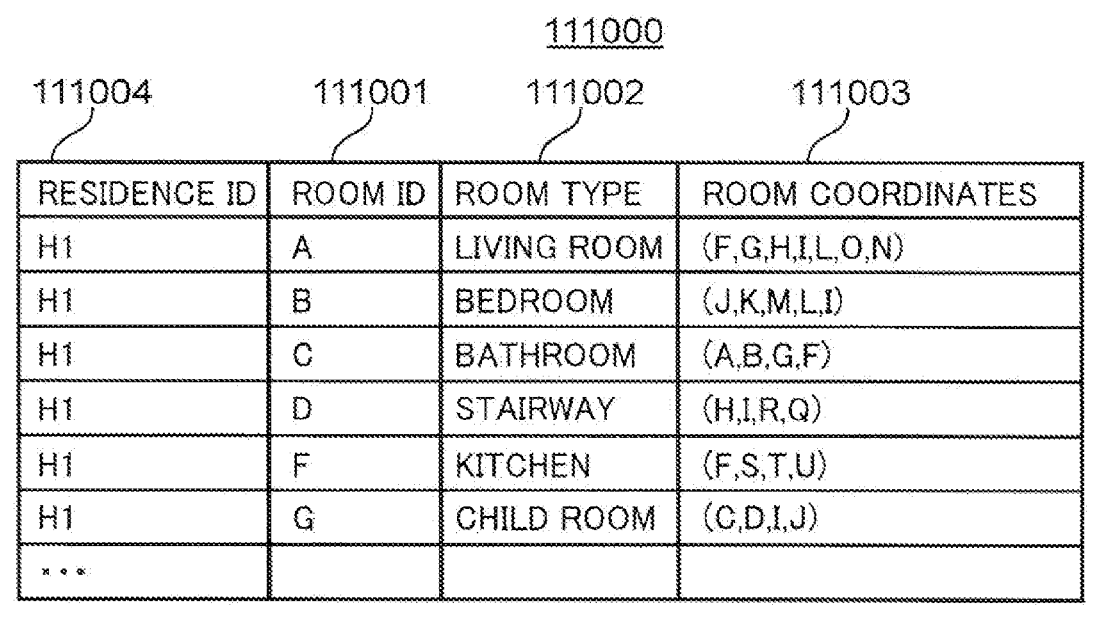

| RESIDENCE ID | ROOM ID | ROOM TYPE | ROOM COORDINATES |
|---|---|---|---|
| H1 | A | LIVING ROOM | (F,G,H,I,L,O,N) |
| H1 | B | BEDROOM | (J,K,M,L,I) |
| H1 | C | BATHROOM | (A,B,G,F) |
| H1 | D | STAIRWAY | (H,I,R,Q) |
| H1 | F | KITCHEN | (F,S,T,U) |
| H1 | G | CHILD ROOM | (C,D,I,J) |
| ... | | | |

| RESIDENCE ID | VERTEX ID | VERTEX COORDINATES |
|---|---|---|
| H1 | A | (X0,Y0,Z1) |
| H1 | B | (X20,Y0,Z1) |
| H1 | C | (X40,Y0,Z1) |
| ... | | |
| H1 | P | (X150,Y100,Z1) |

110913 — RESIDENCE ID
110911 — VERTEX ID
110912 — VERTEX COORDINATES

| FIRST DEVICE TYPE | SECOND DEVICE TYPE |
|---|---|
| REFRIGERATOR | MICROWAVE OVEN |
| REFRIGERATOR | INDUCTION COOKER |
| TELEVISION SET | CONTENT REPRODUCING MACHINE |
| ... | ... |

| RESIDENCE ID | DEVICE ID | DEVICE TYPE | MODEL NUMBER | ROOM ID | ARRANGEMENT |
|---|---|---|---|---|---|
| H1 | A | AIR CONDITIONER | CS-X403C | A | (X10,Y90,Z1) |
| H1 | B | ILLUMINATION DEVICE | HH-LC710A | A | (X50,Y50,Z1) |
| H1 | T | TELEVISION SET | TH-L55WT5 | A | (X70,Y200,Z1) |
| ... | | | | | |

| | 110905 | 110901 | 110902 | 110903 | 110904 |
|---|---|---|---|---|---|
| | RESIDENCE ID | DEVICE ID | REGISTRATION DATE | NUMBER OF TIMES POWER TURNED ON | VIEWING TIME |
| | H1 | T | SEPT. 29, 2010 | 465 | 1965 |
| | H1 | T2 | OCT. 1, 2012 | 31 | 32 |
| | ... | ... | ... | ... | ... |

FIG. 155

| 120901 | 120902 | 120903 |
|---|---|---|
| RESIDENCE ID | DEVICE ID | DEVICE TYPE |
| 5 | 5A2 | AIR CONDITIONER |

| RESIDENCE ID (121001) | LAYOUT TYPE (121002) |
|---|---|
| 1 | A |
| 2 | A |
| 3 | B |
| 4 | C |
| 5 | A |
| 6 | B |
| ... | ... |

| RESIDENCE ID 121101 | DEVICE ID 121102 | DEVICE TYPE 121103 | ARRANGEMENT 121104 | INSTALLATION ROOM 121105 |
|---|---|---|---|---|
| 1 | 1A1 | AIR CONDITIONER | (X10,Y90,Z1) | LIVING ROOM |
| 1 | 1A2 | AIR CONDITIONER | (X140,Y40,Z1) | WESTERN STYLE ROOM 1 |
| 1 | 1T | TELEVISION SET | (X70,Y200,Z1) | LIVING ROOM |
| ... | ... | ... | ... | ... |
| 2 | 2A | AIR CONDITIONER | (X10,Y90,Z1) | LIVING ROOM |
| 2 | 2B | ILLUMINATION DEVICE | (X70,Y200,Z1) | LIVING ROOM |
| 2 | 2T | TELEVISION SET | (X90,Y150,Z1) | WESTERN STYLE ROOM 2 |
| ... | ... | ... | ... | ... |

| LAYOUT TYPE | DEVICE TYPE | ROOM | INSTALLATION RATIO(%) |
|---|---|---|---|
| A | AIR CONDITIONER | LIVING ROOM | 80 |
| A | AIR CONDITIONER | WESTERN STYLE ROOM 1 | 40 |
| A | AIR CONDITIONER | WESTERN STYLE ROOM 2 | 10 |
| A | TELEVISION SET | LIVING ROOM | 90 |
| ... | ... | ... | ... |
| B | AIR CONDITIONER | LIVING ROOM | 90 |
| B | AIR CONDITIONER | WESTERN STYLE ROOM 1 | 30 |
| B | AIR CONDITIONER | WESTERN STYLE ROOM 2 | 60 |
| B | TELEVISION SET | LIVING ROOM | 95 |
| ... | ... | ... | ... |

| LAYOUT TYPE | DEVICE TYPE | ROOM | INSTALLATION RATIO(%) | AVERAGE ARRANGEMENT POSITION |
|---|---|---|---|---|
| A | AIR CONDITIONER | LIVING ROOM | 80 | (X10,Y90,Z1) |
| A | AIR CONDITIONER | WESTERN STYLE ROOM 1 | 40 | (X140,Y40,Z1) |
| A | AIR CONDITIONER | WESTERN STYLE ROOM 2 | 10 | (X90,Y15,Z1) |
| A | TELEVISION SET | LIVING ROOM | 90 | (X70,Y200,Z1) |
| ... | ... | ... | ... | ... |
| B | AIR CONDITIONER | LIVING ROOM | 90 | (X140,Y40,Z1) |
| B | AIR CONDITIONER | WESTERN STYLE ROOM 1 | 30 | (X5,Y55,Z1) |
| B | AIR CONDITIONER | WESTERN STYLE ROOM 2 | 60 | (X5,Y40,Z1) |
| B | TELEVISION SET | LIVING ROOM | 95 | (X130,Y90,Z1) |
| ... | ... | ... | ... | ... |

121201  121202  121203  121204  121501

INFORMATION APPARATUS CONTROL METHOD, COMPUTER-READABLE RECORDING MEDIUM, AND INFORMATION PROVIDING METHOD TO CONTROL DEVICES CONNECTED TO NETWORK VIA DEVICE ICONS DISPLAYED ON FLOOR PLAN

CROSS-REFERENCE TO RELATED APPLICATIONS

This application is a continuation of U.S. patent application Ser. No. 15/708,541, filed on Sep. 19, 2017, which is a continuation of U.S. patent application Ser. No. 14/580,819, filed on Dec. 23, 2014, which is a continuation of International Patent Application No. PCT/JP2013/003964, filed on Jun. 25, 2013, which claims the benefit of U.S. Provisional Patent Application Nos. 61/806,580, filed on Mar. 29, 2013, 61/806,604, filed on Mar. 29, 2013, 61/806,608, filed on Mar. 29, 2013, 61/806,528, filed on Mar. 29, 2013, and 61/806,587, filed on Mar. 29, 2013, the disclosures of which are incorporated by reference herein in their entireties.

TECHNICAL FIELD

The present disclosure relates to a method for controlling information apparatus, a computer-readable recording medium, and a method for providing information.

BACKGROUND ART

Patent Literature 1 discloses a technique for displaying a device icon on a display screen displaying a floor plan and displaying an operation screen of a target device when the device icon is selected. The target device is remotely operated using the operation screen. According to Patent Literature 1, an input screen is displayed when connection of a new target device is detected, whereby a user inputs a name of the target device, a name of a room where the target device is installed, and a name of a floor on which the target device is installed to the input screen (FIG. 8A).

Patent Literature 2 discloses a technique for displaying a device icon on a display screen displaying a floor plan. According to Patent Literature 2, when connection of a new target device is detected, by moving a device icon corresponding to the new target device to an installation position of the target device on the floor plan, the target device and position information of the target device on the floor plan are managed in association with each other.

However, Patent Literature 1 and Patent Literature 2 require further improvements.

Patent Literature 1 U.S. Pat. No. 7,730,223
Patent Literature 2 Japanese Unexamined Patent Publication No. 2005-198252

SUMMARY OF THE INVENTION

In one general aspect, the techniques disclosed here feature a method for controlling information apparatus having a display and being connected to a network, over which one or more target devices are controlled.
  the method causing a computer of the information apparatus to:
  display on the display a display screen representing a floor plan including one or more rooms;
  using at least one memory that associates first information with second information, the first information indicating a type of each of one or more device icons representing the one or more target devices and the second information indicating an attribute of each of the one or more rooms, display each of the one or more device icons in a region on the display screen corresponding to a room that corresponds to each of the one or more device icons in accordance with the type of each of the one or more device icons;
  when selection of any of the one or more device icons is sensed in a region corresponding to any of the rooms included in the floor plan, display a control screen for at least any of operation and state confirmation of a target device corresponding to the selected device icon on the display screen representing the floor plan; and
  output to the network a control command for at least any of the operation and the state confirmation of the target device corresponding to the selected device icon, based on an operation on the control screen, wherein
  the one or more device icons include a device icon of a first type and a device icon of a second type that is in a relationship of being displayed in a region on the display screen corresponding to a same room as a room in which the device icon of the first type is displayed, and
  when it is determined that one device icon among the one or more device icons is the device icon of the second type, the one device icon is displayed in a region on the display screen corresponding to a same room as a room in which the device icon of the first type is displayed.

According to the aspect described above, it is possible to embody a further improvement.

These general and specific aspects may be implemented using a system, a method, and a computer program, and any combination of systems, methods, and computer programs.

BRIEF DESCRIPTION OF THE DRAWINGS

FIG. 32 is a diagram showing the configuration of room information according to the present disclosure.

FIG. 34 is a diagram showing the configuration of a device list managed by the server according to the present disclosure.

FIG. 35 is a diagram showing the configuration of a device list managed by the home controller according to the present disclosure.

FIG. 40 is a flowchart showing the flow of a process for the home controller to generate a control command for a device in accordance with the content of a contact by a contacting object according to the present disclosure.

FIG. 68 is a diagram showing the configuration of room information shown in FIG. 67.

FIG. 70 is a diagram showing the configuration of a device list managed by the server for a case where the floor plan shown in FIG. 52 is adopted.

FIG. 71 is a diagram showing the configuration of a device list managed by the home controller for a case where the floor plan shown in FIG. 52 is adopted.

FIG. 74 is a sequence diagram showing a flow of a displaying process for displaying a device icon corresponding to a device to be newly registered on a floor plan.

FIG. 77 is a diagram showing an example of a reference table that associates a device type and a room type with each other.

FIG. 78A is a diagram showing an example of a first reference table that associates a device ID and a device type name with each other, FIG. 78B is a diagram showing an example of a second reference table that associates a room ID and a room type name with each other, and FIG. 78C is a diagram showing an example of a third reference table that associates a device ID and a room ID with each other.

FIG. 80 is a diagram showing an example of a device list that is managed by a server.

FIG. 100 is a diagram showing an example of a device new registration request that is transmitted when a television set is to be newly registered.

FIG. 102 is a diagram showing an example of a reference table that associates a device type and a room type with each other.

FIG. 103A is a diagram showing an example of a first reference table that associates a device ID and a device type name with each other. FIG. 103B is a diagram showing an example of a second reference table that associates a room ID and a room type name with each other, and FIG. 103C is a diagram showing an example of a third reference table that associates a device ID and a room ID with each other.

FIG. 104 is a diagram showing an example of a reference table that associates a device performance and a room size with each other.

FIG. 105 is a diagram showing an example of vertex information.

FIG. 106 is a diagram showing an example of room information.

FIG. 109 is a diagram showing an example of a device new registration request when a device to be newly registered is a small-sized television set.

FIG. 112 is a diagram showing an example of a reference table that associates a device performance and a room size with each other when a device type is an air conditioner.

FIG. 114 is a diagram showing an example of a device new registration request when devices to be newly registered are two illumination devices.

FIG. 115 is a diagram showing an example of a reference table that associates a device performance and a room size with each other when a device type is an illumination device.

FIG. 119 is a diagram showing an example of a display screen of a home controller when devices to be newly registered are two illumination devices.

FIG. 120 is a diagram showing a floor plan with a different pattern.

FIG. 121 is a diagram for explaining an example of displaying a device icon of a newly registered device on the floor plan with a different pattern.

FIG. 122 is a sequence diagram showing a flow of a process by the home controller for deciding an arrangement position of a device icon corresponding to a device to be newly registered.

FIG. 123 is a flow chart for explaining an initial arrangement deciding process by a home controller.

FIG. 124 is a sequence diagram showing a flow of a process by a server for deciding an arrangement position of a device icon corresponding to a device to be newly registered when the device transmits a device new registration request to a home controller.

FIG. 125 is a sequence diagram showing a flow of a process by a home controller for deciding an arrangement position of a device icon corresponding to a device to be newly registered when the device transmits a device new registration request to a server.

FIG. 126 is a diagram showing an example of a basic screen that is displayed on a display of a home controller.

FIG. 127 is a diagram showing a configuration of a display state of a device control screen of a home controller.

FIG. 128 is a sequence diagram showing a flow of a displaying process for displaying a device icon corresponding to a device to be newly registered on a floor plan.

FIG. 129 is a diagram showing an example of a device new registration request that is transmitted when a microwave oven is to be newly registered.

FIG. 130 is a flow chart for explaining an initial arrangement deciding process by a server.

FIG. 131 is a diagram showing an example of a reference table that associates a device type and a room type with each other.

FIG. 132A is a diagram showing an example of a first reference table that associates a device ID and a device type name with each other, FIG. 132B is a diagram showing an example of a second reference table that associates a room ID and a room type name with each other, and FIG. 132C is a diagram showing an example of a third reference table that associates a device ID and a room ID with each other.

FIG. 133 is a diagram showing an example of room information.

FIG. 134 is a diagram showing an example of vertex information.

Figure 135:
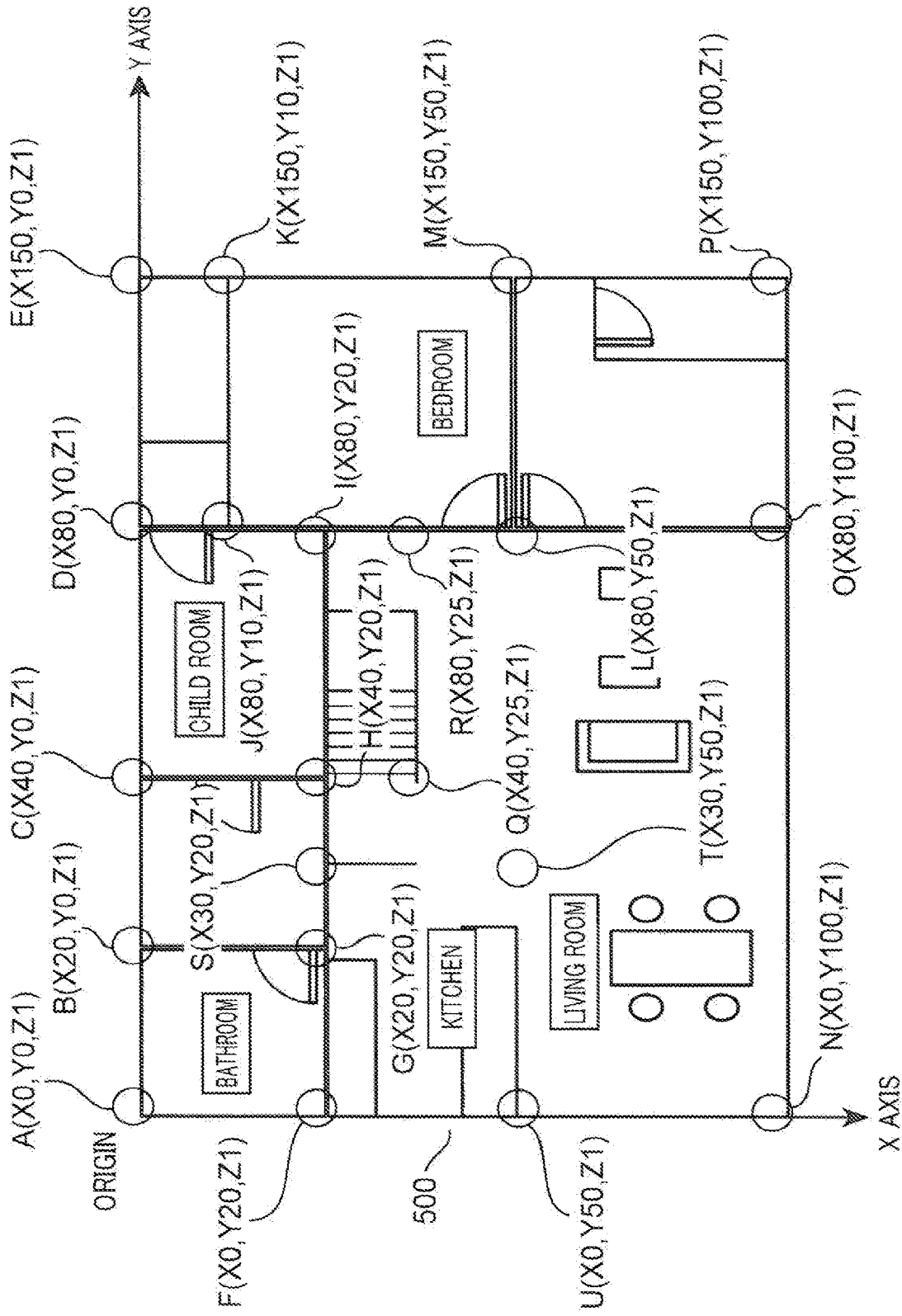

FIG. 135 is a diagram showing a correspondence relationship between each vertex registered in vertex information and a floor plan.

FIG. 136 is a diagram showing an example of a device type reference table that is managed by a server.

FIG. 137 is a diagram showing an example of a device list that is managed by a server.

FIG. 138 is a diagram showing an example of a use frequency management table that is managed by a server.

Figure 139:
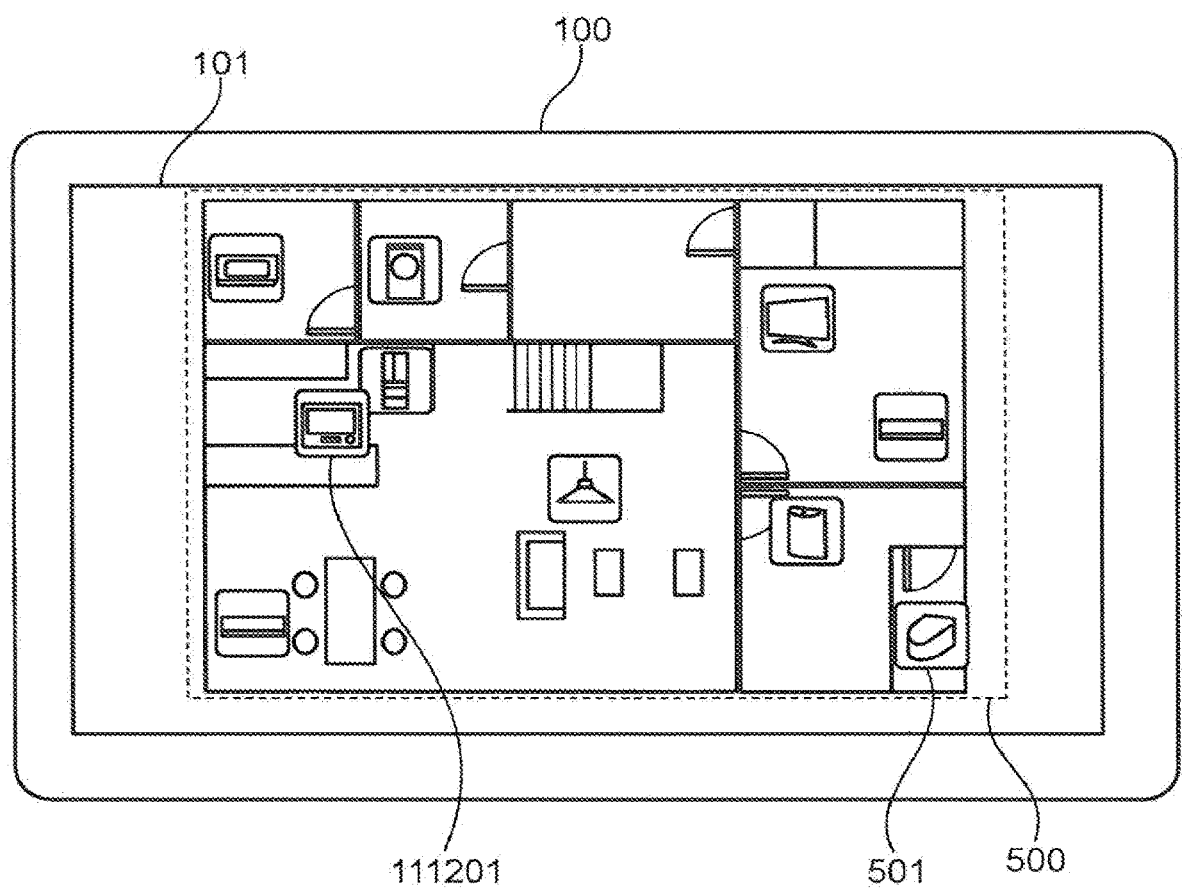

FIG. 139 is a diagram showing an example of a display screen of a home controller when a device to be newly registered is a microwave oven.

Figure 140:
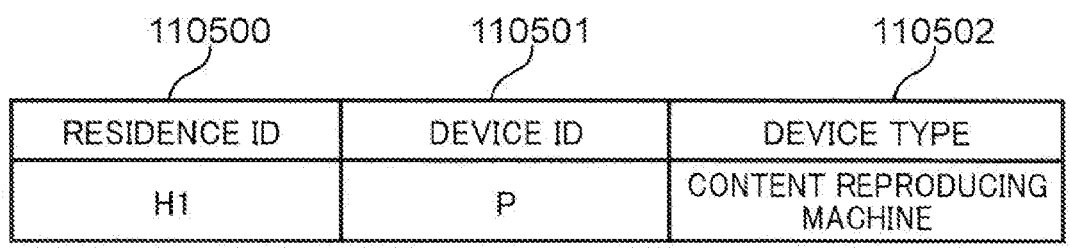

FIG. 140 is a diagram showing an example of a device new registration request when a device to be newly registered is a content reproducing machine.

Figure 141:
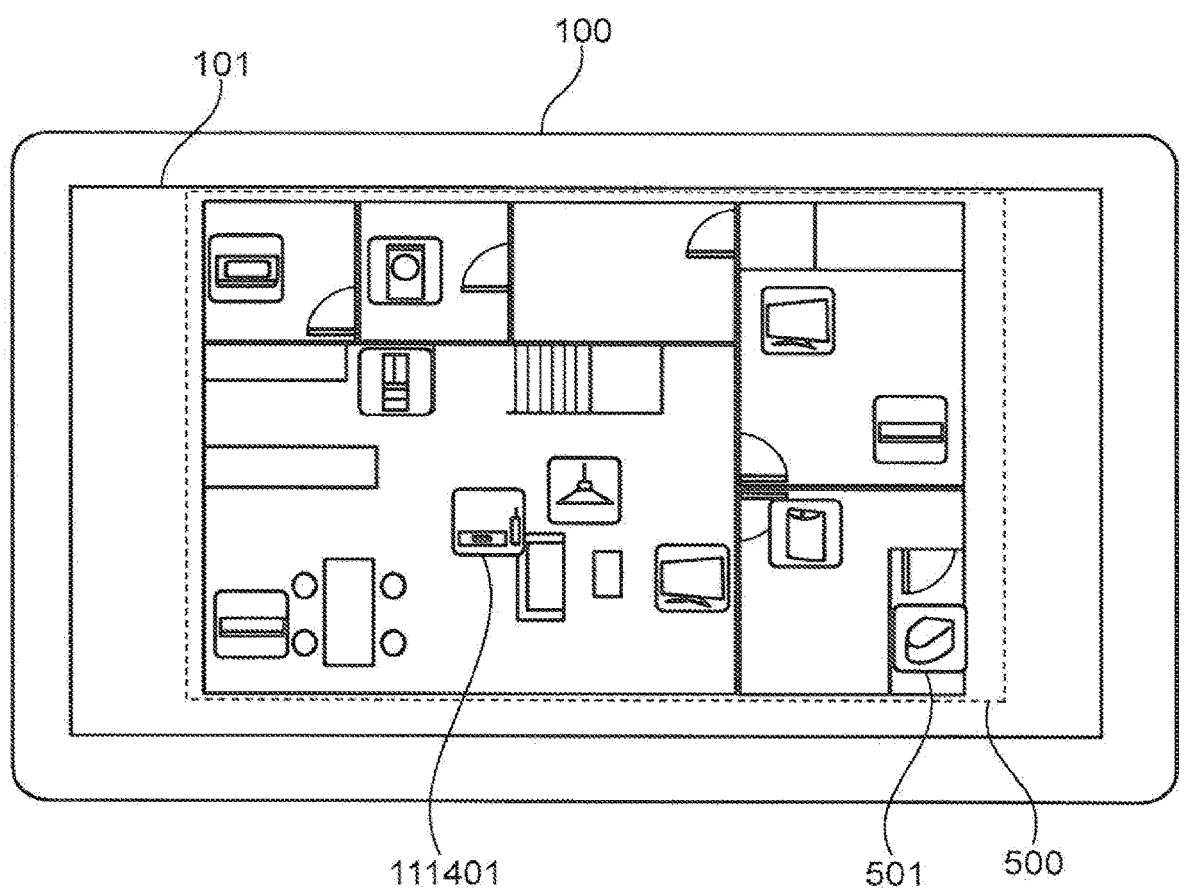

FIG. 141 is a diagram showing an example of a display screen of a home controller when a device to be newly registered is a content reproducing machine.

Figure 142:
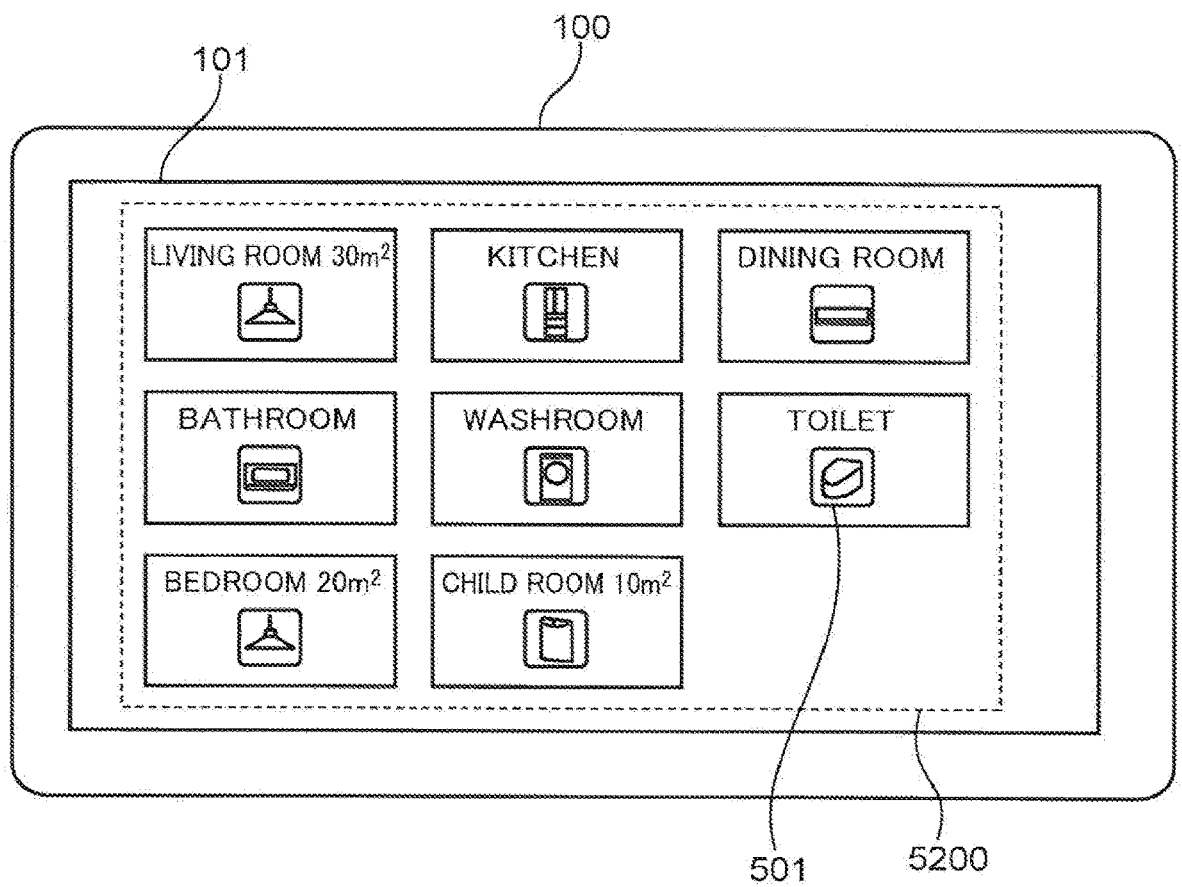

FIG. 142 is a diagram showing a floor plan with a different pattern.

Figure 143:
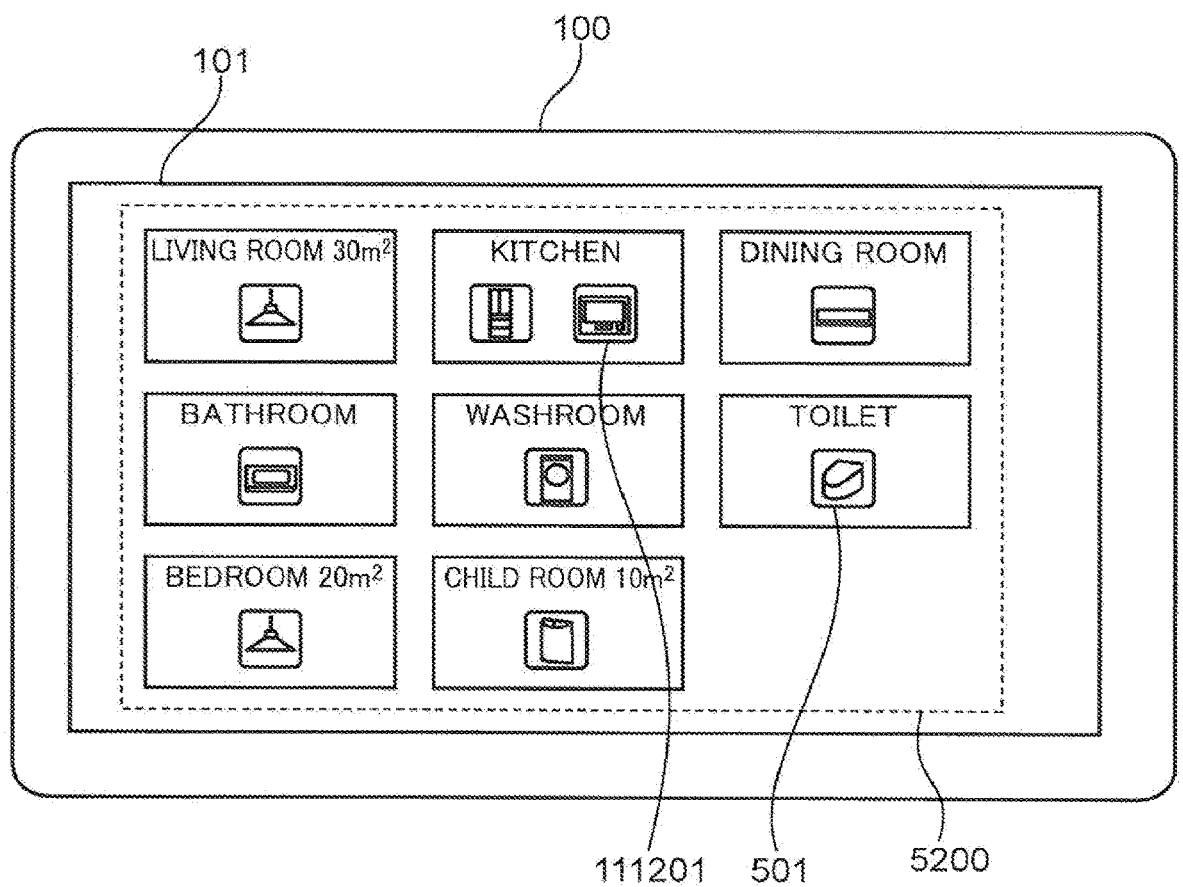

FIG. 143 is a diagram for explaining an example of displaying a device icon of a newly registered device on the floor plan with a different pattern.

Figure 144:
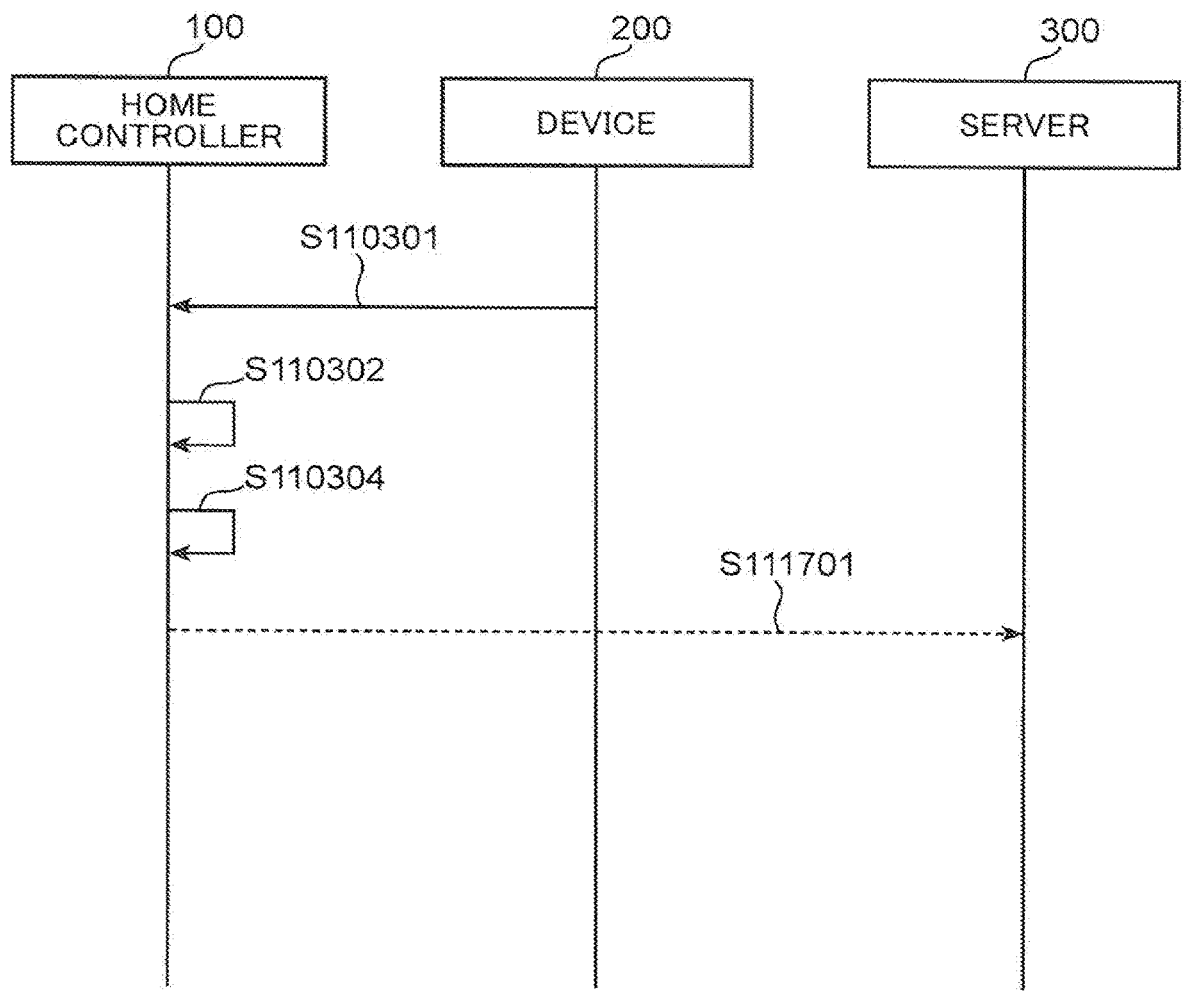

FIG. 144 is a sequence diagram showing a flow of a process by the home controller for deciding an arrangement position of a device icon corresponding to a device to be newly registered.

Figure 145:
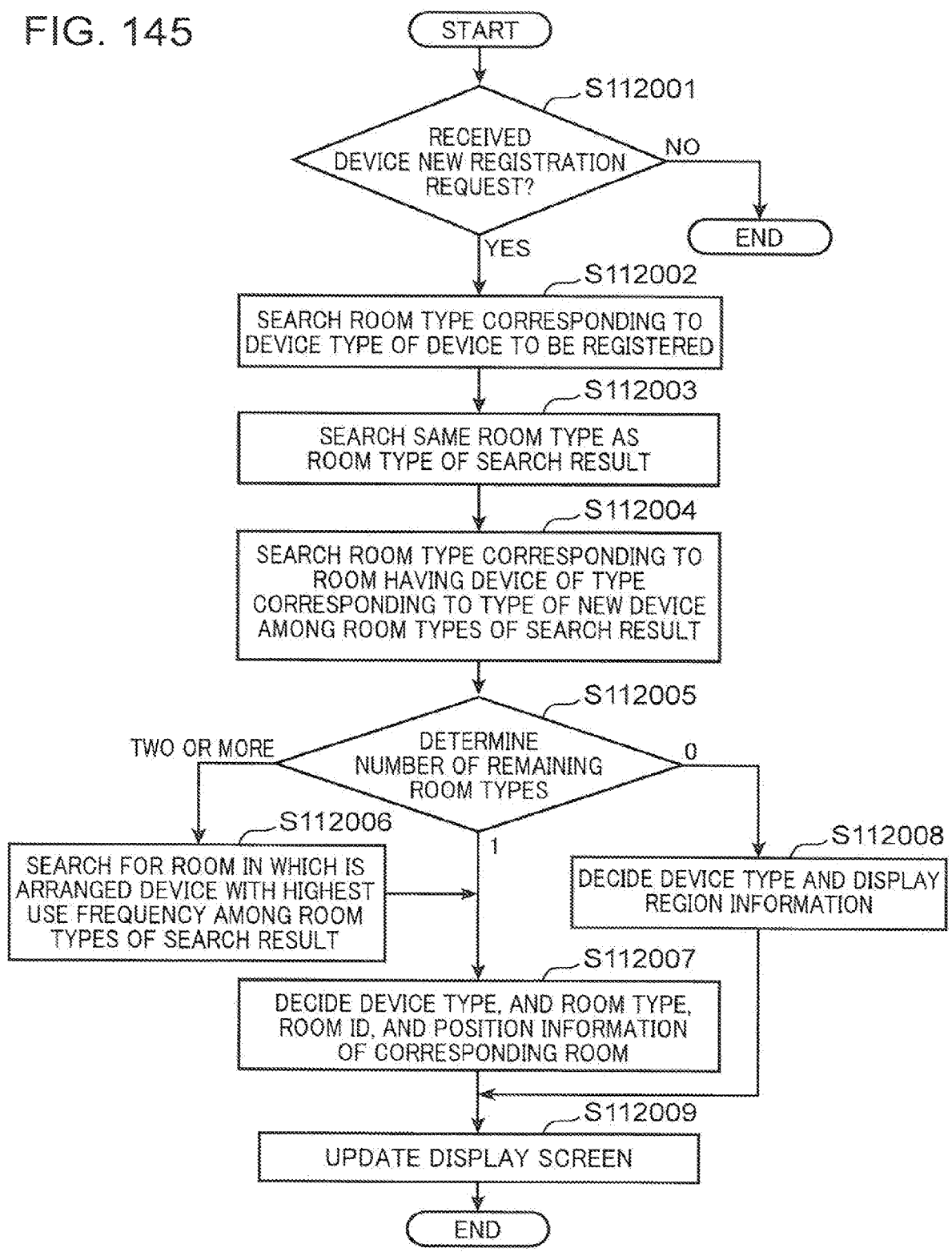

FIG. 145 is a flow chart for explaining an initial arrangement deciding process by a home controller.

Figure 146:
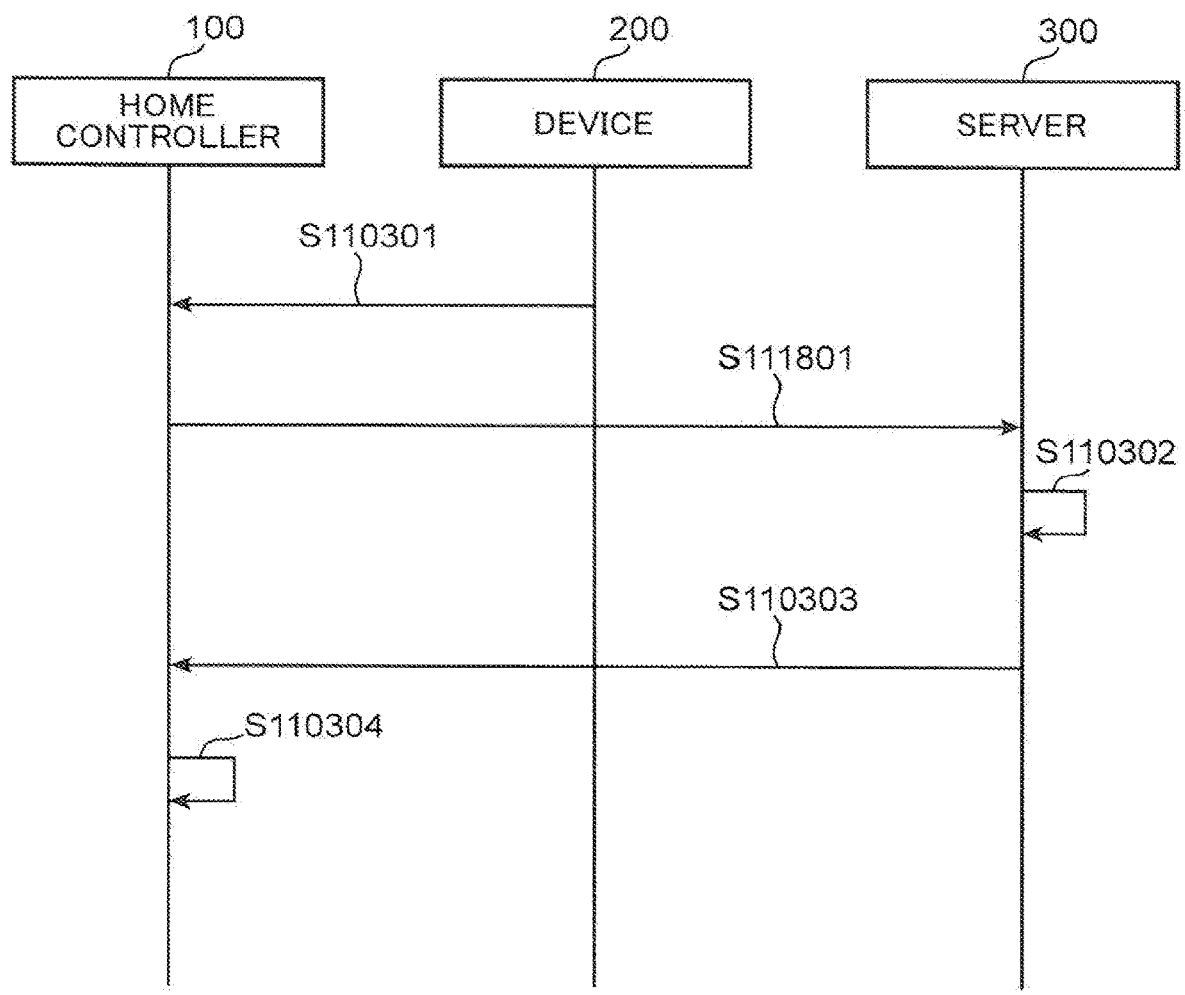

FIG. 146 is a sequence diagram showing a flow of a process by a server for deciding an arrangement position of a device icon corresponding to a device to be newly registered when the device transmits a device new registration request to a home controller.

Figure 147:
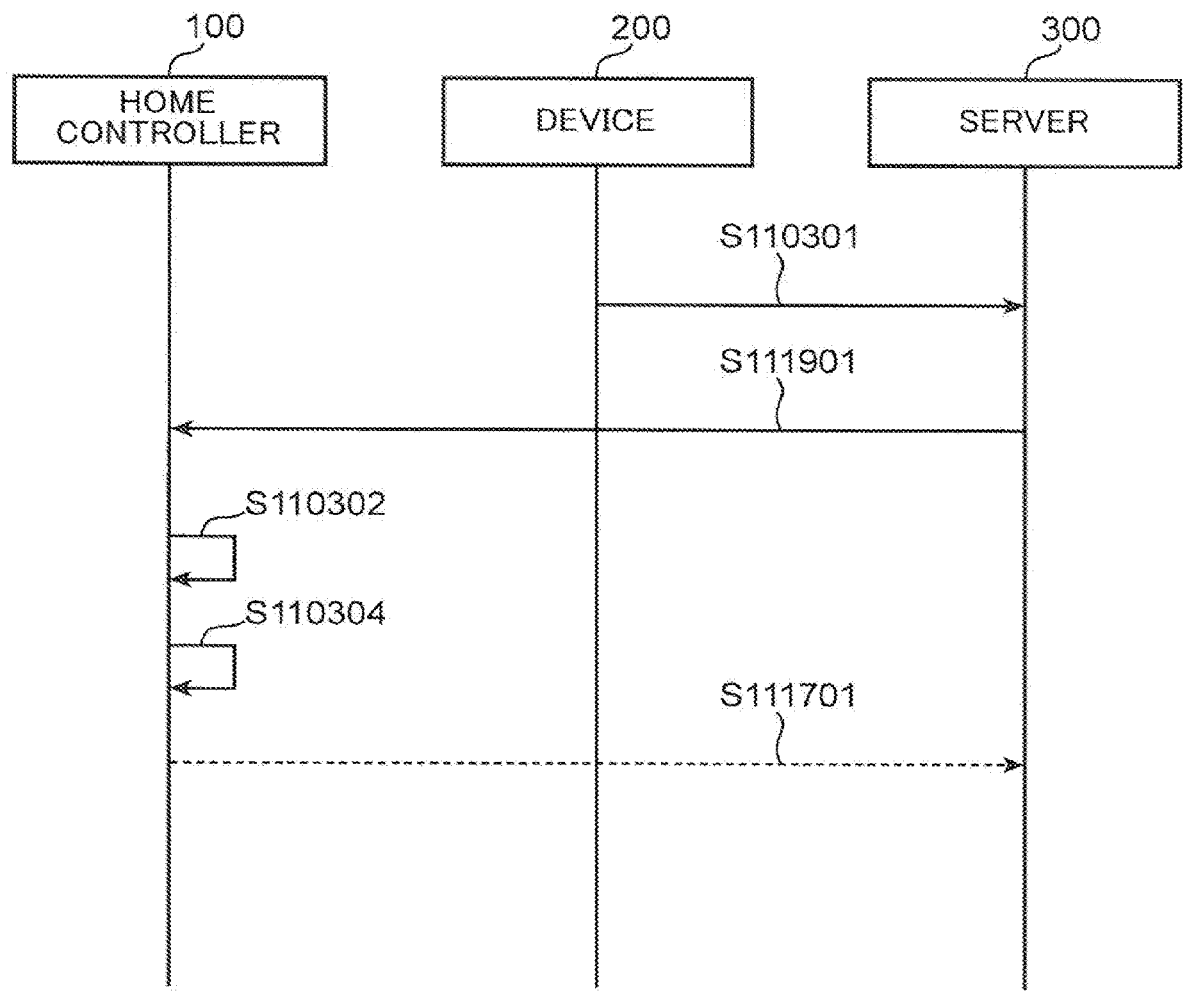

FIG. 147 is a sequence diagram showing a flow of a process by a home controller for deciding an arrangement position of a device icon corresponding to a device to be newly registered when the device transmits a device new registration request to a server.

Figure 148:
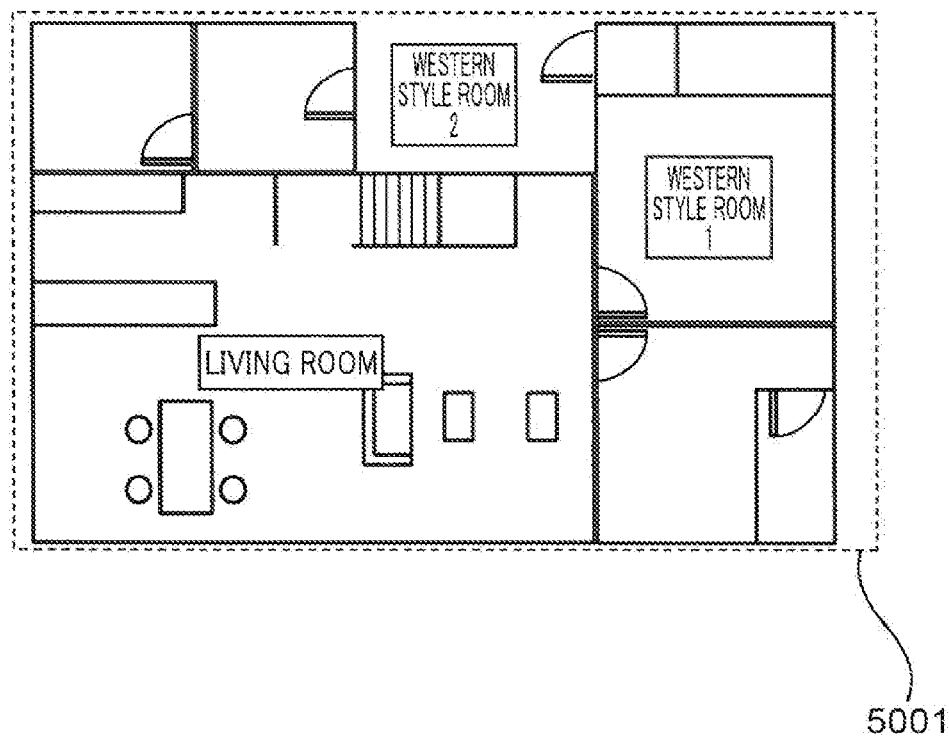

FIG. 148 is a diagram showing an example of a first floor plan.

Figure 149:
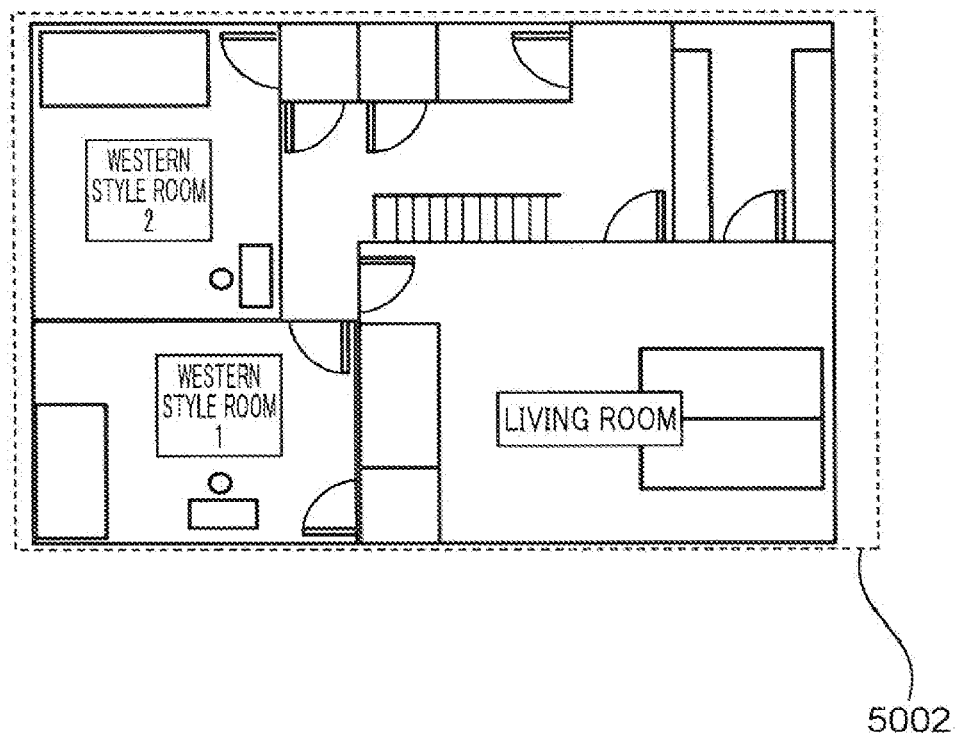

FIG. 149 is a diagram showing an example of a second floor plan.

Figure 150:
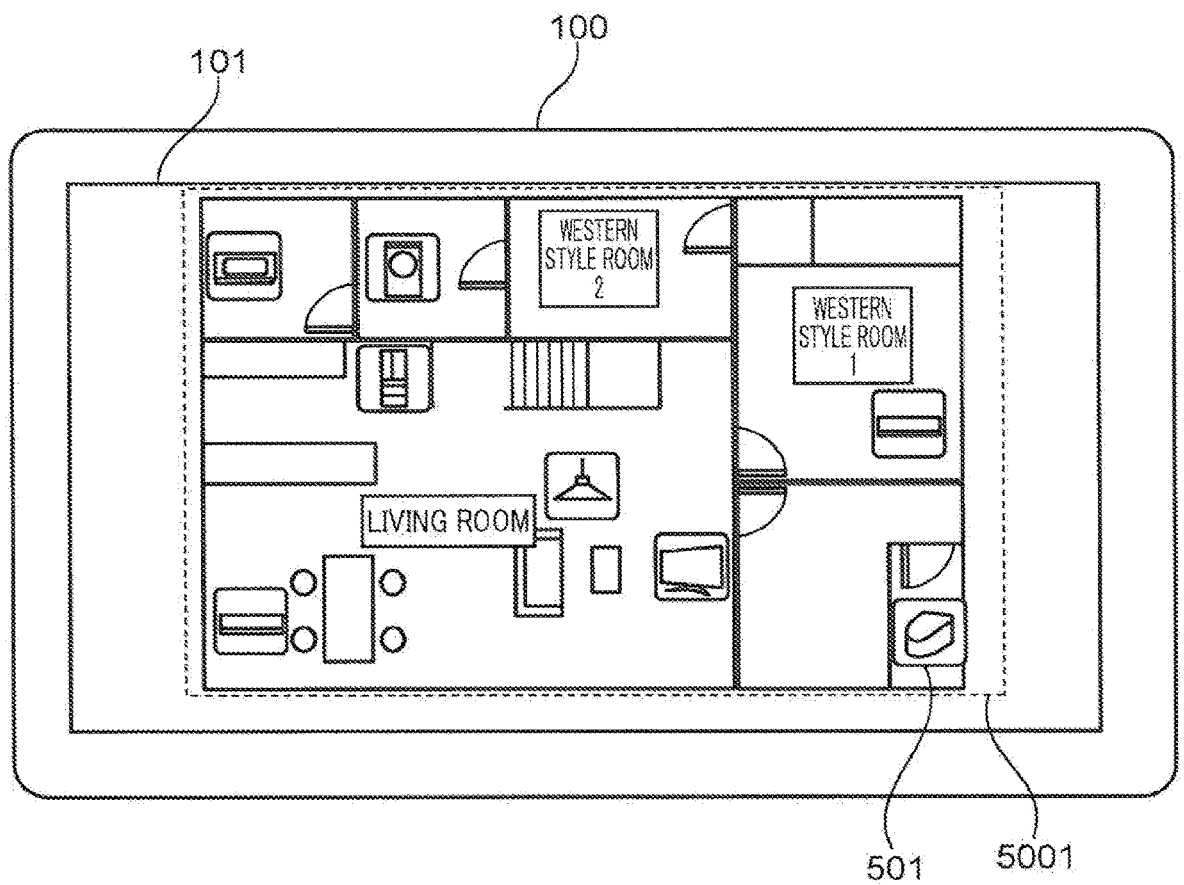

FIG. 150 is a diagram showing a display screen corresponding to a first residence that is displayed on a display of a home controller.

Figure 151:
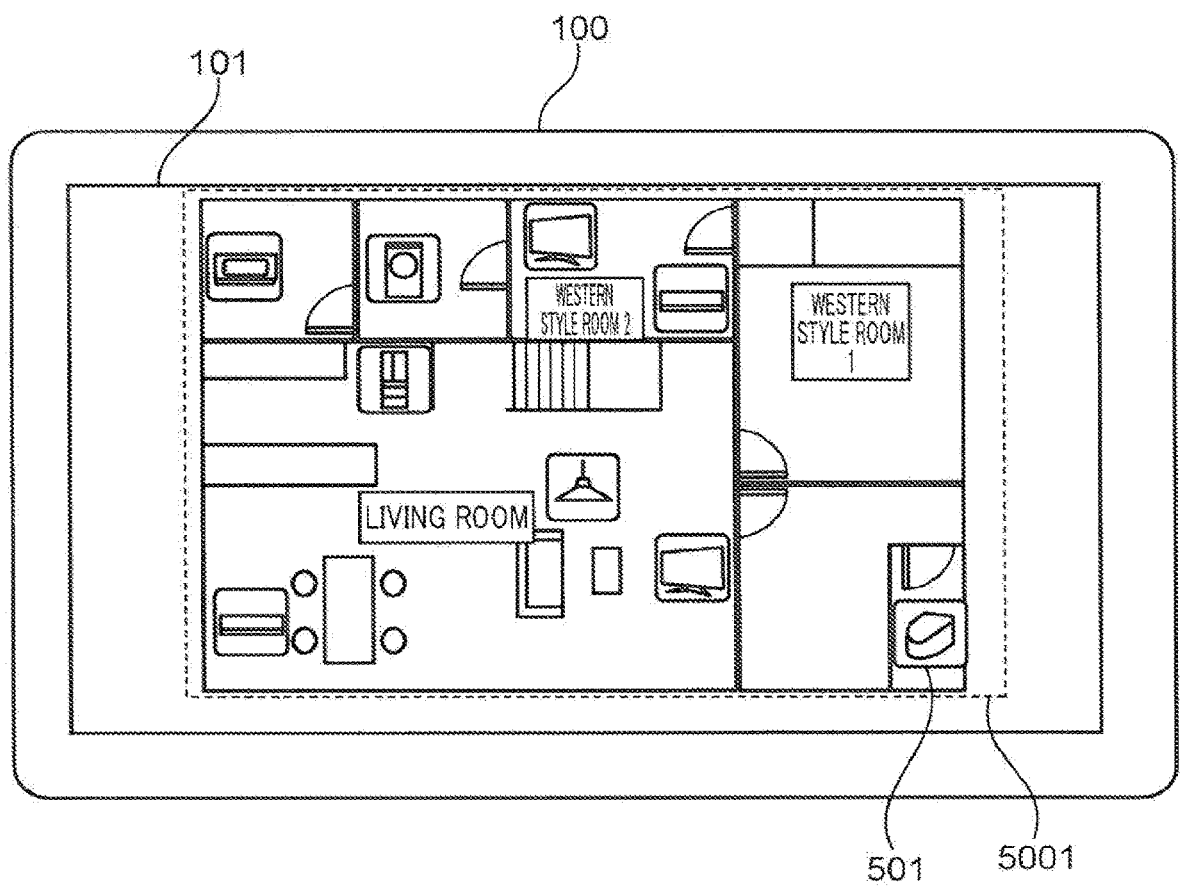

FIG. 151 is a diagram showing a display screen corresponding to a second residence that is displayed on a display of a home controller.

Figure 152:
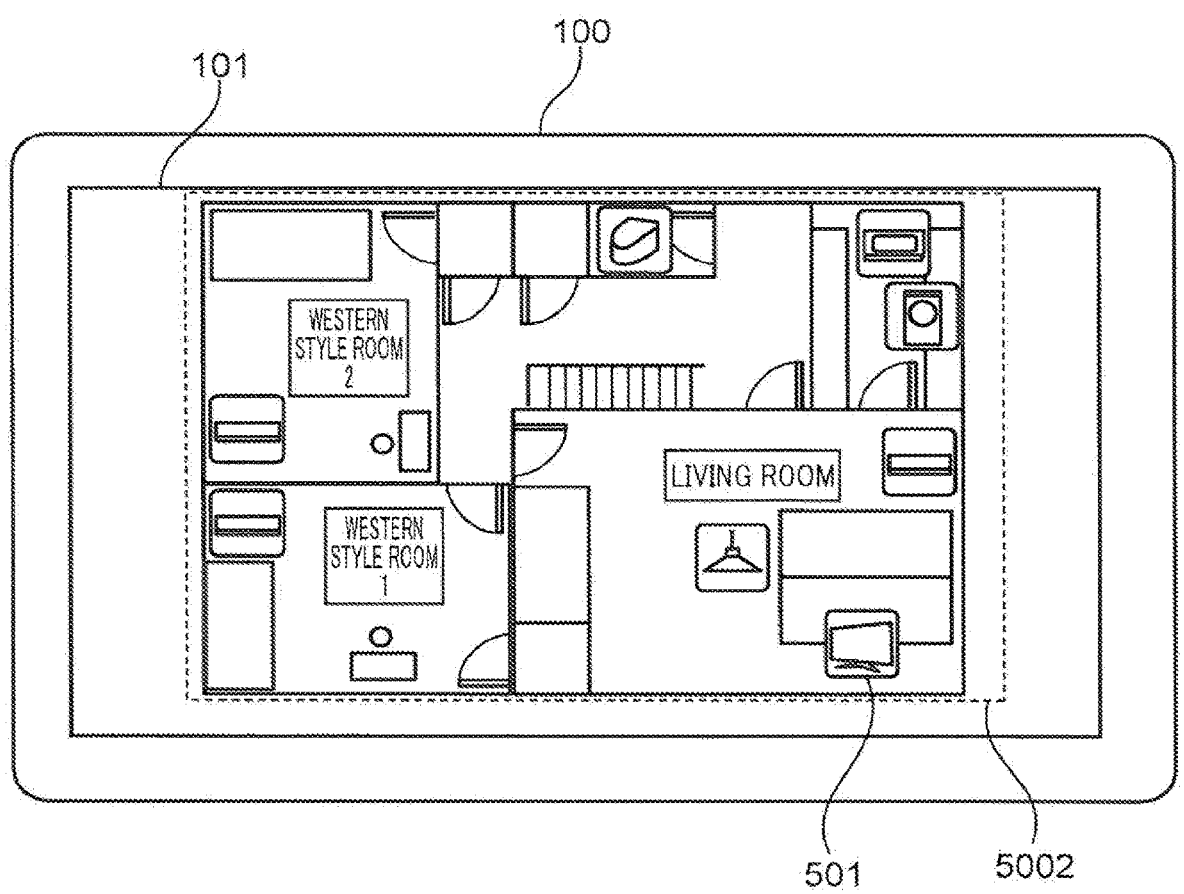

FIG. 152 is a diagram showing a display screen corresponding to a third residence that is displayed on a display of a home controller.

Figure 153:
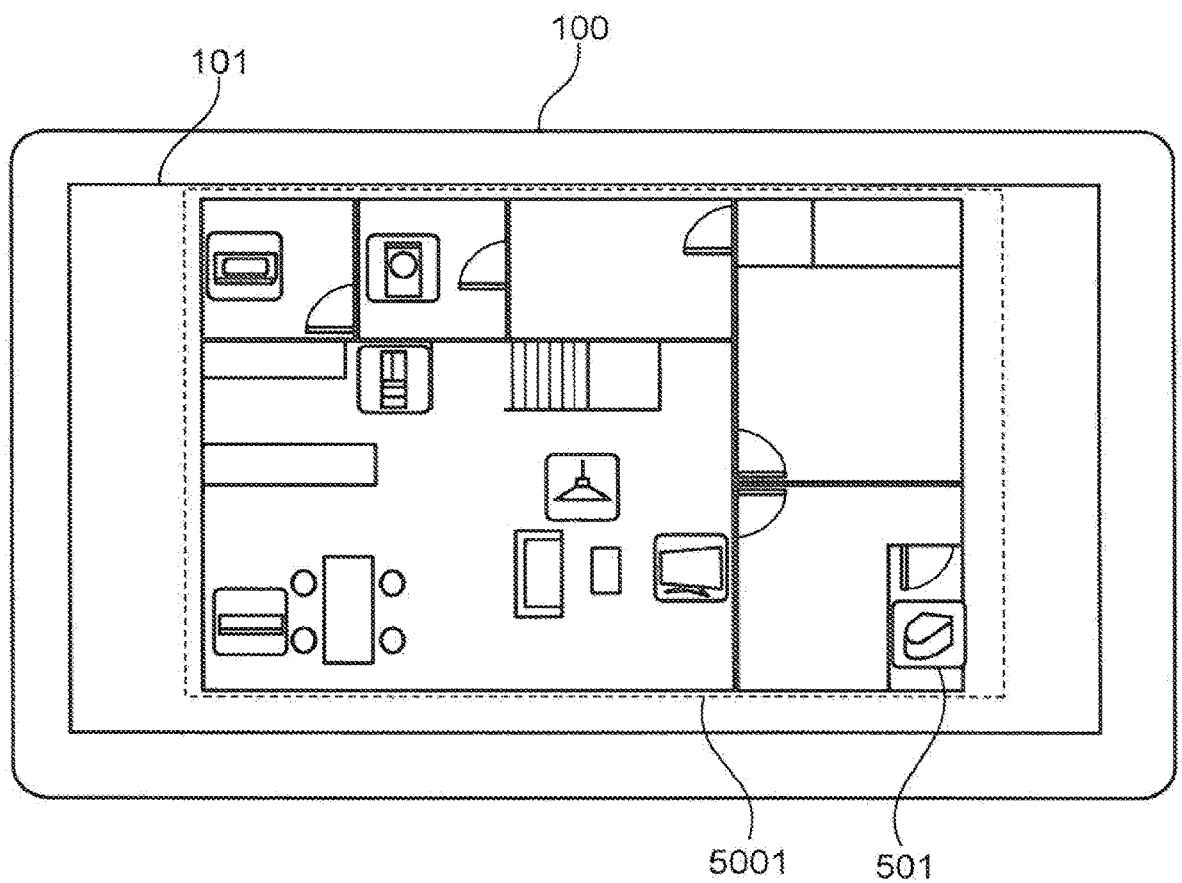

FIG. 153 is a diagram showing an example of a display screen that is displayed on a display of a home controller before a device is newly registered.

Figure 154:
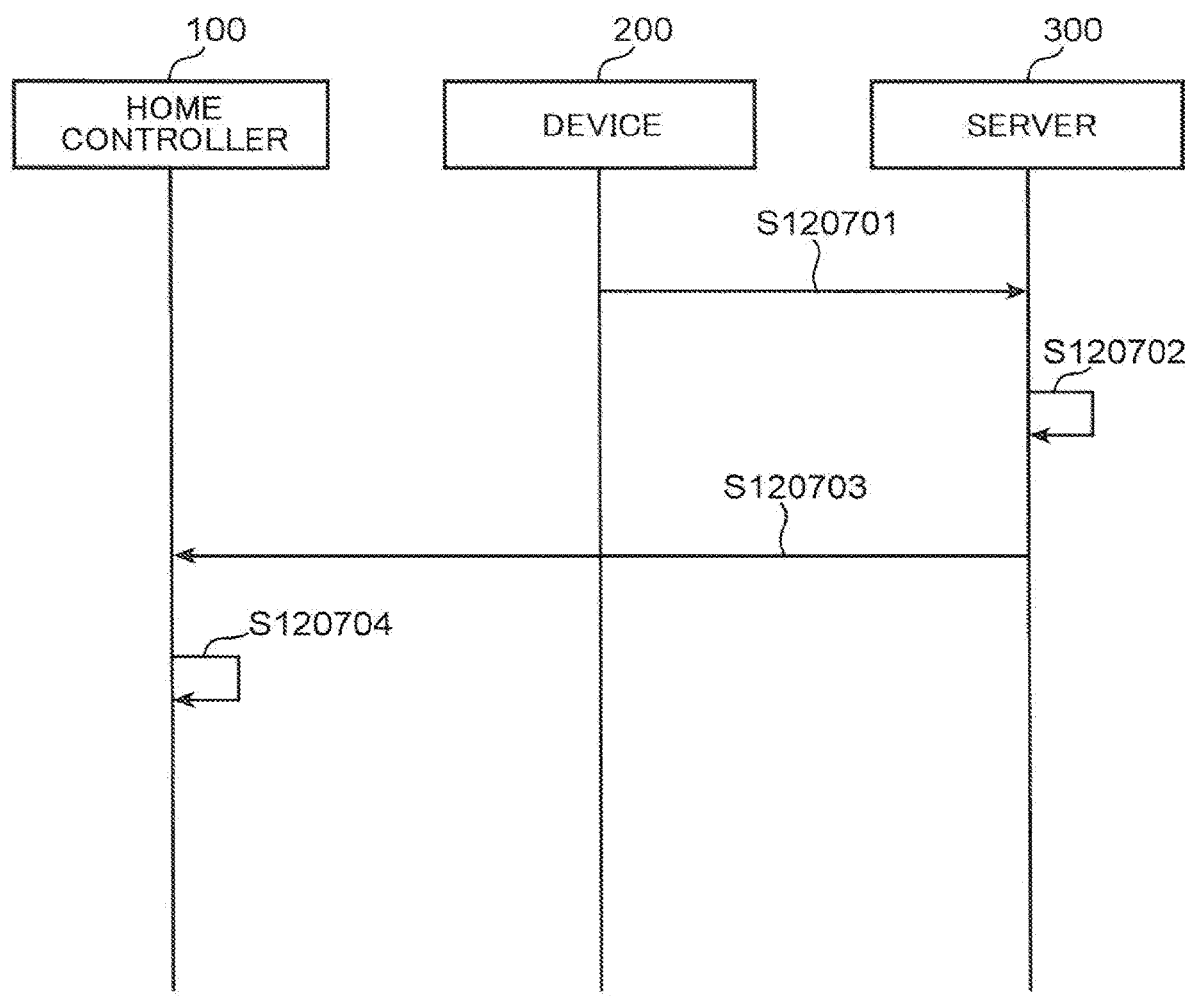

FIG. 154 is a sequence diagram showing a flow of a displaying process for displaying a device icon corresponding to a device to be newly registered on a floor plan.

FIG. 155 is a diagram showing an example of a device new registration request that is transmitted when an air conditioner is to be newly registered.

Figure 156:
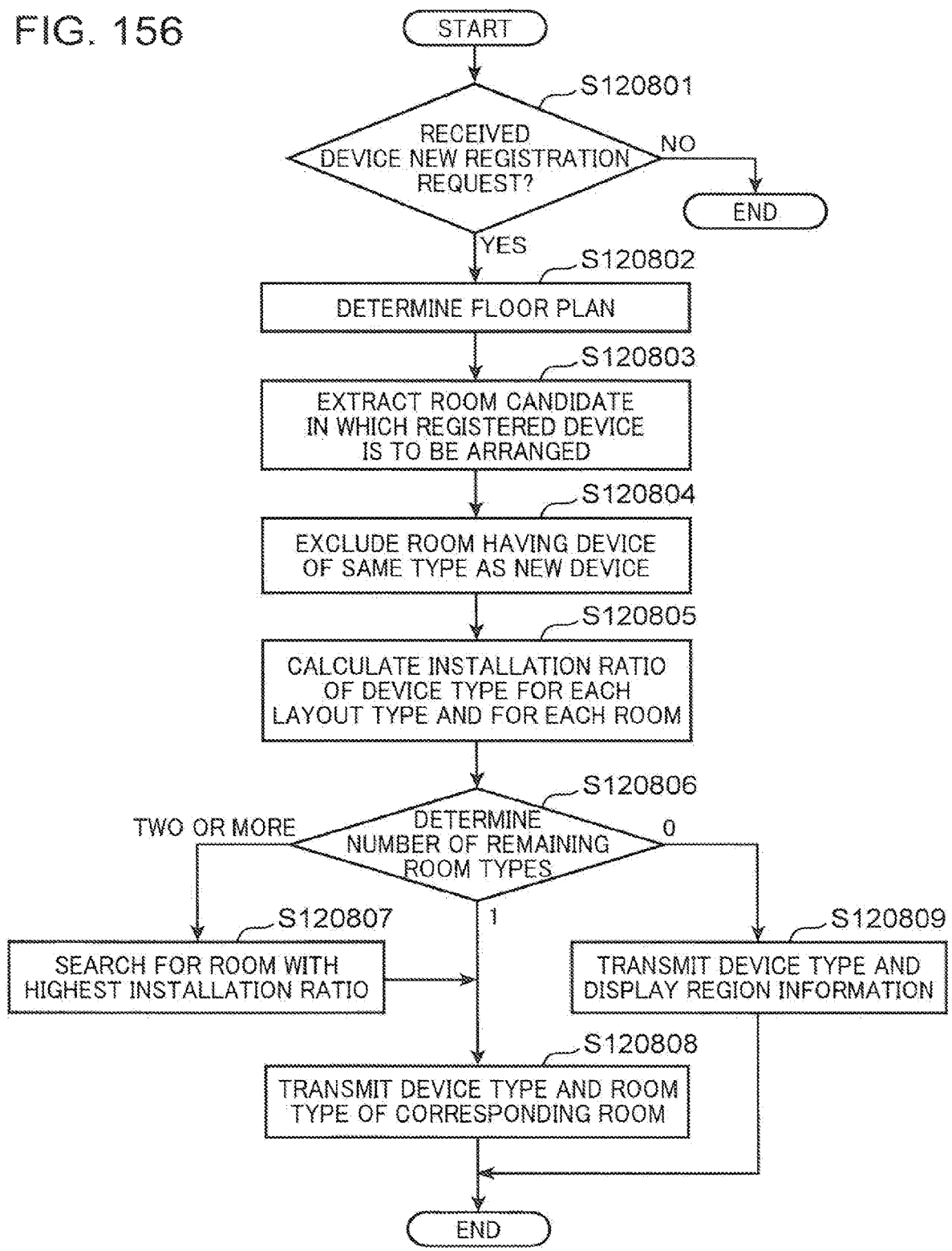

FIG. 156 is a flow chart for explaining an initial arrangement deciding process by a server.

FIG. 157 is a diagram showing an example of a layout type reference table that is managed by a server.

FIG. 158 is a diagram showing an example of a device list that is managed by a server.

FIG. 159 is a diagram showing an example of a layout management table representing a correspondence relationship between a device type and a room for each floor plan.

Figure 160:
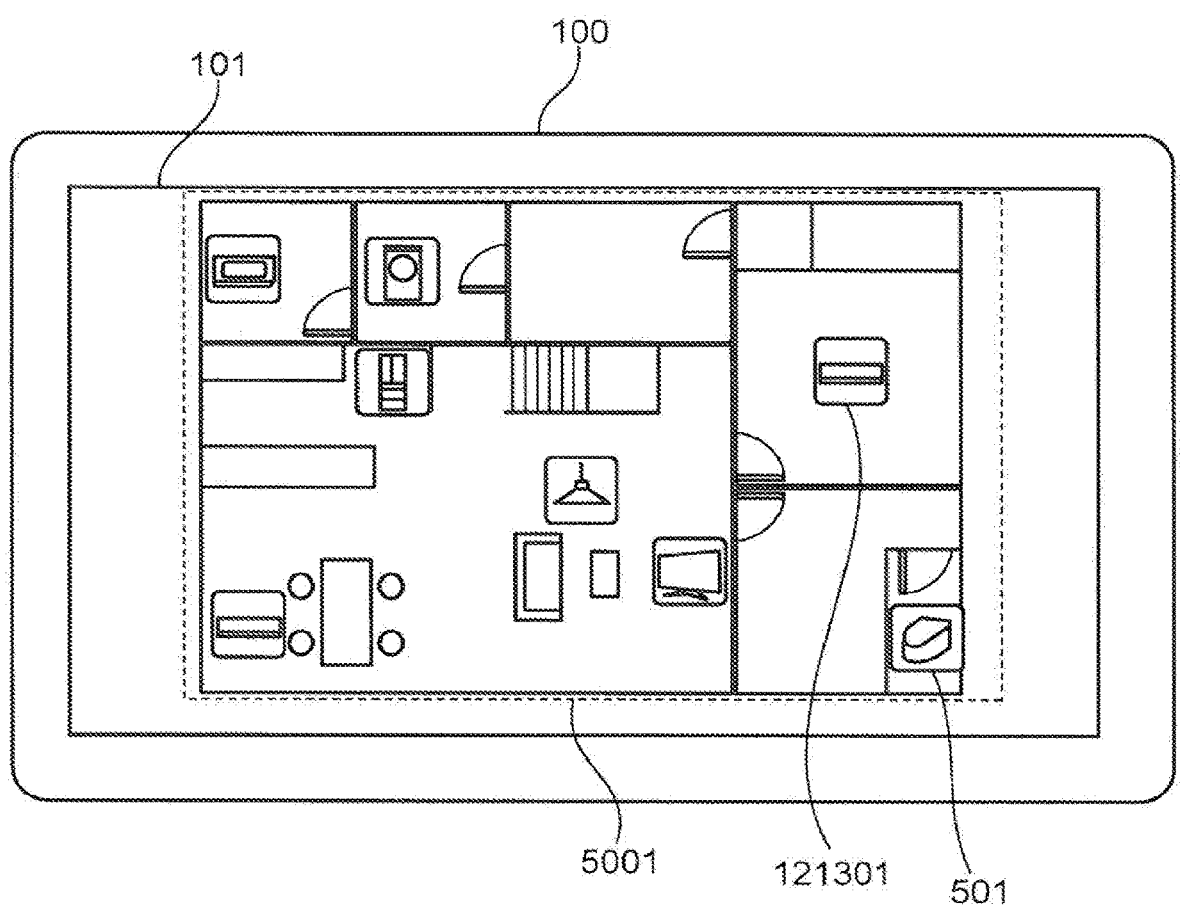

FIG. 160 is a diagram showing an example of a display screen of a home controller when a device to be newly registered is an air conditioner.

Figure 161:
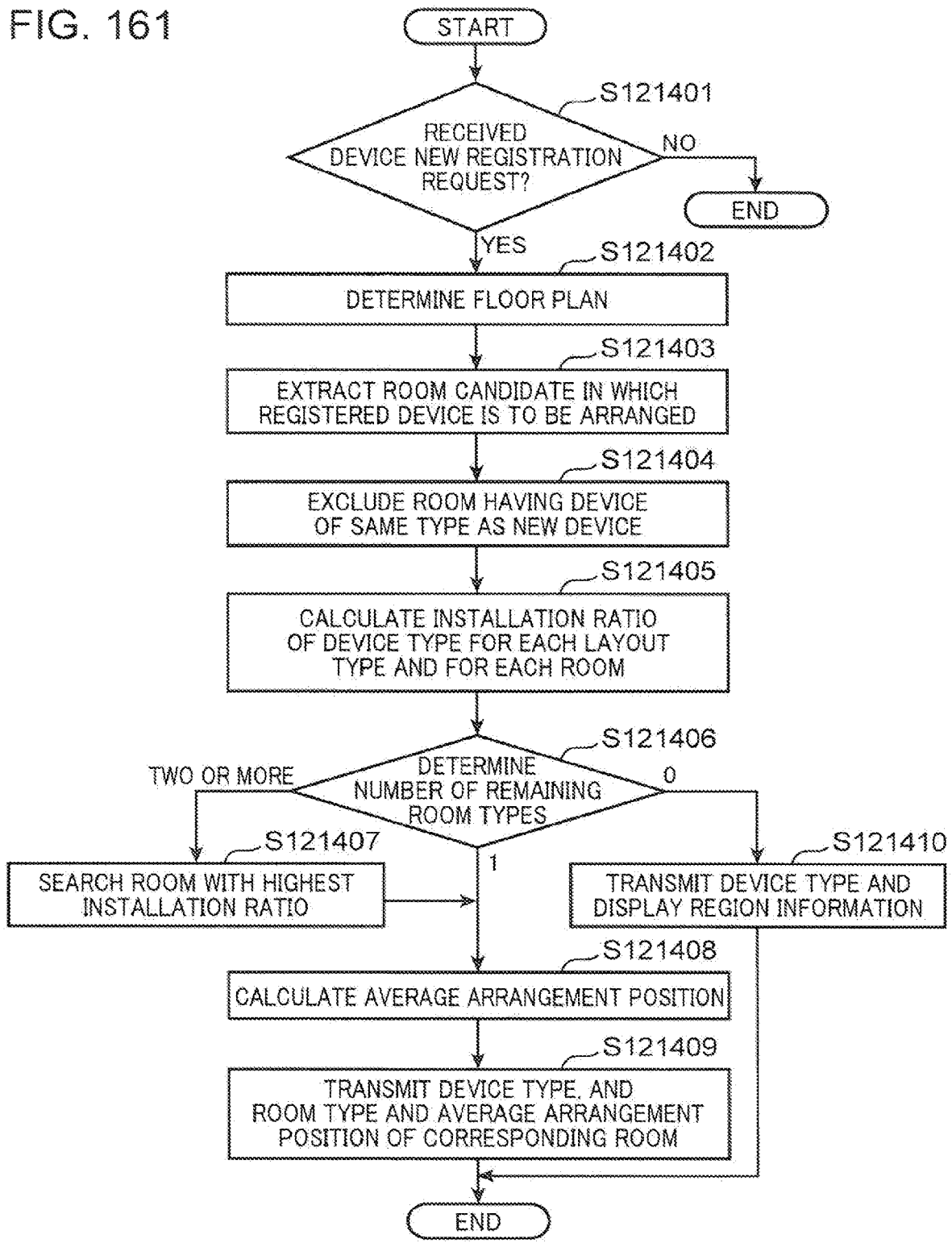

FIG. 161 is a flow chart for explaining another example of an initial arrangement deciding process by a server.

FIG. 162 is a diagram showing an example of a layout management table representing a correspondence relationship between a device type and a room for each floor plan.

Figure 163:
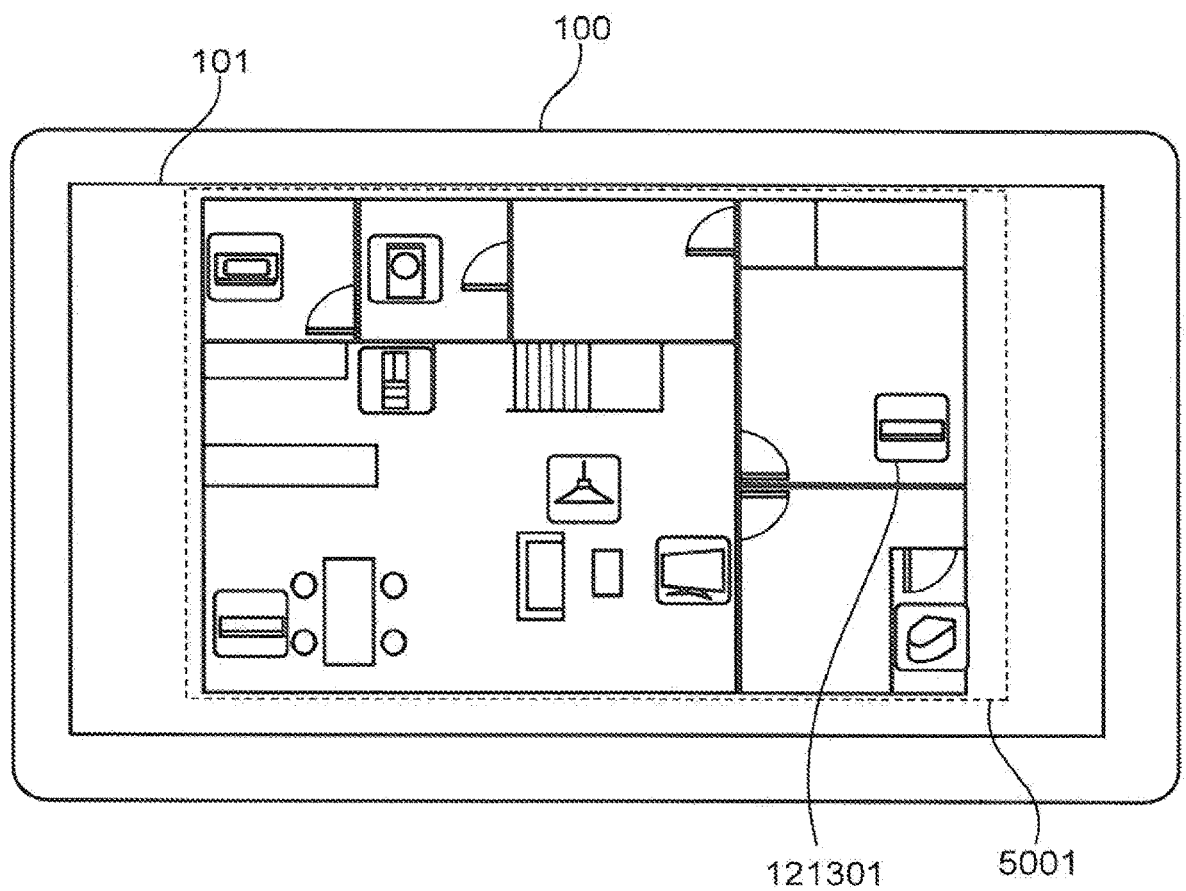

FIG. 163 is a diagram showing an example of a display screen of a home controller when a device to be newly registered is an air conditioner.

Figure 164:
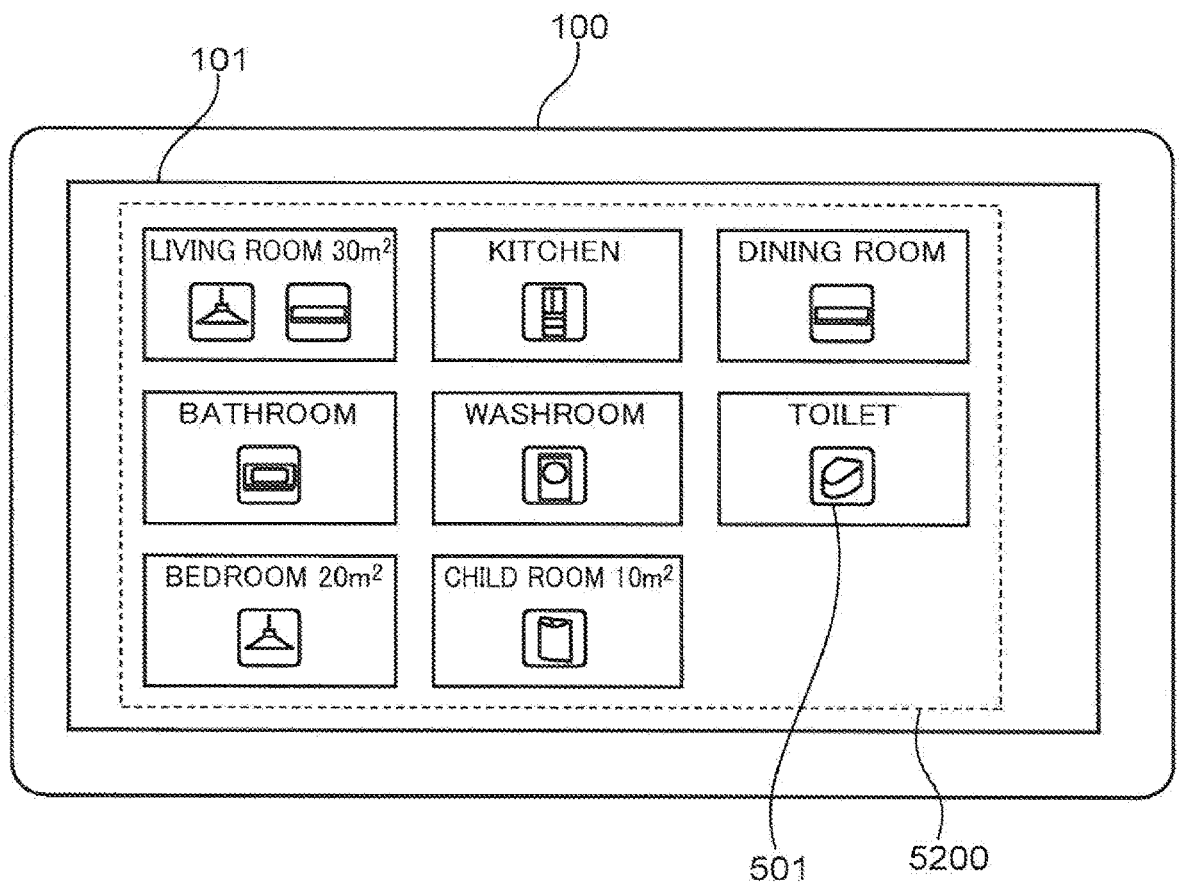

FIG. 164 is a diagram showing a floor plan with a different pattern.

Figure 165:
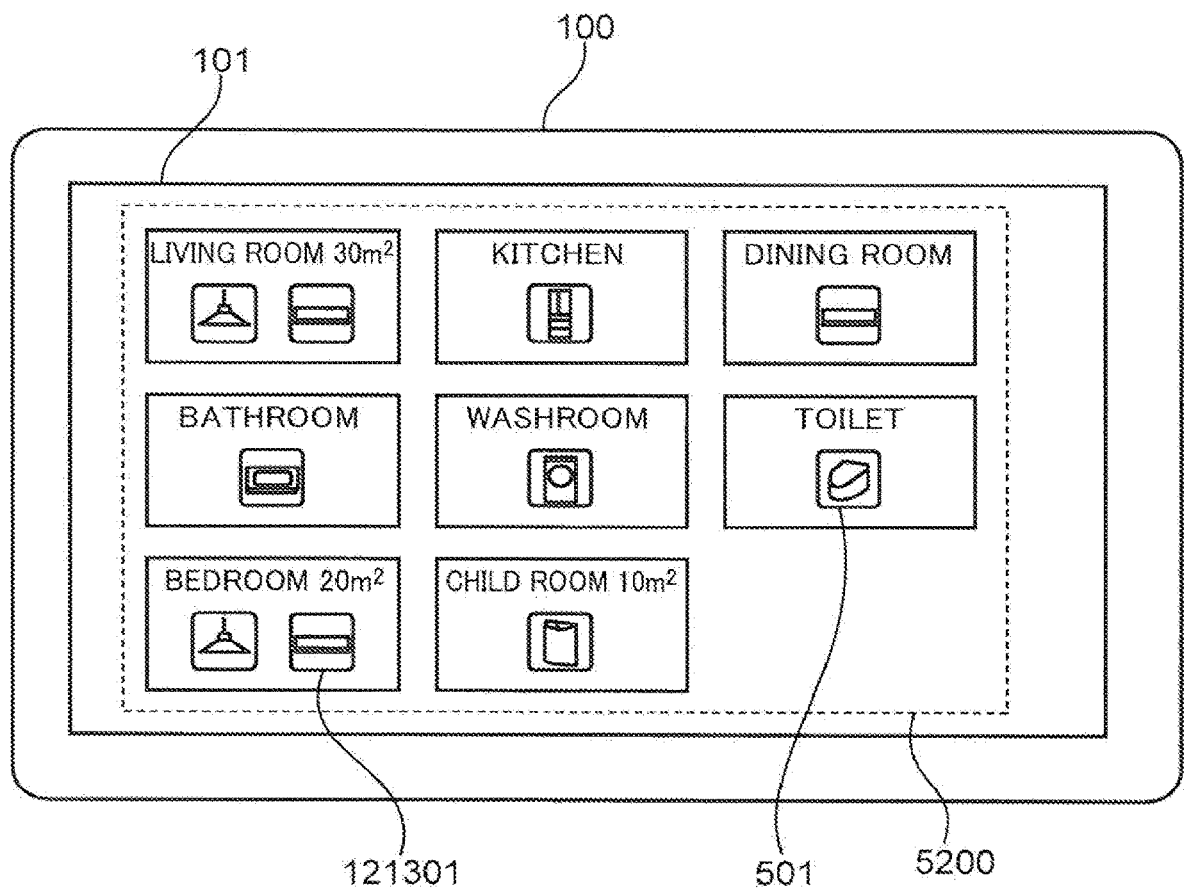

FIG. 165 is a diagram for explaining an example of displaying a device icon of a newly registered device on the floor plan with a different pattern.

Figure 166:
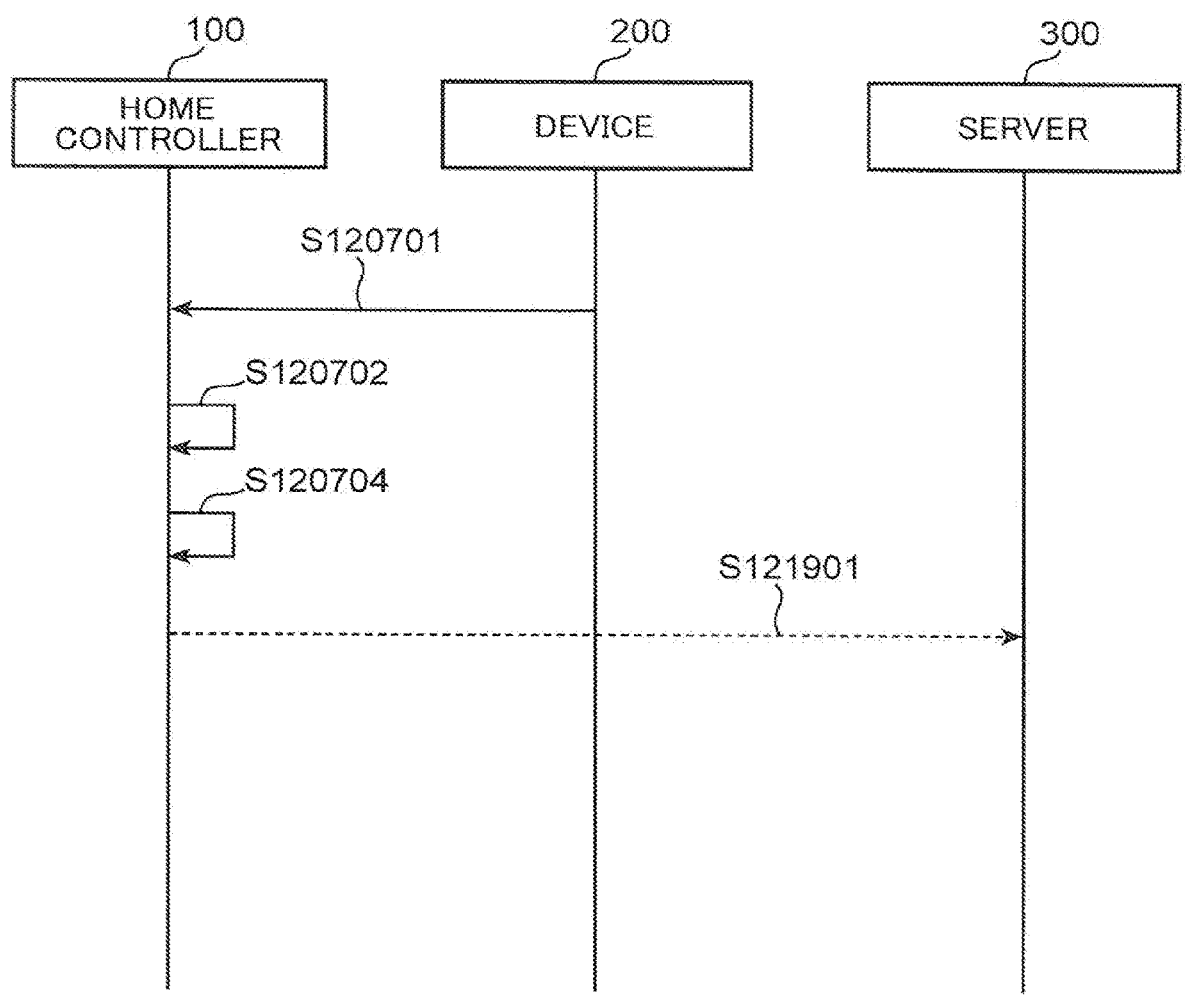

FIG. 166 is a sequence diagram showing a flow of a process by the home controller for deciding an arrangement position of a device icon corresponding to a device to be newly registered.

Figure 167:
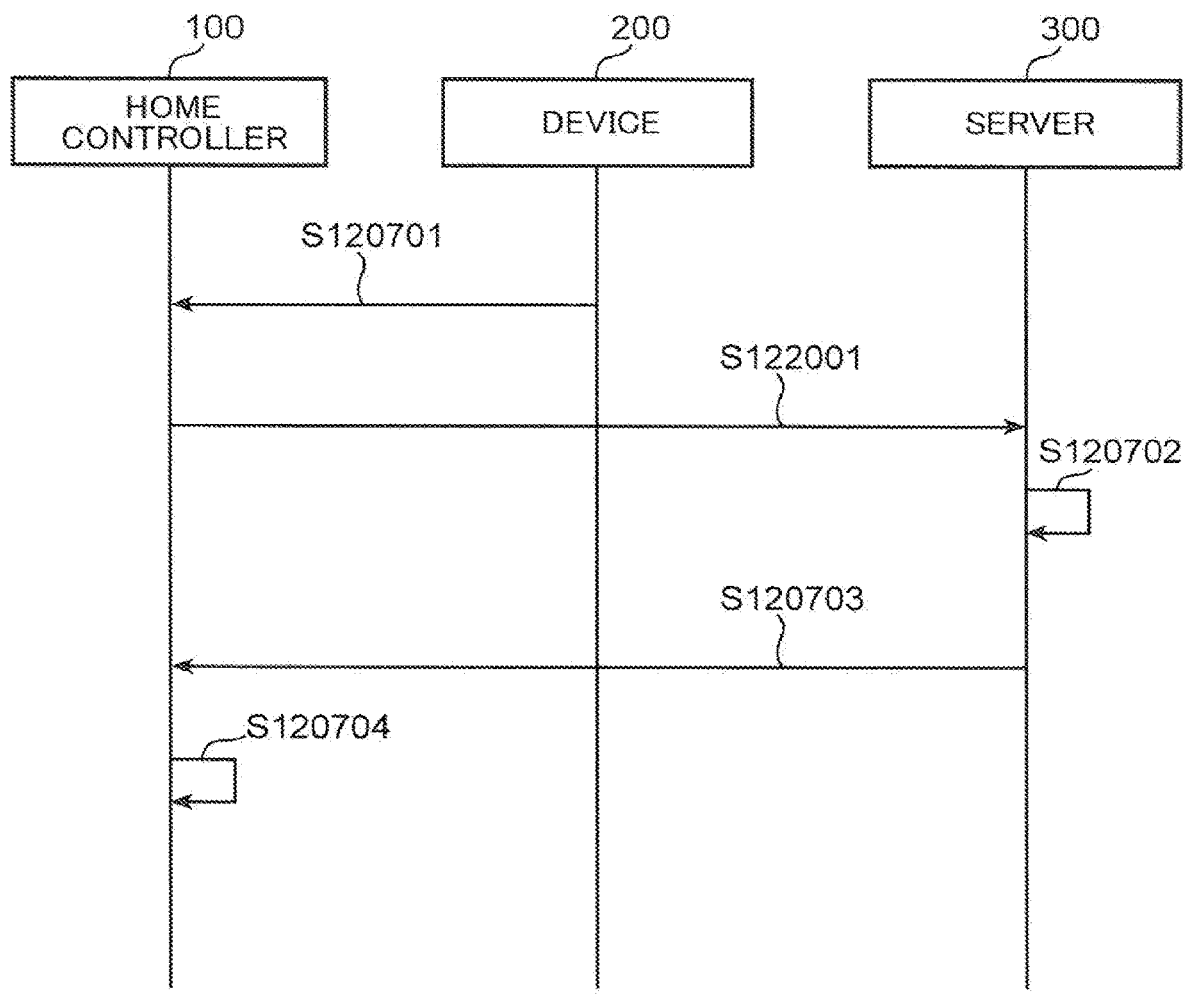

FIG. 167 is a sequence diagram showing a flow of a process by a server for deciding an arrangement position of a device icon corresponding to a device to be newly registered when the device transmits a device new registration request to a home controller.

Figure 168:
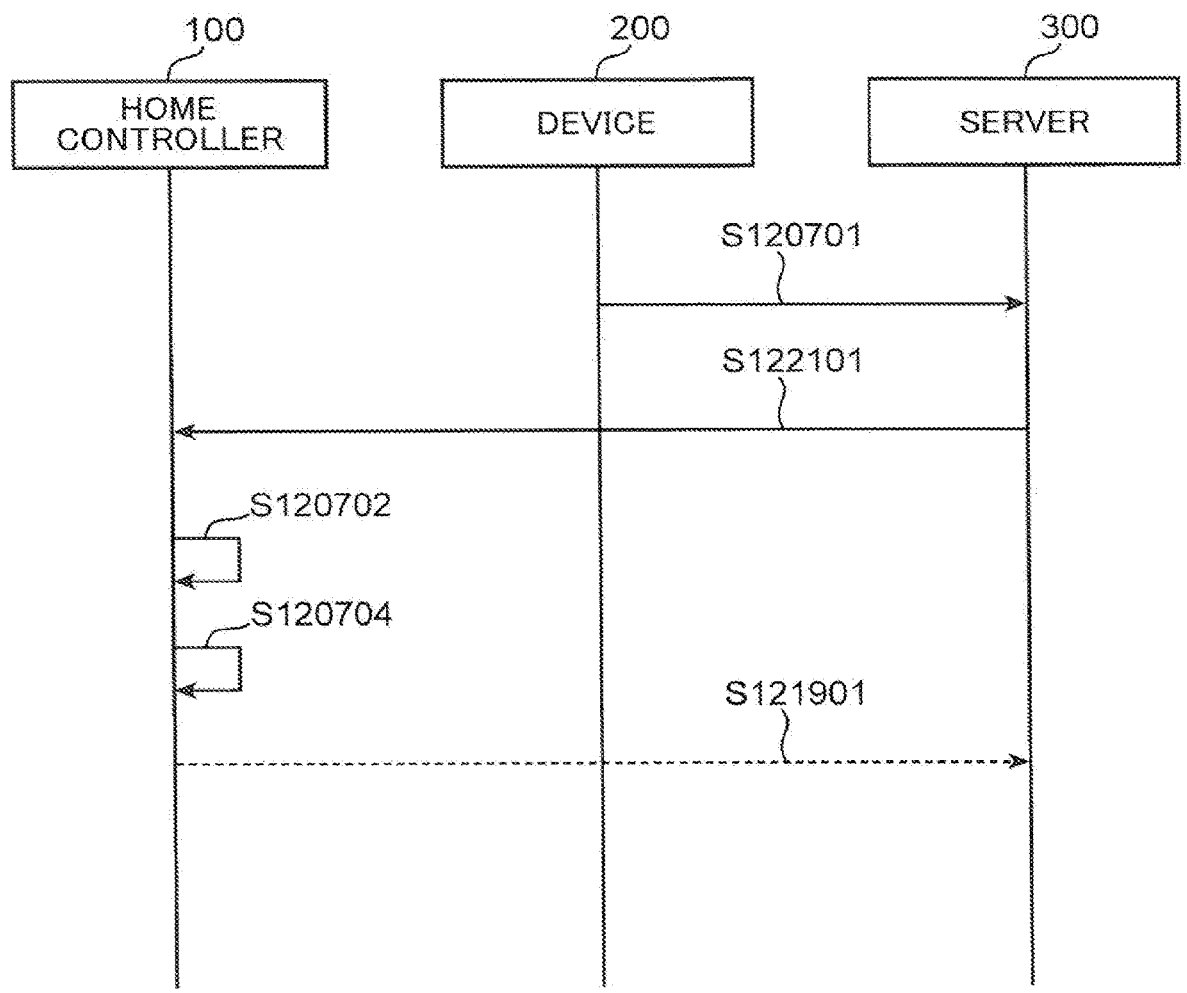

FIG. 168 is a sequence diagram showing a flow of a process by a home controller for deciding an arrangement position of a device icon corresponding to a device to be newly registered when the device transmits a device new registration request to a server.

DETAILED DESCRIPTION (Story Before Inventing Aspect According to Present Disclosure)

First, the point of view of an aspect according to the present disclosure will be described.

In Patent Literature 1, an input screen is displayed and a user is asked to input a name of a target device, a name of a room where the target device is installed, and a name of a floor on which the target device is installed to the input screen. Accordingly, operations become complicated.

In Patent Literature 2, although a user is not asked to input a name of a target device, a name of a room where the target device is installed, and a name of a floor on which the target device is installed as in the case of Patent Literature 1, the user is required to perform an operation involving moving a device icon corresponding to a new target device to an installation position of the target device on the floor plan. In this manner, in Patent Literature 2, since an operation by the user is required, operations become complicated. For example, since the user is required to perform an unfamiliar operation, when a device icon corresponding to a target device is moved to a room adjacent to a desired room by mistake, the target device ends up being registered in association with erroneous position information.

Based on the consideration described above, the present inventors have arrived at the invention according to the aspects described below.

An aspect of the present disclosure provides
a method for controlling information apparatus having a display and being connected to a network, over which one or more target devices are controlled, the method causing a computer of the information apparatus to:

display on the display a display screen representing a floor plan including one or more rooms;

using at least one memory that associates first information with second information, the first information indicating a type of each of one or more device icons representing the one or more target devices and the second information indicating an attribute of each of the one or more rooms, display each of the one or more device icons in a region on the display screen corresponding to a room that corresponds to each of the one or more device icons in accordance with the type of each of the one or more device icons;

when selection of any of the one or more device icons is sensed in a region corresponding to any of the rooms included in the floor plan, display a control screen for at least any of operation and state confirmation of a target device corresponding to the selected device icon on the display screen representing the floor plan; and output to the network a control command for at least any of the operation and the state confirmation of the target device corresponding to the selected device icon, based on an operation on the control screen, wherein the one or more device icons include a device icon of a first type and a device icon of a second type that is in a relationship of being displayed in a region on the display screen corresponding to a same room as a room in which the device icon of the first type is displayed, and when it is determined that one device icon among the one or more device icons is the device icon of the second type, the one device icon is displayed in a region on the display screen corresponding to a same room as a room in which the device icon of the first type is displayed.

According to the aspect described above, the one or more device icons include a device icon of a first type and a device icon of a second type that is in a relationship of being displayed in a region on the display screen corresponding to a same room as a room in which the device icon of the first type is displayed. In addition, when it is determined that one device icon among the one or more device icons is the device icon of the second type, the one device icon is displayed in a region on the display screen corresponding to a same room as a room in which the device icon of the first type is displayed.

Accordingly, for example, when the device icon of the first type is a device icon representing a television set and the device icon of the second type is a device icon representing a content reproducing machine such as a DVD player, the device icon representing the content reproducing machine is displayed in a region on the display screen corresponding to a same room as a room in which the device icon representing the television set is displayed.

As described above, a display position of the device icon of the second type (for example, a device icon representing a content reproducing machine) is determined by focusing on the fact that the device icon of the second type is in a relationship of being displayed in a region on the display screen corresponding to a same room as a room in which the device icon of the first type (for example, a device icon representing a television set) is displayed.

Therefore, since the user is not required to set a correspondence relationship between a device icon and a room corresponding to the device icon, an erroneous operation of displaying a device icon in a region other than a region corresponding to a room that corresponds to the device icon by mistake can be reliably prevented.

(The Present Disclosure)

The present disclosure will be described below with reference to the drawings. In the drawings, the same symbols are used for the same constituent elements.

In the present disclosure, a home controller which can singly control one or more devices will be described.

(Overall Configuration)

Figure 1:
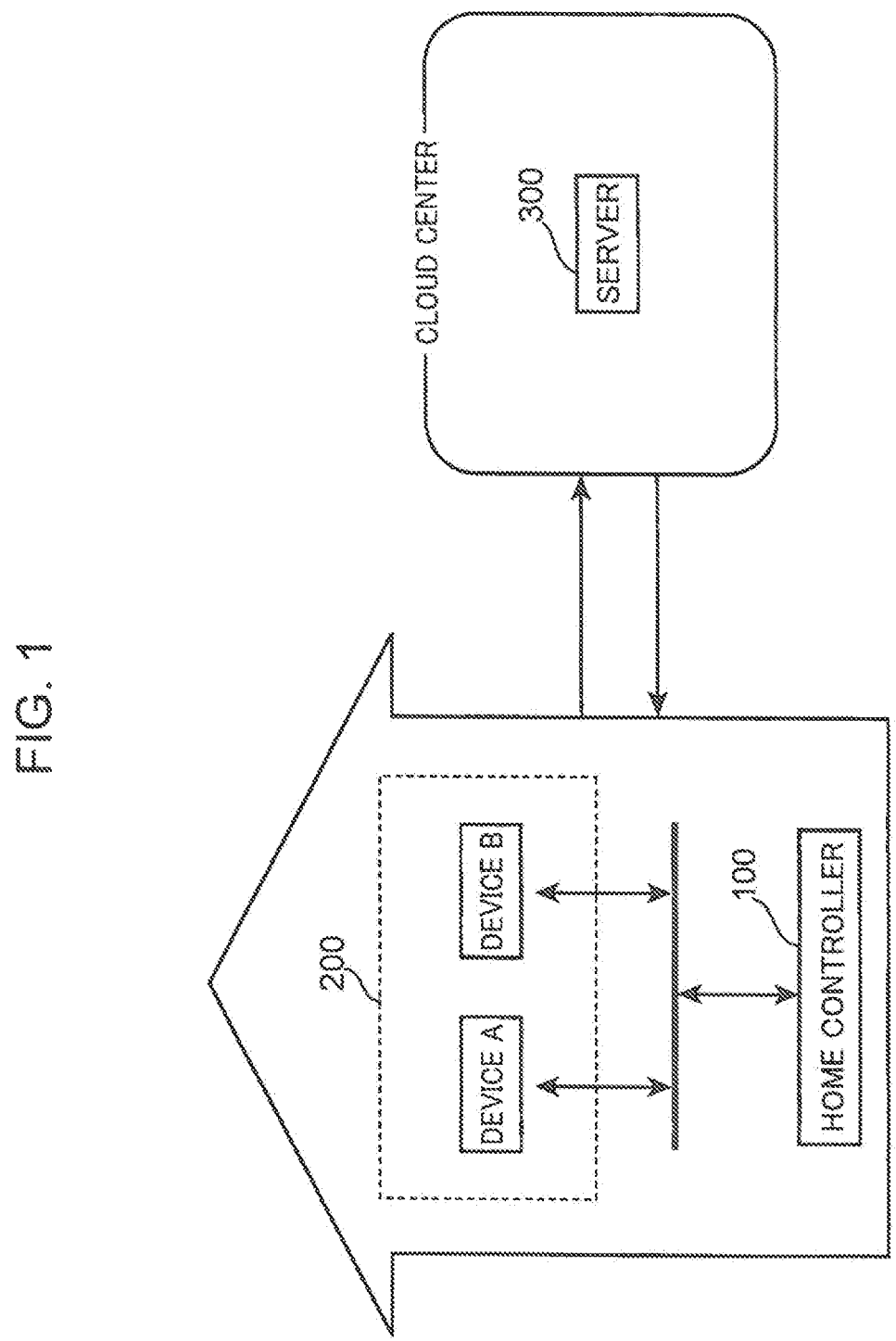
FIG. 1 is a diagram showing an overall configuration of a home control system to which a home controller according to the present disclosure is applied.

FIG. 1 is a diagram showing an overall configuration of a home control system to which a home controller according to the present disclosure is applied. As shown in FIG. 1, the home control system includes a home controller 100, a device 200 (an example of a target device), and a server 300.

The home controller 100 and one or more devices 200 (for example, a device A 200 and a device B 200) are disposed in a house. The server 300 is disposed in a cloud center. The home controller 100, the device 200, and the server 300 communicate with each other via a wired or wireless network. For example, the device 200 and the home controller 100 are communicably connected to each other via a wireless or wired in-home network, and the home controller 100, the device 200, and the server 300 are communicably connected to each other via an external network such as the Internet.

The home controller 100 is not necessarily disposed in the house, and may be disposed outside the house. In this case, a user controls the one or more devices 200 from a location away from the home.

A portable information terminal such as a smartphone or a tablet terminal may be adopted as the home controller 100. It should be noted, however, that the smartphone and the tablet terminal are merely exemplary, and a portable information terminal of a button type such as a cellular phone may be adopted as the home controller 100.

Figure 2:
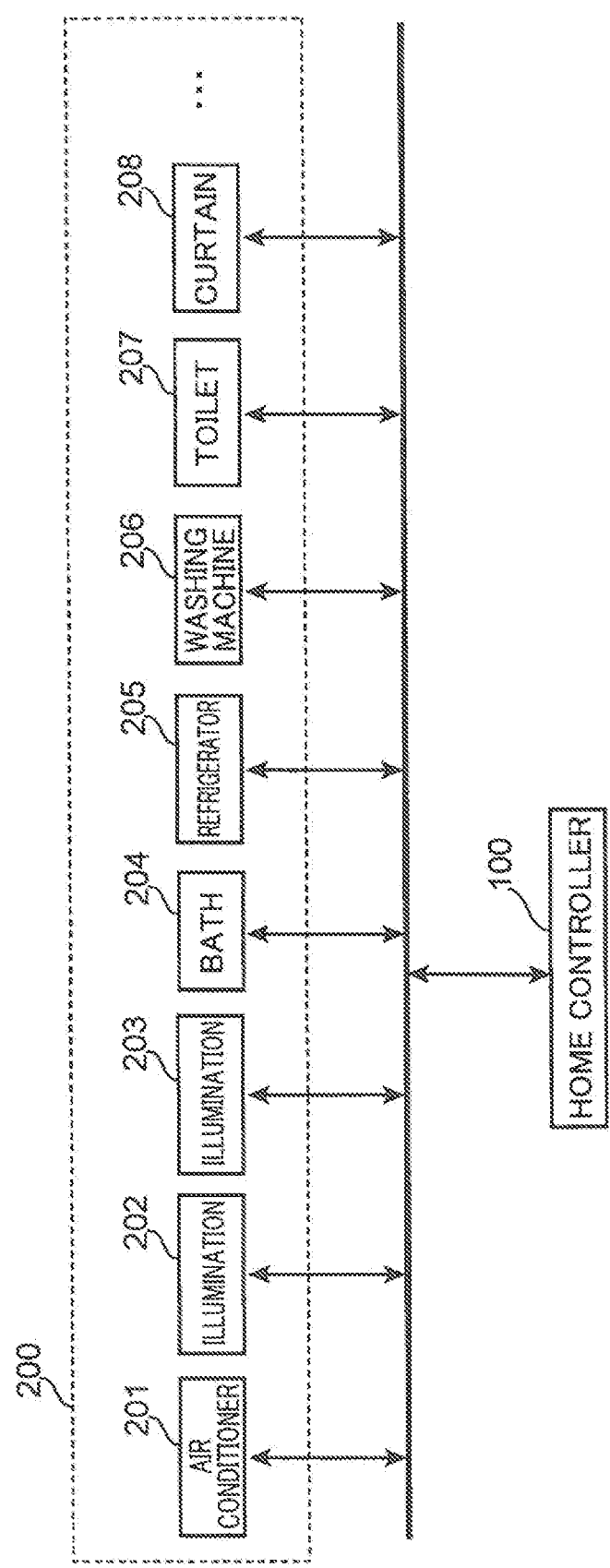
FIG. 2 is a diagram showing main devices to be controlled by the home controller according to the present disclosure.

FIG. 2 is a diagram showing the main devices 200 to be controlled by the home controller 100. The home controller 100 controls the devices 200 such as an air conditioner 201, illumination devices 202 and 203, a bath 204, a refrigerator 205, a washing machine 206, a toilet 207, and a curtain 208. The devices 200 to be controlled by the home controller 100 may include a plurality of devices 200 of the same type such as the illumination devices 202 and 203.

The devices 200 such as the air conditioner 201 shown in FIG. 2 are merely exemplary, and a television set, a Blu-ray recorder, an audio device, and so forth may be adopted as the devices 200. That is, any electrical device that functions to communicate with the home controller 100 may be adopted as the device 200. In FIG. 2, electrical devices for use in ordinary households are shown as the devices 200. However, the present disclosure is not limited thereto, and office devices for use in offices or the like may be adopted as the devices 200. Examples of the office devices include a printer, a personal computer, a scanner, and a copy machine.

Figure 3:
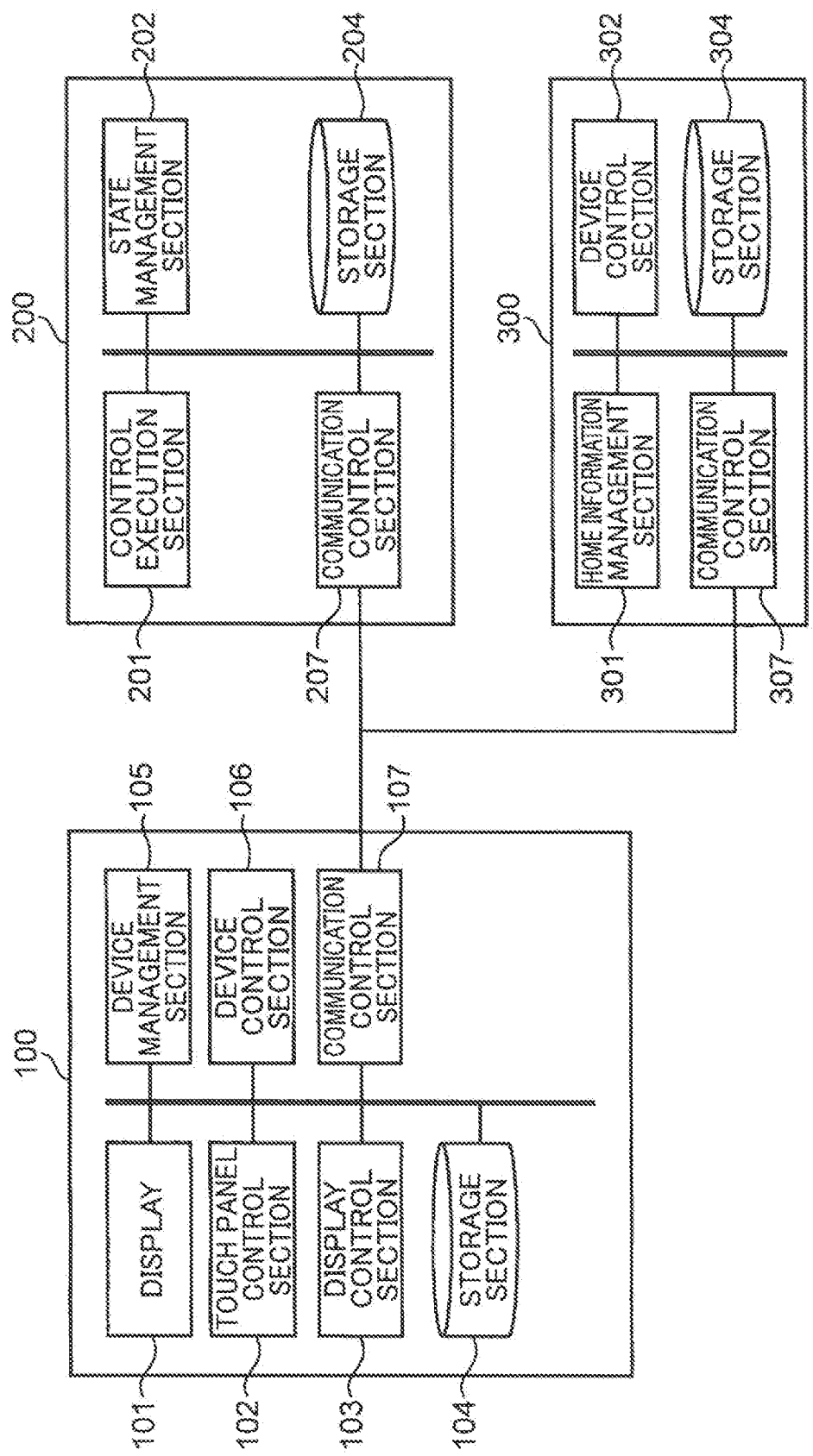
FIG. 3 is a block diagram showing the configuration of the home controller, a device, and a server according to the present disclosure.

FIG. 3 is a block diagram showing the configuration of the home controller 100, the device 200, and the server 300. As shown in FIG. 3, the home controller 100 includes a display 101, a touch panel control section 102, a display control section 103, a storage section 104, a device management section 105, a device control section 106, and a communication control section 107.

The display 101 is formed from a touch panel display, for example, and displays a user interface that allows the user to operate the home controller 100. The user can input various operations to the home controller 100 by contacting the display 101.

The touch panel control section 102 recognizes an operation performed on the display 101 by the user, interprets the content of the operation, and notifies the other constituent elements of the content of the operation. For example, if an object is displayed at a position on the display 101 tapped on by the user, the touch panel control section 102 determines that the object is selected by the user. A variety of GUI parts that receive a user operation such as buttons are adopted as the object.

The display control section 103 generates a GUI (Graphical User Interface) of the home controller 100, and causes the display 101 to display the GUI. The storage section 104 stores information that is necessary for operation of the home controller 100 such as a device list managed by the device management section 105.

The device management section 105 manages the control target devices 200 using the device list stored in the storage section 104. In addition, the device management section 105 detects a device 200 when the device 200 is connected to the in-home network. Further, the device management section 105 acquires home information 2700 to be discussed later from the server 300, stores the acquired home information 2700 in the storage section 104, and manages the home information 2700. The device control section 106 issues a control command for the devices 200. The communication control section 107 controls communication between the home controller 100 and the devices 200 and communication between the home controller 100 and the server 300. In addition, the communication control section 107 transmits a variety of data to the devices 200 or the server 300 upon receiving a request to transmit such data from other blocks, and receives data transmitted from the devices 200 or the server 300 to deliver the data to the relevant block.

The display 101 may be a normal display rather than a touch panel display. In this case, the user may use an external input device such as a mouse (not shown) to input an instruction to select an object by moving a pointer displayed on the display 101 and clicking on a desired object. That is, in the present disclosure, a series of operations performed by the user by contacting the display 101 may be replaced with operations of moving a pointer and clicking using an external input device such as a mouse.

As shown in FIG. 3, the device 200 includes a control execution section 201, a state management section 202, a storage section 204, and a communication control section 207. The control execution section 201 receives a control command from the home controller 100 or the server 300, and controls the device 200 in accordance with the received control command. The content of control of the device 200 performed by the control execution section 201 differs in accordance with the type of the device 200. For example, if the device 200 is an illumination device, the control execution section 201 turns on and off the illumination device. In addition, the control execution section 201 transmits the result of execution of the control command and the state of the device 200 to the home controller 100 or the server 300.

The state management section 202 manages the state of the device 200. The content of management of the device 200 performed by the state management section 202 differs in accordance with the type of the device 200. For example, if the device 200 is an illumination device, the state management section 202 manages whether the illumination device is currently turned on or turned off. The storage section 204 stores information related to the state of the device 200 managed by the state management section 202. The communication control section 207 controls communication between the device 200 and the home controller 100 and communication between the device 200 and the server 300. In addition, the communication control section 207 transmits a variety of data to the home controller 100 or the server 300 upon receiving a request to transmit such data from other blocks, and receives data transmitted from the home controller 100 or the server 300 to deliver the data to the relevant block.

As shown in FIG. 3, the server 300 includes a home information management section 301, a device control section 302, a storage section 304, and a communication control section 307. The home information management section 301 manages the home information 2700 to be discussed later for each house or each user account. In addition, the home information management section 301 transmits the home information 2700 to the home controller 100 in response to a request from the home controller 100. Further, the home information management section 301 acquires log information related to the use history of the device 200 and information related to the state of the device 200 from the device 200, stores the acquired information in the storage section 304, and manages the information.

The device control section 302 transmits a control command to the device 200 in response to a request from the home controller 100. The storage section 304 stores information that is necessary for operation of the server 300 such as the home information 2700 and the information related to the state of the device 200 managed by the home information management section 301. The communication control section 307 controls communication between the server 300 and the home controller 100 and communication between the server 300 and the device 200 as with the communication control section 107. In addition, the communication control section 307 transmits a variety of data to the home controller 100 or the device 200 upon receiving a request to transmit such data from other blocks, and receives data transmitted from the home controller 100 or the device 200 to deliver the data to the relevant block.

Figure 4:
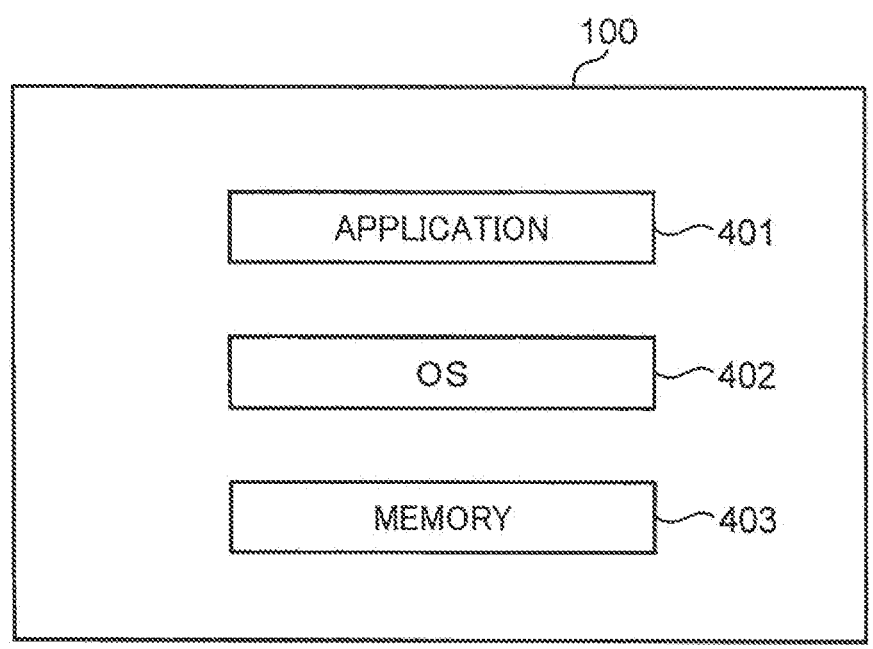
FIG. 4 is a diagram showing a configuration example of the form of implementation of the home controller according to the present disclosure.

FIG. 4 is a diagram showing a configuration example of the form of implementation of the home controller 100. As shown in FIG. 4, the home controller 100 includes an application 401, an OS (Operating System) 402, a memory 403, and other hardware (not shown).

The application 401 is application software for causing the portable information terminal to function as the home controller 100, and is executed by a processor of the home controller 100. The home controller 100 may read the application 401 from a computer readable recording medium to implement the application 401, or may download the application 401 from a network to implement the application 401. The OS 402 is basic software of the portable information terminal, and is executed by the processor of the home controller 100. The memory 403 is formed from a storage device such as a RAM and a ROM of the home controller 100, and stores a group of data included in the application 401. The processor of the home controller 100 executes the application 401 to embody the functions of the touch panel control section 102, the display control section 103, the storage section 104, the device management section 105, the device control section 106, and the communication control section 107 shown in FIG. 3. In addition, the processor of the home controller 100 executes the application 401 to cause the memory 403 to function as the storage section 104.

It should be noted, however, that in the present disclosure, the home controller 100 may be implemented by the application 401 alone, may be implemented by the application 401 and the OS 402, may be implemented by the application 401, the OS 402, and the memory 403, or may be implemented by the application 401, the OS 402, the memory 403, and other hardware (not shown). In any present disclosure, the home controller 100 according to the present disclosure can be embodied. In the present disclosure, the processor and the storage device forming the portable information terminal, for example, form a computer. One of a CPU, an FPGA, and an ASIC or a combination of two or more of these may be adopted as the processor. One of a ROM, a RAM, and a hard disk or a combination of two or more of these may be adopted as the storage device.

Figure 5:
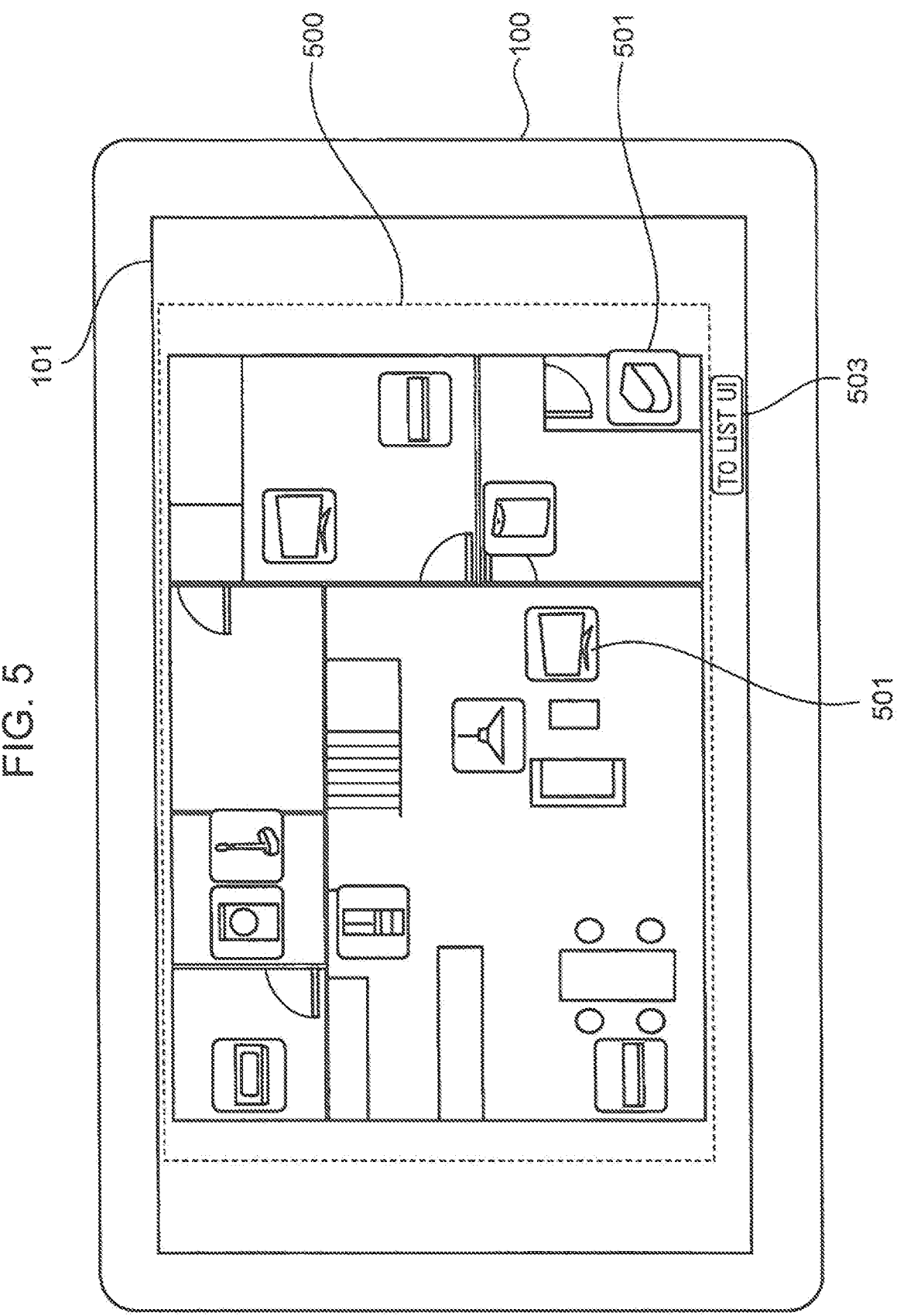
FIG. 5 is a diagram showing the configuration of a basic screen of the home controller according to the present disclosure.
Figure 6:
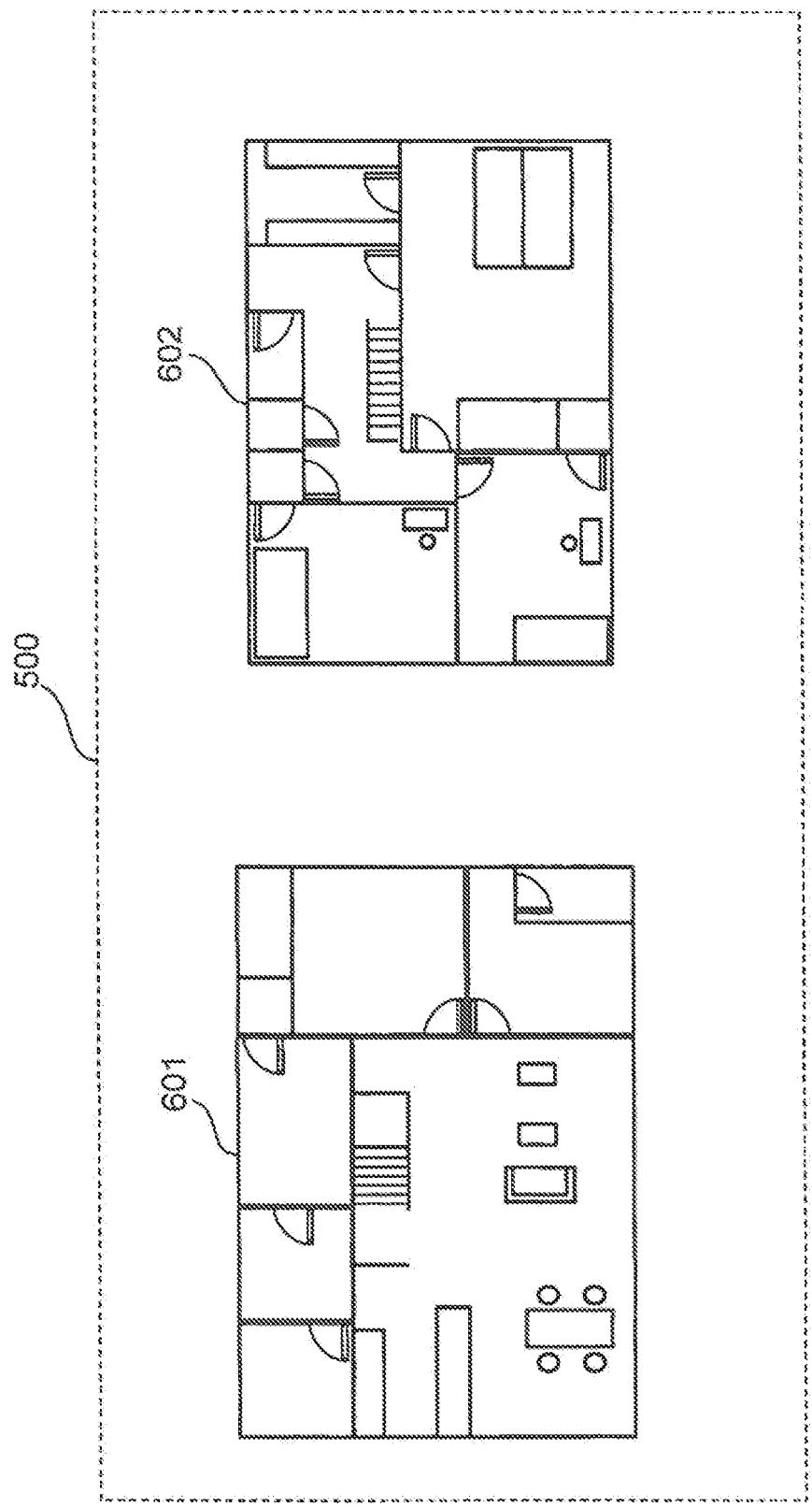
FIG. 6 is a diagram showing an example of a floor plan according to the present disclosure.

FIG. 5 is a diagram showing the configuration of a basic screen of the home controller 100. As shown in FIG. 5, the basic screen of the home controller 100 displayed on the display 101 include a floor plan 500, device icons 501, and a device list display change button 503. The floor plan 500 is a plan view that planarly represents the arrangement and the shape of one or more rooms forming each floor of a house. In the case where the house has one or more floors, the floor plan 500 is prepared for each floor. For example, in the case where the house has two floors, two floor plans 500, namely a floor plan 601 for the first floor and a floor plan 602 for the second floor, are displayed on the display 101 as shown in FIG. 6.

The device icon 501 is an icon displayed as overlapped on the floor plan 500 and representing the device 200. When the touch panel control section 102 senses a tap on the device icon 501 performed by the user, the display control section 103 causes the display 101 to display a device control screen 502 to be discussed later. This allows the user to control the device 200 by operating the device control screen 502.

The device icon 501 is prepared for each device 200. The display control section 103 disposes the device icon 501 on the floor plan 500 on the basis of the actual arrangement of the device 200 within the house. Information as to at what position on the floor plan 500 the device icon 501 is to be disposed is registered in an arrangement 3104 of a device list 3100 to be discussed later. Here, a position on the floor plan 500 corresponding to the actual arrangement position of the device 200 is registered in the arrangement 3104. Thus, the display control section 103 can dispose the device icon 501 at a position on the floor plan 500 corresponding to the actual arrangement position of the device 200 by disposing the device icon 501 at the position registered in the arrangement 3104 of the device list 3100.

In the floor plan 500 shown in FIG. 5, one floor is partitioned into a plurality of rooms by partition lines that indicate partitions between the rooms. This allows the user to recognize what device 200 is disposed in what room at a glance.

In the example of FIG. 5, in addition, schematic images of furniture pieces are displayed at positions on the floor plan 500 corresponding to the actual arrangement positions of the furniture pieces. An image that indicates the movable range of a door is displayed at a position on the floor plan 500 corresponding to the actual arrangement position of the door. An image of a staircase is displayed at a position on the floor plan 500 corresponding to the actual arrangement position of the staircase. This allows the user to recognize the positions of the furniture pieces disposed in each room and the positions of the staircase and the doors on the floor.

The button with a text "TO LIST UI" displayed at the lower right of the basic screen is the device list display change button 503, which is a button for switching the screen display from the basic screen to a device list display screen to be discussed later (see FIG. 24). When the touch panel control section 102 senses a tap on the device list display change button 503 performed by the user, the display control section 103 switches the screen display on the display 101 from the basic screen to the device list display screen. It should be noted, however, that the display control section 103 may hide the device list display change button 503 in the case where a registration is made in the home controller 100 in advance that the device list display screen is not utilized.

In the foregoing description, one device icon 501 is correlated with one device 200. However, the present disclosure is not limited thereto, and one device icon 501 may be correlated with a plurality of devices 200 so that the one device icon 501 may be used in common to the plurality of devices 200. For example, in the case where there are two illumination devices in a living room, the two illumination devices may be represented by one device icon 501.

In this case, when the device icon 501 representing the two illumination devices is tapped on by the user, the display control section 103 causes the display 101 to display a device control screen 502 that allows simultaneous control of the two illumination devices. This allows the user to control the two illumination devices at the same time. A plurality of illumination devices are often disposed in a large room such as the living room. In the case where the user turns on or off the illumination devices in the living room, the user often turns on or off all the illumination devices disposed in the living room, rather than turning on or off some of the illumination devices. In this case, if it is possible to collectively turn on or off all the illumination devices, the number of operations to be performed by the user can be reduced. Thus, one device icon 501 may be correlated with a plurality of devices 200 that are highly likely to be operated by the user at the same time to cause one device control screen 502 to be displayed.

In the case where the device icon 501 represents a plurality of devices 200, the display control section 103 may display the device icon 501 at a position on the floor plan 500 corresponding to the actual arrangement position of one of the devices 200. Alternatively, the display control section 103 may display the device icon 501 representing the plurality of devices 200 at a predetermined location of a room in which the plurality of devices 200 are disposed.

In order to dispose the device icon 501 on the floor plan 500 on the basis of the actual arrangement of the device 200 within the house, the user moves the device icon 501 to an appropriate position on the floor plan 500. The user can move the device icon 501 to a desired position by dragging the device icon 501 while holding down the device icon 501. These operations are executed at the timing when the device icon 501 is added such as when the home controller 100 is initially utilized and when a new device 200 is purchased.

Specifically, when the touch panel control section 102 senses a drag on the device icon 501, the device management section 105 registers the position on the floor plan 500 of the device icon 501 after the movement in the arrangement 3104 of the device list 3100 to be discussed later. This allows a position on the floor plan 500 corresponding to the actual arrangement position of the device 200 to be registered in the arrangement 3104.

The initial display position of the device icon 501 may be determined in advance by the system, and may be a predetermined position outside the display region of the floor plan 500 or a predetermined position within a predetermined room on the floor plan 500, for example. The method of disposing the device icon 501 on the floor plan 500 on the basis of the actual arrangement of the device 200 within the house is not limited thereto, and the method described below may be used.

Figure 7:
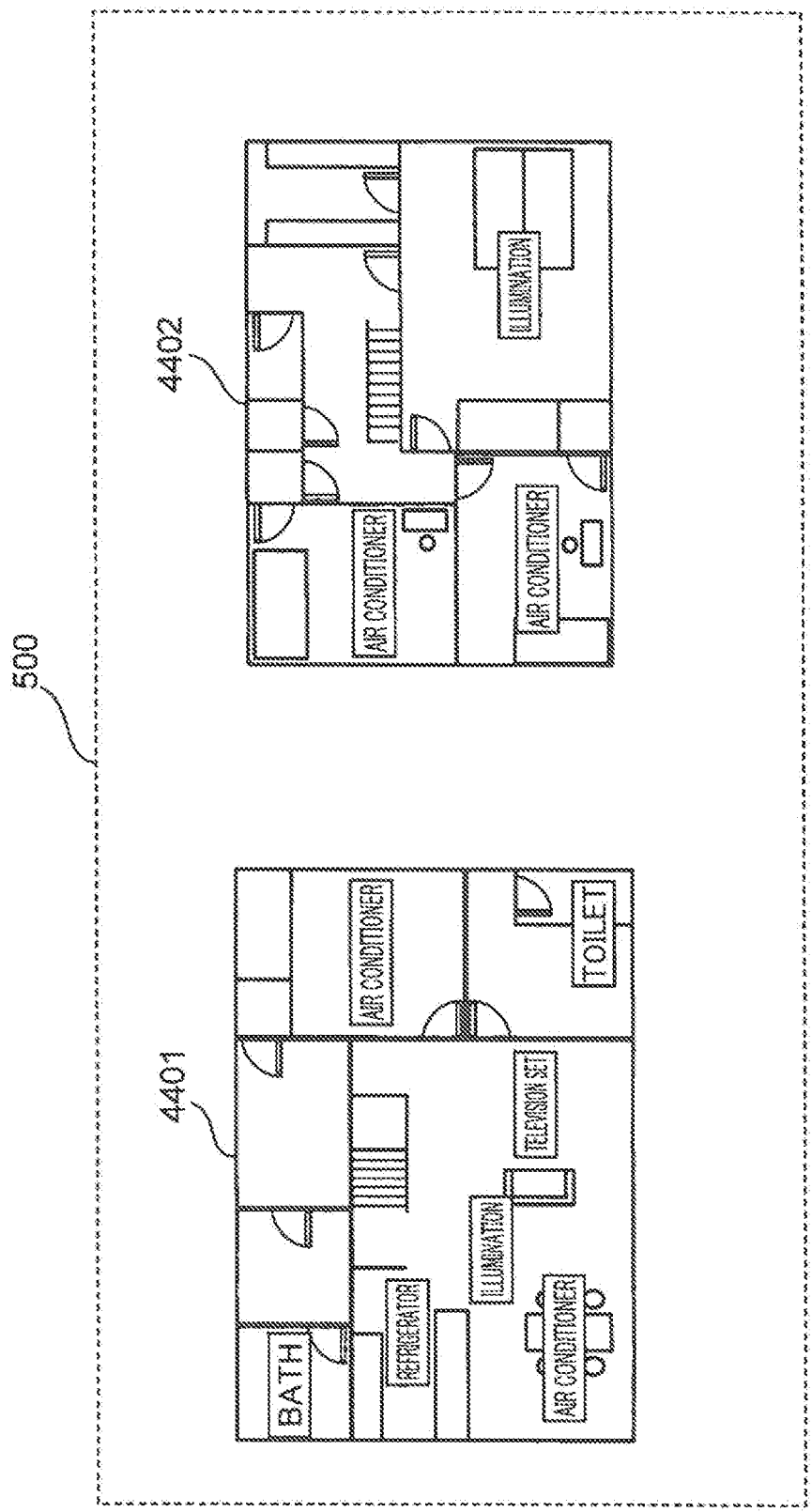
FIG. 7 is a diagram showing an example of the floor plan including arrangement information for device icons as texts according to the present disclosure.
Figure 8:
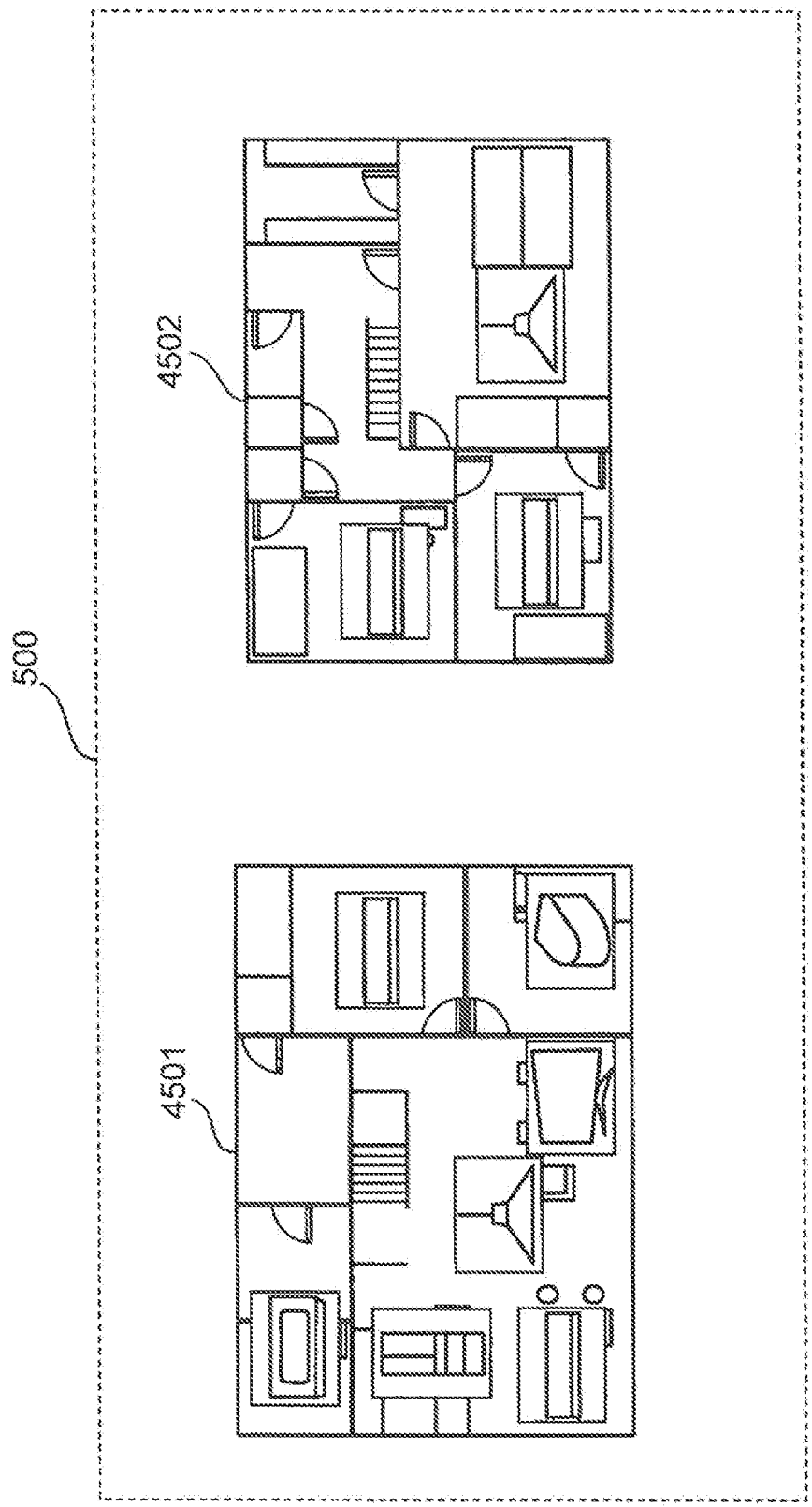
FIG. 8 is a diagram showing an example of the floor plan including arrangement information for device icons as images according to the present disclosure.
Figure 9:
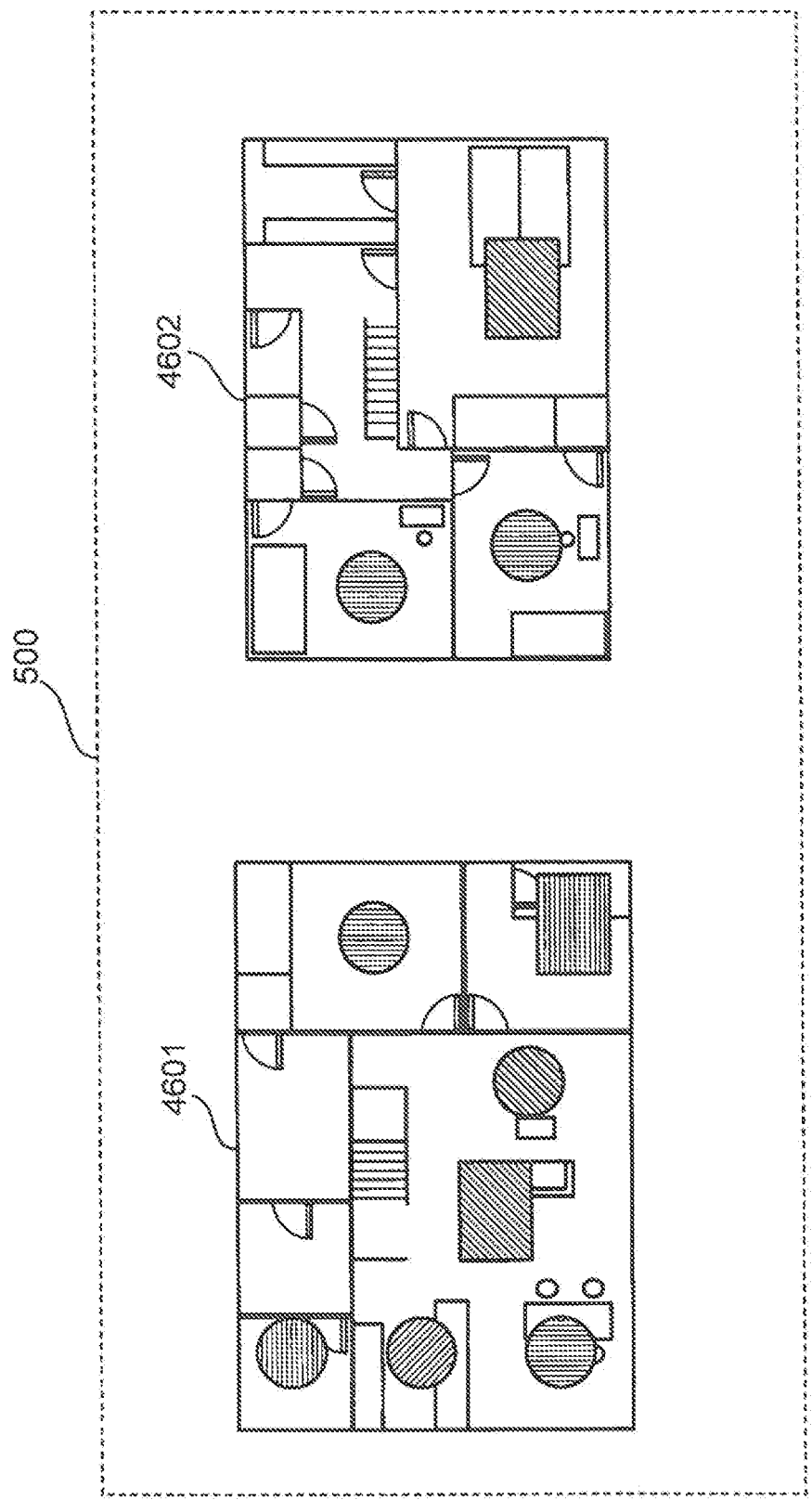
FIG. 9 is a diagram showing an example of the floor plan including arrangement information for device icons as images according to the present disclosure.

As shown in FIGS. 7, 8, and 9, some floor plans 500 include arrangement information for the device icons 501. For example, in the example of the floor plan 500 of FIG. 7, texts that indicate the type of the devices 200 represented by the device icons 501 to be disposed are provided at positions at which the device icons 501 are to be disposed. In the example of the floor plan 500 of FIG. 8, images that indicate the type of the devices 200 represented by the device icons 501 to be disposed are provided at positions at which the device icons 501 are to be disposed. In the example of the floor plan 500 of FIG. 9, simplified images such as circles and rectangles that indicate the type of the devices 200 represented by the device icons 501 to be disposed are provided at positions at which the device icons 501 are to be disposed.

Consequently, in the case where the floor plan 500 includes arrangement information for the device icons 501, the display control section 103 may generate the basic screen of FIG. 5 by automatically disposing the device icons 501 on the floor plan 500 on the basis of the arrangement information included in the floor plan 500. In this case, it is not necessary for the user to perform an operation of moving the device icons 501 to appropriate positions on the floor plan 500.

For example, in an exemplary floor plan 4401 for the first floor of FIG. 7, the display control section 103 detects a position provided with a text "TELEVISION SET", automatically disposes the device icon 501 for the television set at the detected position, and registers the detected position in the arrangement 3104 of the device list 3100.

In an exemplary floor plan 4501 for the first floor of FIG. 8, the display control section 103 detects a position provided with an image for the "television set", automatically disposes the device icon 501 for the television set at the detected position, and registers the detected position in the arrangement 3104 of the device list 3100. In an exemplary floor plan 4601 for the first floor of FIG. 9, the display control section 103 detects a position provided with an image in the shape of a "circle filled with oblique lines", automatically disposes the device icon 501 for the television set at the detected position, and registers the detected position in the arrangement 3104 of the device list 3100.

The display control section 103 may detect the display position of arrangement information by recognizing the arrangement information included in the floor plan 500 using a text recognition technology or an image recognition technology commonly utilized.

Figure 10:
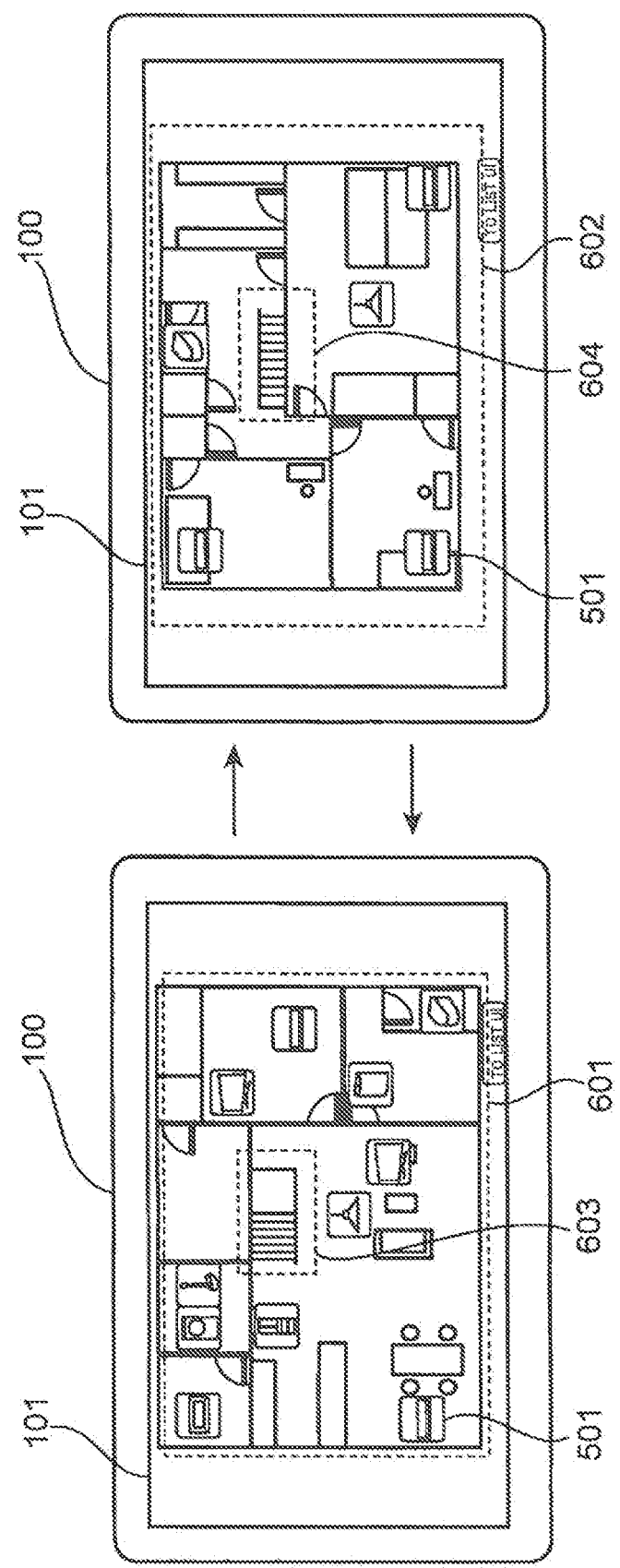
FIG. 10 is a diagram showing an example of transition between a first floor display state and a second floor display state of the basic screen of the home controller according to the present disclosure.

FIG. 10 is a diagram illustrating a method of switching the floor display on the basic screen of the home controller 100. FIG. 10 illustrates a case where the house has two floors, namely the first floor and the second floor. With a floor plan 601 for the first floor displayed on the basic screen of the home controller 100, the touch panel control section 102 senses a tap on a staircase region 603 on the first floor performed by the user. Then, the display control section 103 switches the floor display on the basic screen from the first floor to the second floor. Similarly, with a floor plan 602 for the second floor displayed on the basic screen of the home controller 100, the touch panel control section 102 senses a tap on a staircase region 604 on the second floor performed by the user. Then, the display control section 103 switches the floor display on the basic screen from the second floor to the first floor.

Here, the touch panel control section 102 may judge that the staircase region 603 is tapped on if the position tapped on by the user is positioned within a region surrounded by four vertexes of a staircase registered in a room type 2902 of room information 2900 (see FIG. 32).

Further, the floor display may be switched by not only tapping on the staircase region 603 but also a swipe operation on the display 101. With the floor plan 601 for the first floor displayed on the basic screen of the home controller 100, the touch panel control section 102 senses a swipe operation performed from the right to the left on the display 101 by the user. Then, the display control section 103 switches the floor display on the basic screen from the first floor to the second floor. Similarly, with the floor plan 602 for the second floor displayed on the basic screen of the home controller 100, the touch panel control section 102 senses a swipe operation performed from the left to the right on the display 101 by the user. Then, the display control section 103 switches the floor display on the basic screen from the second floor to the first floor. The floor display may be switched by a swipe operation in the vertical direction.

Figure 11:
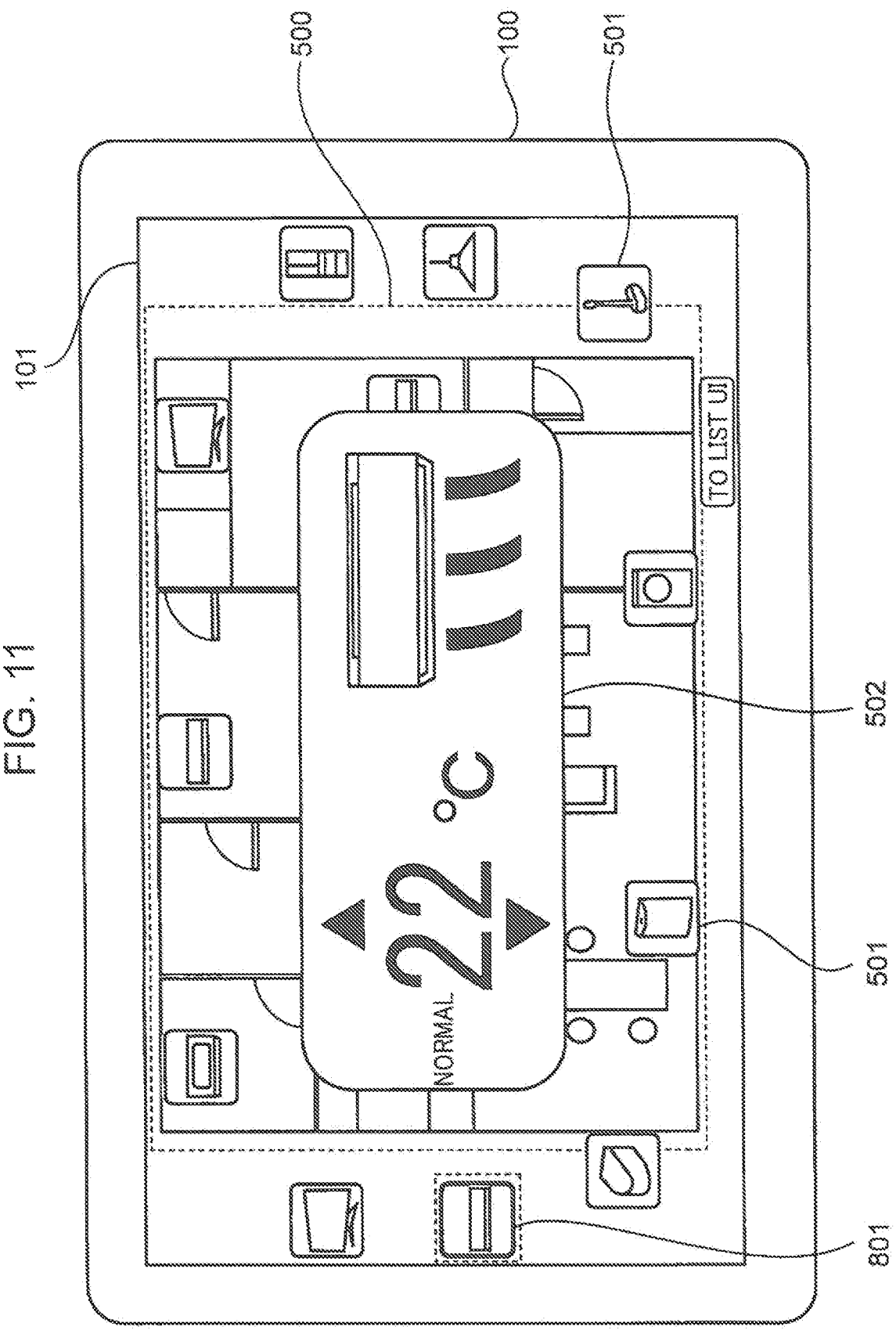
FIG. 11 is a diagram showing the configuration of the display state of a device control screen of the home controller according to the present disclosure.

FIG. 11 is a diagram showing the configuration of the display state of the device control screen 502 of the home controller 100. In the basic screen shown in FIG. 5, when the touch panel control section 102 senses that the user selects the device icon 501, the display control section 103 causes the display 101 to display the device control screen 502 corresponding to the selected device icon 501. The device control screen 502 is a control screen that is specific to each device 200 and that allows control or confirmation of the state of the device 200. For example, in FIG. 11, a device icon 801 for the air conditioner is selected by the user, and the temperature setting and the air flow direction are controlled using the device control screen 502 for the air conditioner.

An image of the air conditioner is displayed in the device control screen 502 to allow the user to immediately recognize that the device control screen 502 corresponds to the air conditioner. This prevents an erroneous operation. An image that indicates the air flow direction is displayed on the lower side of the image of the air conditioner to allow the user to select a desired air flow direction by repeatedly tapping on the image, for example. A numeral displayed within the device control screen 502 indicates the current set temperature of the air conditioner. A button in the shape of a triangle that points upward in the device control screen 502 is a temperature increase button. A button in the shape of a triangle that points downward is a temperature decrease button. Pressing the temperature increase button once increases the set temperature of the air conditioner by a predetermined temperature (for example, 0.5 degrees). Pressing the temperature decrease button once decreases the set temperature of the air conditioner by a predetermined temperature (for example, 0.5 degrees).

Examples of the method of disposing the device icons 501 in the display state of the device control screen 502 include the following methods.

A first method is to dispose the device icons 501 outside the display region of the device control screen 502 as shown in FIG. 11. When the touch panel control section 102 senses that a certain device icon 501 is tapped on by the user, the display control section 103 disposes all the device icons 501 at locations outside the display region of the device control screen 502 and inside the display region of the display 101 irrespective of whether or not the locations are inside the display region of the floor plan 500. In the example of FIG. 11, the device icons 501 are disposed in an elliptical arrangement so as to surround the device control screen 502. That is, when a certain device icon 501 is selected by the user and the device control screen 502 for the device 200 corresponding to the device icon 501 is displayed, the display control section 103 retracts all the device icons 501 out of the display region of the device control screen 502.

This prevents the device icons 501 from being hidden by the device control screen 502. Therefore, in the case where the device control screen 502 for a device 200 is currently displayed and the user attempts to cause the device control screen 502 for another device 200 to be displayed, it is not necessary for the user to temporarily erase the currently displayed device control screen 502 and search for the device icon 501 for the relevant device 200.

Here, the display control section 103 may decide the arrangement position of each device icon 501 on the outer periphery of an ellipse having a shape determined in advance in accordance with the size of the device control screen 502, and dispose the device icon 501 at the decided position, for example. Examples of the method of deciding the arrangement position include a method of arranging all the device icons 501 as display targets at equal intervals on the outer periphery of an ellipse, and a method of disposing the device icons 501 such that the angles formed by lines connecting between adjacent device icons 501 and the center of an ellipse are equal to each other. Alternatively, the display control section 103 may divide the outer periphery of an ellipse into four sections corresponding to the upper, lower, left, and right portions of the device control screen 502, and dispose the device icons 501 such that the number of device icons 501 in each section is the same and the device icons 501 in each section are arranged at equal intervals. The device icon 501 disposed at the closest position on the floor plan 500 may be disposed at the decided arrangement position.

In the foregoing description, the device icons 501 are arranged in an elliptical arrangement. However, the present disclosure is not limited thereto, and the device icons 501 may be arranged in a circular arrangement. Also in this case, the arrangement position of the device icons 501 may be decided using the same method as in the case where the device icons 501 are arranged in an elliptical arrangement. Other examples of the shape of arrangement of the device icons 501 used when the device icons 501 are retracted out of the display region of the device control screen 502 include polygonal arrangements such as triangular, rectangular, and pentagonal arrangements.

Figure 13:
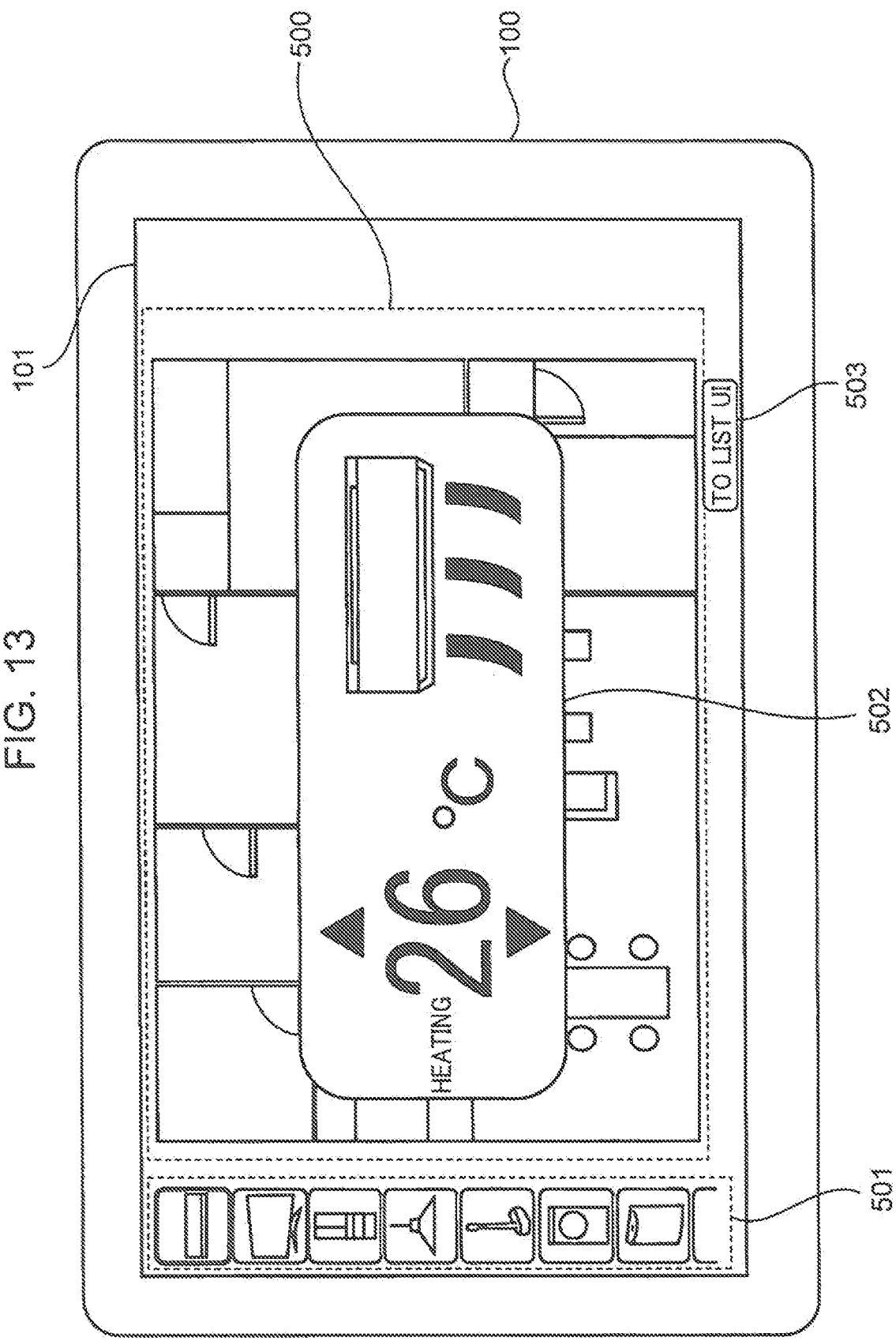
FIG. 13 is a diagram showing the configuration of the display state of a device control screen of the home controller according to the present disclosure.

A second method is to dispose the device icons 501 in one line outside the display region of the device control screen 502 and the floor plan 500 and inside the display region of the display 101 as shown in FIG. 13. When the touch panel control section 102 senses that a certain device icon 501 is tapped on by the user, the display control section 103 disposes all the device icons 501 in one vertical line on the left side of the display region of the floor plan 500. That is, the display control section 103 retracts all the device icons 501 to a vacant space outside the display region of the floor plan 500 and inside the display region of the display 101.

In FIG. 13, the device icons 501 are disposed on the left side of the floor plan 500. However, the present disclosure is not limited thereto, and the device icons 501 may be disposed in one vertical line on the right side of the floor plan 500, or may be disposed in one horizontal line on the upper or lower side of the floor plan 500.

In the case where all the device icons 501 cannot be disposed on the left side of the floor plan 500, the display control section 103 may scroll the device icons 501 upward or downward in accordance with a swipe operation performed upward or downward on the device icons 501 disposed in one vertical line on the left side to cause the device icons 501, which have been hidden, to be displayed within the display 101.

This allows the device icons 501, which have been hidden, to be displayed within the display 101 to allow the user to select the device icons 501. In the case where the device icons 501 are displayed in one horizontal line and all the device icons 501 may not displayed, the display control section 103 may scroll the device icons 501 leftward or rightward in accordance with a swipe operation performed leftward or rightward on the device icons 501 disposed in one horizontal line to cause the device icons 501, which have been hidden, to be displayed within the display 101.

In the display state of the device control screen 502, the display control section 103 may display the device icon 501 selected by the user in a display mode that is different from that for the unselected device icons 501. This allows the user to easily recognize the selected device icon 501.

For example, as shown in FIG. 11, the display control section 103 may display the selected device icon 801 in a color that is different from that of the other unselected device icons 501. Specifically, the display control section 103 may display a background portion of the selected device icon 501 in a color that is different from that of background portions of the unselected device icons 501. It should be noted, however, that such a display mode is merely exemplary, and the display control section 103 may make the selected device icon 501 brighter than the unselected device icons 501, may make the selected device icon 501 denser than the unselected device icons 501, or may cause the selected device icon 501 to flash on and off at a constant cycle.

In the display state of the device control screen 502, the device icon 501 selected by the user may be disposed as distinguished from the unselected device icons 501. This allows the user to easily recognize the selected device icon 501.

Figure 12:
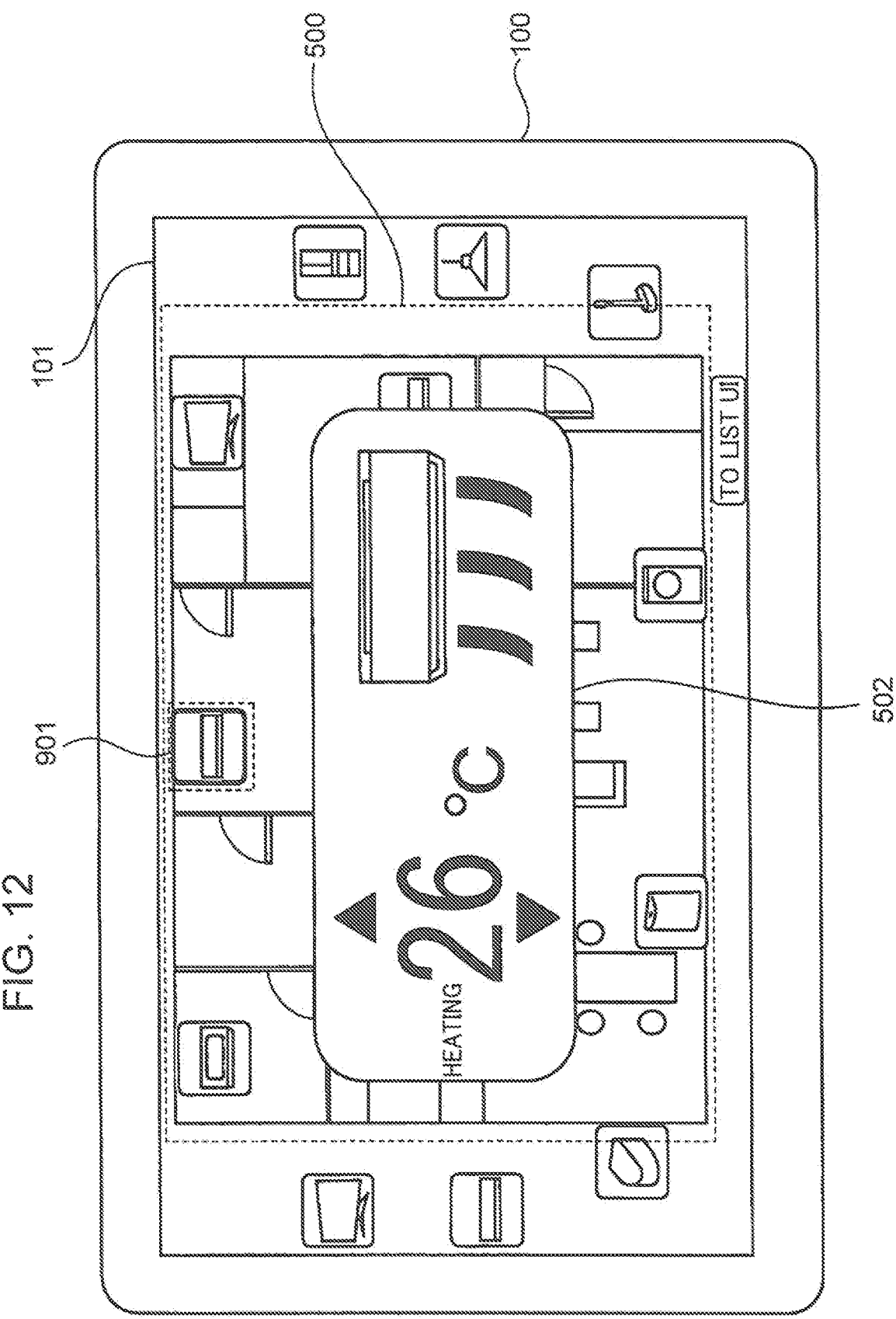
FIG. 12 is a diagram showing a device icon arrangement example of the display state of the device control screen of the home controller according to the present disclosure.

For example, as shown in FIG. 12, the display control section 103 may dispose a selected device icon 901 at the uppermost position on the outer periphery of an ellipse. Besides, for example, the display control section 103 may dispose the selected device icon 501 at a particular position (for example, the lowermost position, the rightmost position, or the leftmost position) on the outer periphery of an ellipse. In any event, the display control section 103 may dispose the device icon 501 selected by the user at a particular location that is easily recognizable by the user.

Figure 14:
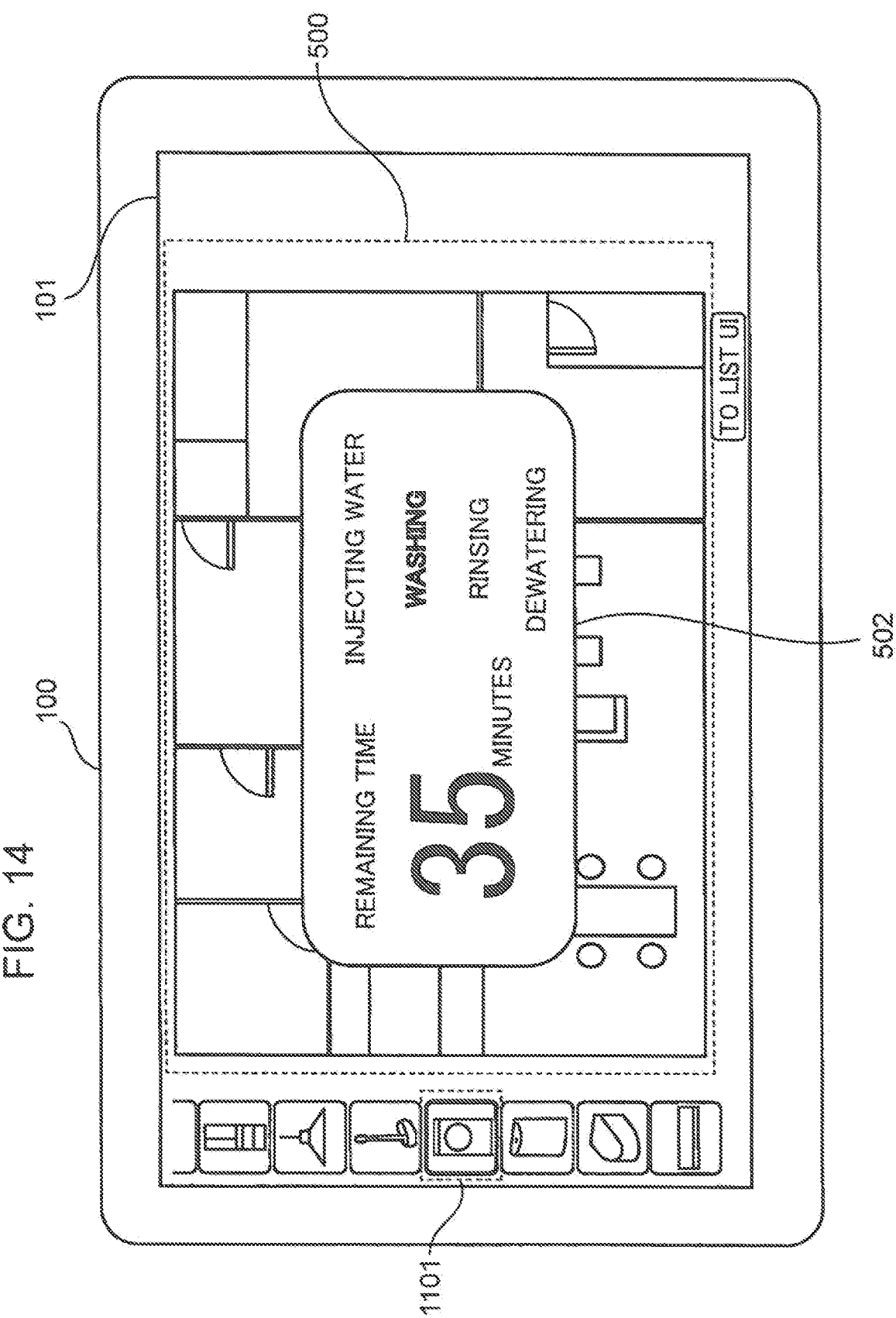
FIG. 14 is a diagram showing a device icon arrangement example of the display state of the device control screen of the home controller according to the present disclosure.

Besides, for example, as shown in FIG. 14, the display control section 103 may scroll an array of the device icons 501 such that a selected device icon 1101 is disposed within the display region of the display 101. In the example of FIG. 14, the device icons 501 are scrolled such that the selected device icon 1101 is disposed at the center of a line of icons displayed in one vertical line on the left side of the floor plan 500. This allows the user to easily recognize the selected device icon 501. Although the device icon 1101 is disposed at the center of the line of icons in FIG. 14, the device icon 1101 may be disposed at any other conspicuous position. For example, the device icon 1101 may be disposed at the top or bottom position of the line of icons.

The order of arrangement of the device icons 501 taken when the device icons 501 are retracted out of the display region of the floor plan 500 may be determined such that devices 200 that are closer in position of arrangement on the floor plan 500 to the device icon 501 selected by the user are disposed to be closer in order of arrangement to the selected device icon 501. Alternatively, the order of arrangement of the device icons 501 may be determined such that the device icons 501 for devices 200 that are more likely to be used together with the device 200 selected by the user are disposed to be closer in order of arrangement to the device icon 501 for the device 200 selected by the user. For example, the television set and the Blu-ray recorder are highly likely to be used together by the user. Therefore, when the device icon 501 for the television set is selected by the user, the device icon 501 for the Blu-ray recorder may be displayed next to the device icon 501 for the television set. In order to embody such a configuration, a table that indicates combinations of devices 200 that are highly likely to be used together may be stored in advance in the storage section 104, and the arrangement of the device icons 501 may be decided in accordance with the table.

In any of the methods of disposing the device icons 501 taken when the device control screen 502 is displayed described above, in addition, the display control section 103 may dispose the device icons 501 as grouped under particular conditions.

Figure 15:
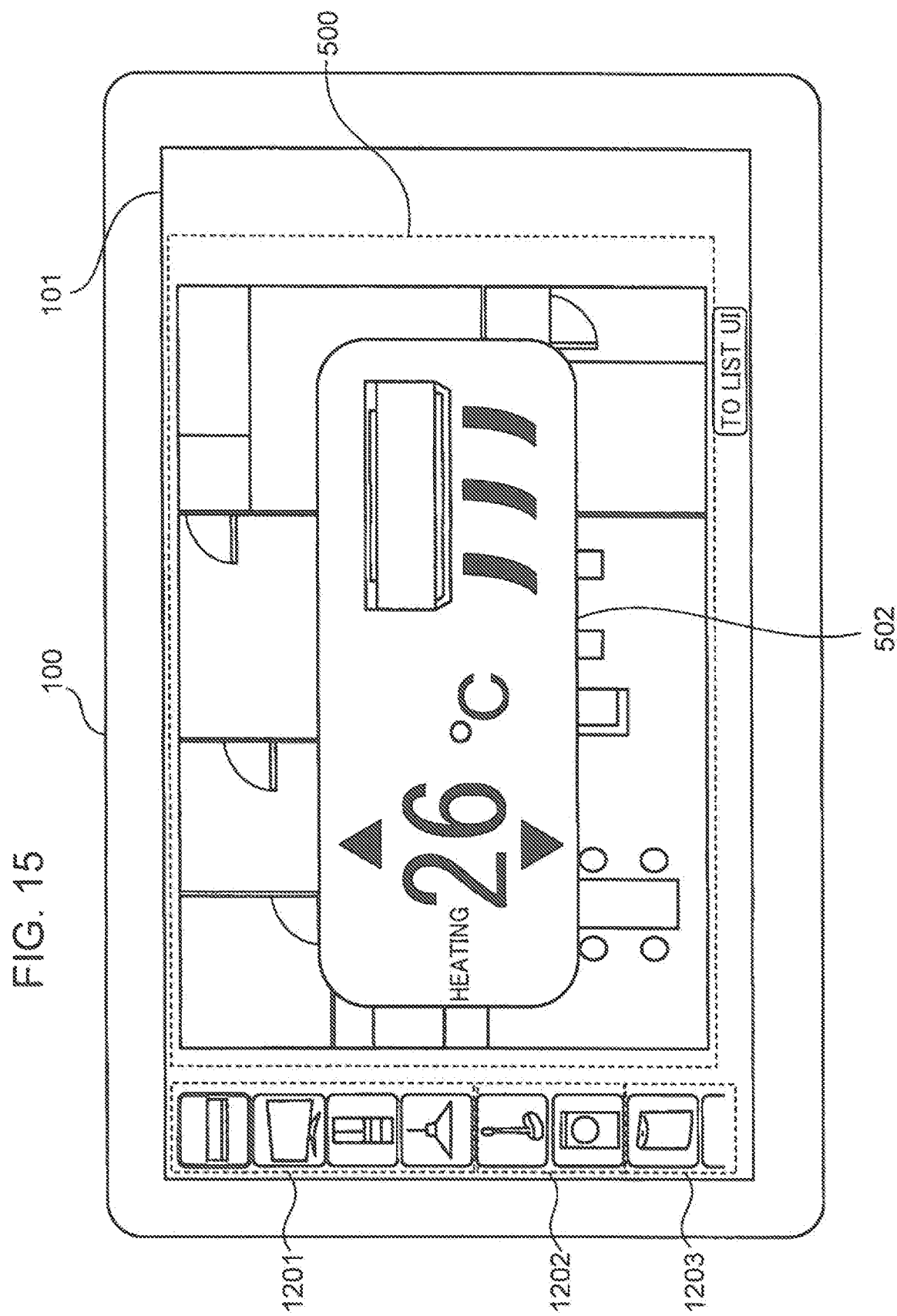
FIG. 15 is a diagram showing a device icon arrangement example of the display state of the device control screen of the home controller according to the present disclosure.

For example, in FIG. 15, the device icons 501 are grouped in accordance with the location at which the devices 200 are disposed. The devices 200 disposed in the living room are grouped as device icons 1201. The devices 200 disposed in a lavatory are grouped as device icons 1202. The devices 200 disposed in a bedroom are grouped as device icons 1203. Then, the display order is set to each group, and the grouped device icons 501 are disposed in one vertical line on the left side of the floor plan 500 in accordance with the display order. The display order of the groups may be determined such that groups that are positioned closer to the room in which the device 200 selected by the user is disposed are closer in display order to the group for the room in which the device 200 selected by the user is disposed.

Besides, the display control section 103 may dispose the device icons 501 as grouped in accordance with the type of the devices 200. For example, in FIG. 16, two device icons 501 for the television set are disposed on the left side of the floor plan 500 as grouped as device icons 2301, and two device icons 501 for the air conditioner are disposed on the left side of the floor plan 500 as grouped as device icons 2302 for the air conditioner. Consequently, the display control section 103 may group the device icons 501 in accordance with the device type by disposing the device icons 501 for the devices 200 of the same type to be continuous.

The display control section 103 may discriminate the type of the devices 200 in accordance with the content registered in a device type 3102 of the device list 3100 (see FIG. 35).

Although the device icons 501 for the devices 200 of the same type are grouped into one group in the foregoing description, the present disclosure is not limited thereto. For example, the display control section 103 may classify the devices 200 into categories matching the device type, group the device icons 501 in accordance with the category, and dispose the device icons 501 on the left side of the floor plan 500 in groups.

Figure 16:
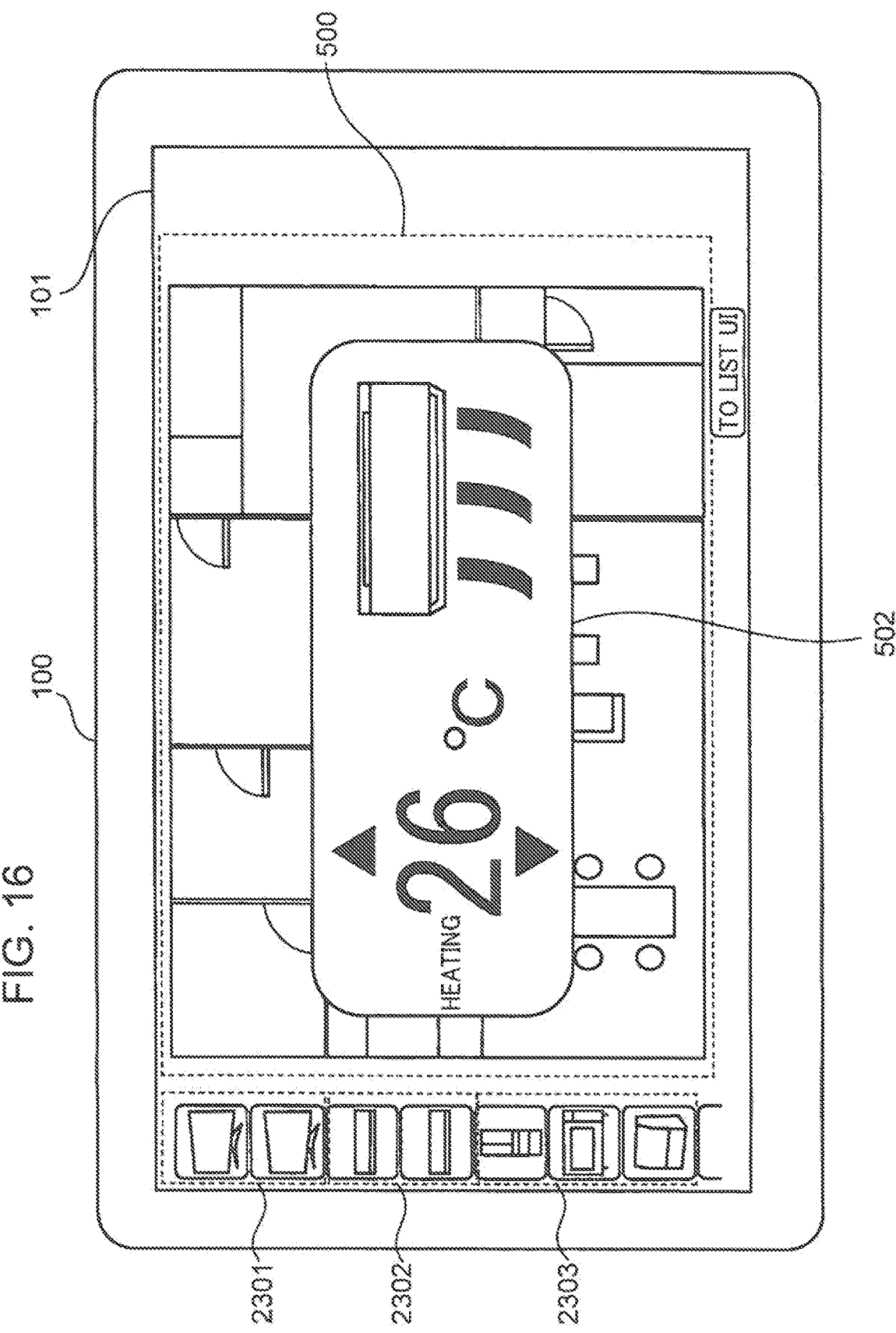
FIG. 16 is a diagram showing a device icon arrangement example of the display state of the device control screen of the home controller according to the present disclosure.

For example, as shown in the lower left of FIG. 16, three device icons 501 for the refrigerator, a microwave oven, and a dish washing/drying machine are classified into a cooking device category, and therefore the three device icons are grouped as device icons 2303 for the cooking devices and disposed on the left side of the floor plan 500.

Examples of the other categories include entertainment devices and air-conditioning devices. The entertainment device category includes devices 200 such as a television set, a recorder, a player, and a home theater system. The air-conditioning device category includes devices 200 such as an air conditioner, an air purifier, a humidifier, a dehumidifier, and a home air circulation system.

For example, if the device icons 501 for the television set, the recorder, the air conditioner, and the air purifier are disposed on the floor plan 500 and the device icon 501 for the television set is selected by the user, the device icons 501 for the television set and the recorder classified into the entertainment device category are grouped into one group and disposed on the left side of the floor plan 500, and the device icons 501 for the air conditioner and the air purifier classified into the air-conditioning device category are grouped into one group and disposed on the left side of the floor plan 500.

The display control section 103 may determine the category of the devices 200 from the content registered in the device type 3102 of the device list 3100. In this case, a classification table for determining the category of the devices 200 from the content registered in the device type 3102 may be stored in advance in the storage section 104, and the display control section 103 may reference the classification table to discriminate the category of the devices 200.

A variety of manners of classifying the devices 200 according to the device type may be adopted besides that described above. For example, as shown in FIG. 24, the devices 200 may be classified into household appliance, air-conditioning, and facility categories.

The method of grouping the device icons 501 on the basis of particular conditions and disposing the device icons 501 as described above may also be applied to the display mode in which the device icons 501 are retracted so as to surround the device control screen 502 as shown in FIG. 11.

Figure 17A:
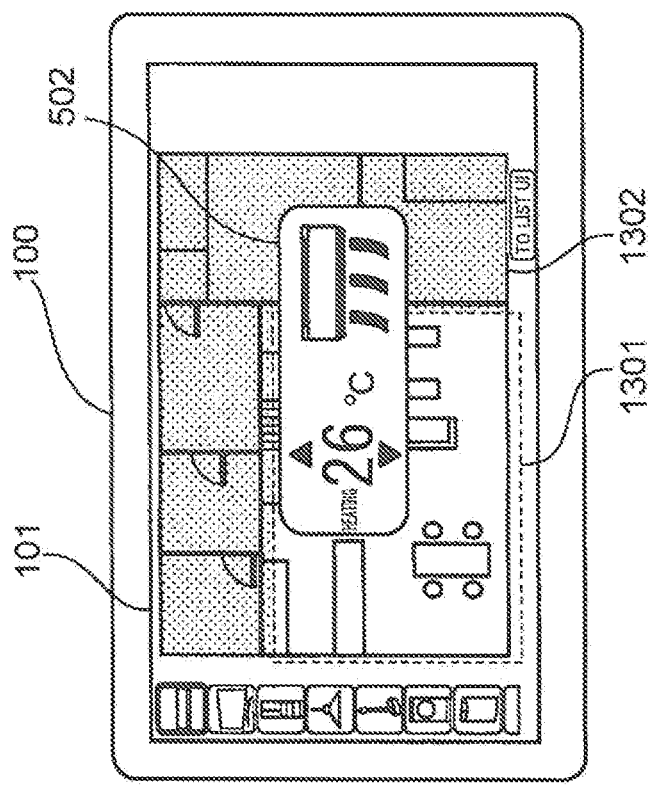
FIGS. 17A and 17B are diagrams showing configuration examples of the display state of the device control screen of the home controller according to the present disclosure.
Figure 17B:
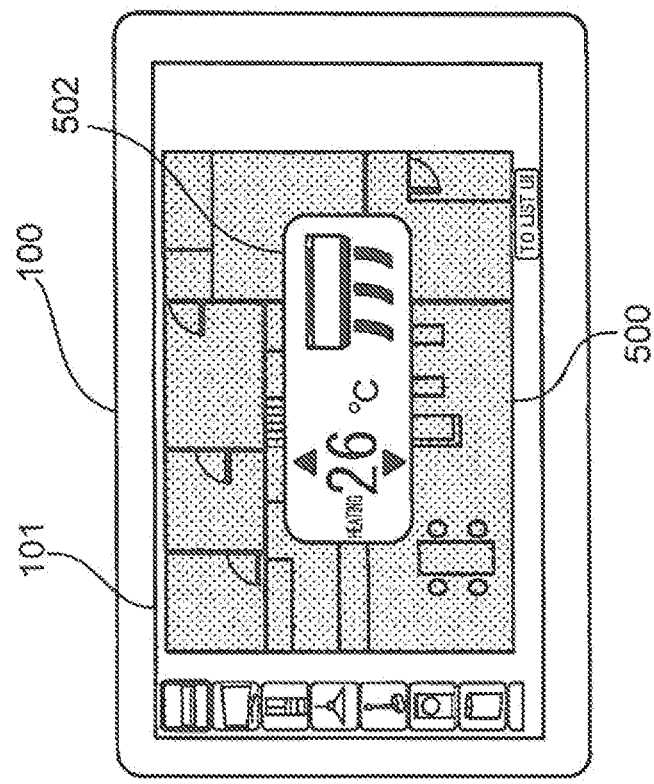

FIGS. 17A and 17B are each a diagram showing a method of displaying the floor plan 500 with the device control screen 502 displayed. As shown in FIGS. 17A and 17B, there are two types of the method of displaying the floor plan 500. In a first display method, as shown in FIG. 17A, the entire floor plan 500 is covered by a translucent gray layer (in the drawing, indicated by dots).

In this case, the background of the device control screen 502 is turned into a gray color to emphasize the device control screen 502, which allows the user to more definitely recognize the device control screen 502. In addition, the gray layer is translucent, and the floor plan 500 is not completely hidden. This allows the device control screen 502 to be operated with presence. The gray layer is image data having a color with low brightness such as gray and set to predetermined transparency.

The display control section 103 may decide the display order of the device control screen 502, the gray layer, and the floor plan 500 such that the device control screen 502 is the uppermost layer and the floor plan 500 is the lowermost layer, and synthesize these images. This prevents the device control screen 502 from being displayed as covered by the gray layer.

In a second display method, as shown in FIG. 17B, a non-control target region 1302 in the floor plan 500 is covered by a translucent gray layer (the region with dots in the drawing), and a control target region 1301 is not covered by the translucent gray layer. This allows the user to operate the device control screen 502 while being conscious of the control target region 1301, which allows operation with presence. Here, the control target region 1301 refers to a region on the floor plan 500 that corresponds to a room in which the device 200 represented by the device icon 501 selected by the user is disposed, and the non-control target region 1302 refers to a region on the floor plan 500 other than the room. For example, in the case where the control target device is the air conditioner installed in the living room, the control target region 1301 is the region on the floor plan 500 corresponding to the living room, and the non-control target region 1302 is the region on the floor plan 500 other than the living room.

For example, it is assumed that the user selects the device icon 501 for the air conditioner with a device ID 3101 of A shown in FIG. 35. In this case, the display control section 103 specifies the position (X10, Y100, Z1) of the air conditioner from the content registered in the arrangement 3104 of the air conditioner. Next, the display control section 103 references the room information 2900 to decide in which room the specified position (X10, Y100, Z1) is positioned. Here, it is assumed that the position (X10, Y100, Z1) is positioned within a region surrounded by vertexes with vertex IDs of F, G, H, I, L, O, and N. Then, the display control section 103 determines that the air conditioner is disposed in the living room with a room ID of A. Then, the display control section 103 generates a gray layer with the region of the living room defined as the control target region 1301 and with the region on the floor plan 500 other than the living room defined as the non-control target region 1302.

Next, transition between the display state of the basic screen and the display state of the device control screen 502 will be described using FIG. 18. In the basic screen shown in the left diagram of FIG. 18, the user selects the device icon 501 for the device 200 (here, the air conditioner) that is desired to be controlled, and the touch panel control section 102 senses the selection. Then, as shown in the right diagram of FIG. 18, the display control section 103 displays the device control screen 502 corresponding to the selected device icon 501 as overlapped on the floor plan 500. This results in transition from the display state of the basic screen to the display state of the device control screen 502.

Figure 18:
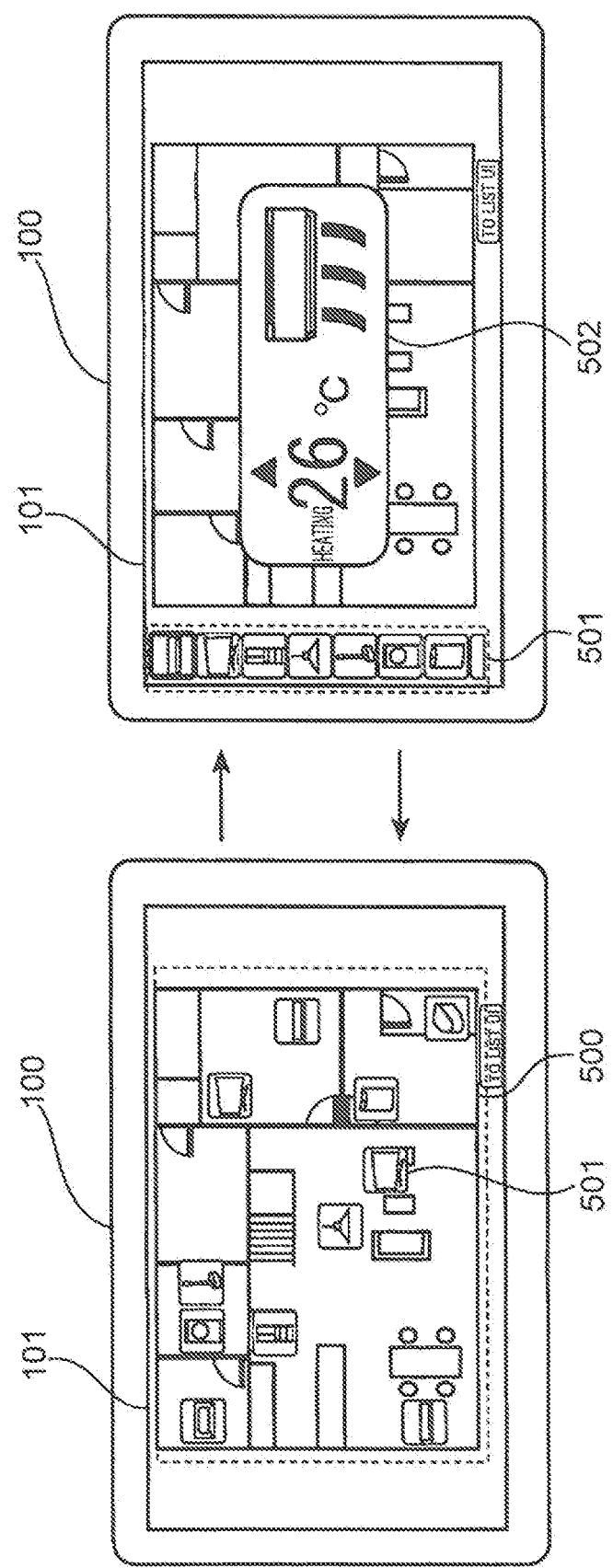
FIG. 18 is a diagram showing an example of transition between the basic screen of the home controller and the display state of the device control screen according to the present disclosure.

On the other hand, as shown in the right diagram of FIG. 18, in the display state of the device control screen 502, the user taps on the device icon 501 for the air conditioner corresponding to the device control screen 502 or a location outside the display region of the device control screen 502 (for example, the display region of the floor plan 500 outside the display region of the device control screen 502), and the touch panel control section 102 senses the tap. Then, as shown in the left diagram of FIG. 18, the display control section 103 erases the device control screen 502, and returns from the display state of the device control screen 502 to the display state of the basic screen. At this time, the display control section 103 returns the device icon 501 to the original arrangement position on the floor plan 500).

The operation described above is the same for the floor plan 500 for any floor displayed in the basic screen. For example, as shown in the left diagram of FIG. 19, in the case where the basic screen displays the floor plan 602 for the second floor, the user taps on the device icon 501 for the device 200 (here, the air conditioner) that is desired to be controlled, and the touch panel control section 102 senses the tap. Then, as shown in the right diagram of FIG. 19, the display control section 103 displays the device control screen 502 corresponding to the selected device icon 501 as overlapped on the floor plan 602 for the second floor.

Figure 19:
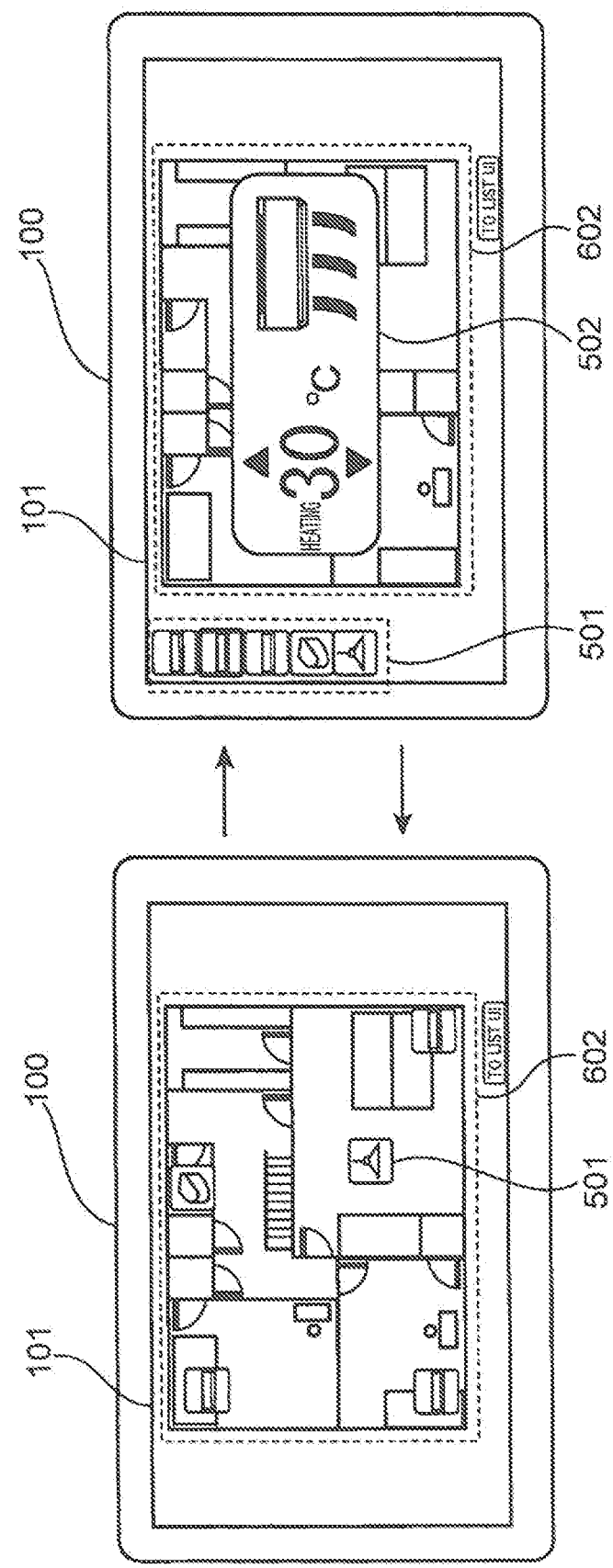
FIG. 19 is a diagram showing an example of transition between the second floor display state of the basic screen of the home controller and the display state of the device control screen for the second floor according to the present disclosure.

On the other hand, as shown in the right diagram of FIG. 19, in the display state of the device control screen 502 for the air conditioner, the user taps on the device icon 501 for the air conditioner corresponding to the device control screen 502 being displayed or a location outside the display region of the device control screen 502 (for example, the display region of the floor plan 500 outside the display region of the device control screen 502), and the touch panel control section 102 senses the tap. Then, as shown in the left diagram of FIG. 19, the display control section 103 erases the device control screen 502, and returns from the display state of the device control screen 502 to the display state of the basic screen in which the floor plan 602 for the second floor is displayed.

Figure 20:
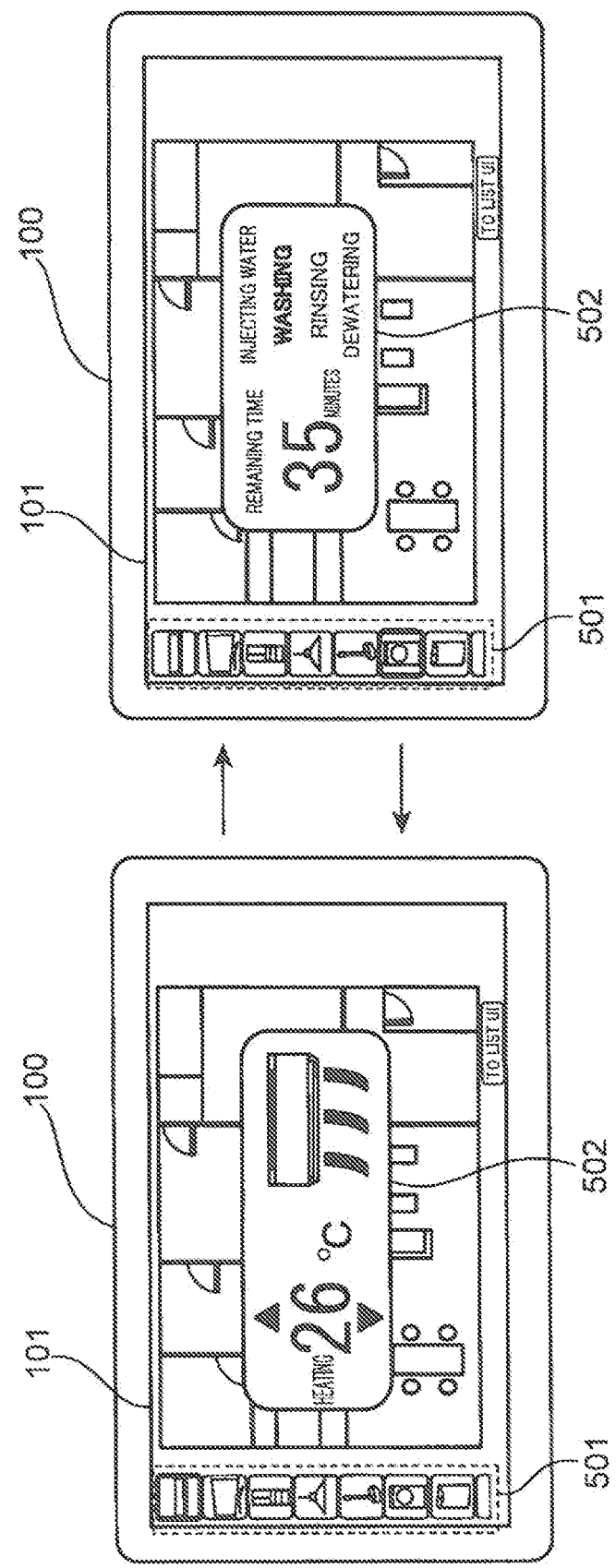
FIG. 20 is a diagram showing an example of transition from the display state of the device control screen of a certain device to the display state of the device control screen of another device according to the present disclosure.

Next, a method of switching from the display state of a certain device control screen 502 to the display state of another device control screen 502 will be described using FIG. 20. As shown in the left diagram of FIG. 20, in the display state of the device control screen 502 for the air conditioner, the user taps on the device icon 501 for the washing machine which is different from the device icon 501 for the air conditioner, and the touch panel control section 102 senses the tap. Then, as shown in the right diagram of FIG. 20, the display control section 103 erases the device control screen 502 which has been displayed, and displays the device control screen 502 corresponding to the device icon 501 for the washing machine as overlapped on the floor plan 500. Switching in the opposite direction is performed in the same manner.

Consequently, when the user successively selects different device icons 501, switching is successively performed between the device control screens 502, which allows the user to successively control different devices 200. That is, in causing another device control screen 502 to be displayed while a certain device control screen 502 is displayed, it is no longer necessary for the user to input an operation of erasing the certain device control screen 502, and switching can be performed between the device control screens 502 with one touch operation.

In the display state of the device control screen 502, in the case where the user taps on the device icon 501 corresponding to the device control screen 502 being displayed, the display control section 103 may only erase the device control screen 502, and may not return to the basic screen. Such screen transition is shown in FIG. 21.

Figure 21:
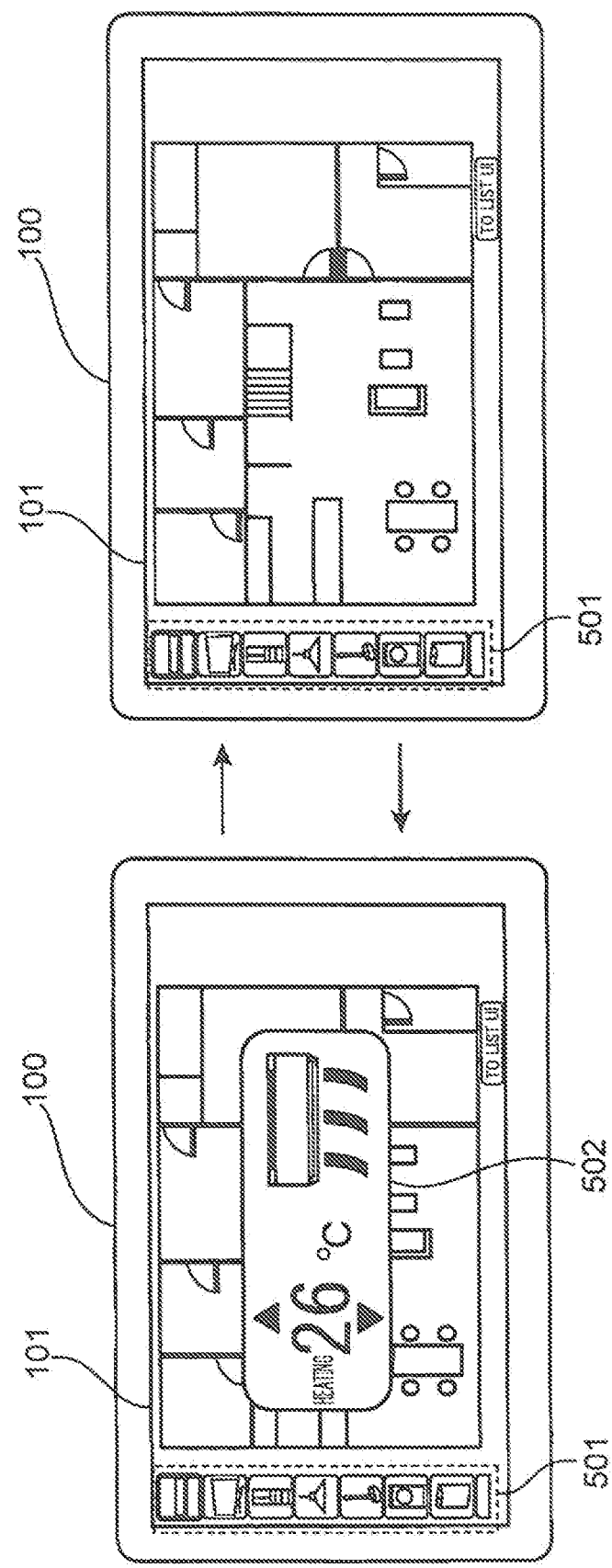
FIG. 21 is a diagram showing an example of transition between the display state and the hidden state of the device control screen of the home controller according to the present disclosure.

In the left diagram of FIG. 21, the device icon 501 for the air conditioner is selected by the user, and therefore the device control screen 502 for the air conditioner is displayed, and all the device icons 501 are displayed in one vertical line on the left side of the floor plan 500. In this state, the user taps on the device icon 501 for the air conditioner, and the touch panel control section 102 senses the tap. Then, as shown in the right diagram of FIG. 21, the display control section 103 erases only the device control screen 502 for the air conditioner with the device icons 501 kept displayed in one vertical line. In this case, the device icons 501 do not move onto the floor plan 500, and therefore a user's desire to cause only the floor plan 500 to be displayed may be met.

On the other hand, in the hidden state of the device control screen 502, the user selects a desired device icon 501, and the touch panel control section 102 senses the selection. Then, the display control section 103 displays the device control screen 502 corresponding to the selected device icon 501. For example, in the right diagram of FIG. 21, when the user selects the device icon 501 for the air conditioner from the device icons 501 disposed in one vertical line on the left side of the floor plan 500, the device control screen 502 for the air conditioner is displayed as shown in the left diagram of FIG. 21.

Figure 22:
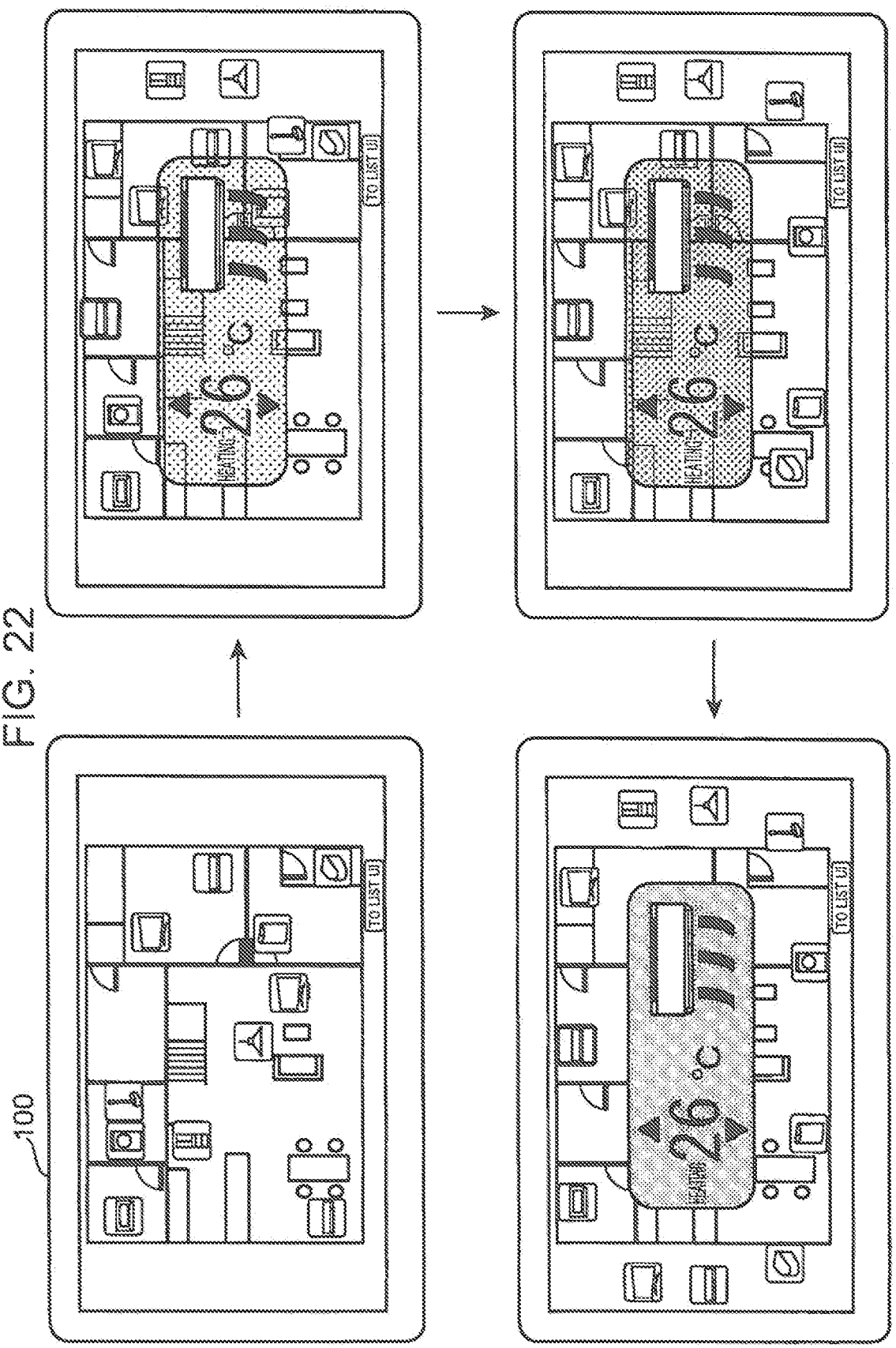
FIG. 22 is a diagram showing an example of an animation for transition from the basic screen of the home controller to the display state of the device control screen according to the present disclosure.

Next, transition from the display state of the basic screen to the display state of the device control screen 502 represented through an animation will be described using FIG. 22. As shown in the upper left diagram of FIG. 22, the user selects the device icon 501 for the air conditioner, for example, in the basic screen. Then, the display control section 103 gradually lowers the transparency of the device control screen 502 for the air conditioner in the order of the upper right diagram, the lower right diagram, and the lower left diagram of FIG. 22 to a final transparency of 0. At the same time, the display control section 103 moves all the device icons 501 onto the outer periphery of an ellipse that surrounds the device control screen 502.

Figure 23:
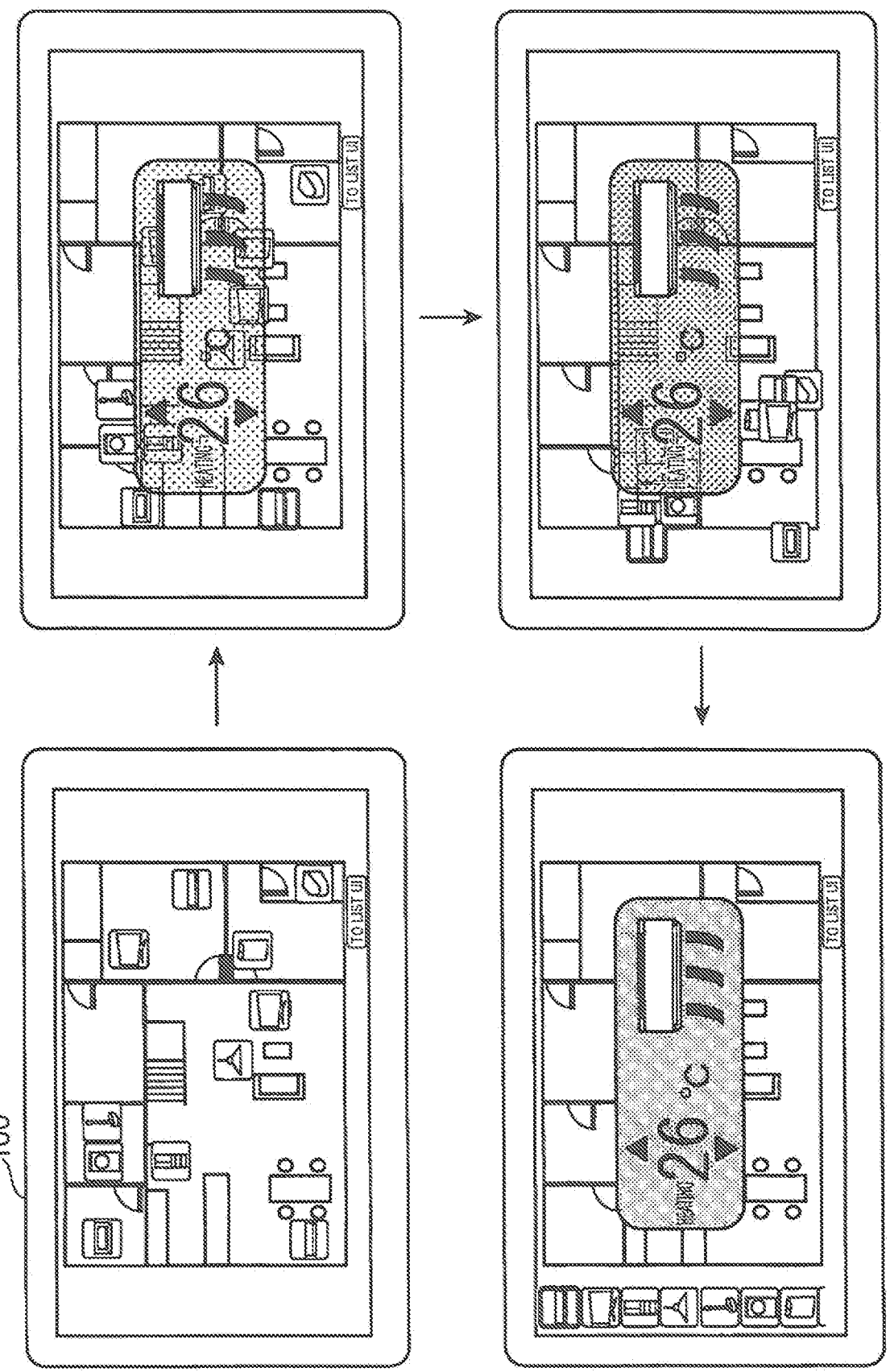
FIG. 23 is a diagram showing an example of an animation for transition from the basic screen of the home controller to the display state of the device control screen according to the present disclosure.

Next, transition from the display state of the basic screen to the display state of the device control screen 502 represented through an animation will be described using FIG. 23. As shown in the upper left diagram of FIG. 23, the user selects the device icon 501 for the device 200 which is the air conditioner, for example, in the basic screen. Then, the display control section 103 gradually decreases the transparency of the device control screen 502 for the air conditioner in the order of the upper right diagram, the lower right diagram, and the lower left diagram of FIG. 23 to a final transparency of 0. At the same time, the display control section 103 moves all the device icons to the left side of the floor plan 500.

Consequently, representing the screen transition through an animation can enhance the interest of the user in operating the device control screen 502 through screen rendering shown since the device icon 501 is selected until the device control screen 502 is displayed.

Figure 24:
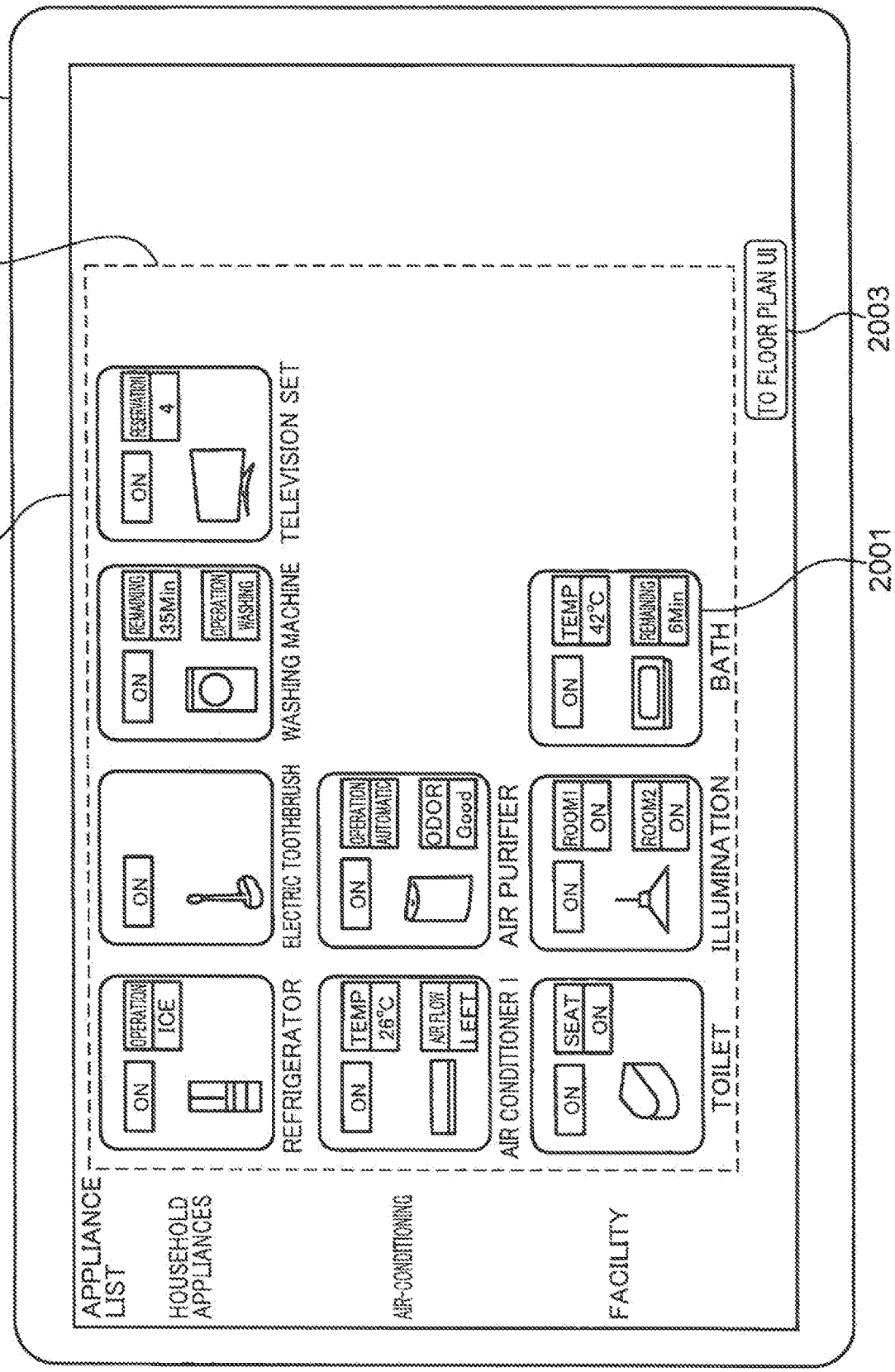
FIG. 24 is a diagram showing the configuration of a device icon list display screen of the home controller according to the present disclosure.

FIG. 24 is a diagram showing the configuration of a device list display screen. The device list display screen is displayed when the user taps on the device list display change button 503 in the basic screen shown in FIG. 5.

As shown in FIG. 24, the device list display screen includes a device list 2000, device details icons 2001, and a basic screen display button 2003.

When the user taps on the device details icon 2001 and the touch panel control section 102 senses the tap, the display control section 103 causes the device control screen 502 to be displayed as overlapped on the device list 2000. This allows the user to cause the device control screen 502 to be displayed and operate the device 200 as in the case where the device icon 501 is tapped on.

The device details icon 2001 is prepared for each device 200. The device details icon 2001 is different from the device icon 501 in representing not only an image representing the device 200 but also the on/off state and the operation state of the device 200. For example, the device details icon 2001 for the refrigerator displayed in the upper left of FIG. 24 displays not only an image of the refrigerator but also "ON", which indicates that the refrigerator is currently turned on, and "OPERATION/ICE", which indicates that the refrigerator is currently making ice.

In the device list 2000, the device details icons 2001 are displayed as classified on the basis of a classification criterion determined in advance. Examples of the classification criterion determined in advance include the type of the device 200, the room in which the device 200 is disposed, and the status of use of the device 200. In FIG. 24, the type of the device 200 is used as the classification criterion, and the device details icons 2001 are classified into three categories, namely the household appliance, air-conditioning, and facility categories.

In the example of FIG. 24, the refrigerator, an electric toothbrush, the washing machine, and the television set are classified into the household appliance category, the air conditioner and the air purifier are classified into the air-conditioning category, and the toilet, the illumination device, and the bath are classified into the facility category.

In this case, a classification table that determines into which of the household appliance, air-conditioning, and facility categories each device 200 is classified on the basis of the content registered in the device type 3102 of the device list 3100 (see FIG. 35) is stored in advance in the storage section 104. Then, the display control section 103 may reference the classification table to classify each device into a category.

Returning to FIG. 24, the button with a text "TO FLOOR PLAN UI" displayed at the lower right of the device list 2000 is the basic screen display button 2003. The basic screen display button 2003 is a button for switching the screen from the device list display screen to the basic screen.

Although switching can be made between the basic screen and the device list display screen in the foregoing description, the device list display screen may be utilized as the basic screen in place of the basic screen shown in FIG. 5. In this case, the basic screen display button 2003 may be omitted.

In the foregoing description, one device details icon 2001 is correlated with one device 200. However, the present disclosure is not limited thereto, and one device details icon 2001 may be correlated with a plurality of devices 200 so that the one device details icon 2001 may be used in common to the plurality of devices 200. For example, in the case where there are two illumination devices in a living room, the two illumination devices may be represented by one device details icon 2001.

In this case, when the device details icon 2001 representing the two illumination devices is tapped on by the user, the display control section 103 causes the display 101 to display a device control screen 502 that allows simultaneous control of the two illumination devices. In this case, the same effect as that obtained in the case where one device icon 501 is used in common to a plurality of devices 200 is obtained. In the case where one device details icon 2001 is used in common to a plurality of illumination devices, the device details icon 2001 may display the on/off state and the operation state of each of two illumination devices.

In the basic screen, the device details icon 2001 may be used in place of the device icon 501. In the device list display screen, the device icon 501 may be used in place of the device details icon 2001. In addition, the device control screen 502 displayed in the case where the device details icon 2001 is selected and the device control screen 502 displayed in the case where the device icon 501 is selected may be the same as or different from each other. For example, the device details icon 2001 contains more information than that of the device icon 501, and therefore the device control screen 502 displayed in the case where the device details icon 2001 is selected may include more buttons and states than those of the device control screen 502 displayed in the case where the device icon 501 is selected.

Figure 25:
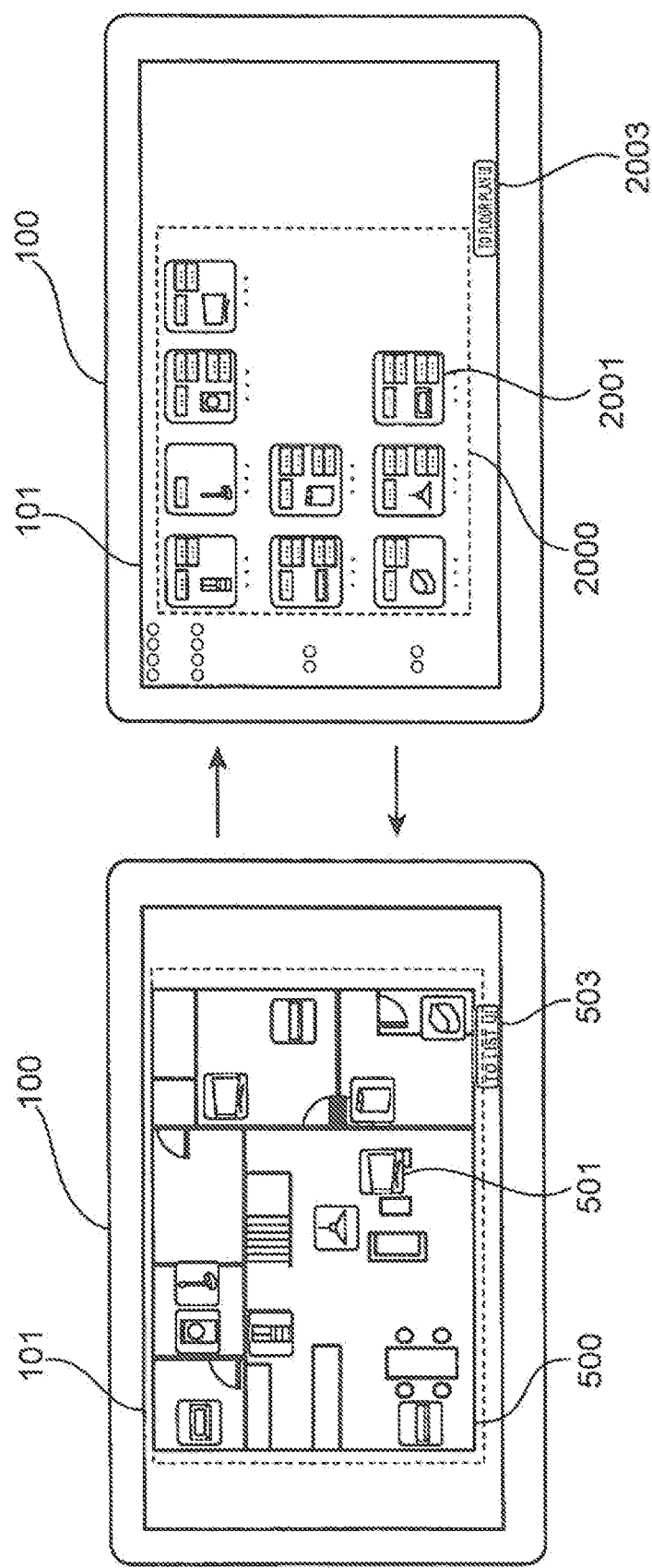
FIG. 25 is a diagram showing an example of transition between the basic screen of the home controller and the device icon list display screen according to the present disclosure.

FIG. 25 is a diagram showing screen transition between the basic screen and the device list display screen. In the basic screen shown in the left diagram of FIG. 25, when the device list display change button 503 is selected by the user, display on the display 101 is switched to the device list display screen shown in the right diagram of FIG. 25. On the other hand, in the device list display screen shown in the right diagram of FIG. 25, when the basic screen display button 2003 is selected by the user, display on the display 101 is switched to the basic screen shown in the left diagram of FIG. 25.

Specifically, when the touch panel control section 102 senses a tap on the basic screen display button 2003, the display control section 103 switches the display screen on the display 101 to the basic screen from the device list display screen. On the other hand, in the display state of the basic screen, when the touch panel control section 102 senses a tap on the device list display change button 503, the display control section 103 switches the display screen on the display 101 from the basic screen to the device list display screen.

For example, in the case where the device list display screen is selected for display, and in the case where the user attempts to operate the television set located in front of the user, the device list display screen includes only one device details icon 2001 for the television set if there is only one television set in the house. This allows the user to directly select the device details icon 2001 for the television set without an erroneous operation, and to cause the device control screen 502 corresponding to the television set to be displayed.

On the other hand, in the case where the device list display screen is selected, the device list display screen focuses on the individual devices 200, and thus the relationship between the device 200 and the location at which the device 200 is disposed is unclear, although it is possible to operate or confirm the state of the individual devices 200. Therefore, for a plurality of devices 200 installed within the same building, such as the air conditioners or the illumination devices, for example, it is unclear the air conditioner or the illumination device in which room is the control target, which may incur an erroneous operation.

Thus, in the present disclosure, the basic screen is provided in addition to the device list display screen to allow selection from the basic screen and the device list display screen.

Consequently, in the case where the basic screen is selected, the relationship between the device 200 and the location at which the device 200 is disposed is made definite. Therefore, also for a plurality of devices 200 of the same type installed in the same building, such as the air conditioners or illumination devices, for example, a discrimination as to the air conditioner or the illumination device in which room is the control target is facilitated. This prevents the air conditioner or the illumination device installed in a room that is different from the desired room from being erroneously operated.

Figure 26:
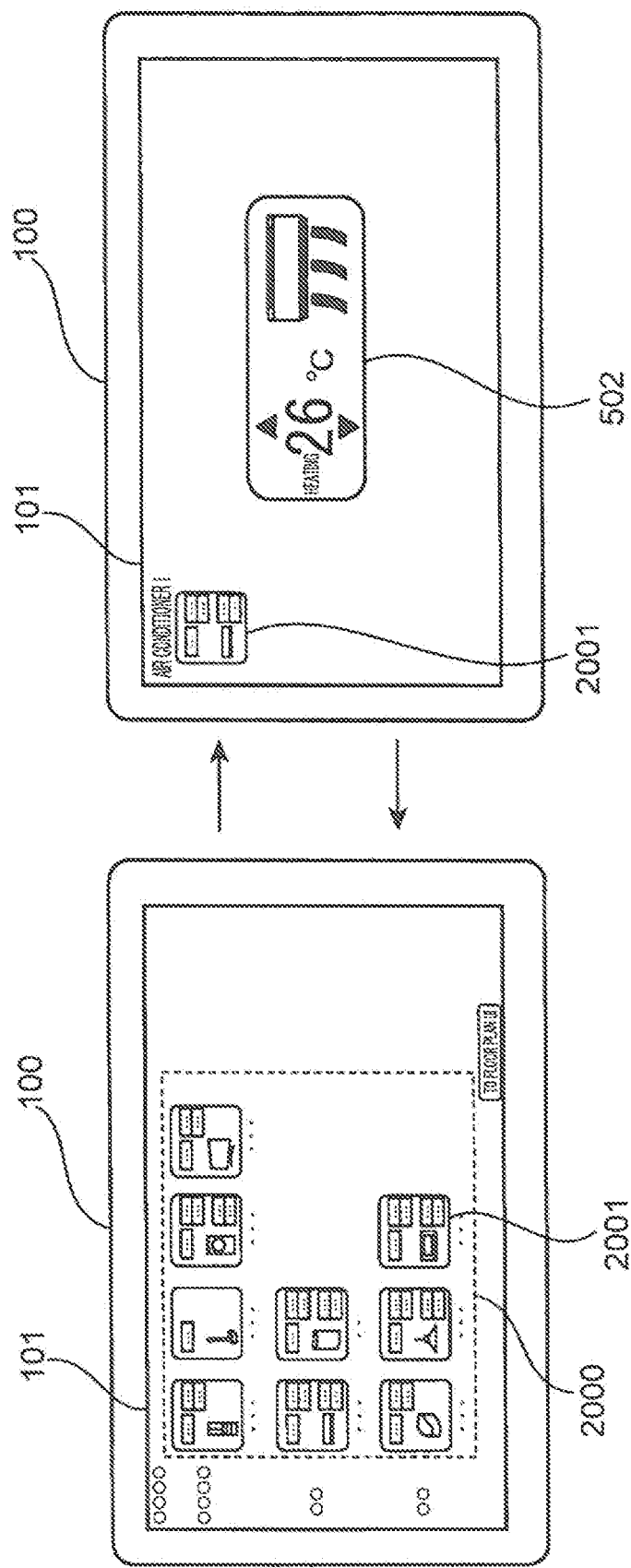
FIG. 26 is a diagram showing an example of transition between the device icon list display screen of the home controller and the display state of the device control screen according to the present disclosure.

FIG. 26 is a diagram showing screen transition between the display state of the device list display screen and the display state of the device control screen 502. In the device list display screen shown in the left diagram of FIG. 26, the user selects the device details icon 2001 for the device 200 (here, the air conditioner) that is desired to be controlled, and the touch panel control section 102 senses the selection. Then, as shown in the right diagram of FIG. 26, the display control section 103 displays the device control screen 502 for the air conditioner corresponding to the selected device details icon 2001 as overlapped on the device list display screen. This results in transition from the display state of the device list display screen to the display state of the device control screen 502.

In the example in the right drawing of FIG. 26, the display control section 103 hides the device details icons 2001 for devices other than the air conditioner selected by the user, and only the device details icon 2001 for the air conditioner is displayed at a position that is different from that in the device control screen 502. This allows the user to definitely recognize the device details icon 2001 that the user himself/herself selected.

On the other hand, as shown in the right diagram of FIG. 26, in the display state of the device control screen 502, the user selects the device details icon 2001 for the air conditioner, and the touch panel control section 102 senses the selection. Then, as shown in the left diagram of FIG. 26, the display control section 103 erases the device control screen 502, and returns from the display state of the device control screen 502 to the display state of the device list display screen.

Although only one device details icon 2001 is displayed in the display state of the device control screen 502 shown in the right diagram of FIG. 26, other device details icons 2001 that are not selected by the user may be displayed in the same manner as in FIG. 13. In this case, the plurality of device details icons 2001 may be displayed in one line at an end of the screen as shown in FIG. 13, or may be displayed so as to surround the device control screen 502 as shown in FIG. 12.

According to the configuration, the user can successively select the device details icons 2001 in the display state of the device control screen 502 to successively display other device control screens 502. Consequently, in causing another device control screen 502 to be displayed while a certain device control screen 502 is displayed, it is no longer necessary for the user to input an operation of erasing the certain device control screen 502, and switching can be performed between the device control screens 502 with one touch operation.

Figure 27:
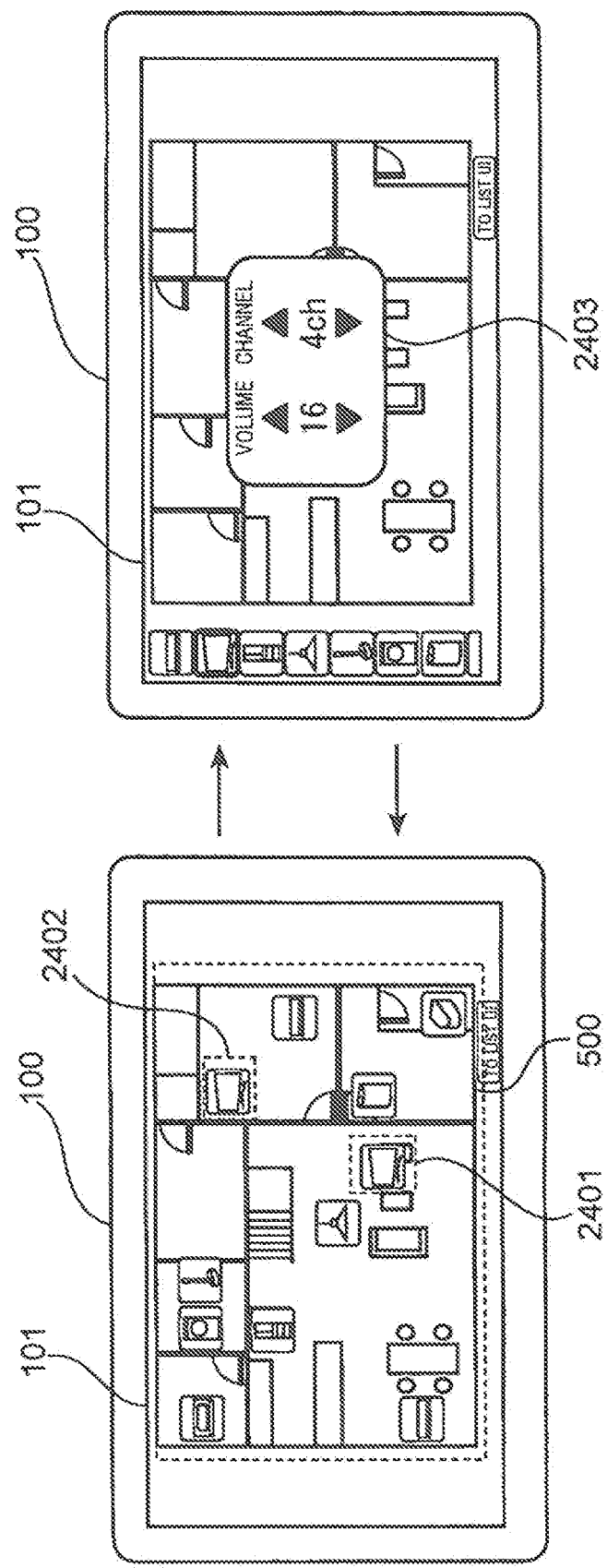
FIG. 27 is a diagram showing an example of transition between the basic screen of the home controller and the display state of the device control screen according to the present disclosure.

FIG. 27 is a diagram showing screen transition between the display state of the basic screen and the display state of the device control screen 502 performed in the case where the basic screen includes a plurality of device icons 501 representing the devices 200 of the same type. As shown in the left diagram of FIG. 27, the basic screen includes two device icons 501 for the television set. Here, the device icon 501 for a television set A is represented as a device icon 2401, and the device icon 501 for a television set B is represented as a device icon 2402. At this time, the user can intuitively select a television set that is desired to be controlled from the floor plan 500, and operate the television set.

For example, in the right diagram of FIG. 27, the device icon 2401 for the television set A is selected, and a device control screen 2403 for the television set A is displayed. Consequently, even if there are a plurality of device icons 501 for the devices 200 of the same type, each device icon 501 is disposed at a position on the floor plan 500 corresponding to the actual installation position. This allows the user to intuitively select the device icon 501 for a device 200 that is desired to be controlled in accordance with the display position on the floor plan 500, which prevents the device control screen 502 for another device 200 from being erroneously displayed.

Figure 28:
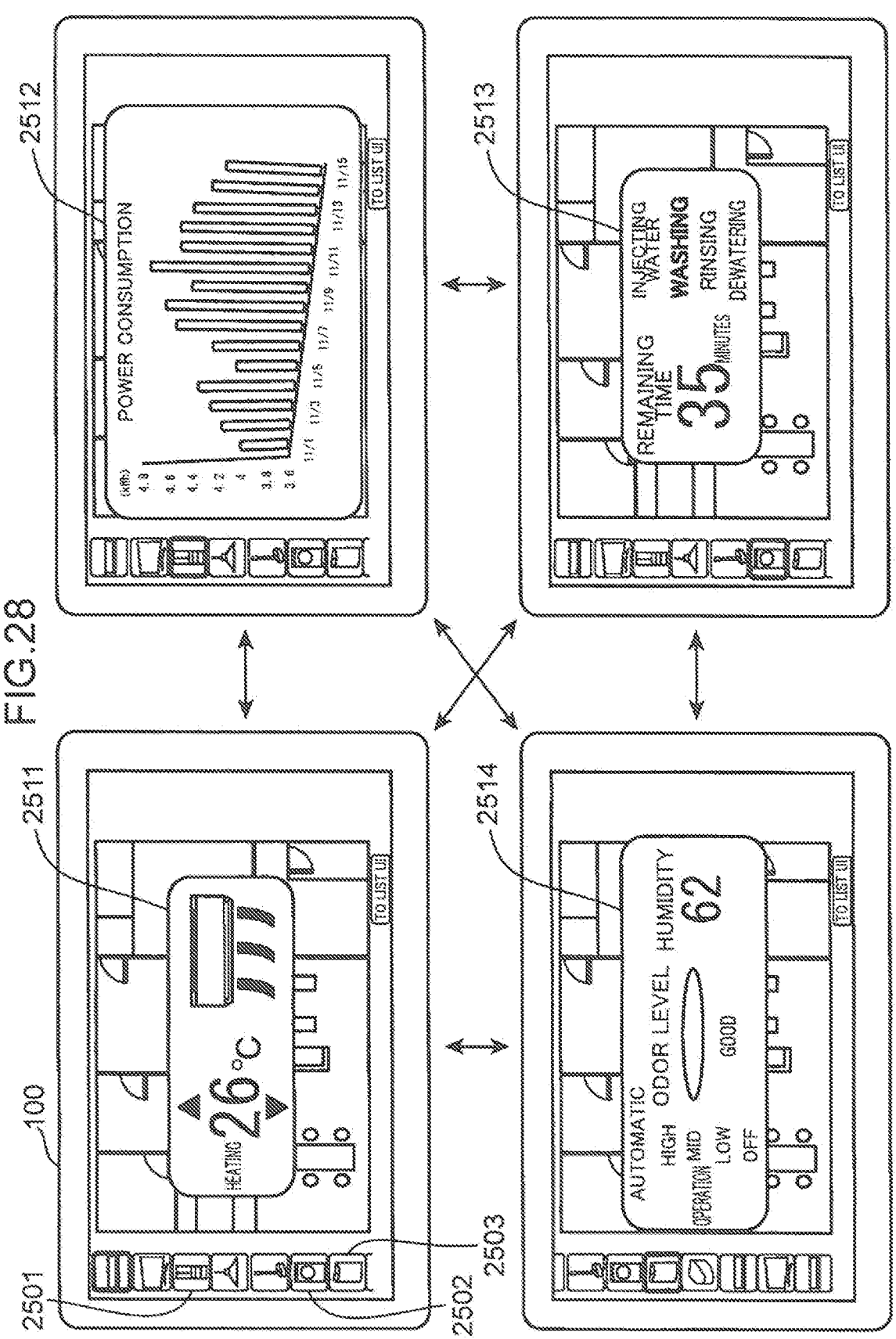
FIG. 28 is a diagram showing how the home controller successively transitions among the display states of the device control screens for different devices according to the present disclosure.

FIG. 28 is a diagram showing screen transition performed in the case where different device icons 501 are successively selected in the display state of the device control screen 502 to successively switch between the device control screens 502. In the upper left diagram, a device control screen 2511 for the air conditioner is displayed. When the device icon 2501 for the refrigerator is selected in this state, a device control screen 2512 for the refrigerator is displayed on the display 101 as shown in the upper right diagram. When the device icon 2502 for the washing machine is selected in the upper left diagram, a device control screen 2513 for the washing machine is displayed as shown in the lower right diagram. When the device icon 2503 for the air purifier is selected in the upper left diagram, a device control screen 2514 for the air purifier is displayed as shown in the lower left diagram. Such screen transition is performed in the same manner in the upper right diagram, the lower right diagram, and the lower left diagram.

Consequently, when the user selects the device icon 501 in the display state of the device control screen 502, the device control screen 502 corresponding to the device icon 501 can be directly displayed. Therefore, in the case where another device control screen 502 is to be displayed while a certain device control screen 502 is displayed, the other device control screen 502 can be displayed with one touch operation without inputting an operation of erasing the device control screen 502 being displayed. This allows the user to smoothly switch between the device control screens 502.

Figure 29:
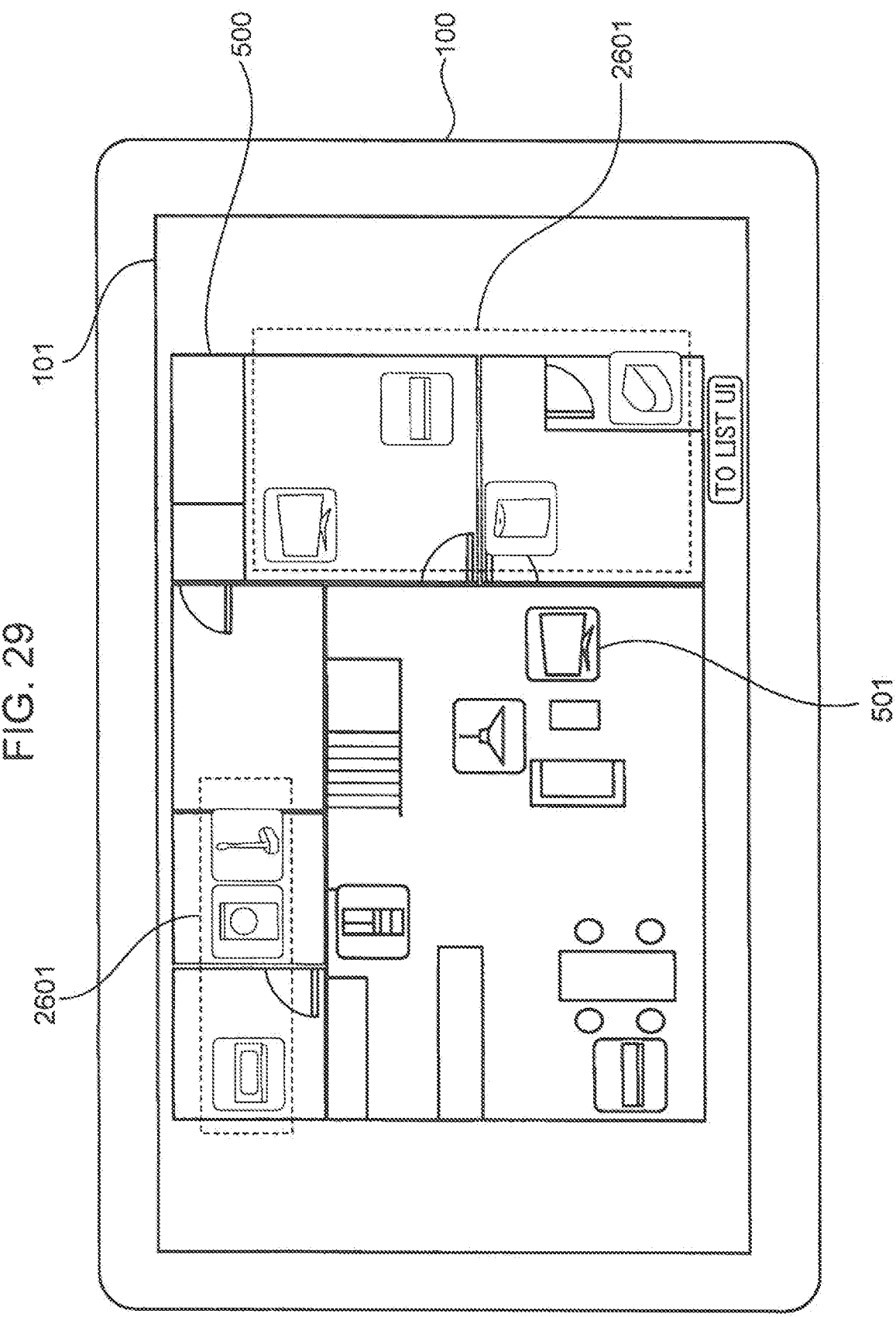
FIG. 29 is a diagram showing an example of display on the basic screen of devices that cannot be detected on a network according to the present disclosure.

FIG. 29 is a diagram showing an example of display on the basic screen of the device icons 501 for incommunicable devices 200 that cannot be detected on the network. The device management section 105 detects a device 200 that cannot be detected on the network and a device 200 that does not respond to a control command even though registered in the device list 3100 as incommunicable devices 200. Then, the display control section 103 displays the device icons 501 for the incommunicable devices 200 in a display mode that is different from that for the device icons 501 for communicable devices 200.

For example, in FIG. 29, the device icons 501 for the incommunicable devices 200 are represented as device icons 2601. The device icons 2601 are displayed translucently. This allows the user to immediately recognize that the devices 200 indicated by the device icons 2601 are currently out of order or cannot be controlled because of occurrence of a communication failure.

Although the device icons 2601 are displayed translucently in FIG. 29, the present disclosure is not limited thereto. For example, the device icons 2601 may be displayed in a fainter color or more darkly than the other device icons 501, or provided with an annotation mark.

Figure 30:
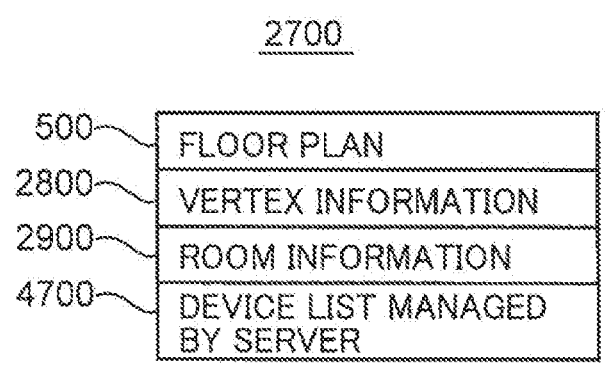
FIG. 30 is a diagram showing the configuration of home information according to the present disclosure.

FIG. 30 is a diagram showing the configuration of home information 2700. The home information 2700 is managed by the server 300 for each house, and the home controller 100 controls display on the basic screen, the device control screen 502, and so forth on the basis of the home information 2700. As shown in FIG. 30, the home information 2700 includes the floor plan 500, vertex information 2800, the room information 2900, and a device list 4700 managed by the server.

As shown in FIG. 6, the floor plan 500 is a plan view that is prepared for each floor of a house and that planarly represents the arrangement and the shape of one or more rooms forming the floor. In the present disclosure, the floor plan 500 includes a plan view formed from image data represented in a bitmap format, for example.

The vertex information 2800 is information for adapting the floor plan 500 to a two-dimensional coordinate-axis space to allow the home controller 100 to interpret the floor plan 500. The room information 2900) is information for deciding the regions of rooms from the vertex information 2800. The vertex information 2800, the room information 2900, and the device list 4700 managed by the server will be described in detail below.

Figure 31:
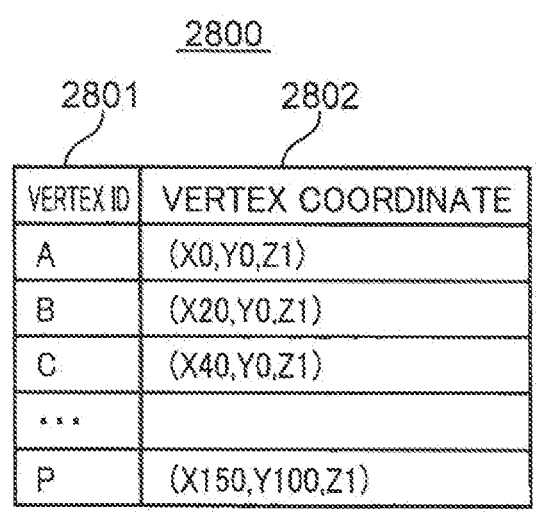
FIG. 31 is a diagram showing the configuration of vertex information according to the present disclosure.

FIG. 31 is a diagram showing the configuration of the vertex information 2800. As shown in FIG. 31, the vertex information 2800 includes a vertex ID 2801 and a vertex coordinate 2802. The vertex ID 2801 is an identifier that identifies a vertex on the floor plan 500. The vertex coordinate 2802 is a coordinate represented in the format of (X coordinate, Y coordinate, floor number), and indicates the position of a vertex of a partition line or the like represented on the floor plan 500. For example, the vertex with a vertex ID of B has a vertex coordinate (X20, Y0, Z1), which represents the position on the first floor (the ground floor) with an X coordinate of 20 and a Y coordinate of 0.

Figure 33:
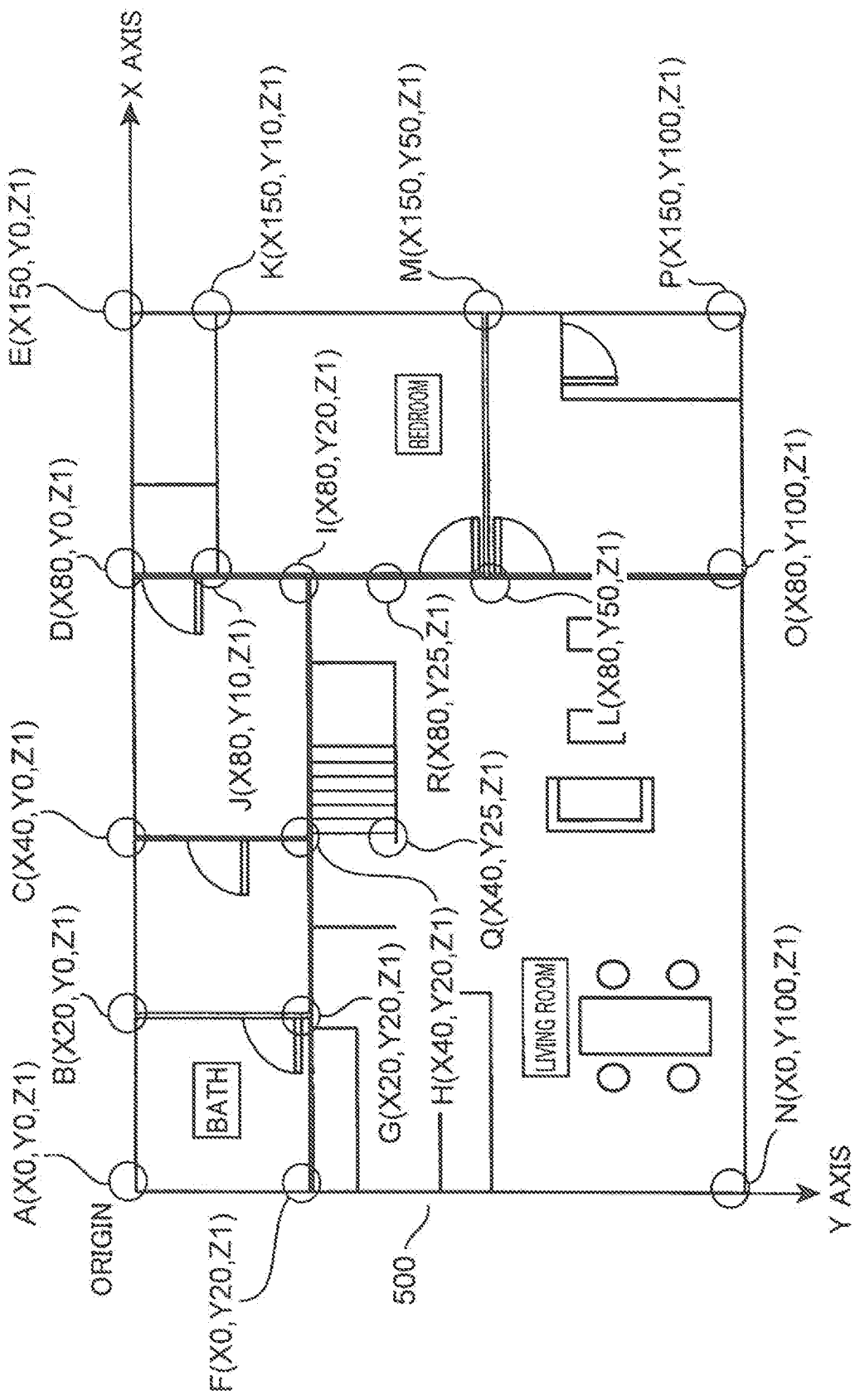
FIG. 33 is a diagram showing an example of the correspondence between the vertex information and the floor plan for the first floor according to the present disclosure.

FIG. 33 is a diagram showing the correlation between each vertex registered in the vertex information 2800 and the floor plan 500. It should be noted, however, that in FIG. 33, the upper left vertex of the floor plan 500 is the origin (with an X coordinate of 0 and a Y coordinate of 0). For example, the vertex with a vertex ID of A has a vertex coordinate (X0, Y0, Z1), and therefore is positioned at the origin. Meanwhile, the vertex with a vertex ID of B has a vertex coordinate (X20, Y0, Z1), and therefore is positioned at the upper right vertex of the bath.

FIG. 32 is a diagram showing the configuration of the room information 2900. As shown in FIG. 32, the room information 2900 includes a room ID 2901, the room type 2902, and a room coordinate 2903. The room ID 2901 is an identifier that identifies a room on the floor plan 500. The room type 2902 indicates the type of the room. The room coordinate 2903 is expressed by a set of the vertex IDs 2801, and decides the region of the room on the floor plan 500. For example, the room with a room ID of C is the bath, and indicates a region formed by connecting the vertexes with vertex IDs of A. B. G and F sequentially in this order on the floor plan 500. The room information 2900 includes not only information on the rooms but also information on the staircase. The region with a room ID of D formed by connecting the vertexes with vertex IDs of H, I, R, and Q sequentially in this order represents the staircase.

Consequently, with the vertex information 2800 and the room information 2900 provided, the home controller 100 can specify the regions of the rooms represented on the floor plan 500 by plotting the vertexes indicated by the vertex information 2800 on the image data for the floor plan 500 and connecting the vertexes indicated by the room coordinate 2903, and recognize the type of the rooms from the room type 2902.

The vertex information 2800 may be generated by a system administrator by causing the floor plan 500 to be displayed on a display of a personal computer, detecting vertexes from the displayed floor plan, and inputting the vertex ID and the vertex coordinate of the detected vertexes to the personal computer. The vertex information 2900 may also be generated by the system administrator by detecting rooms from the floor plan displayed on a display, and inputting the room ID, the room type, and the room coordinate of the detected rooms to a personal computer. Alternatively, the vertex information 2800 and the room information 2900 may be generated by taking in CAD data which are the original data for the floor plan 500.

FIG. 34 is a diagram showing the configuration of the device list 4700 managed by the server 300. As shown in FIG. 34, the device list 4700 includes a device ID 4701, a device type 4702, a model number 4703, an arrangement 4704, a capability information 4705, and a control command transmission destination 4706.

The device ID 4701 is the identifier of the device 200. The device type 4702 indicates the type of the device 200. The model number 4703 indicates the model number of the device 200. The arrangement 4704 is a coordinate represented in the format of (X coordinate, Y coordinate, floor number) as with the vertex coordinate 2802, and indicates the arrangement of the device icon 501 corresponding to the device 200 on the floor plan 500.

The display control section 103 can dispose the device icon 501 on the floor plan 500 on the basis of the arrangement 4704, and display the basic screen and so forth. The capability information 4705 indicates the content for control of the device 200 and the state that can be acquired from the device 200. For example, the air conditioner with a device ID of A can be controlled for the temperature, the air flow direction, and the air flow amount. The control command transmission destination 4706 indicates the transmission destination of a control command for controlling the device 200. For example, the control command transmission destination 4706 for the air conditioner with a device ID of A is the device, and therefore a control command is directly transmitted from the home controller 100 to the device 200. Meanwhile, the control command transmission destination 4706 for the refrigerator with a device ID of C is the server, and therefore a control command is transmitted from the home controller 100 to the device 200 via the server 300. The control command is a command for operating the device 200 or confirming the state of the device 200.

The current state of the device 200 may be registered in the device list 4700. This allows the server 300 to notify the home controller 100 of the state of the relevant device 200 in the case where a request for confirmation of the state of the device 200 is made from the home controller 100.

As discussed above, in order to dispose the device icon 501 on the floor plan 500 on the basis of the actual arrangement of the device 200 within the house, the user moves the device icon 501 to an appropriate position on the floor plan 500. Thus, for the device icon 501 of which the arrangement on the floor plan 500 is not specified by the user, a value that indicates an unset arrangement such as (0, 0, 0) is set as the value of the arrangement 4704. The display control section 103 displays the device icon 501 with the arrangement 4704 unset at a position on the display 101 determined in advance.

The device list 4700 managed by the server may be omitted from the home information 2700. In this case, the home controller 100 may directly acquire from the device 200 information corresponding to the device type 4702, the model number 4703, and the capability information 4705 provided in the device list 4700 managed by the server.

FIG. 35 is a diagram showing the configuration of the device list 3100 managed by the home controller 100. The home controller 100 disposes the device icons 501 on the floor plan 500 in the basic screen and controls the devices 200 on the basis of information in the device list 3100.

The device list 3100 includes the device ID 3101, the device type 3102, a model number 3103, the arrangement 3104, capability information 3105, a control command transmission destination 3106, and an IP address 3107. The device ID 3101 to the control command transmission destination 3106 are the same in content as those with the same name in FIG. 34.

In the device list 3100, the content of the device type 3102, the model number 3103, the arrangement 3104, the capability information 3105, the control command transmission destination 3106 can be acquired by the device management section 105 by transmitting the device list 4700 from the server 300. The IP address 3107 is acquired from the device 200 by the device management section 105. It should be noted, however, that the device management section 105 may give priority to the content of the device type 3102, the model number 3103, the capability information 3105, and the control command transmission destination 3106 that can be directly acquired from the device 200 in the case where such content is available.

The control command transmission destination 3106 may be determined in advance by the home controller system, may be automatically decided on the basis of the state of the network to which the home controller 100 is connected, or may be set by the user, rather than being acquired from the server 300 or the device 200.

Next, the flow of control performed on the device 200 by the home controller 100 will be described using the drawings.

Figure 36:
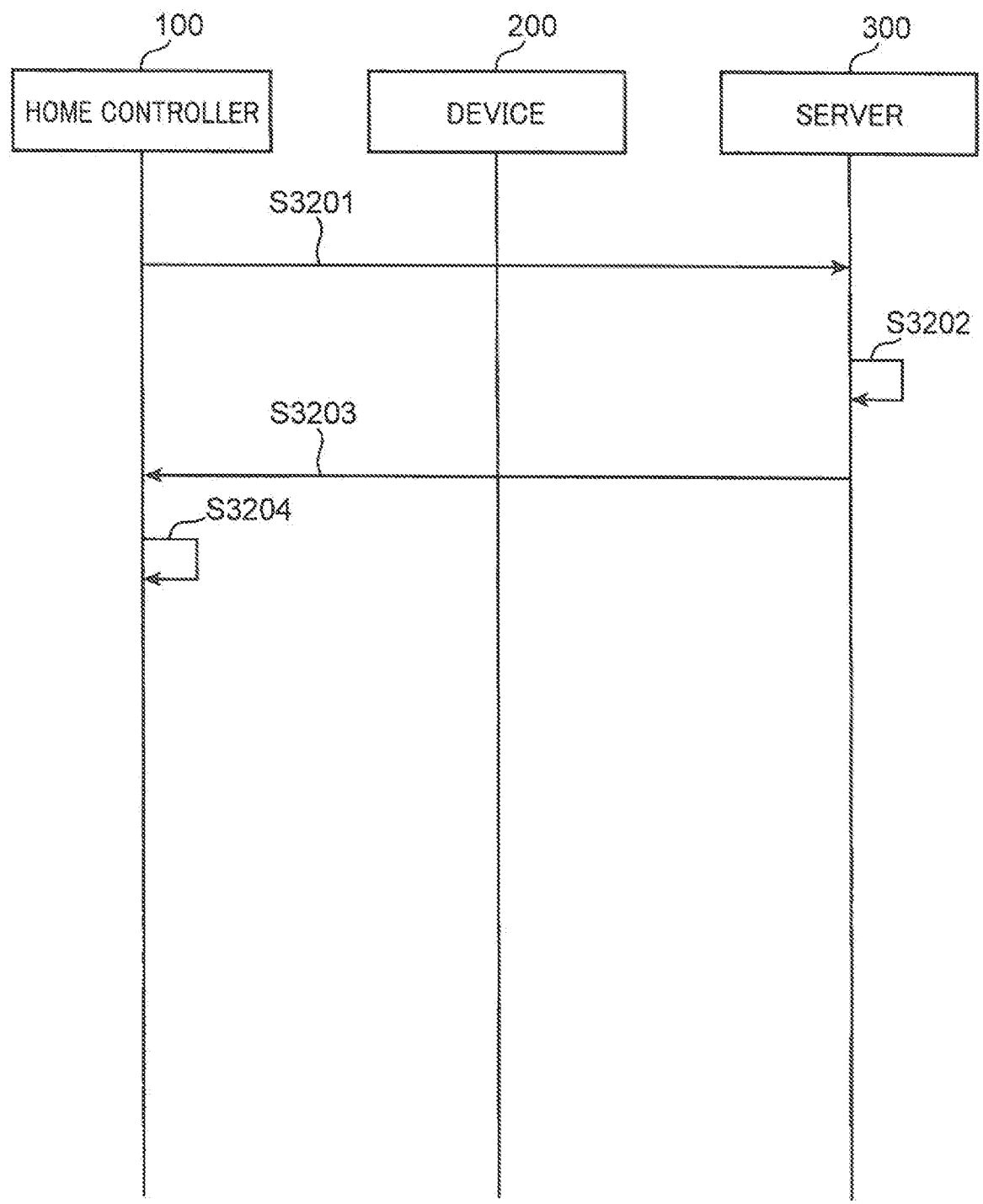
FIG. 36 is a sequence diagram showing the flow of a process for the home controller to acquire the home information from the server according to the present disclosure.

FIG. 36 is a sequence diagram showing the flow of a process for the home controller 100 to acquire the home information 2700 from the server 300. The home controller 100 acquires the home information 2700 from the server 300 at desired timing such as when the home controller 100 is initially utilized or started, and generates the basic screen shown in FIG. 5 on the basis of the acquired home information 2700.

First, the device management section 105 of the home controller 100 transmits a home information request to the server 300 (S3201). Here, the home information request includes at least a home controller ID that indicates a user or a home that utilizes the home controller 100. The home information management section 301 of the server 300 which receives the home information request searches the storage section 304 for the home information 2700 corresponding to the home controller ID (S3202), and transmits the home information 2700 to the home controller 100 (S3203). The device management section 105 of the home controller 100 stores the home information 2700 received from the server 300 in the storage section 104, and the display control section 103 generates a basic screen on the basis of the home information 2700, and displays the basic screen on the display 101 (S3204).

Next, the flow of a process for the home controller 100 to detect the device 200 on the network after the home controller 100 is connected to the network will be described using FIG. 37.

Figure 37:
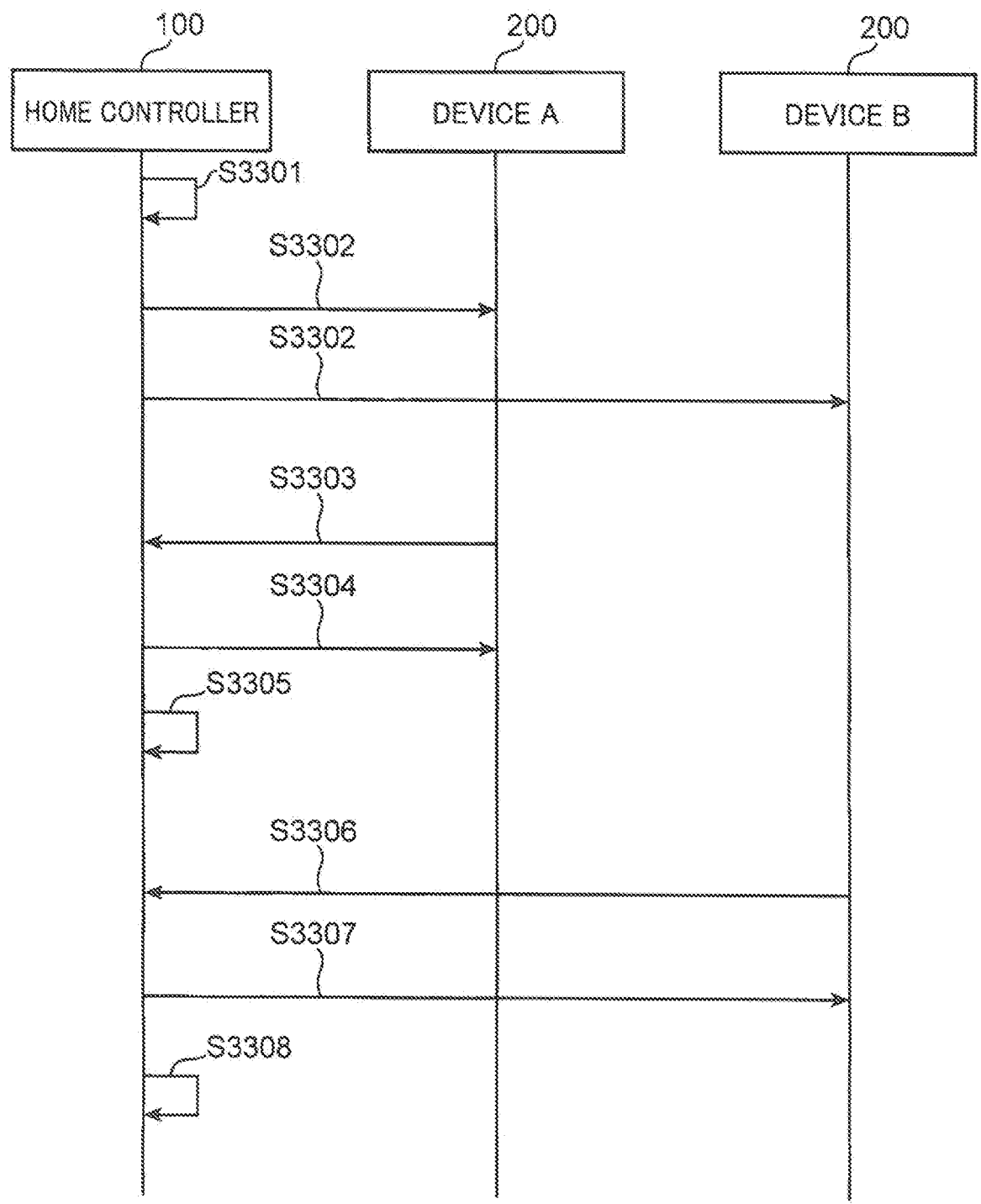
FIG. 37 is a sequence diagram showing the flow of a process for the home controller to detect a device on a network when the home controller is connected to the network according to the present disclosure.

In FIG. 37, a device A 200 with a device ID of A and a device B 200 of a device ID of B shown in FIG. 34 are connected to the network.

When the home controller 100 is connected to the network when the home controller 100 is initially utilized or turned on (S3301), the device management section 105 of the home controller 100 broadcasts a device search request to all the devices 200 on the network (S3302). The device A 200 which receives the device search request returns a device search response to the home controller 100 (S3303). The home controller 100 which receives the device search response acquires device information from the device A 200 (S3304), and updates the display screen (S3305).

Similarly, the device B 200 which receives the device search request returns a device search response to the home controller 100 (S3306). The home controller 100 which receives the device search response acquires device information from the device B 200 (S3307), and updates the display screen (S3308). Here, the device information is information that represents the device type, the model number, the capability information, and so forth of the device 200. The device management section 105 of the home controller 100 generates the device list 3100 (see FIG. 35) on the basis of the device information.

Figure 38:
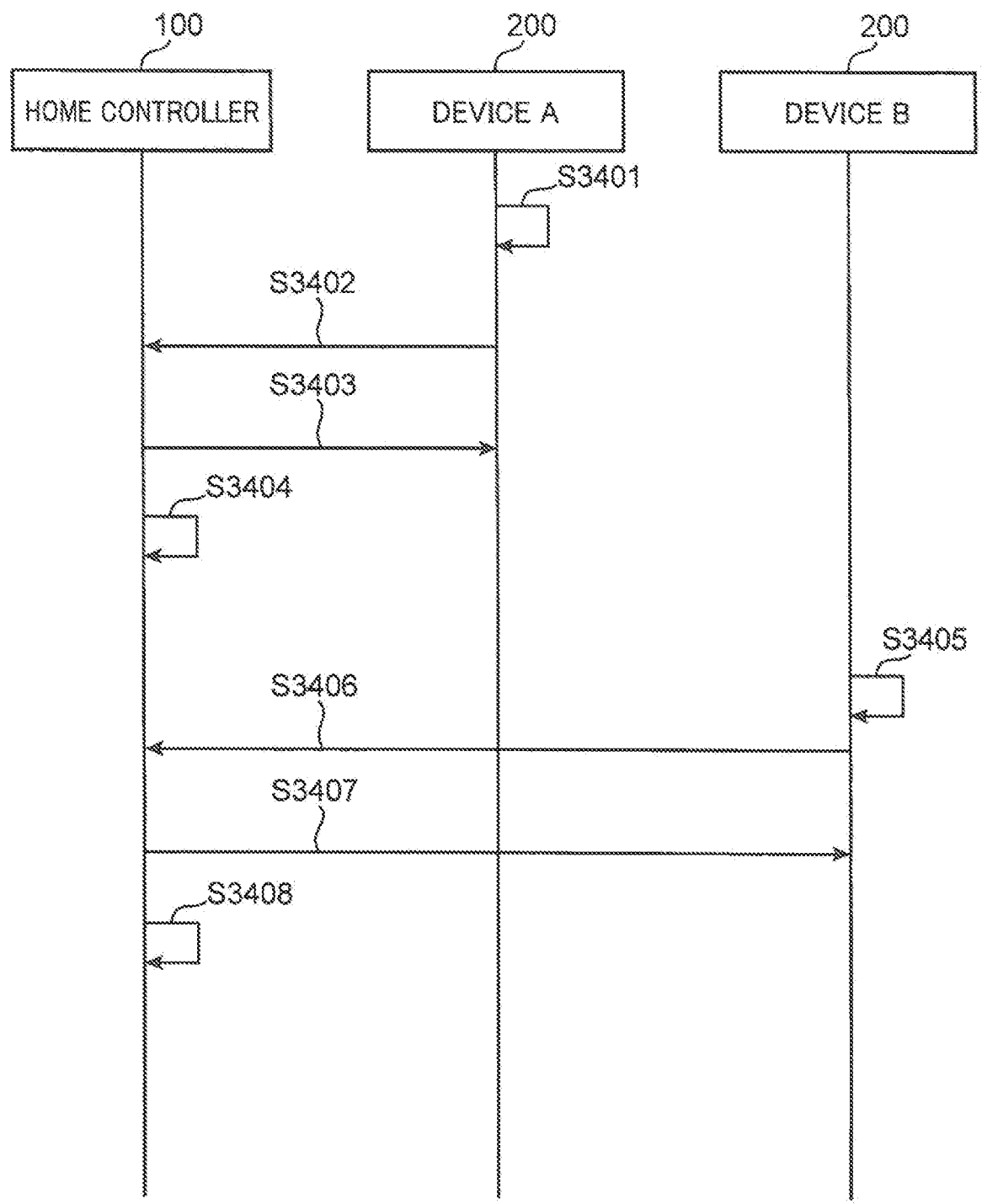
FIG. 38 is a sequence diagram showing the flow of a process for the home controller to detect a device on a network when the device is connected to the network according to the present disclosure.

Next, the flow of a process for the home controller 100 to detect the device 200 on the network when the device 200 is connected to the network will be described using FIG. 38. When the device A 200 is connected to the network when the device A 200 is initially utilized or turned on (S3401), a network connection notification is broadcast to all the home controllers 100 on the network (S3402). In the home controller 100 which receives the network connection notification, the device management section 105 acquires device information from the device A 200 (S3403), and the display control section 103 updates the display screen (S3404). When the device B 200 is connected to the network, the same process as for the device A 200 is performed (S3405 to S3408).

Here, the update of the display screen of the home controller 100 in FIGS. 37 and 38 (S3305, S3308, S3404, and S3408) will be described. The home controller 100 hides the device icon 501 corresponding to the device 200 until the device search response or the network connection notification is received from the device 200, that is, until the device 200 is detected on the network. Then, the home controller 100 which receives the device search response displays the device icon 501 for the corresponding device 200 on the screen. Alternatively, the home controller 100 displays the device icon 501 for the undetected device 200 in a faint color (for example, translucently) compared to the device icon 501 for the detected device 200. Then, the home controller 100 which receives the device search response changes the color of the device icon 501 for the undetected device 200 to the same color as the color of the device icon 501 for the detected device 200.

Figure 39A:
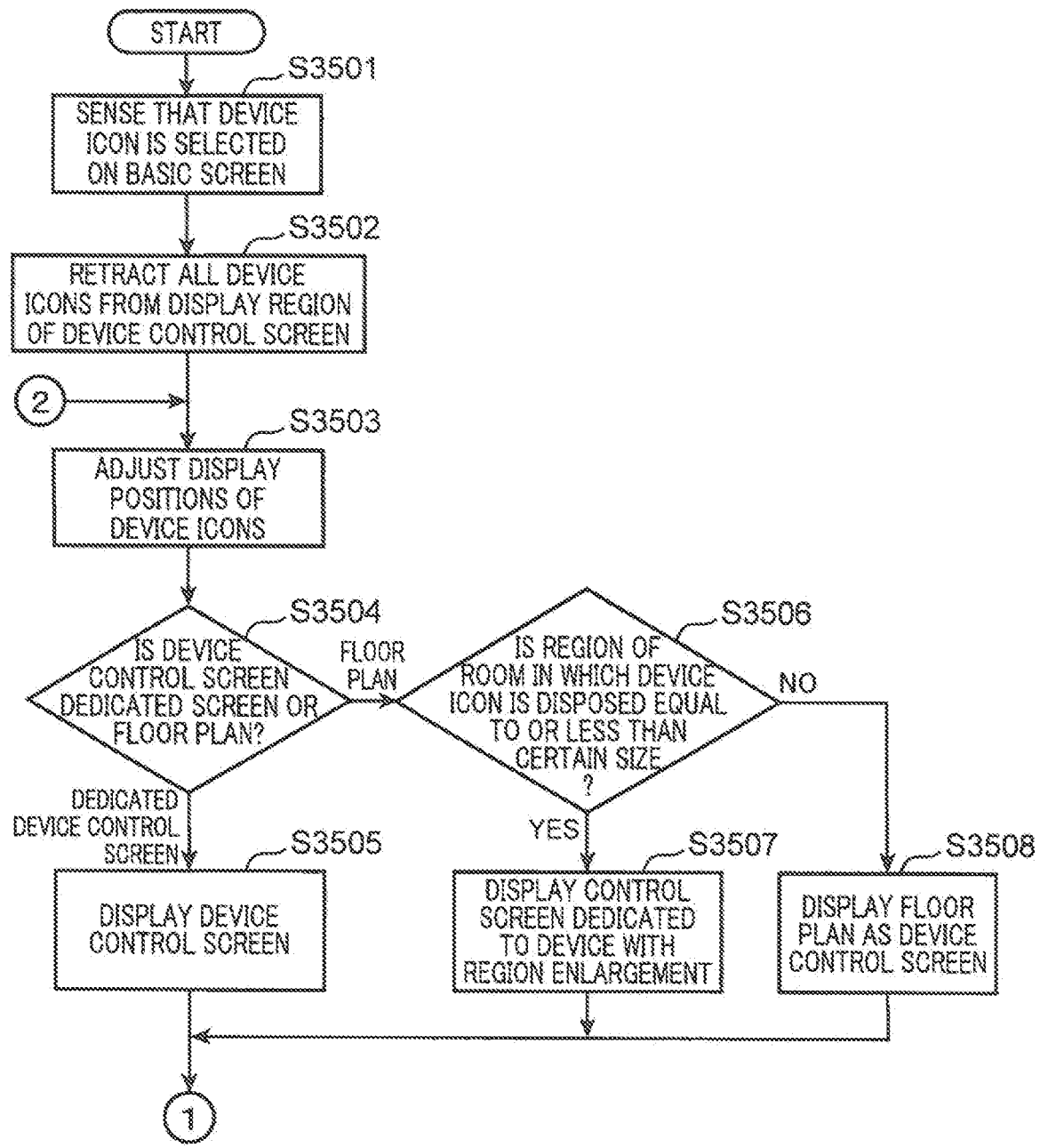
FIG. 39A is a flowchart showing the flow of a process for the home controller to control a device according to the present disclosure.
Figure 39B:
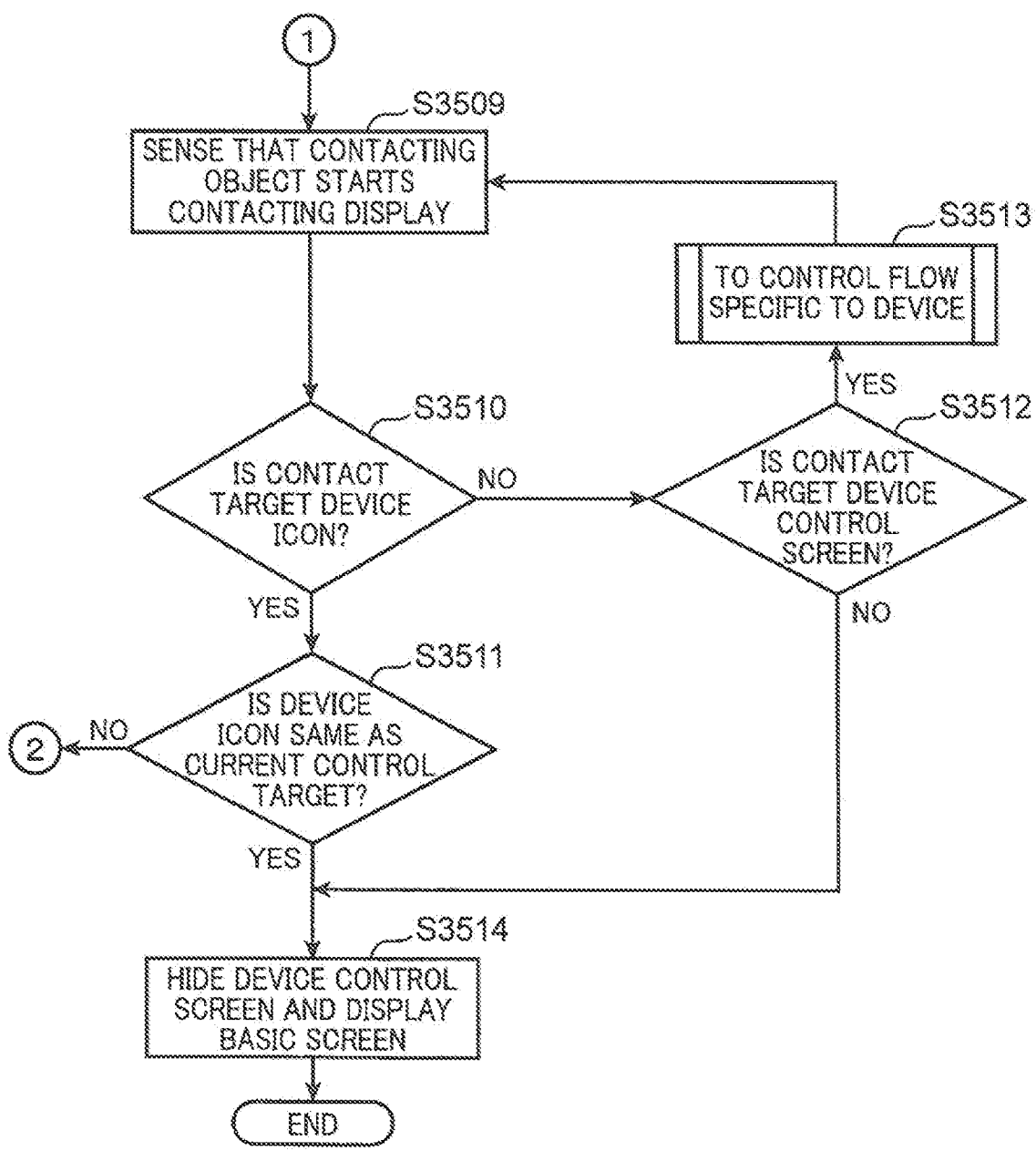
FIG. 39B is a flowchart showing the flow of a process for the home controller to control a device according to the present disclosure.

FIGS. 39A and 39B are each a flowchart showing the flow of a process for the home controller 100 to control the device 200 according to the present disclosure.

First, the touch panel control section 102 senses that the device icon 501 representing a certain device 200 is selected by the user on the basic screen (S3501). Next, the display control section 103 retracts all the device icons 501 out of the display region of the device control screen 502 (S3502). In this case, the device icons 501 are retracted as shown in FIGS. 11 and 13.

Next, the display control section 103 adjusts the display positions of the retracted device icons 501 (S3503). For example, the selected device icons 501 are adjusted so as to be displayed at particular positions as shown in FIGS. 12 and 14.

Next, the display control section 103 judges whether the device control screen 502 corresponding to the device icon 501 selected by the user is a dedicated screen or a floor plan (S3504).

Here, the device control screen 502 which is a dedicated screen refers to the device control screen 502 prepared separately from the floor plan and displayed as overlapped on the floor plan as shown in FIG. 13. On the other hand, the device control screen 502 which is a floor plan refers to the device control screen 502 which is the floor plan itself.

For example, if the illumination device can be turned on and off or adjusted for the brightness by the user by directly tapping on the region of a room on the floor plan in which the illumination device is disposed, the illumination device can be operated with presence. In the case where the user attempts to operate a plurality of illumination devices installed in the living room at the same time, meanwhile, the entire screen is covered by the device control screens 502 dedicated to the illumination devices if the device control screens 502 dedicated to the individual illumination devices are displayed on the floor plan at the same time, which lowers the viewability.

Thus, in the following description, it is assumed that the device control screen 502 for the illumination device is a floor plan. Specifically, when the user selects the device icon 501 for the illumination device installed in a certain room in the basic screen, all the device icons 501 are retracted out of the display region of the floor plan, and the floor plan becomes ready to receive an operation for the illumination device in the room. Then, when the user taps on the region of the room on the floor plan in which the selected illumination device is installed, one or more illumination devices within the room can be operated at the same time.

For example, when the user taps on the region of a room with the illumination devices in the room turned off, one or more illumination devices in the room are turned on at the same time. Next, when the user taps on the region, the one or more illumination devices are turned off at the same time.

In the case where the device control screen 502 is a floor plan in S3504, and if the region of the room in which the device icon 501 is disposed is equal to or less than a certain size (YES in S3506), the display control section 103 causes the device control screen 502 dedicated to the device in which the region of the room is displayed as enlarged to be displayed as overlapped on the floor plan (S3507). Here, for example, a floor plan formed by clipping the floor plan of the relevant room from the floor plan for the entire floor and enlarging the clipped floor plan is displayed as overlapped on the floor plan for the entire floor.

If the region of the room in which the device icon 501 is disposed is not equal to or less than the certain size (NO in S3506), on the other hand, the display control section 103 displays the floor plan as the device control screen 502 (S3508).

Information as to whether a dedicated screen or a floor plan is adopted as the device control screen 502 for each device 200 is stored in advance in the storage section 104. Thus, the display control section 103 may reference the information to determine whether the device control screen 502 is a dedicated screen or a floor plan.

In addition, the display control section 103 may calculate the size of the relevant room by specifying the vertexes of the relevant room from the room information 2900, specifying the coordinates of the specified vertexes from the vertex information 2800, and calculating the area of a region surrounded by the specified coordinates of the vertexes. Then, the result of determination in S3506 may be NO if the size of the room is not equal to or less than the certain size determined in advance, and the result of determination in S3506 may be YES if the size of the room is equal to or less than the certain size.

In the case where the device control screen 502 is a dedicated screen in S3504, on the other hand, the display control section 103 displays the dedicated screen as overlapped on the floor plan (S3505).

In S3509, the touch panel control section 102 senses that a contacting object (here, a finger of the user) starts contacting the display 101.

Next, the touch panel control section 102 determines whether or not the contact target is the device icon 501 (S3510).

If it is determined that the device icon 501 is contacted (YES in S3510), the touch panel control section 102 determines whether or not the contacting object contacts the same device icon 501 as the device icon 501 selected in S3501 (S3511). In the case where it is determined that the contacting object contacts the same device icon 501 as the device icon 501 selected in S3501 (YES in S3511), the display control section 103 hides the device control screen 502 being displayed to display the basic screen (S3514).

In the case where the touch panel control section 102 determines that the device icon 501 is not contacted (NO in S3510), the touch panel control section 102 further determines whether or not the contact target is the device control screen 502 (S3512). In the case where it is determined that the contact target is not the device control screen 502 (NO in S3512), the display control section 103 hides the device control screen 502 being displayed, and the basic screen is displayed (S3514).

If the touch panel control section 102 determines that the contacting object contacts a button or the like within the device control screen 502 (YES in S3512), on the other hand, the process is advanced to S3513, where a control flow that is specific to the device is executed (S3513).

Next, the control flow that is specific to the device executed in S3513 will be described in detail using FIG. 40. First, the device control section 106 decides the content of control that is specific to the device in accordance with the content of a contact by the contacting object (S3601). Next, the device control section 106 generates a control command according to the content of control (S3602). It is assumed that the user taps on the button for raising the temperature with the device control screen 502 for the air conditioner displayed as shown in FIG. 11 and the touch panel control section 102 senses the tap. Then, the device control section 106 generates a control command for raising the temperature of the air conditioner. Next, the device control section 106 advances the process to S3603, where a control command transmission flow is executed.

Figure 41:
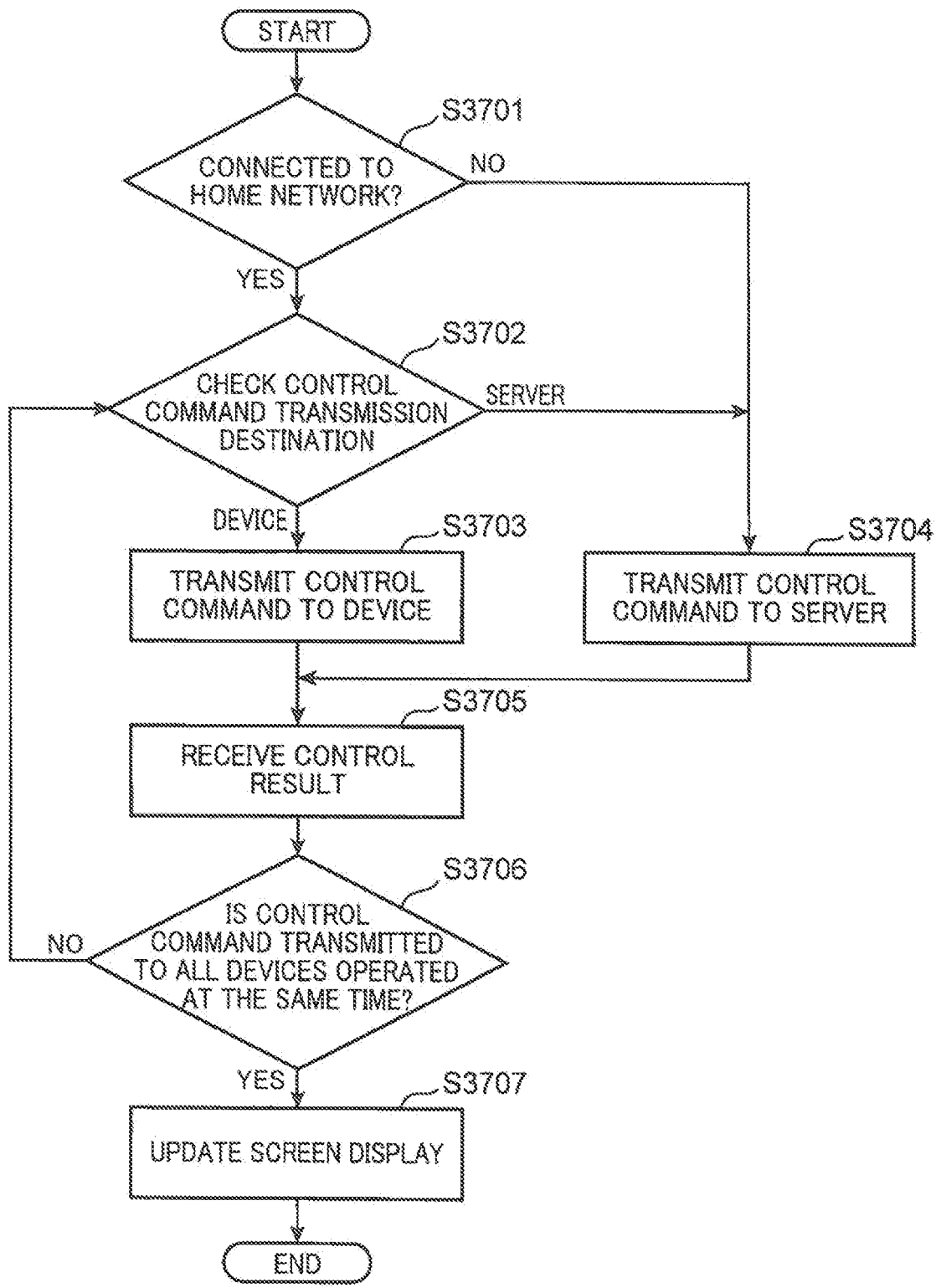
FIG. 41 is a flowchart showing the flow of a process for the home controller to transmit a control command according to the present disclosure.

Next, the control command transmission flow executed in S3603 will be described in detail using FIG. 41. First, the device control section 106 determines whether or not the home controller 100 is connected to the home network (S3701). If the home controller 100 is connected to the home controller (YES in S3701), the device control section 106 checks the transmission destination of a control command in accordance with the content of the control command transmission destination 3106 of the device list 3100 (S3702). Here, the home network is a network provided within the home of the user. Thus, the result of determination in S3701 is NO if the user operates the home controller 100 from a location away from the home, and the result of determination in S3701 is YES if the user operates the home controller 100 from a location within the home.

If the transmission destination of a control command is "DEVICE" in S3702, the device control section 106 transmits a control command to the relevant device 200 (S3703). If the transmission destination of a control command is "SERVER" in S3702, on the other hand, the device control section 106 transmits a control command to the server 300 (S3704).

For example, in the device list 3100, the control command transmission destination 3106 of the air conditioner is "DEVICE", and therefore the device control section 106 transmits a control command to the air conditioner. On the other hand, in the device list 3100, the control command transmission destination 3106 of the refrigerator is "SERVER", and therefore the device control section 106 transmits a control command to the server 300.

1 Meanwhile, in the case where it is judged in S3701 that the home controller 100 is not connected to the home network (NO in S3701), the process in S3704 is performed.

In S3705, the device control section 106 receives the control result from the device 200. Next, in the case where transmission of a control command to all the devices 200 that are operated at the same time is completed (YES in S3706), the device control section 106 advances the process to S3707. In the case where transmission of a control command to all the devices 200 that are operated at the same time is not completed (NO in S3706), on the other hand, the device control section 106 returns the process to S3702, and repeats the processes in and after S3702.

For example, in the case where two illumination devices are installed in the same room and the two illumination devices are set in advance to be operated at the same time, the device control section 106 transmits a control command to each of the two illumination devices. The result of determination in S3706 is NO for devices 200 that are not operated at the same time as other devices 200.

Next, the display control section 103 updates the screen displayed on the display 101 (S3707). For example, if the set temperature of the air conditioner is changed, the device control screen 502 is updated such that the temperature display is flashed on and off, for example, until the set temperature of the air conditioner is changed by a control command and the temperature display stops flashing when the set temperature of the air conditioner is changed by a control command. In the example of the illumination device, the screen is updated such that the region on the floor plan of a room in which the illumination device is installed becomes brighter than other regions in the case where the illumination device is turned on.

Figure 42:
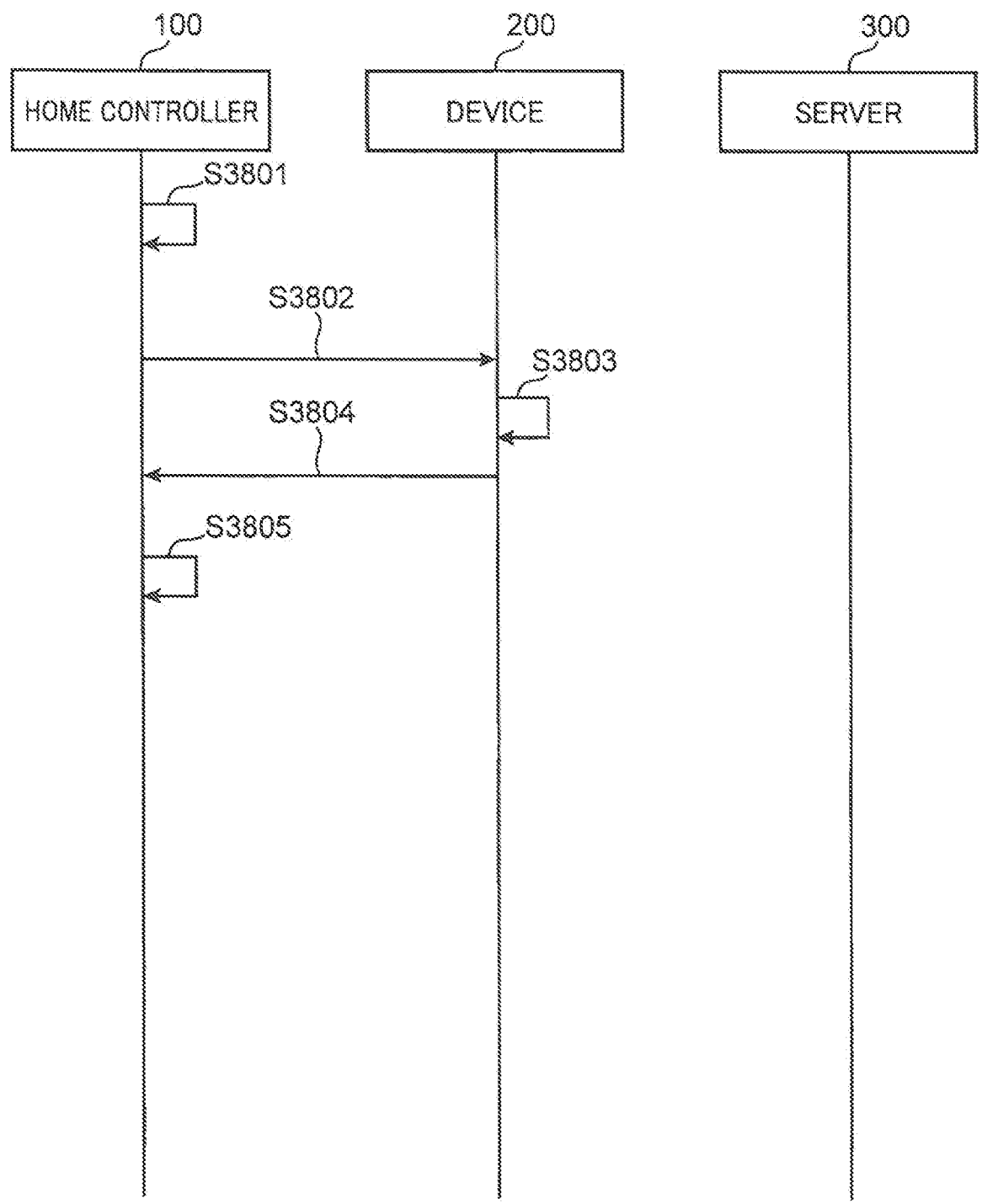
FIG. 42 is a sequence diagram showing the flow of a process for the home controller to directly control a device according to the present disclosure.

Next, the flow of a process for the home controller 100 to directly control the device 200 will be described using FIG. 42. First, the touch panel control section 102 of the home controller 100 senses a user operation on the device control screen 502 (S3801). Next, the device control section 106 of the home controller 100 generates a control command according to the user operation, and transmits the control command to the device 200 (S3802).

The device 200 which receives the control command executes the control command (S3803), and transmits the control result to the home controller 100 (S3804). The display control section 103 of the home controller 100 which receives the control result updates the display screen in accordance with the control result (S3805).

Figure 43:
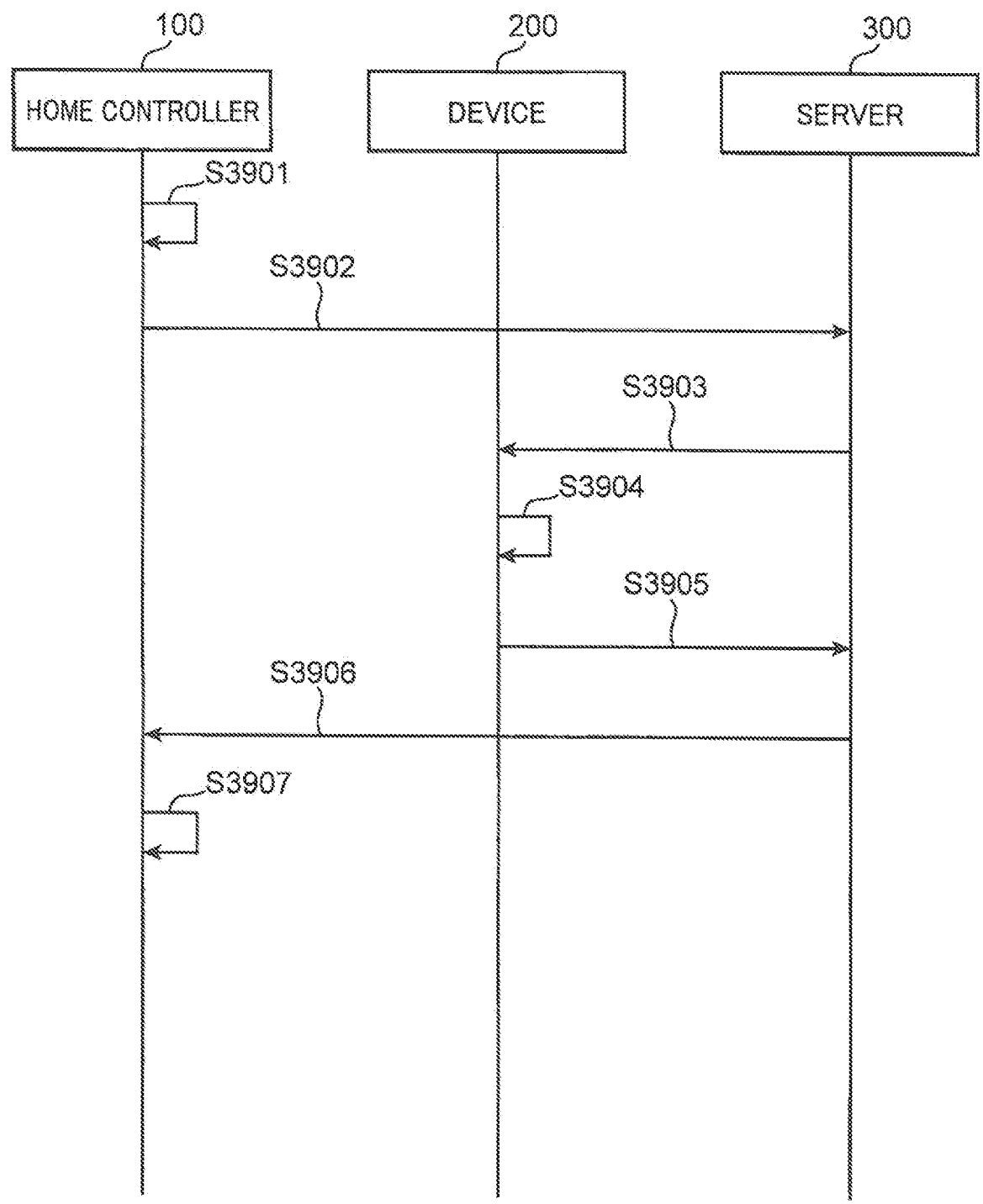
FIG. 43 is a sequence diagram showing the flow of a process for the home controller to control a device by way of the server according to the present disclosure.

Next, the flow of a process for the home controller 100 to control the device 200 by way of the server 300 will be described using FIG. 43. First, the touch panel control section 102 of the home controller 100 senses a user operation on the device control screen 502 (S3901). Next, the device control section 106 of the home controller 100 generates a control command according to the user operation, and transmits the control command to the server 300 (S3902).

The server 300 which receives the control command transmits the relevant control command to the device 200 (S3903). The device 200 which receives the control command executes the control command (S3904), and transmits the control result to the server 300 (S3905). The server 300 which receives the control result transmits the control result to the home controller 100 (S3906). The display control section 103 of the home controller 100 which receives the control result updates the display screen in accordance with the control result (S3907).

Figure 44:
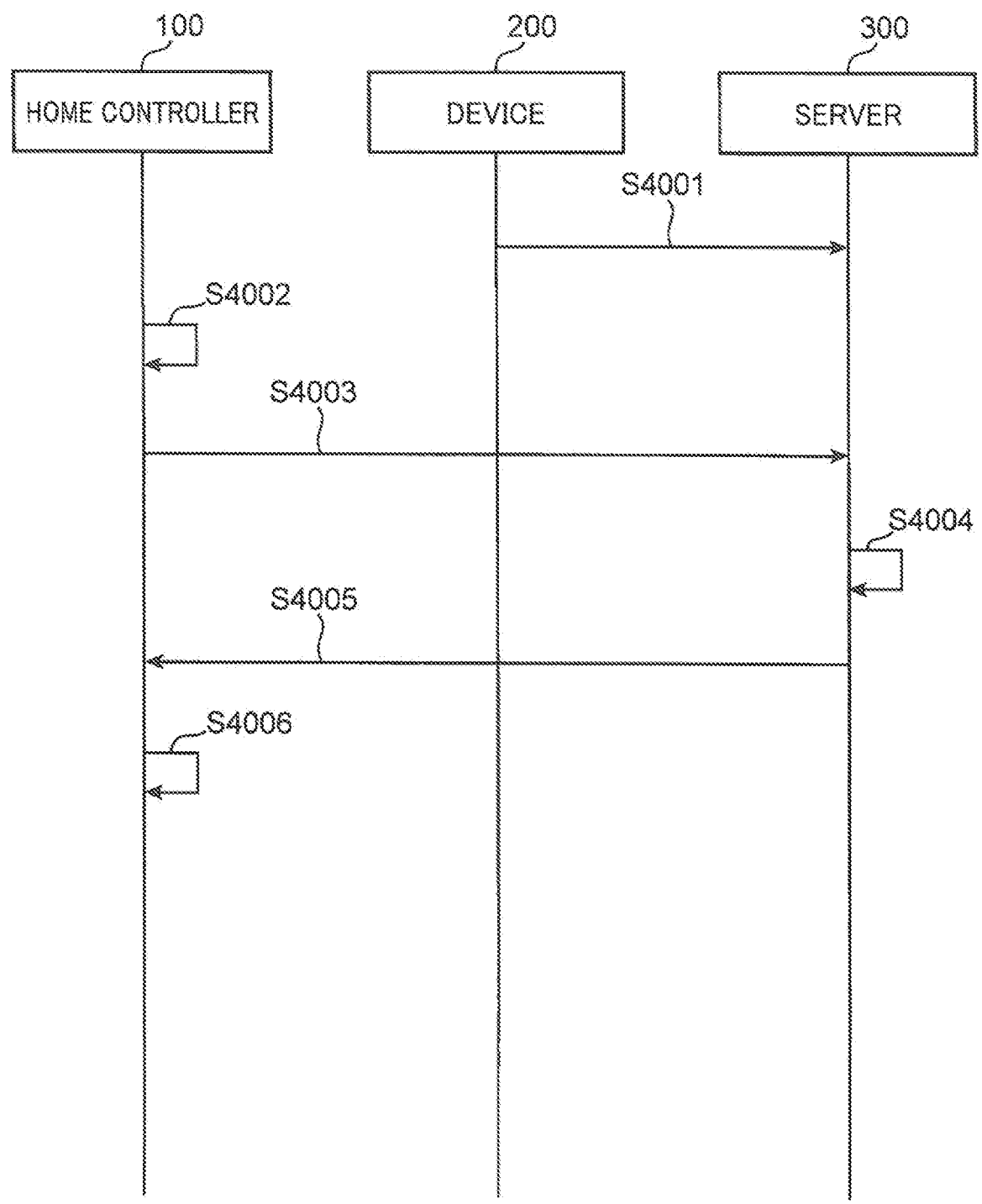
FIG. 44 is a sequence diagram showing the flow of a process for the home controller to acquire the state of a device from the server according to the present disclosure.

Next, the flow of a process for the home controller 100 to confirm the device state of the device 200 by way of the server 300 will be described using FIG. 44. First, the device 200 transmits the current device state to the server 300 (S4001). Here, the device 200 transmits the device state to the server 300 when the device 200 is turned on, when the device 200 is turned off, when the device state is changed, or regularly to cause the server 300 to store the device state. The process in S4001 may be executed asynchronously with the processes in S4002 to S4006.

Next, the touch panel control section 102 of the home controller 100 senses a user operation on the device control screen 502 (S4002). Next, the device control section 106 of the home controller 100 generates a control command according to the user operation, and transmits the control command to the server 300 (S4003). Here, a control command for confirming the device state of the device 200 is generated.

The server 300 which receives the control command searches for the current device state of the relevant device 200 (S4004), and transmits the device state of the relevant device 200 to the home controller 100 as the control result (S4005). The display control section 103 of the home controller 100 which receives the control result updates the display screen in accordance with the control result (S4006). For example, if the device control screen 502 for the device 200 is displayed on the display 101, the content of the device control screen 502 for the device 200 is updated in accordance with the control result.

Figure 45:
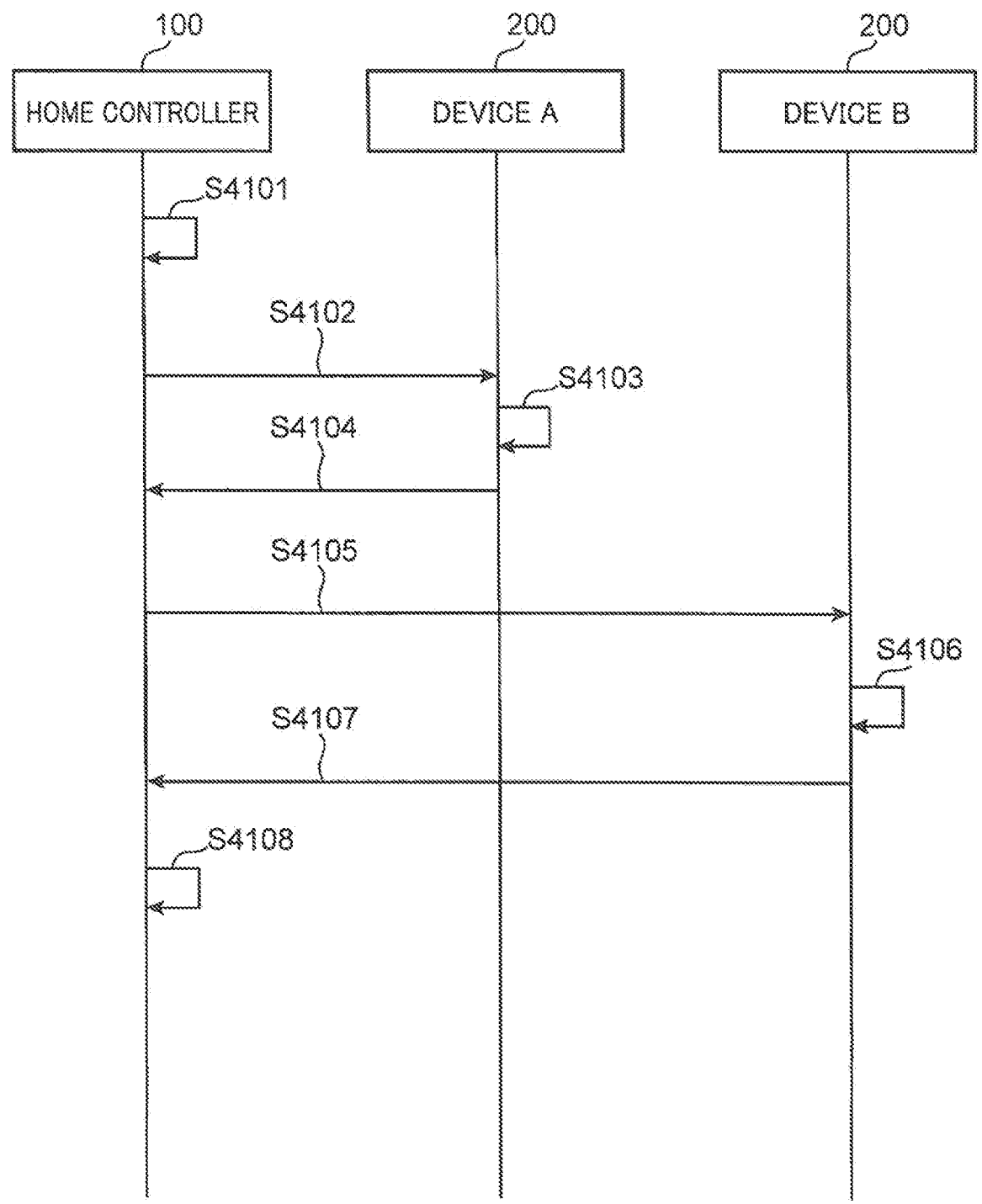
FIG. 45 is a sequence diagram showing the flow of a process for the home controller to directly control devices in the case where the home controller controls a plurality of devices with one operation according to the present disclosure.

Next, the flow of a process for the home controller 100 to directly control the devices 200 in the case where the home controller 100 controls a plurality of devices 200 with one operation will be described using FIG. 45. Here, a case where the home controller 100 controls the device A 200 and the device B 200 is described as an example.

First, the touch panel control section 102 of the home controller 100 senses a user operation on the device control screen 502 (S4101). Next, the device control section 106 of the home controller 100 generates a control command according to the user operation, and transmits the control command to the device A 200 (S4102).

The device A 200 which receives the control command executes the control command (S4103), and transmits the control result to the home controller 100 (S4104).

Next, the device control section 106 of the home controller 100 transmits to the device B 200 a control command that is the same as the control command transmitted to the device A 200 (S4105). The device B 200 which receives the control command executes the control command (S4106), and transmits the control result to the home controller 100 (S4107).

The display control section 103 of the home controller 100 which receives the control result updates the display screen in accordance with the control result (S4108). In this case, for example, if the device control screens 502 for the devices A 200 and B 200 are displayed on the display 101, the content of the device control screens 502 for the devices A 200 and B 200 is updated in accordance with the control result.

Figure 46:
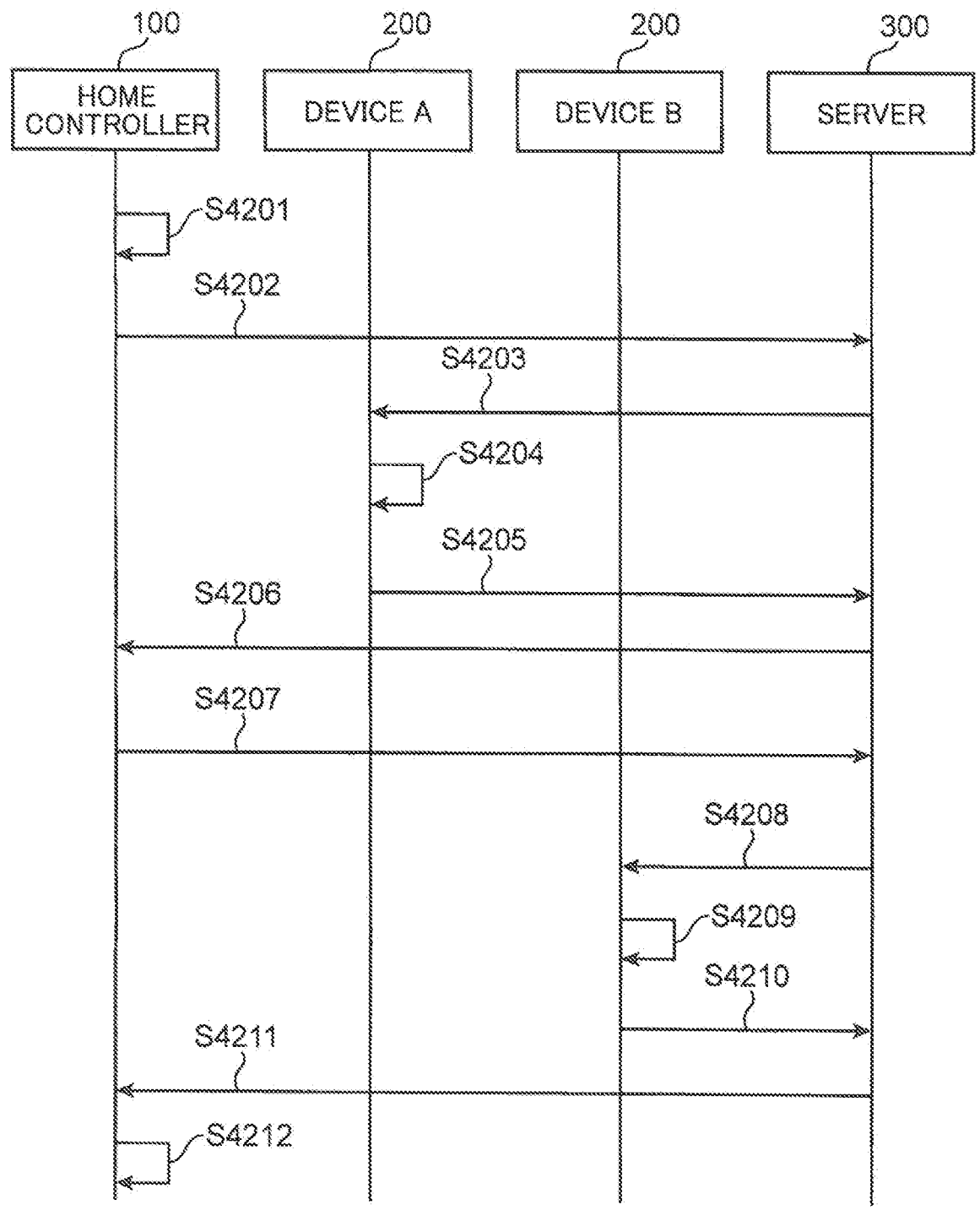
FIG. 46 is a sequence diagram showing the flow of a process for the home controller to control devices by way of the server in the case where the home controller controls a plurality of devices with one operation according to the present disclosure.

Next, the flow of a process for the home controller 100 to control the devices 200 by way of the server 300 in the case where the home controller 100 controls a plurality of devices 200 with one operation will be described using FIG. 46. Here, a case where the home controller 100 controls the device A 200 and the device B 200 is described as an example. In addition, it is assumed that the devices A 200 and B 200 are represented by one device icon 501, and controlled using one device control screen 502.

First, the touch panel control section 102 of the home controller 100 senses a user operation on the device control screen 502 (S4201).

Next, the device control section 106 of the home controller 100 generates a control command for the device A 200 according to the user operation, and transmits the control command to the server 300 (S4202).

The server 300 which receives the control command for the device A 200 transmits the control command to the device A 200 (S4203). The device A 200 which receives the control command executes the control command (S4204), and transmits the control result to the server 300 (S4205). The server 300 which receives the control result transmits the control result to the home controller 100 (S4206).

Similarly, the device control section 106 of the home controller 100 generates a control command for the device B 200 according to the user operation, and transmits the control command to the server 300 (S4207).

The server 300 which receives the control command transmits the control command to the device B 200 (S4208). The device B 200 which receives the control command executes the control command (S4209), and transmits the control result to the server 300 (S4210). The server 300 which receives the control result transmits the control result to the home controller 100 (S4211).

Then, the display control section 103 of the home controller 100 updates the display screen in accordance with the control result (S4212).

Figure 47:
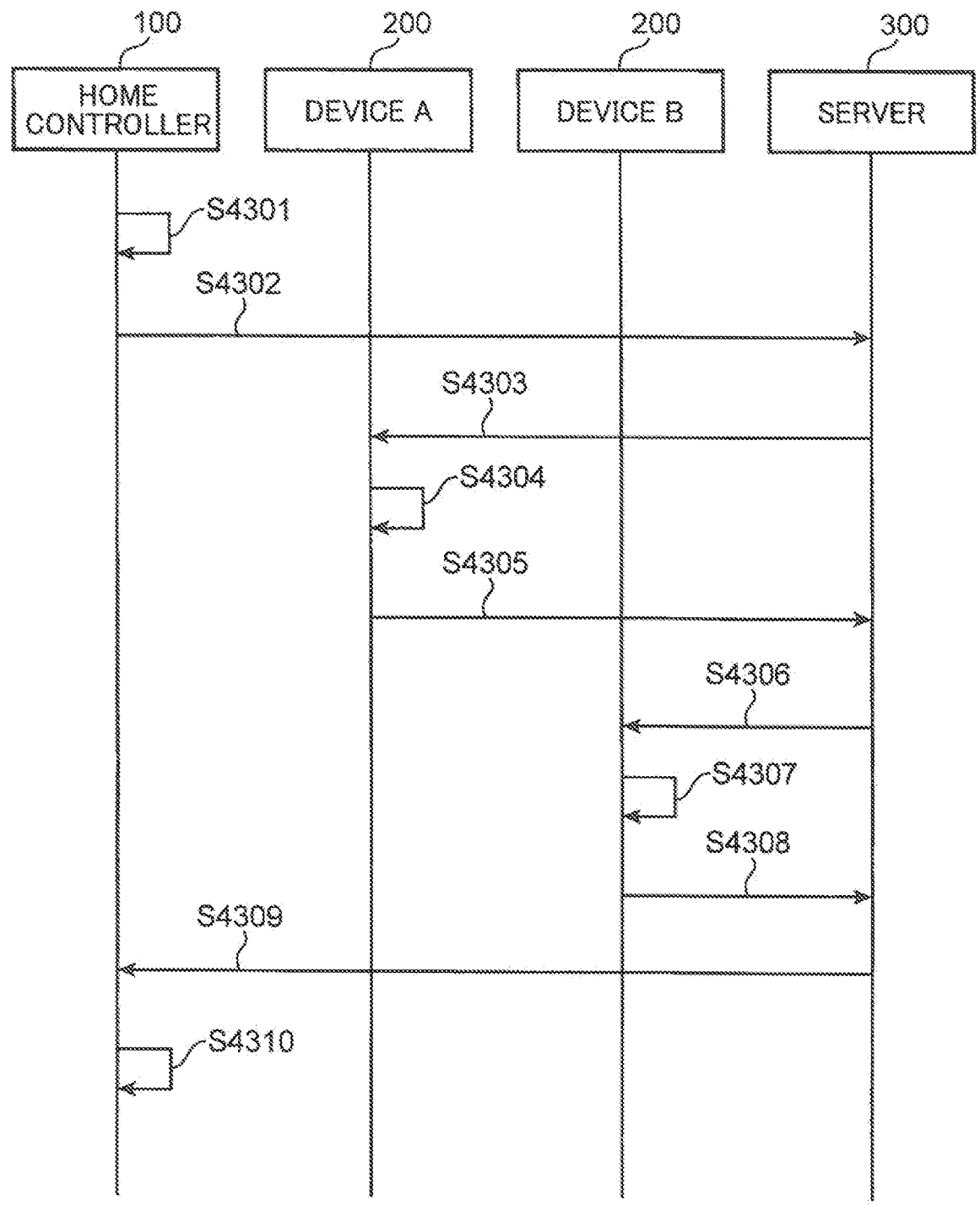
FIG. 47 is a sequence diagram showing the flow of a process for the home controller to control devices by way of the server in the case where the home controller controls a plurality of devices with one operation according to the present disclosure.

Next, the flow of a process for the home controller 100 to control the devices 200 by way of the server 300 in the case where the home controller 100 controls a plurality of devices 200 with one operation will be described using FIG. 47. Here, a case where the home controller 100 controls the device A 200 and the device B 200 is described as an example. In addition, it is assumed that the devices A 200 and B 200 are represented by one device icon 501, and controlled using one device control screen 502.

First, the touch panel control section 102 of the home controller 100 senses a user operation on the device control screen 502 (S4301).

Next, the device control section 106 of the home controller 100 generates a control command for the device A 200 and the device B 200 in accordance with the user operation, and transmits the control command to the server 300 (S4302).

The server 300 which receives the control command transmits the control command to the device A 200 (S4303). The device A 200 which receives the control command executes the control command (S4304), and transmits the control result to the server 300 (S4305).

Similarly, the server 300 transmits the control command to the device B 200 (S4306). The device B 200 which receives the control command executes the control command (S4307), and transmits the control result to the server 300 (S4308). The server 300 which receives the control result for the device A 200 and the device B 200 transmits the control result to the home controller 100 (S4309).

Then, the display control section 103 of the home controller 100 updates the display screen in accordance with the control result (S4310).

Figure 48:
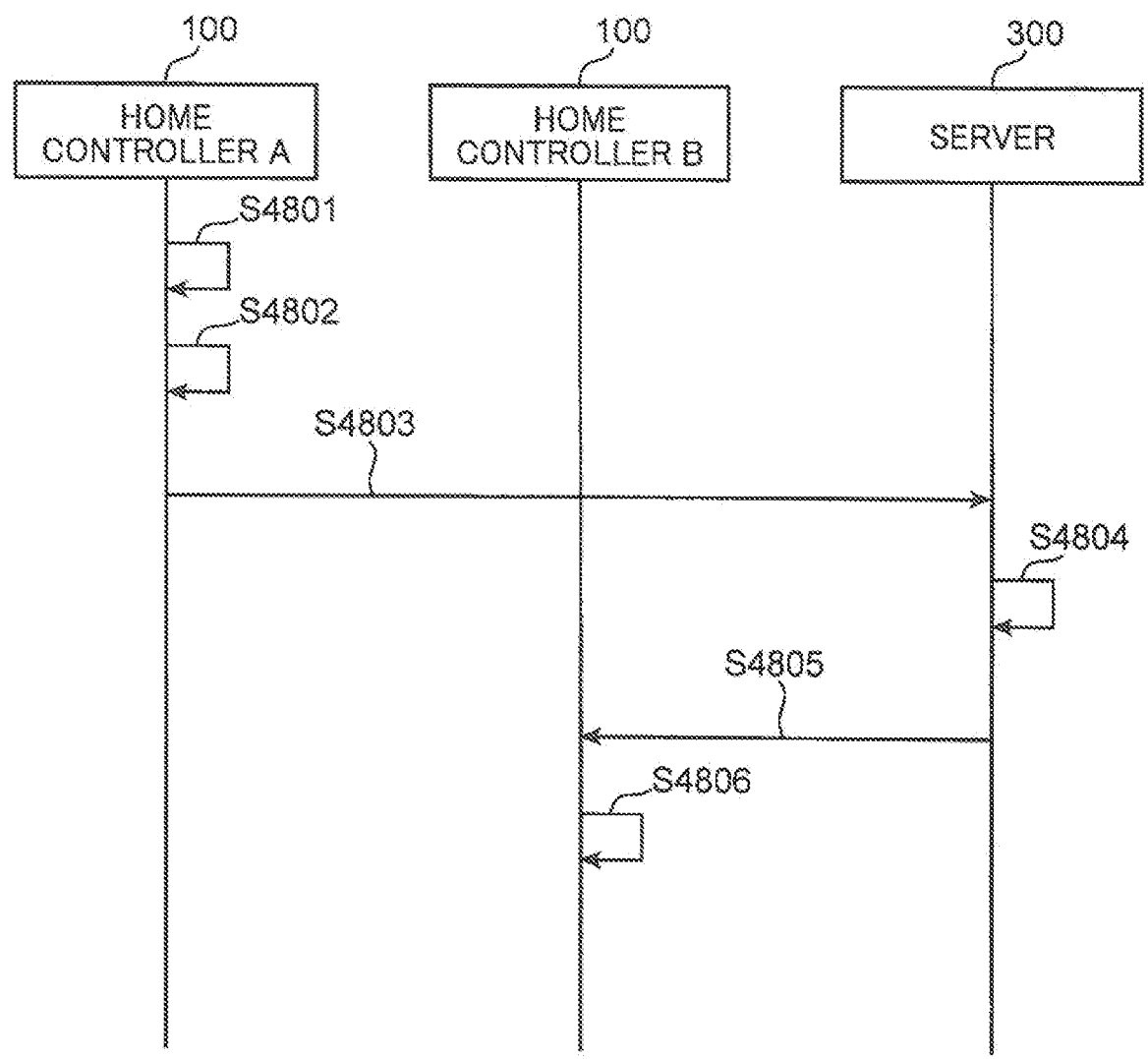
FIG. 48 is a sequence diagram showing the flow of a process for a case where a device icon is moved in the home controller according to the present disclosure.

Next, the flow of a process for a case where the device icon 501 is moved in the home controller 100 will be described using FIG. 48. Here, it is assumed that the user owns two home controllers A 100 and B 100.

When the touch panel control section 102 of the home controller A 100 senses movement of the device icon 501 (S4801), the display control section 103 updates the display screen (S4802). Here, the display control section 103 displays the device icon 501 moved in accordance with the amount of a drag performed on the device icon 501 by the user.

The device management section 105 of the home controller A 100 transmits to the server 300 a device list update notification including the coordinate on the floor plan 500 after the drag (S4803). Here, the device management section 105 of the home controller A 100 updates the content of the arrangement 3104 of the relevant device 200 in the device list 3100 managed by the device management section 105 itself with the coordinate after the drag.

The server 300 which receives the device list update notification updates the device list 4700 (S4804). In this case, the home information management section 301 of the server 300 updates the content of the arrangement 4704 of the relevant device 200 in the device list 4700 with the coordinate included in the device list update notification.

Subsequently, the server 300 transmits the device list update notification to the home controller B 100 (S4805). The home controller B 100 which receives the device list update notification updates the display screen (S4806). Here, the device management section 105 of the home controller B 100 updates the content of the arrangement 3104 of the relevant device 200 in the device list 3100 managed by the device management section 105 itself with the coordinate included in the device list update notification.

The device icon 501 is disposed at an appropriate position on the floor plan 500 through the process described above. Because the home controller B 100 is notified of the update of the arrangement position of the device icon 501 performed by the home controller A 100 by way of the server 300, the arrangement position of the device icon 501 after the update is shared among the home controllers A 100 and B 100 and the server 300. Therefore, it is possible to avoid trouble in which the arrangement position of the device icon 501 is different between the home controller A 100 and the home controller B 100.

Figure 49:
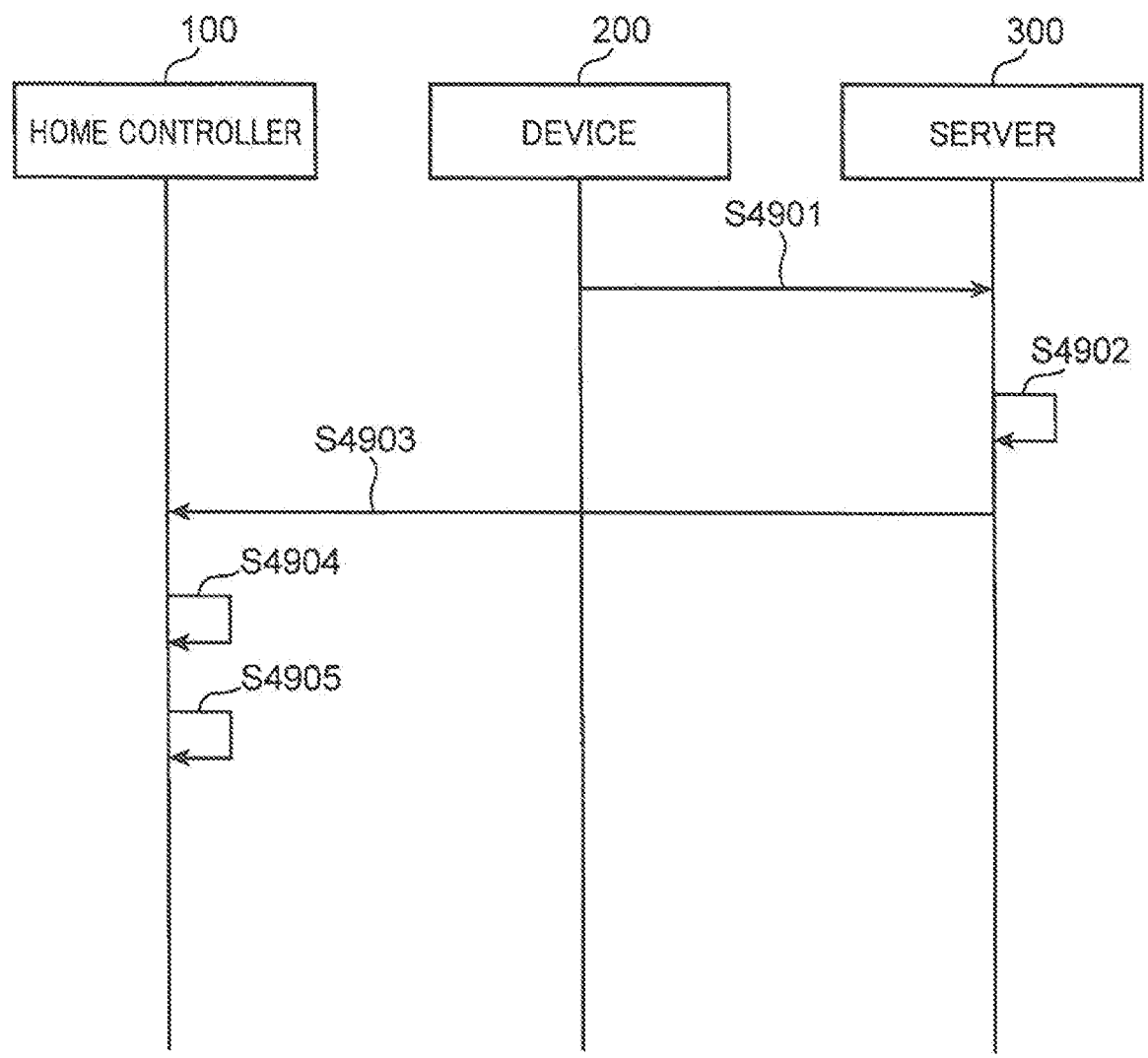
FIG. 49 is a sequence diagram showing the flow of a process for updating the device lists of the home controller and the server according to the present disclosure.

Next, an example of a process for updating the device lists of the home controller 100 and the server 300 will be described using FIG. 49. The device 200 transmits the device state indicating the current state of the device 200 itself to the server 300 (S4901). Here, the device 200 may regularly transmit the device state, or may transmit the device state when the state is varied. The server 300 updates the device list 4700 in accordance with the content of the received device state (S4902). Here, in the case where the device list 4700 does not contain information on the device 200, the server 300 adds information on the device 200 as a new device. Then, the server 300 transmits a device list update notification to the home controller 100 (S4903). The device management section 105 of the home controller 100 updates the device list 3100 in accordance with the content of the received device list update notification (S4904). Here, in the case where the device list 3100 does not contain information on the device 200, the device management section 105 adds information on the device 200 as a new device. Then, the display control section 103 of the home controller 100 updates the display screen (S4905).

Consequently, the server 300 is notified of variation in state of the device 200, which allows the server 300 to monitor variation in state of the device 200. The server 300 to which the device state is transmitted from the device 200 notifies the home controller 100 of variation in state of the device 200, which allows the home controller 100 to recognize the current state of the device 200. In the case where a new device 200 is connected to the home network, the server 300 and the home controller 100 can add the new device. Hence, it is possible to prevent occurrence of deviation between the actual state of the device 200 and the state of the device 200 recognized by the home controller 100.

Figure 50:
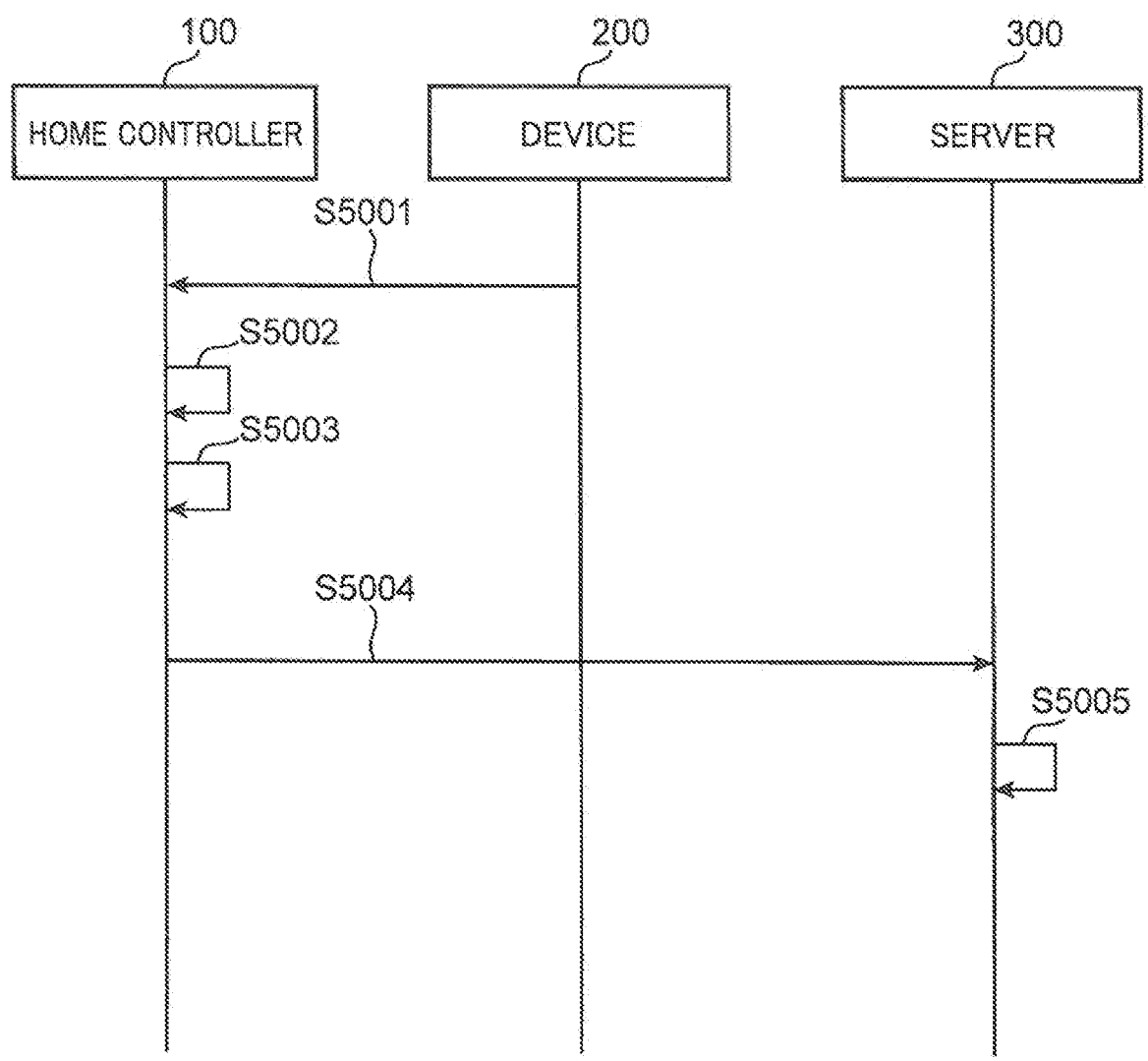
FIG. 50 is a sequence diagram showing the flow of a process for updating the device lists of the home controller and the server according to the present disclosure.

Next, another example of the process for updating the device lists of the home controller 100 and the server 300 will be described using FIG. 50. The device 200 transmits the device state to the home controller 100 (S5001). Here, the device 200 may regularly transmit the device state, or may transmit the device state when the state is varied.

The device management section 105 of the home controller 100 updates the device list 3100 in accordance with the content of the received device state (S5002). Here, in the case where the device list 3100 does not contain information on the device 200, the device management section 105 adds information on the device 200 as a new device. Then, the display control section 103 updates the display screen (S5003). Then, the device management section 105 of the home controller 100 transmits a device list update notification to the server 300 (S5004). The server 300 updates the device list 4700 in accordance with the received device list update notification (S5005). Here, in the case where the device list 4700 does not contain information on the device 200, the server 300 adds information on the device 200 as a new device.

Figure 51:
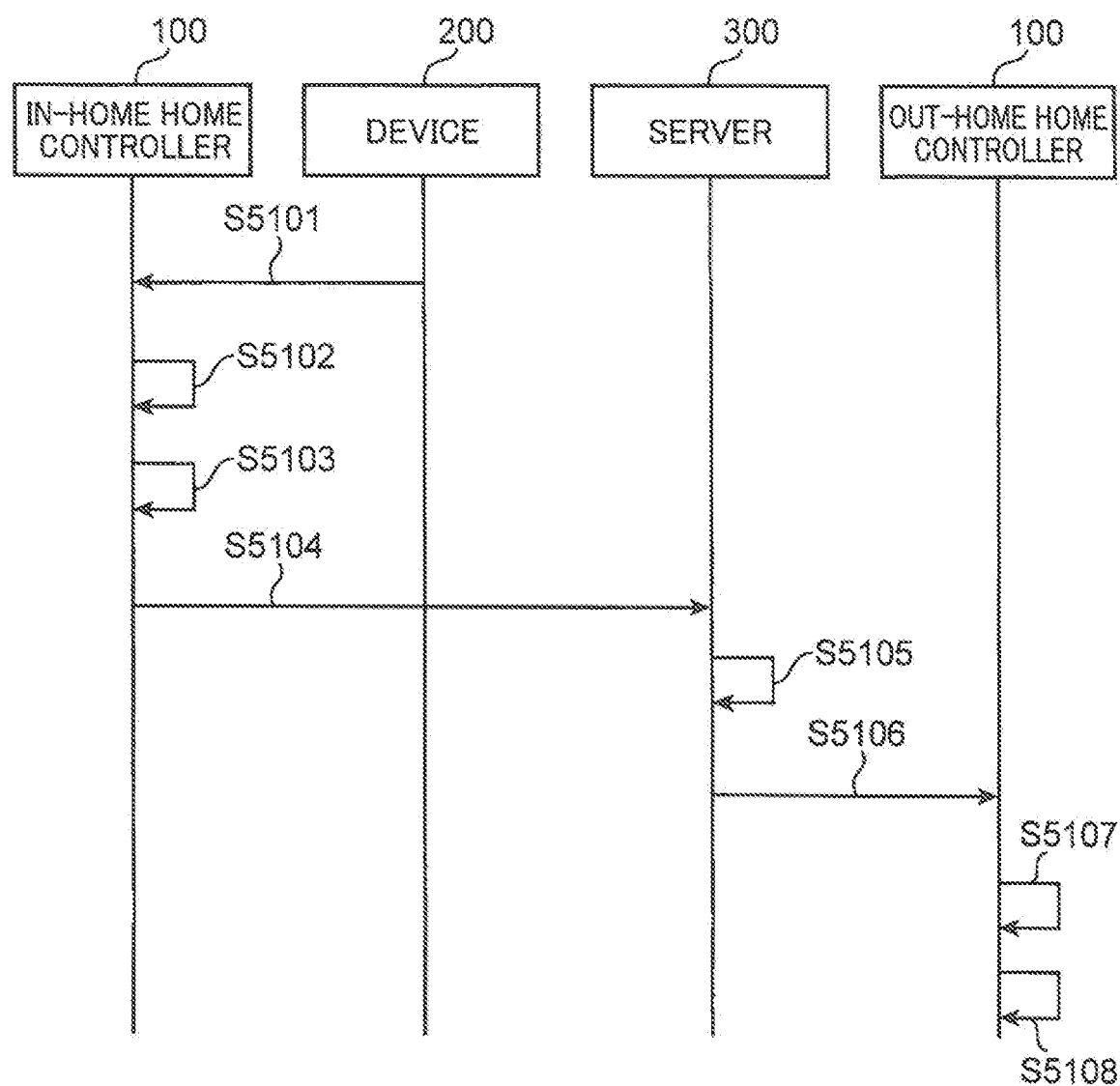
FIG. 51 is a sequence diagram showing the flow of a process for updating the device lists of the home controller and the server according to the present disclosure.

Next, still another example of a process in which the home controller 100 and the server 300 update the device list will be described using FIG. 51. In FIG. 51, a case where the user owns two home controllers 100, namely an in-home home controller 100 and an out-home home controller 100, is described as an example. Here, the out-home home controller 100 is a home controller 100 taken away from the home by the user, and the in-home home controller 100 is a home controller 100 kept at the home by the user.

The device 200 transmits the device state to the in-home home controller 100 (S5101). The in-home home controller 100 updates the device list 3100 in accordance with the content of the received device state (S5102). Here, in the case where the device list 3100 does not contain information on the device 200, the device management section 105 adds information on the device 200 as a new device. Then, the display screen is updated (S5103). Then, the in-home home controller 100 transmits a device list update notification to the server 300 (S5104).

The server 300 updates the device list 4700 in accordance with the content of the received device list update notification (S5105). Here, in the case where the device list 4700 does not contain information on the device 200, the server 300 adds information on the device 200 as a new device. Then, the server 300 transmits a device list update notification to the out-home home controller 100 (S5106). The out-home home controller 100 updates the device list 3100 in accordance with the content of the received device list update notification (S5107). Here, in the case where the device list 3100 does not contain information on the device 200, the device management section 105 of the out-home home controller 100 adds information on the device 200 as a new device. Then, the display screen is updated (S5108).

According to the example, even in the case where one home controller 100 is located away from the home and the other home controller 100 is located in the home, it is possible to prevent occurrence of deviation between the states of the device 200 recognized by the two home controllers 100.

The sequences and the process flows described above are merely exemplary, and the order of the steps may be changed and some of the steps may be omitted as long as the intended process may be embodied. For example, a control command may be transmitted to the device A 200 and the device B 200 asynchronously.

In the foregoing description, a plan view that planarly represents the position and the shape of rooms forming each floor is adopted as the floor plan 500. However, the present disclosure is not limited thereto, and a diagram that schematically shows how many rooms of what type are located on each floor may be adopted as the floor plan.

Figure 52:
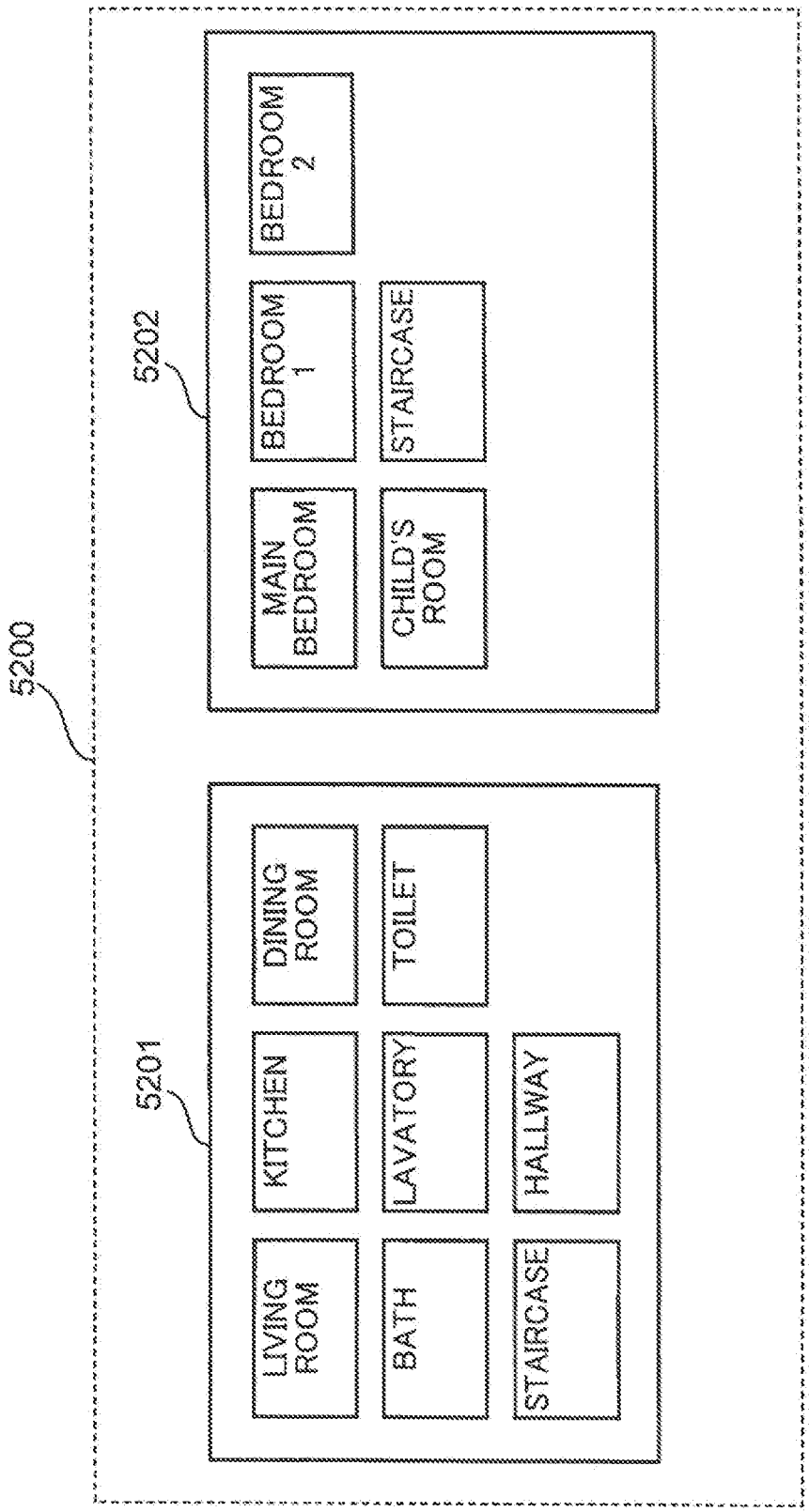
FIG. 52 is a diagram showing a floor plan in another pattern according to the present disclosure.

Floor plans in other patterns will be specifically described below. FIG. 52 is a diagram showing a floor plan 5200 in another pattern. In the floor plan 5200, rooms forming one floor are each represented by one rectangular block, and the rooms on the one floor are disposed in a matrix. The blocks have the same size, and are each provided with the name of the room.

In the floor plan 5200, the name and the number of the rooms forming each floor are indicated, but the relative size and the position in the floor of the rooms are not represented. In the present disclosure, such a diagram is treated as the floor plan 5200. That is, in the present disclosure, any diagram that represents at least what rooms are provided on each floor are treated as the floor plan.

For example, it is seen that a floor plan 5201 for the first floor includes rooms such as a living room, a kitchen, a dining room, a bath, a lavatory, a toilet, a staircase, and a hallway. Meanwhile, it is seen that a floor plan 5202 for the second floor includes rooms such as a main bedroom, a bedroom 1, a bedroom 2, a child's room, and a staircase.

The user can drag and move a desired room on the floor plan 5200 to change the position of the room on the floor plan 5200. In the case where a large number of devices 200 are disposed within a room and all the device icons 501 cannot be displayed within the room on the floor plan 5200 using a default room size, the display control section 103 may increase the size of the room such that all the device icons 501 can be accommodated within the room.

Figure 53:
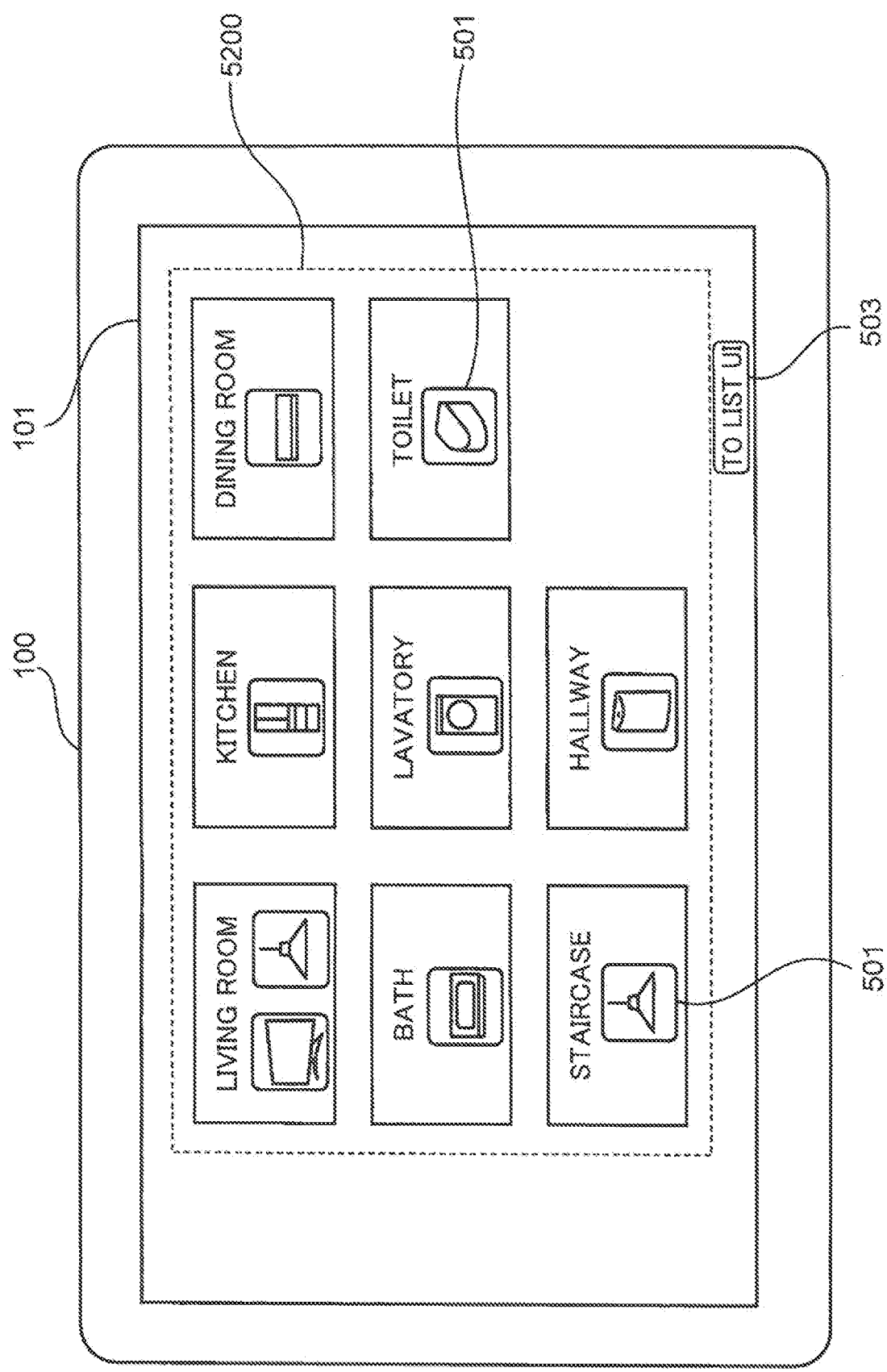
FIG. 53 is a diagram showing the configuration of a basic screen that adopts the floor plan shown in FIG. 52.

FIG. 53 is a diagram showing the configuration of a basic screen that adopts the floor plan 5200. The floor plan 5200 is displayed on the basic screen. In addition, the device icons 501 for the devices 200 actually disposed are displayed within each room.

For example, the device icons 501 for the television set and the illumination device are displayed in the living room, and therefore it is seen that the television set and the illumination device are installed in the living room.

The device list display change button 503 is a button for switching the screen display from the basic screen to the device list display screen discussed earlier (see FIG. 24).

Figure 54:
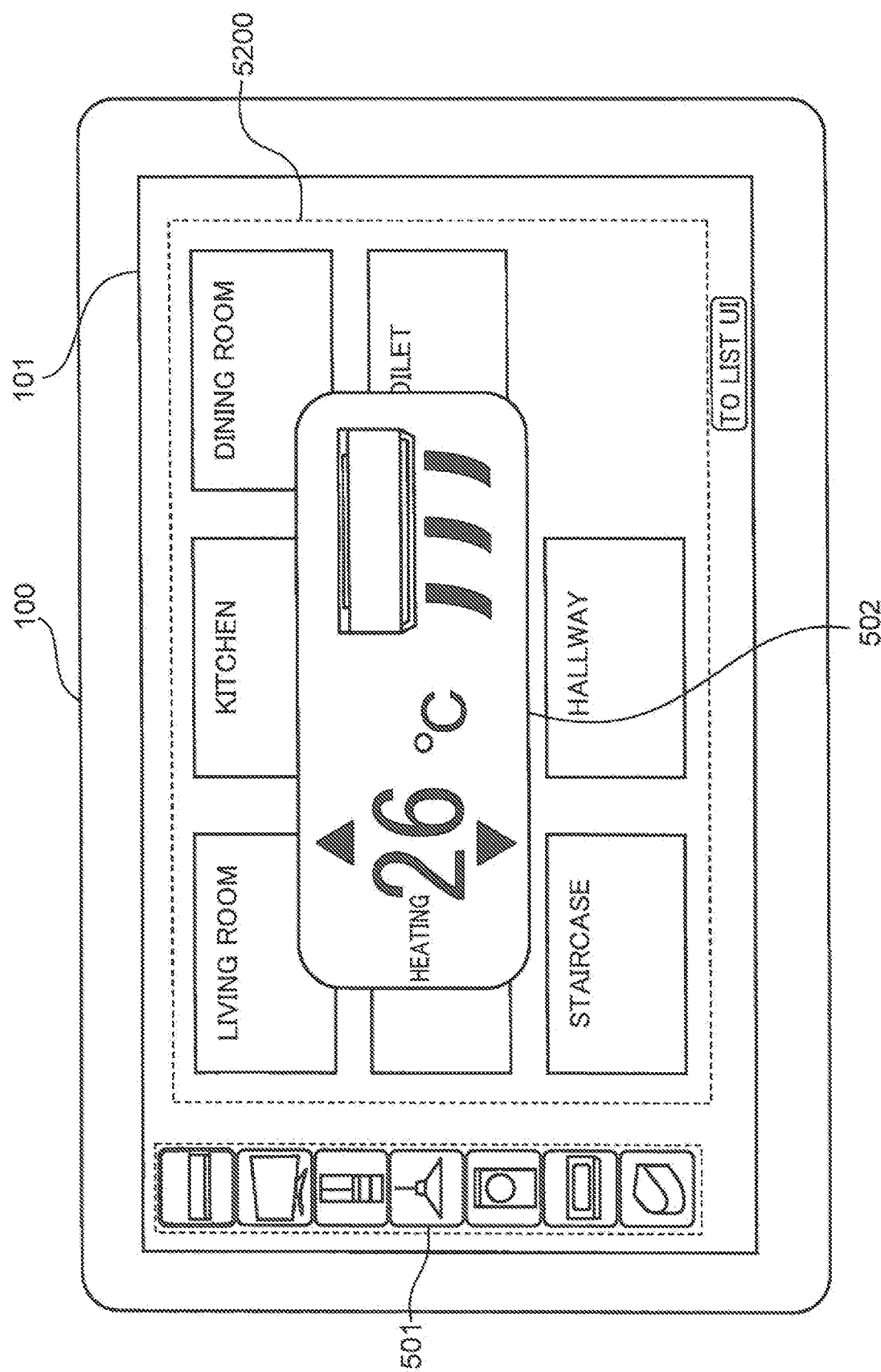
FIG. 54 is a diagram showing the display state of a device control screen for a case where the floor plan shown in FIG. 52 is adopted.

FIG. 54 is a diagram showing the display state of the device control screen 502 for a case where the floor plan 5200 shown in FIG. 52 is adopted. In the basic screen shown in FIG. 53, when the touch panel control section 102 senses that the user selects the device icon 501, the display control section 103 causes the display 101 to display the device control screen 502 corresponding to the selected device icon 501. In FIG. 54, the device icon 501 for the air conditioner is selected, and therefore the device control screen 502 for the air conditioner is displayed as overlapped on the floor plan 5200.

In displaying the device control screen 502, the display control section 103 disposes the device icons 501 displayed on the floor plan 5200 outside the display region of the device control screen 502. In the example of FIG. 54, all the device icons 501 are disposed in one vertical line on the left side of the floor plan 5200.

In disposing the device icons 501 in one vertical line on the left side of the floor plan 5200, the display control section 103 may group the device icons 501 under particular conditions. For example, the device icons 501 may be grouped in accordance with the room, may be grouped in accordance with the type of the device 200, or may be grouped in accordance with the category based on the type of the device 200.

In the example of FIG. 54, the device icons 501 are disposed on the left side of the floor plan 5200. However, the device icons 501 may be disposed in one vertical line on the right side of the floor plan 5200, or may be disposed in one horizontal line on the upper or lower side of the floor plan 5200.

In the case where all the device icons 501 cannot be displayed on the left side of the floor plan 5200, the display control section 103 may scroll the device icons 501 upward or downward in accordance with a swipe operation performed upward or downward on the device icons 501 disposed in one line on the left side to cause the device icons 501, which have been hidden, to be displayed within the display 101.

In disposing the device icons 501 in one vertical line on the left side of the floor plan 5200, the display control section 103 may display the device icon 501 selected by the user in a display mode that is different from that for the unselected device icons 501. For example, the selected device icon 501 may be displayed in a color that is different from that of the unselected device icons 501, may be displayed more brightly than the unselected device icons 501, may be displayed more densely than the unselected device icons 501, or may be flashed on and off at a constant cycle.

The display control section 103 may scroll an array of the device icons 501 such that the device icon 501 selected by the user is positioned at a conspicuous position (for example, the top, middle, or bottom position) in the line of icons.

In displaying the device control screen 502, the display control section 103 may dispose all the device icons 501 on the outer periphery of an ellipse as shown in FIG. 12.

Next, transition between the display state of the basic screen and the display state of the device control screen 502 will be described using FIG. 55.

Figure 55:
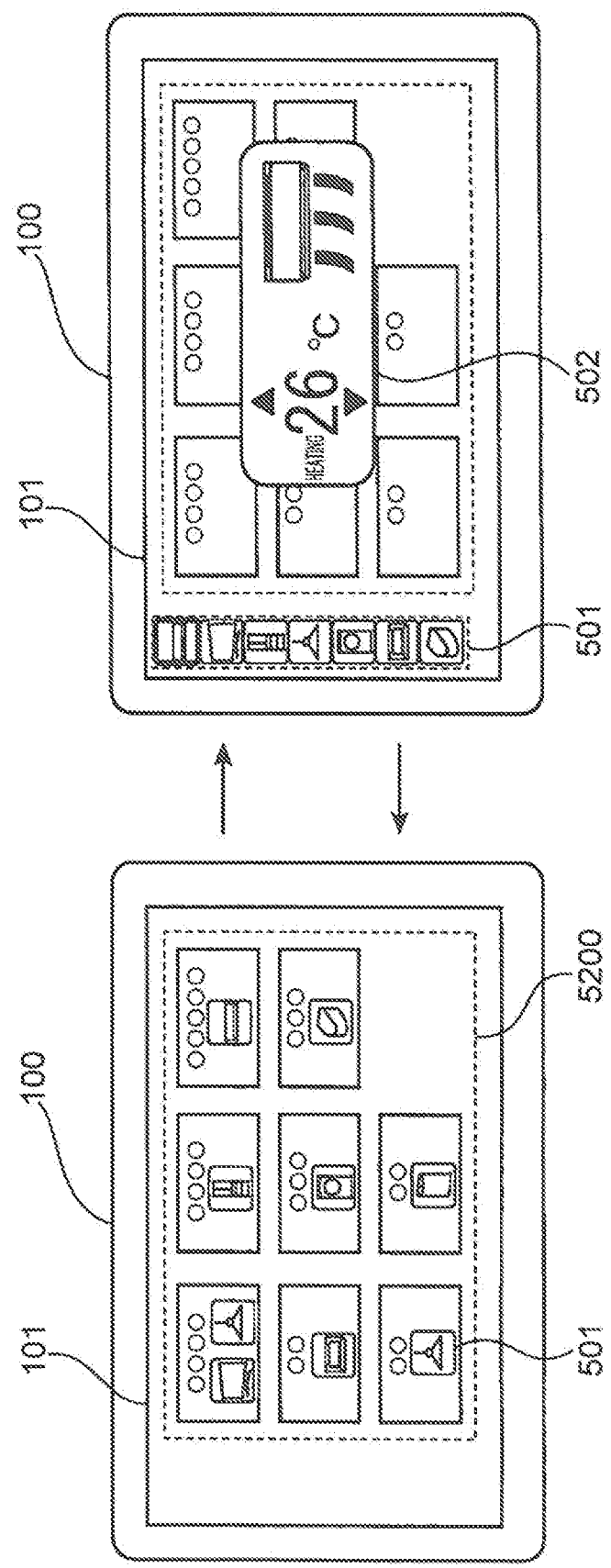
FIG. 55 is a diagram illustrating transition between the display state of the basic screen and the display state of the device control screen.

In the basic screen shown in the left diagram of FIG. 55, the user selects the device icon 501 for the device 200 (here, the air conditioner) that is desired to be controlled, and the touch panel control section 102 senses the selection. Then, as shown in the right diagram of FIG. 55, the display control section 103 displays the device control screen 502 corresponding to the selected device icon 501 as overlapped on the floor plan 5200. This results in transition from the display state of the basic screen to the display state of the device control screen 502.

On the other hand, as shown in the right diagram of FIG. 55, in the display state of the device control screen 502, the user selects the device icon 501 for the air conditioner corresponding to the device control screen 502 or a location outside the display region of the device control screen 502 (for example, the display region of the floor plan 5200 outside the display region of the device control screen 502), and the touch panel control section 102 senses the selection. Then, as shown in the left diagram of FIG. 55, the display control section 103 erases the device control screen 502, and returns from the display state of the device control screen 502 to the display state of the basic screen.

Figure 56:
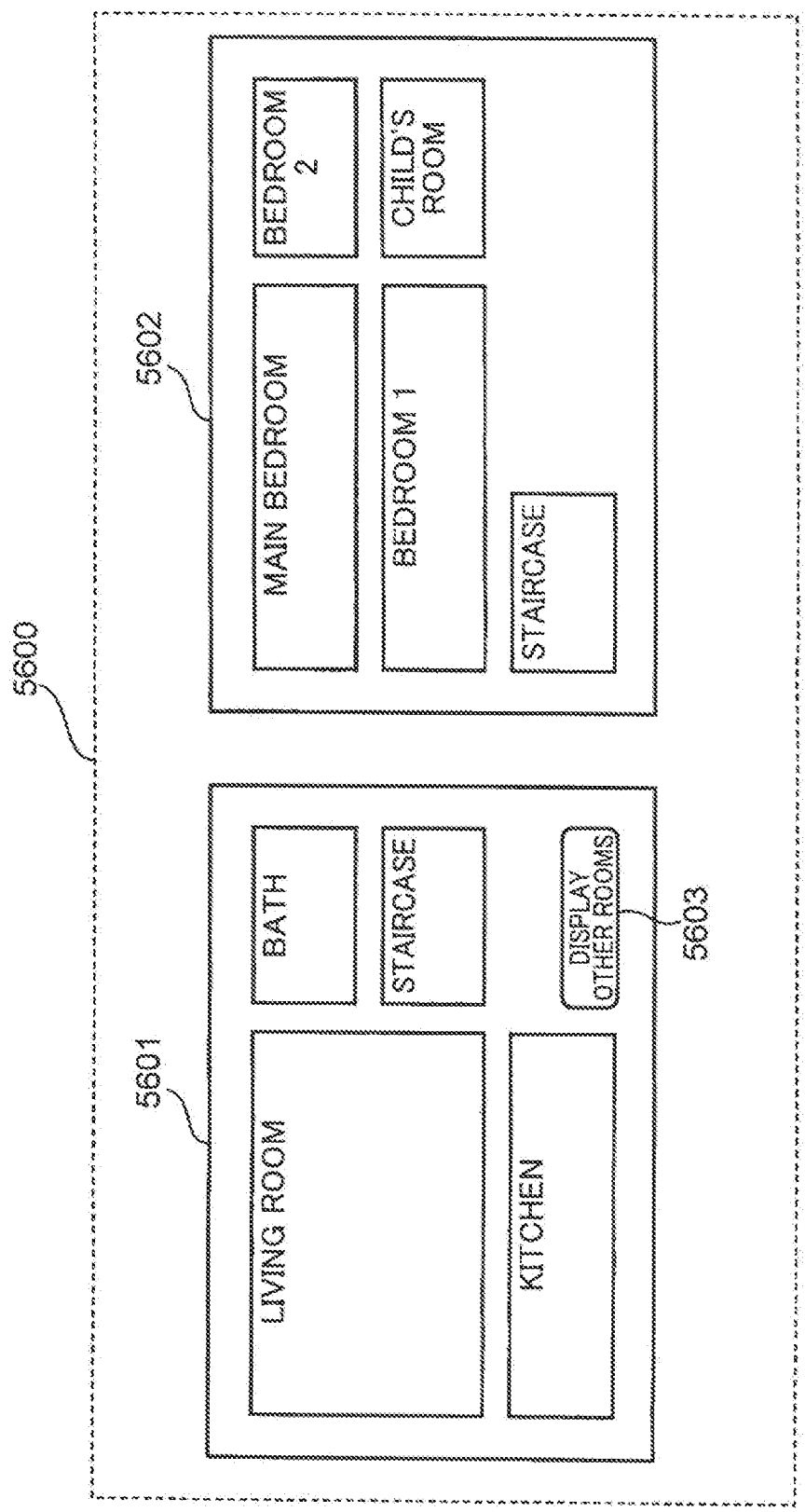
FIG. 56 is a diagram showing the configuration of a floor plan in which the size of each room is varied in accordance with the actual room size in the floor plan shown in FIG. 52.

FIG. 56 is a diagram showing the configuration of a floor plan 5600 for a case where the size of each block is varied in accordance with the actual room size in the floor plan 5200 shown in FIG. 52.

In the left diagram of FIG. 56, a floor plan 5601 for the first floor is shown. In the right diagram of FIG. 56, a floor plan 5602 for the second floor is shown.

In the floor plan 5601 for the first floor, the living room is the largest in terms of the room size, and is followed by the kitchen, the bath, and the staircase. Therefore, the sizes of the rooms are displayed in this order. Also in the floor plan 5602 for the second floor, the rooms are represented in accordance with the actual room size. In this case, information that indicates the actual room size may be registered in advance in room information 6800 to be discussed later, and the display control section 103 may decide the size of each room in accordance with the information.

Figure 57:
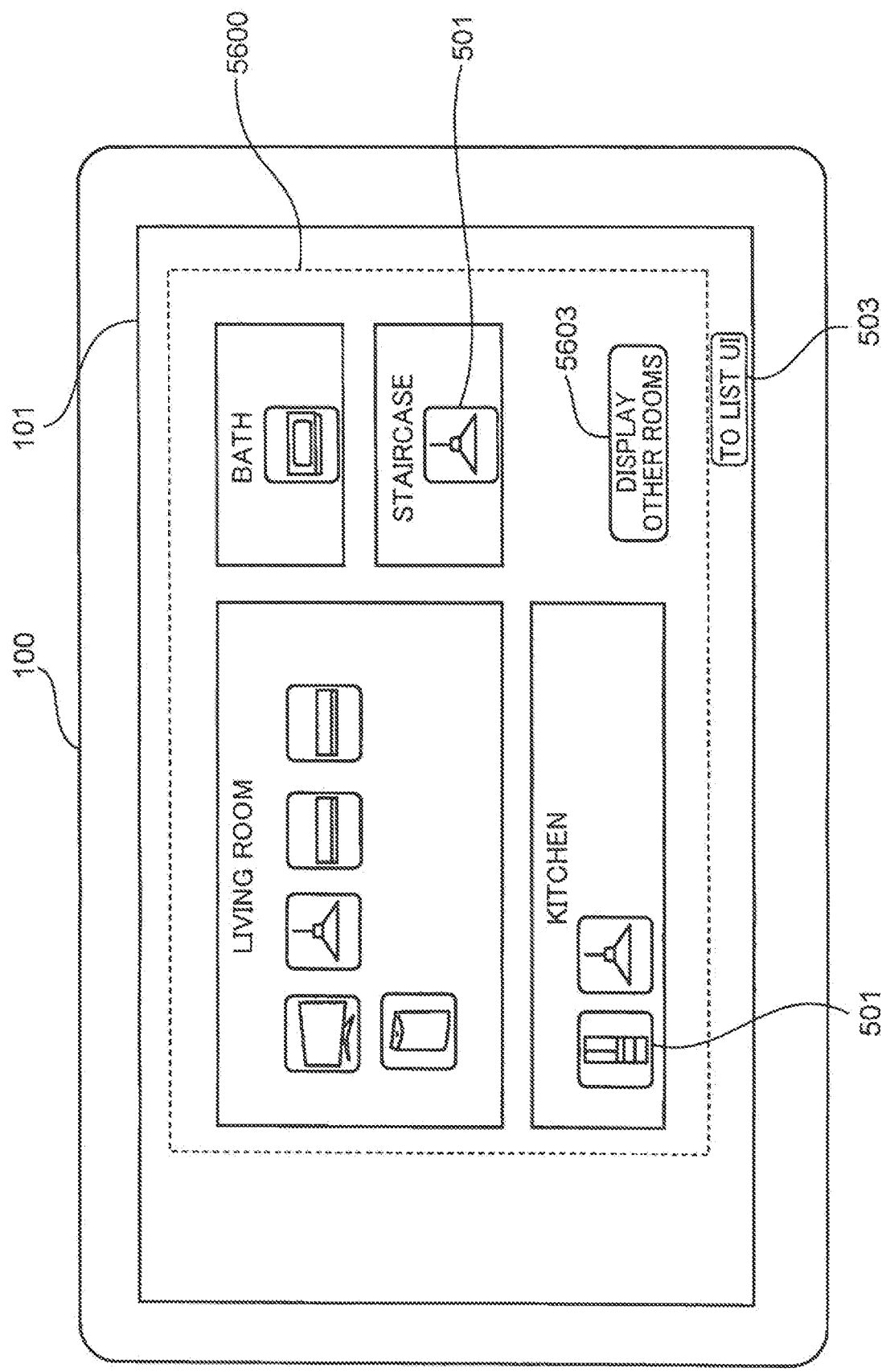
FIG. 57 is a diagram showing the configuration of a basic screen that adopts the floor plan shown in FIG. 56.

FIG. 57 is a diagram showing the configuration of a basic screen that adopts the floor plan 5600 shown in FIG. 56. In the floor plan 5600, each room is displayed with a size matching the actual size. In addition, the device icons 501 for the devices 200 actually disposed are displayed in each room.

In the case where the mode in which each room is represented with a size matching the actual room size on the floor plan 5600 is adopted, displaying all the rooms within the display 101 may result in small display of the rooms to make a user operation difficult. Thus, a room display button 5603 with a text "DISPLAY OTHER ROOMS" is provided in FIG. 57.

When the user selects the room display button and the touch panel control section 102 senses the selection, the display control section 103 switches the screen display to the floor plan 5600 which displays the remaining rooms.

In the example of FIG. 57, the floor plan 5600 is partitioned into the floor plan 5601 for the first floor and the floor plan 5602 for the second floor. Therefore, when the room display button 5603 is selected, the display control section 103 switches display on the display 101 to the floor plan 5602 for the second floor. In this case, the room display button 5603 is also provided on the floor plan 5602 for the second floor. Therefore, when the room display button 5603 is selected, the display control section 103 switches display on the display 101 to the floor plan 5601 for the first floor.

Although the floor plan is provided for each floor in the example of FIG. 57, the present disclosure is not limited thereto. For example, in the case where the floor plan 5601 for the first floor cannot be displayed on the display 101 at the same time, the display control section 103 may divide the floor plan 5601 for the first floor, and display a divided portion of the floor plan 5601 on the display 101. In this case, when the room display button 5603 is selected, a hidden portion of the floor plan 5601 for the first floor may be displayed.

In the case where the floor plan 5601 for the first floor and the floor plan 5602 for the second floor can be displayed on the display 101 at the same time, the display control section 103 may display the floor plan 5601 for the first floor and the floor plan 5602 for the second floor on the display 101 at the same time. In this case, the room display button 5603 is omitted from the floor plan 5600.

In the case where the staircase is tapped on on the floor plan 5600, the display control section 103 may switch between the floor plan 5601 for the first floor and the floor plan 5602 for the second floor.

Figure 58:
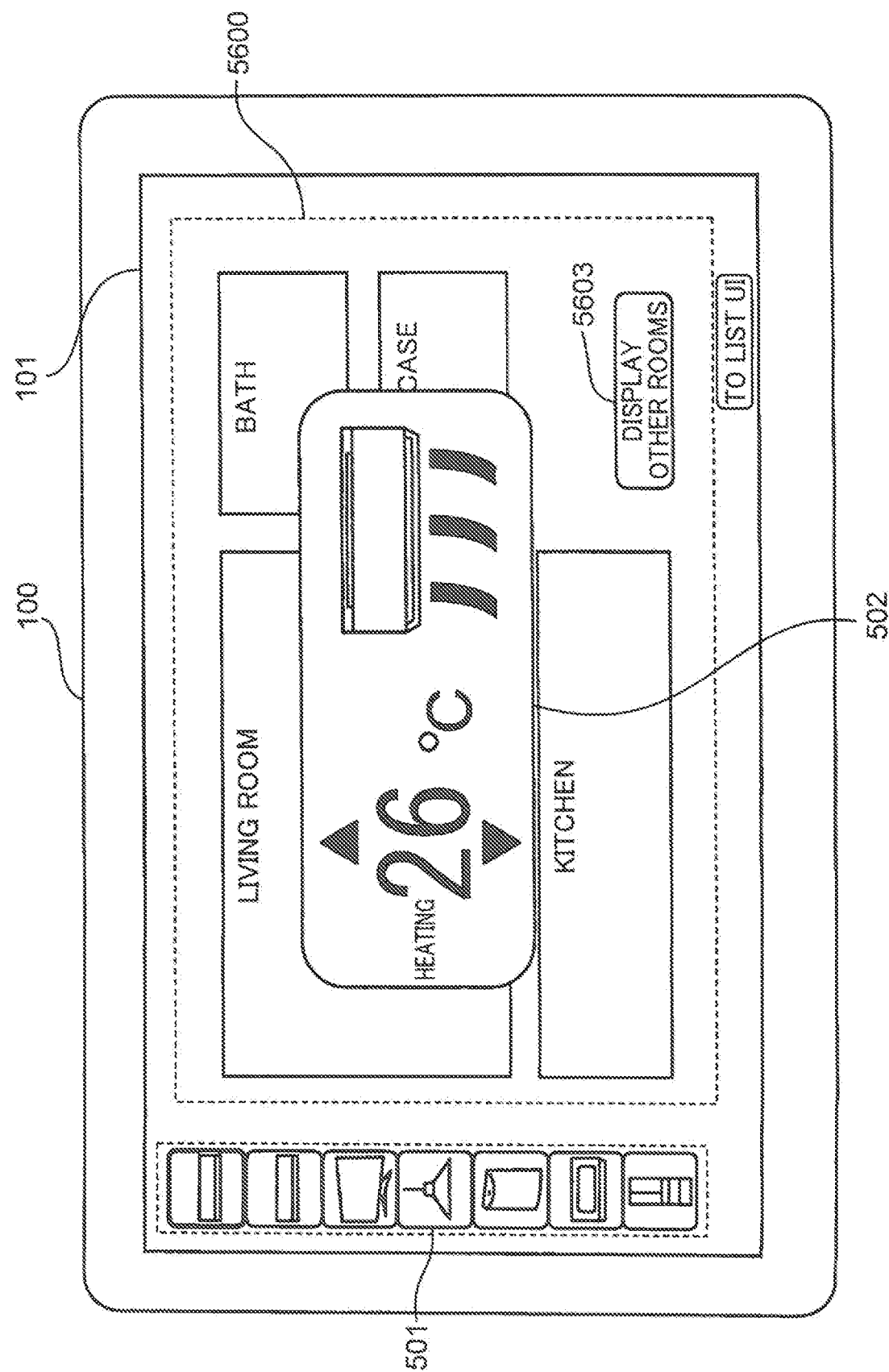
FIG. 58 is a diagram showing the display state of a device control screen for a case where the floor plan shown in FIG. 56 is adopted as the floor plan.

FIG. 58 is a diagram showing the display state of the device control screen 502 for a case where the floor plan 5600 shown in FIG. 56 is adopted as the floor plan. In FIG. 58, as in FIG. 54, the device control screen 502 for the air conditioner is displayed. FIG. 58 is otherwise the same as FIG. 54, and therefore is not described.

Figure 59:
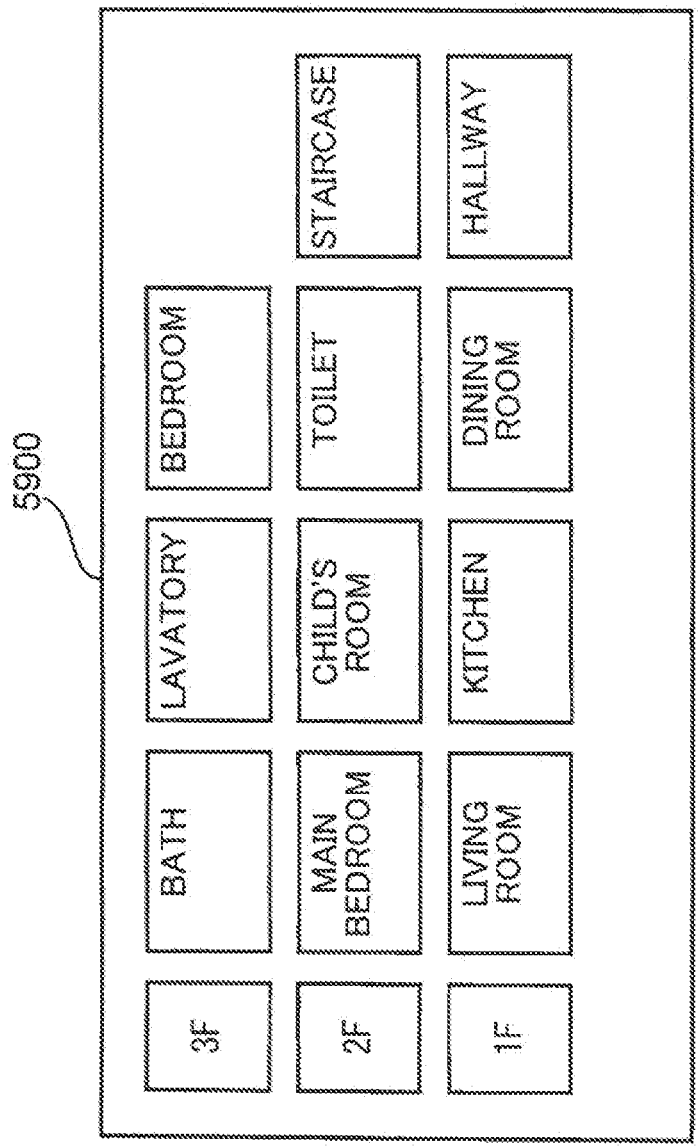
FIG. 59 is a diagram showing a floor plan in still another pattern according to the present disclosure.

FIG. 59 is a diagram showing a floor plan 5900 in still another pattern according to the present disclosure. The floor plan 5900 of FIG. 59 is the same as the floor plan 5200 in that rooms are represented by blocks of the same size, but is different from the floor plan 5200 in arrangement of the rooms. Specifically, in the floor plan 5900, the floor numbers are displayed in the vertical direction, and the rooms forming the same floor are arranged in one horizontal line. In the example of FIG. 59, the house has three floors, namely the first floor to the third floor, and therefore the rooms forming the third floor are disposed in the first line, the rooms forming the second floor are disposed in the second line, and the rooms forming the first floor are disposed in the third line. The floor number such as 1F. 2F and 3F is indicated at the left end of each line. It is seen at a glance from the floor plan 5900 on which floor each room is disposed.

Also in the floor plan 5900, the size of each room may be varied in accordance with the actual room size. In the floor plan 5900, in addition, in the case where all the rooms cannot be displayed within the display region of the display 101, the floor plan 5900 may be scrolled in the horizontal direction so that a desired room can be displayed on the display 101.

For example, in the case where there are further rooms on the second floor, when the touch panel control section 102 senses that the user performs a swipe operation from the left to the right, the display control section 103 may scroll the rooms forming the second floor, or the rooms forming the first floor to the third floor, from the left to the right in accordance with the amount of the swipe operation.

Figure 60:
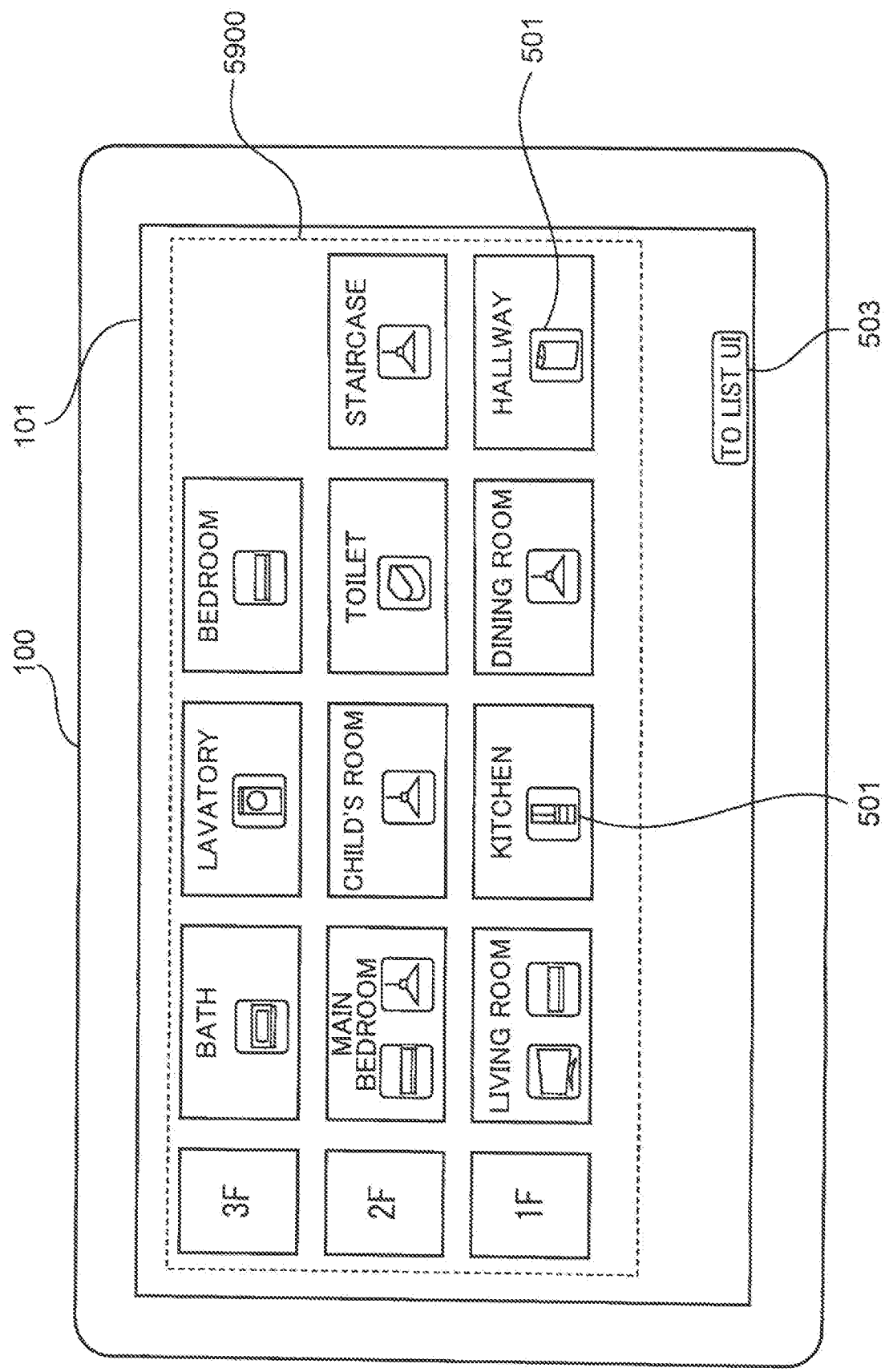
FIG. 60 is a diagram showing the configuration of a basic screen that adopts the floor plan shown in FIG. 59.

FIG. 60 is a diagram showing the configuration of a basic screen that adopts the floor plan 5900 shown in FIG. 59. The floor plan 5900 is displayed on the basic screen. In addition, the device icons 501 for the devices 200 actually disposed are displayed within each room. The device list display change button 503 is a button for switching the screen display from the basic screen to the device list display screen discussed earlier (see FIG. 24).

Figure 61:
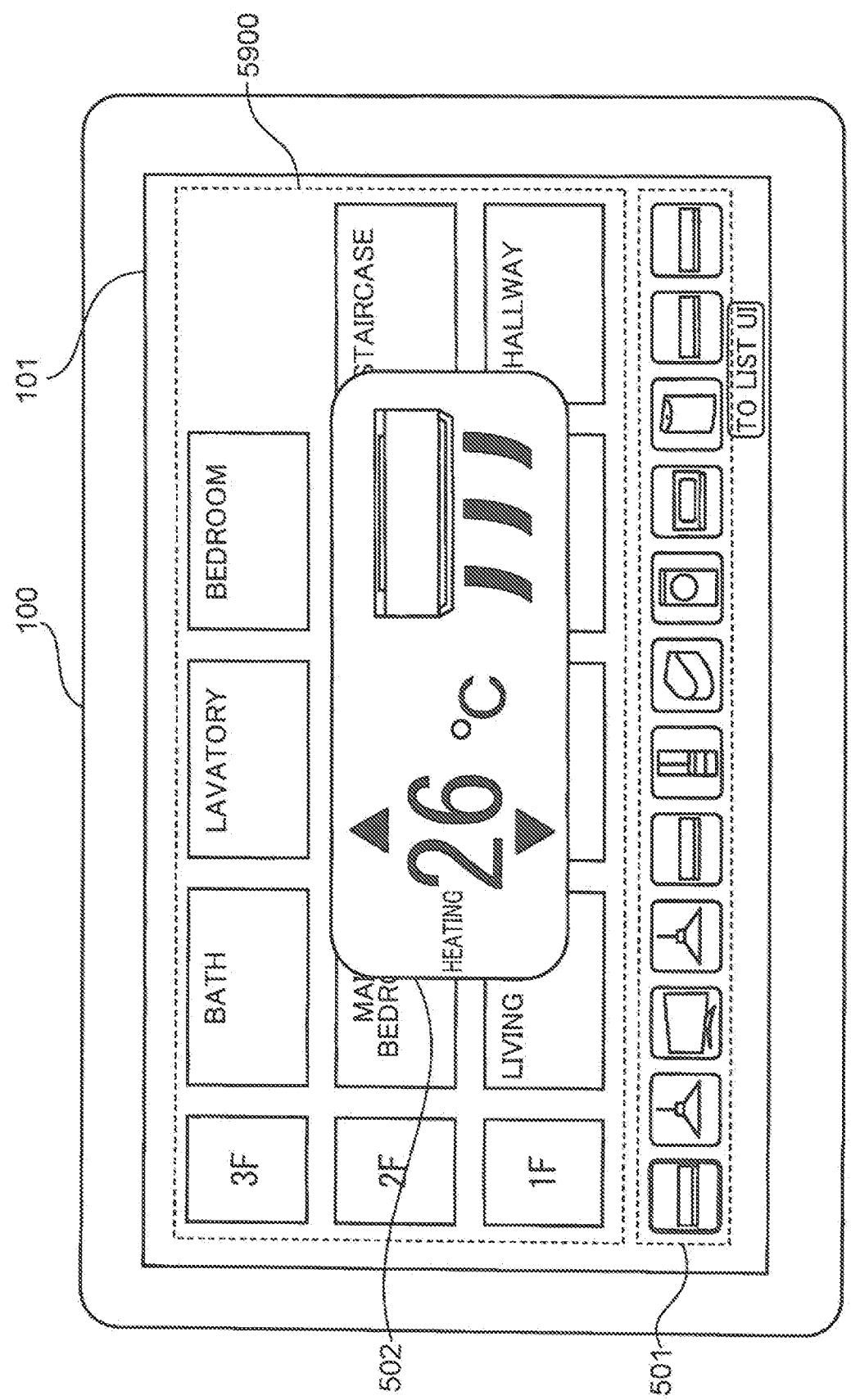
FIG. 61 is a diagram showing the display state of a device control screen for a case where the floor plan shown in FIG. 59 is adopted.

FIG. 61 is a diagram showing the display state of the device control screen 502 for a case where the floor plan 5900 shown in FIG. 59 is adopted. In the basic screen shown in FIG. 60, when the touch panel control section 102 senses that the user selects the device icon 501, the display control section 103 causes the display 101 to display the device control screen 502 corresponding to the selected device icon 501. In FIG. 61, the device icon 501 for the air conditioner is selected, and therefore the device control screen 502 for the air conditioner is displayed as overlapped on the floor plan 5900. In displaying the device control screen 502, the display control section 103 disposes the device icons 501 displayed on the floor plan 5900 outside the display region of the device control screen 502. In the example of FIG. 61, all the device icons 501 are disposed in one horizontal line on the lower side of the floor plan 5900.

In disposing the device icons 501 in one vertical line on the lower side of the floor plan 5900, the display control section 103 may group the device icons 501 under particular conditions. For example, the device icons 501 may be grouped in accordance with the room, may be grouped in accordance with the type of the device 200, or may be grouped in accordance with the category based on the type of the device 200.

In the example of FIG. 61, the device icons 501 are disposed on the lower side of the floor plan 5900. However, the device icons 501 may be disposed in one horizontal line on the upper side of the floor plan 5900, or may be disposed in one vertical line on the left or right side of the floor plan 5900.

In the case where all the device icons 501 cannot be disposed on the lower side of the floor plan 500, the display control section 103 may scroll the device icons 501 leftward or rightward in accordance with a swipe operation performed leftward or rightward on the device icons 501 disposed in one horizontal line on the lower side to cause the device icons 501, which have been hidden, to be displayed within the display 101.

In disposing the device icons 501 in one horizontal line on the lower side of the floor plan 5900, the display control section 103 may display the device icon 501 selected by the user in a display mode that is different from that for the unselected device icons 501. For example, the selected device icon 501 may be displayed in a color that is different from that of the unselected device icons 501, may be displayed more brightly than the unselected device icons 501, may be displayed more densely than the unselected device icons 501, or may be flashed on and off at a constant cycle.

The display control section 103 may scroll an array of the device icons 501 such that the device icon 501 selected by the user is positioned at a conspicuous position (for example, the leftmost, middle, or rightmost position) in the line of icons.

In displaying the device control screen 502, the display control section 103 may dispose all the device icons 501 on the outer periphery of an ellipse as shown in FIG. 12.

In the floor plan 5900, the rooms on all the floors are displayed on the display 101 at the same time, which may result in small display of the rooms to make a user operation difficult. Thus, the display control section 103 may display the floor plan 5900 as enlarged in accordance with the user operation. Specifically, when the user performs an operation of pinching out on a certain room in the floor plan 5900 and the touch panel control section 102 senses the operation, the display control section 103 may display the room on the display 101 as enlarged at an enlargement scale matching the amount of the pinch out.

Figure 62:
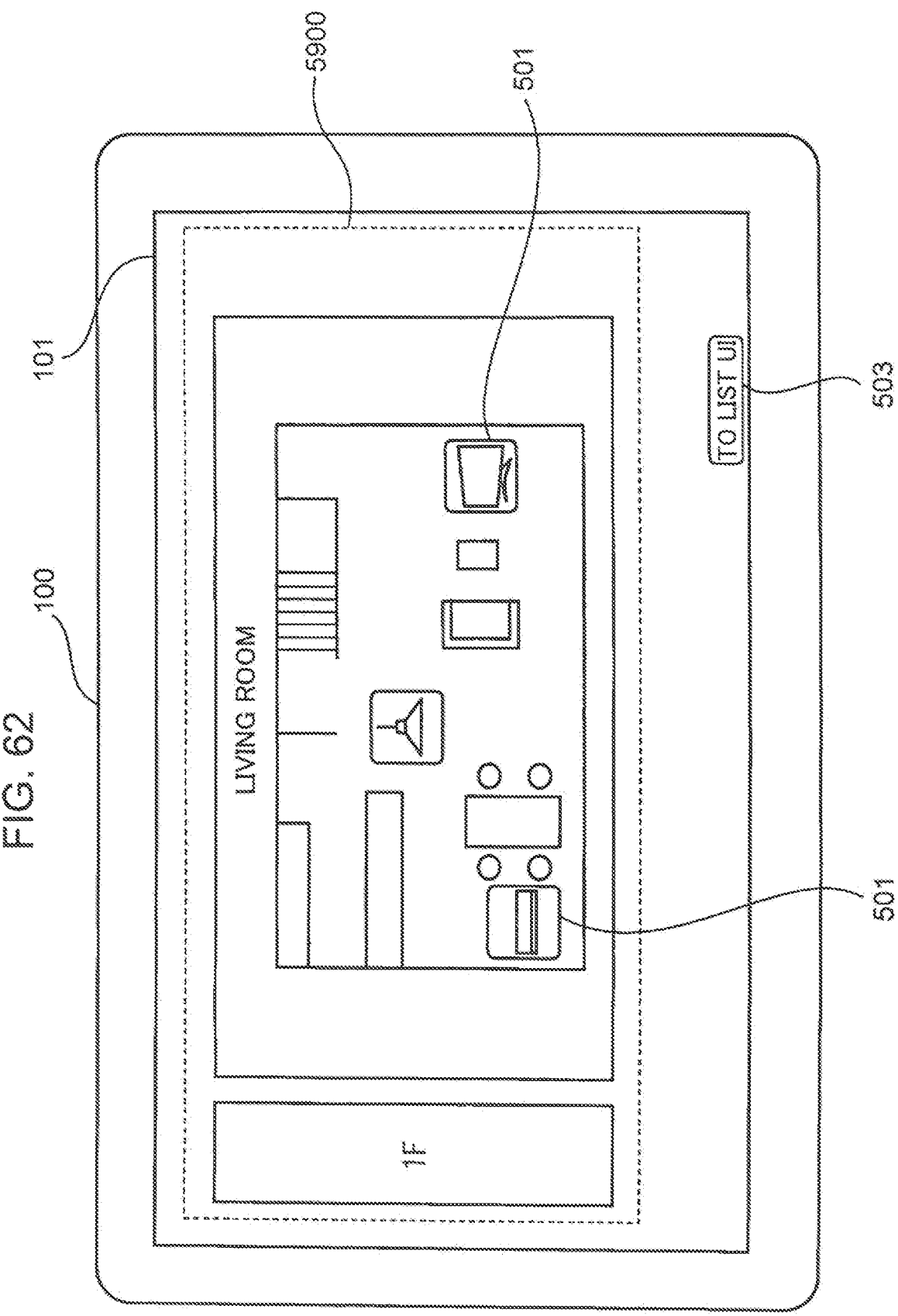
FIG. 62 is a diagram showing a floor plan displayed on a display in the case where a user performs a pinch-out operation on a room in the floor plan shown in FIG. 59.

FIG. 62 is a diagram showing a floor plan that displays a certain room in the floor plan 5900 as enlarged. As shown in FIG. 62, the display control section 103 may display a plan view that planarly represents the shape of the relevant room as overlapped on the floor plan 5900. Alternatively, the display control section 103 may switch to displaying the plan view. This allows the user to grasp the configuration of the rooms in the house and the devices 200 disposed in each room on the floor plan 5900 shown in FIG. 60, and to grasp the actual arrangement position of the devices 200 in the enlarged room on the floor plan 5900 shown in FIG. 62.

In the floor plan 5900 not displayed as enlarged shown in FIG. 60, it is not necessary for the display control section 103 to display the device icons 501 for all the devices 200 disposed within the rooms, and the display control section 103 may display only some of the device icons 501.

In this case, the display control section 103 may display one or a plurality of (for example, two) device icons 501 frequently used by the user on the floor plan 5900. Alternatively, the display control section 103 may not display the device icons 501 on the floor plan 5900 not displayed as enlarged. This prevents the viewability of the floor plan 5900 from being lowered because of an increased number of the device icons 501 displayed on the floor plan 5900 not displayed as enlarged.

Figure 63:
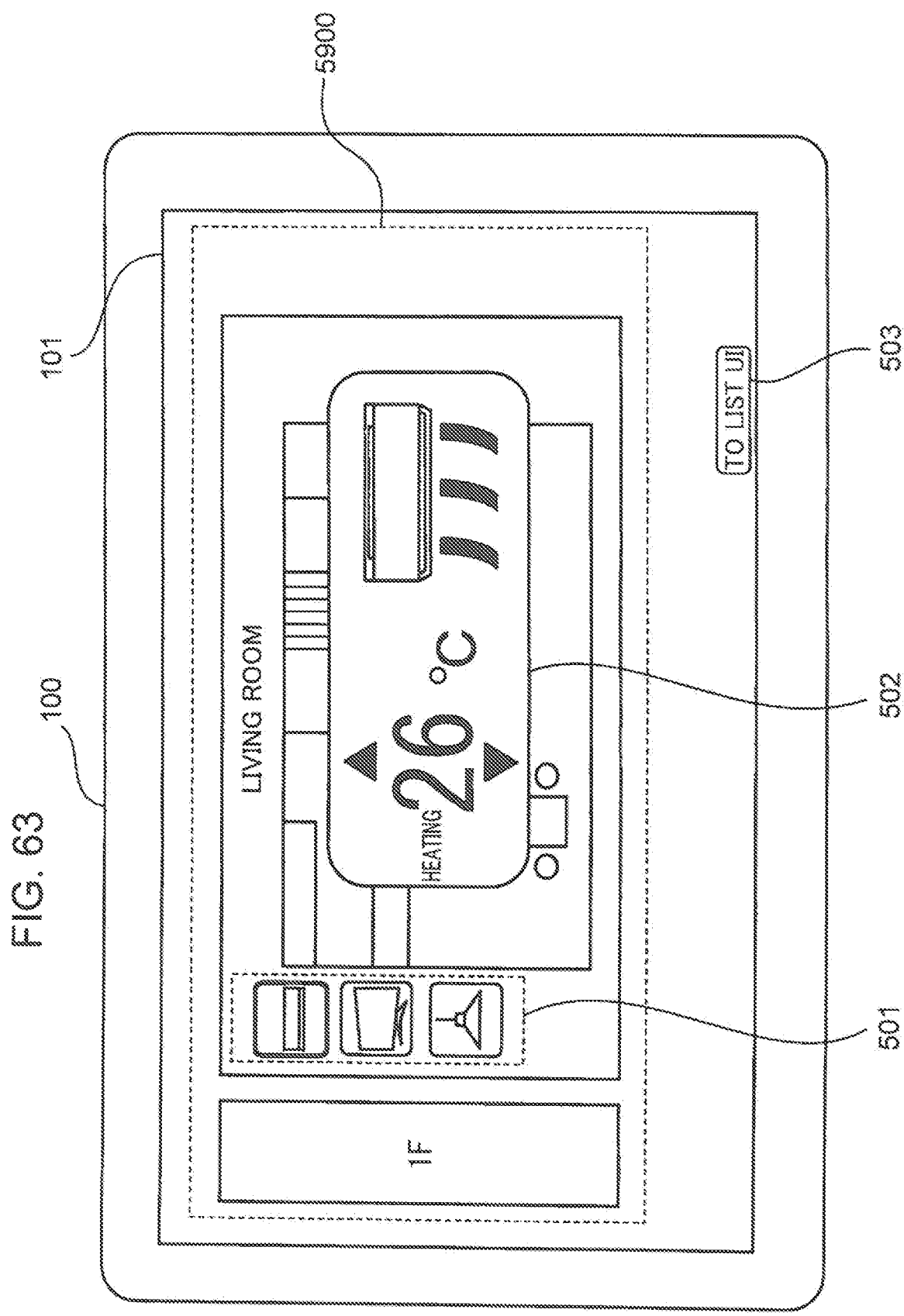
FIG. 63 is a diagram showing the display state of a device control screen in the floor plan displayed as enlarged shown in FIG. 62.

FIG. 63 is a diagram showing the display state of the device control screen 502 in the floor plan 5900 displayed as enlarged shown in FIG. 62. In FIG. 63, as in FIG. 54, the device control screen 502 for the air conditioner is displayed. In FIG. 63, only the device icons 501 disposed in the room (living room) displayed as enlarged are displayed on the left side of the plan view and in the block of the living room. In the example of FIG. 62, the device icons 501 for the air conditioner, the illumination device, and the television set are displayed in the living room within the plan view, and the device icon 501 for the air conditioner is selected by the user. Therefore, the device icons 501 are displayed in one vertical line on the left side of the plan view.

In the case where a certain room is displayed as enlarged, it is highly likely that the user operates the device 200 disposed within the room. In the case where a certain room is displayed as enlarged, in addition, the device icons 501 for devices in the other rooms are not displayed on the display 101. Therefore, if the device icons 501 for devices disposed in the other rooms are displayed on the left side of the plan view when the user selects a certain device icon 501, the user may be given a sense of wrongness.

Figure 64:
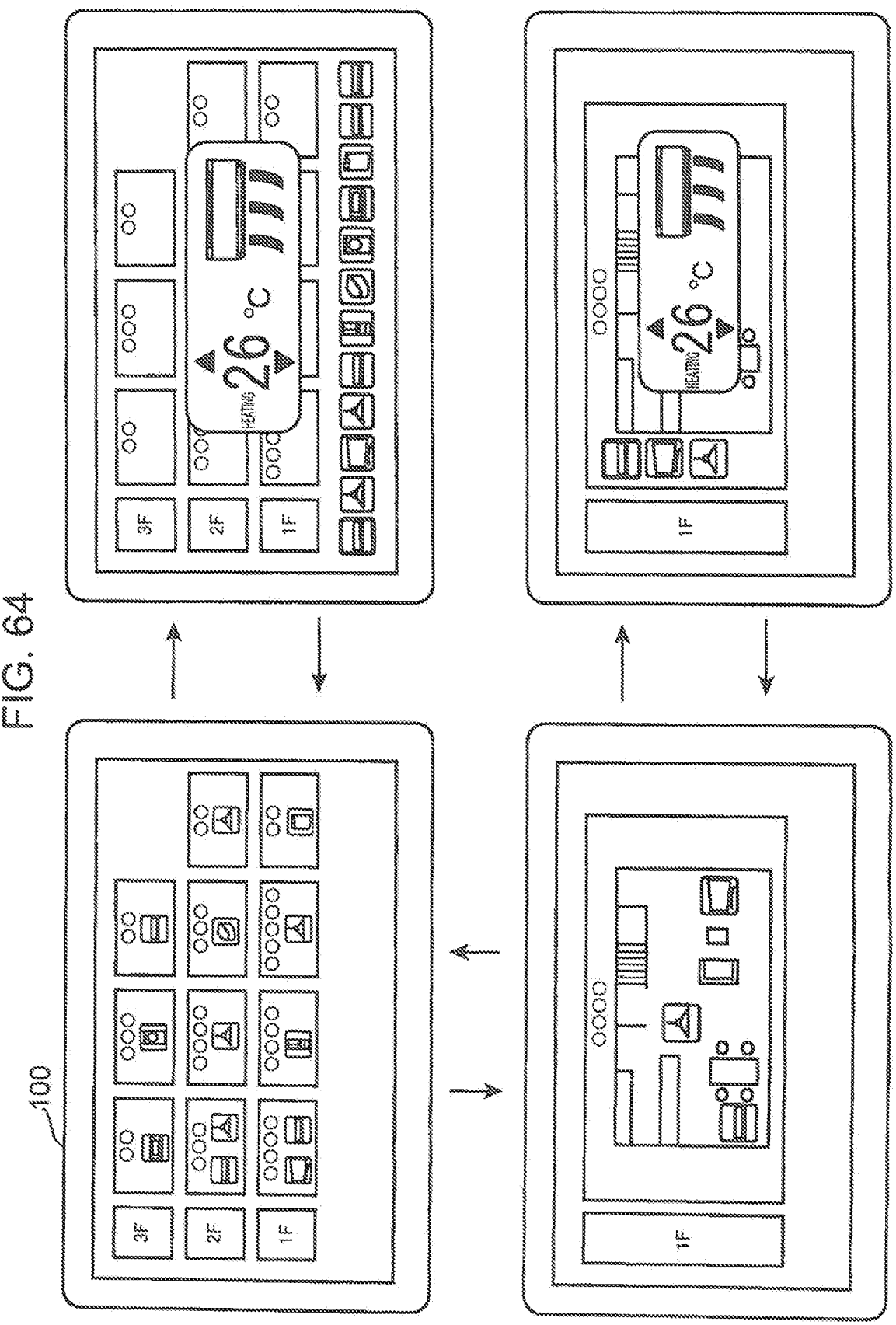
FIG. 64 is a diagram showing screen transition from the display state of the basic screen to the display state of the device control screen.

Thus, in the case where a certain room is displayed as enlarged, the display control section 103 causes only the device icons 501 for the devices 200 disposed in the room to be displayed in one vertical line on the left side of the plan view. In the example of FIG. 64, the device icons 501 are displayed on the left side of the plan view. However, the device icons 501 may be displayed in one vertical line on the right side of the plan view, or may be displayed in one horizontal line on the upper or lower side of the plan view.

FIG. 64 is a diagram showing screen transition from the display state of the basic screen to the display state of the device control screen 502. It is assumed that the user taps on the device icon 501 for the air conditioner, for example, in the basic screen which displays the floor plan 5900 not displayed as enlarged as shown in the upper left diagram of FIG. 64. Then, as shown in the upper right diagram of FIG. 64, the display control section 103 displays the device control screen 502 for the air conditioner as overlapped on the basic screen. In the screen shown in the upper right diagram of FIG. 64, on the other hand, when the user taps on a region on the floor plan 5900 other than the device control screen 502 or taps on the device icon 501 for the air conditioner, the display control section 103 returns the screen display to the basic screen shown in the upper left diagram of FIG. 64.

It is assumed that the user pinches out on the living room in the basic screen shown in the upper left diagram of FIG. 64. Then, as shown in the lower left diagram of FIG. 64, the display control section 103 enlarges the block of the living room, and at the same time displays the plan view of the living room having a size matching the size of the enlarged block as overlapped on the enlarged block. It is assumed that the user pinches in on the living room in the lower left diagram of FIG. 64. Then, the display control section 103 returns the screen display to the basic screen shown in the upper left diagram of FIG. 64.

When the device icon 501 for the air conditioner, for example, is selected in the basic screen shown in the lower left diagram of FIG. 64, the display control section 103 displays the device control screen 502 for the air conditioner as overlapped on the plan view as shown in the lower right diagram of FIG. 64. In the lower right diagram of FIG. 64, when the user taps on a region on the floor plan 5900 other than the device control screen 502 or on the device icon 501 for the air conditioner, the display control section 103 returns the screen display to the screen shown in the lower left diagram of FIG. 64.

Figure 65:
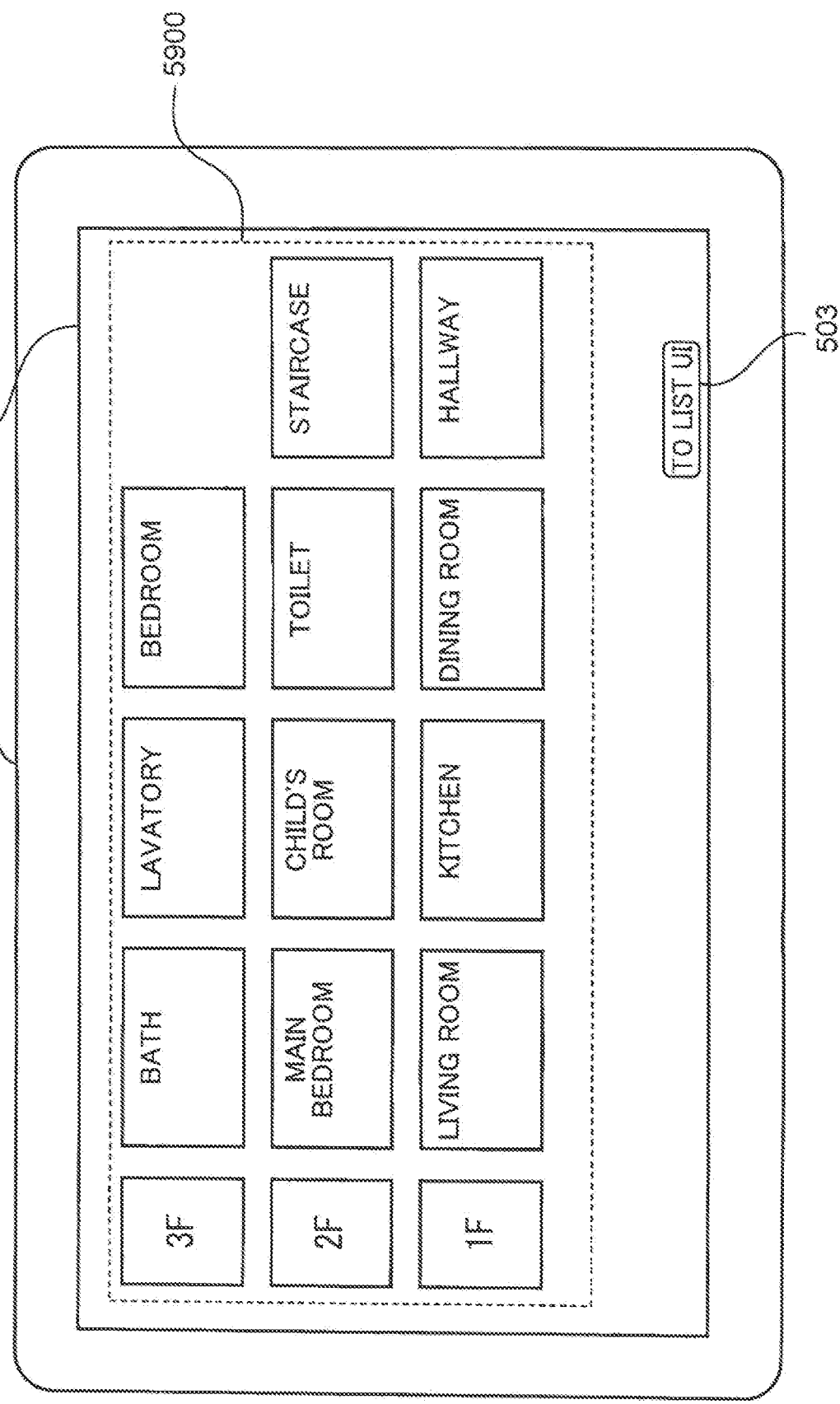
FIG. 65 is a diagram showing the configuration of a basic screen which adopts the floor plan shown in FIG. 59 and in which device icons are not displayed.

FIG. 65 is a diagram showing the configuration of a basic screen 5900 which adopts the floor plan shown in FIG. 59 and in which device icons 501 are not displayed. In the mode shown in FIG. 65, only rooms forming each floor are displayed, and the device icons 501 are not displayed.

Figure 66:
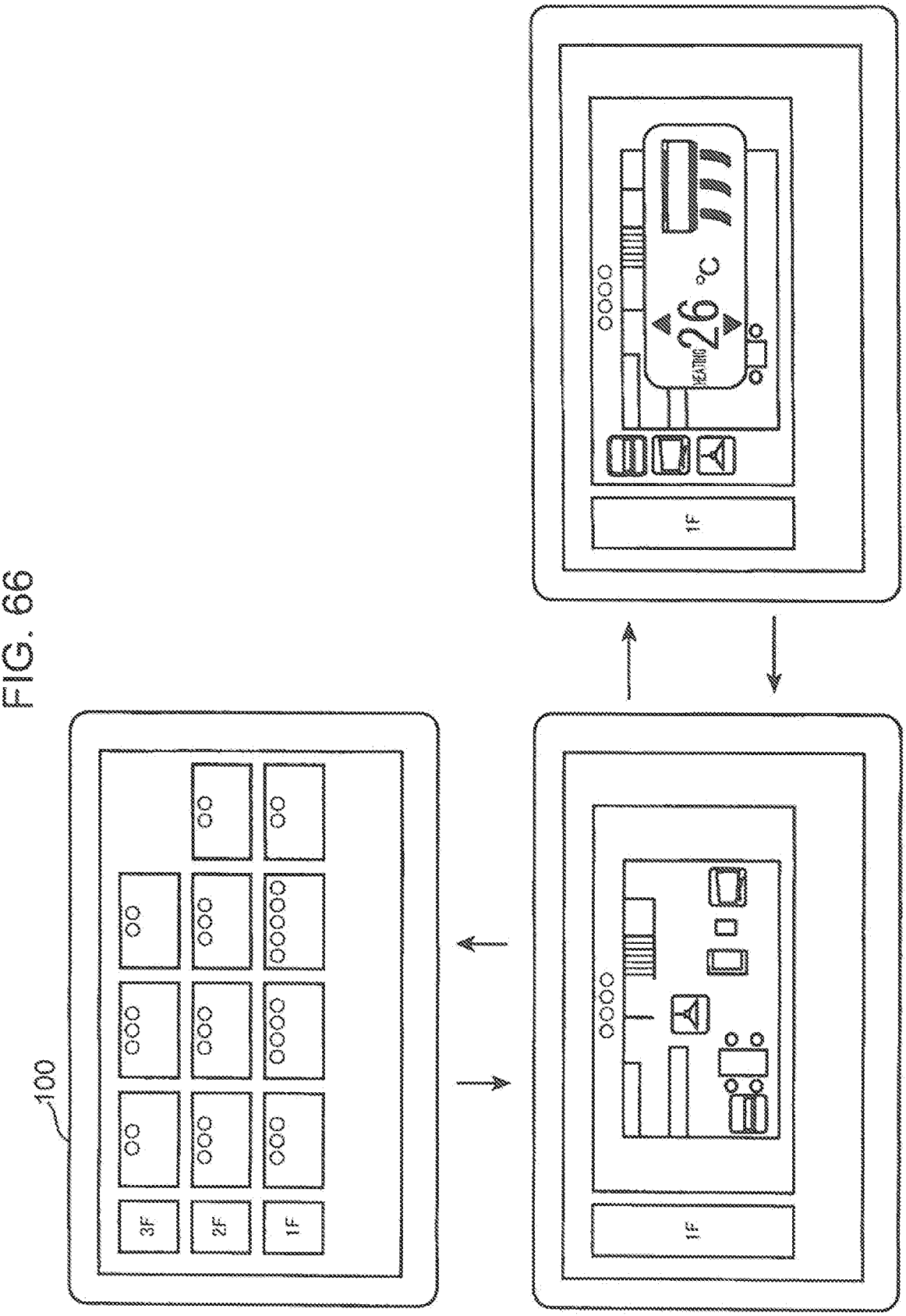
FIG. 66 is a diagram showing screen transition from the display state of the basic screen to the display state of the device control screen for a case where the basic screen in which device icons are not displayed is adopted.

FIG. 66 is a diagram showing screen transition from the display state of the basic screen to the display state of the device control screen 502 for a case where the basic screen in which device icons 501 are not displayed is adopted. It is assumed that the user pinches out on the living room, for example, in the basic screen shown in the upper left diagram of FIG. 66. Then, as shown in the lower left diagram of FIG. 66, the display control section 103 displays the block of the living room as enlarged, and displays the plan view of the living room as overlapped on the block displayed as enlarged. It is assumed that the user taps on the device icon 501 for the air conditioner, for example, in the screen shown in the lower left diagram of FIG. 66. Then, as shown in the lower right diagram of FIG. 66, the display control section 103 displays the device control screen 502 for the air conditioner as overlapped on the plan view of the living room, and disposes the device icons 501 for the living room in one vertical line on the left side of the plan view of the living room. In the lower right diagram of FIG. 66, when the user taps on a region on the floor plan 5900 and outside the display region of the device control screen 502, the display control section 103 returns the display screen to the screen shown in the lower left diagram of FIG. 66.

Figure 67:
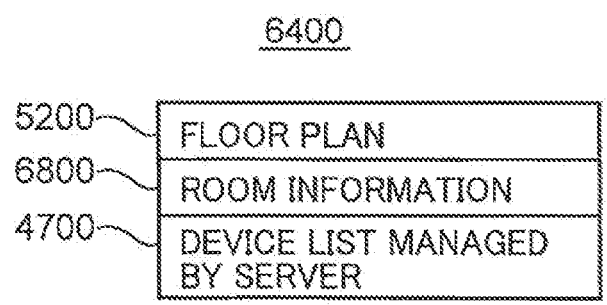
FIG. 67 is a diagram showing the configuration of the home information for a case where the floor plan shown in FIG. 52 is adopted.

FIG. 67 is a diagram showing the configuration of the home information 2700 for a case where the floor plan 5200 shown in FIG. 52 is adopted. As shown in FIG. 67, the home information 6400 includes the floor plan 5200, the room information 6800, and the device list 4700 managed by the server. In the floor plan 5200, the display positions of the rooms are determined in advance. Therefore, the vertex information 2800 included in the home information 2700 is omitted from the home information 6400.

The floor plan 5200 is image data obtained by representing the floor plan 5200 shown in FIG. 52 in a bitmap format, for example. Alternatively, the floor plan 5200 may be information that prescribes the color, the shape, the size, and so forth for displaying the floor plan 5200. The room information 6800 is information for deciding the regions of rooms from the floor plan 5200.

FIG. 68 is a diagram showing the configuration of room information 6800 shown in FIG. 67. As shown in FIG. 68, the room information 6800 includes a room ID 6801, a room type 6802, a floor level 6803, and a display position 6804. The room ID 6801 is an identifier that identifies a room on the floor plan 5200. The room type 6802 indicates the type of the room. The floor level 6803 indicates the floor level (floor) on which the room is disposed. The display position 6804 indicates the arrangement position of the room on the floor plan 5200.

Figure 69:
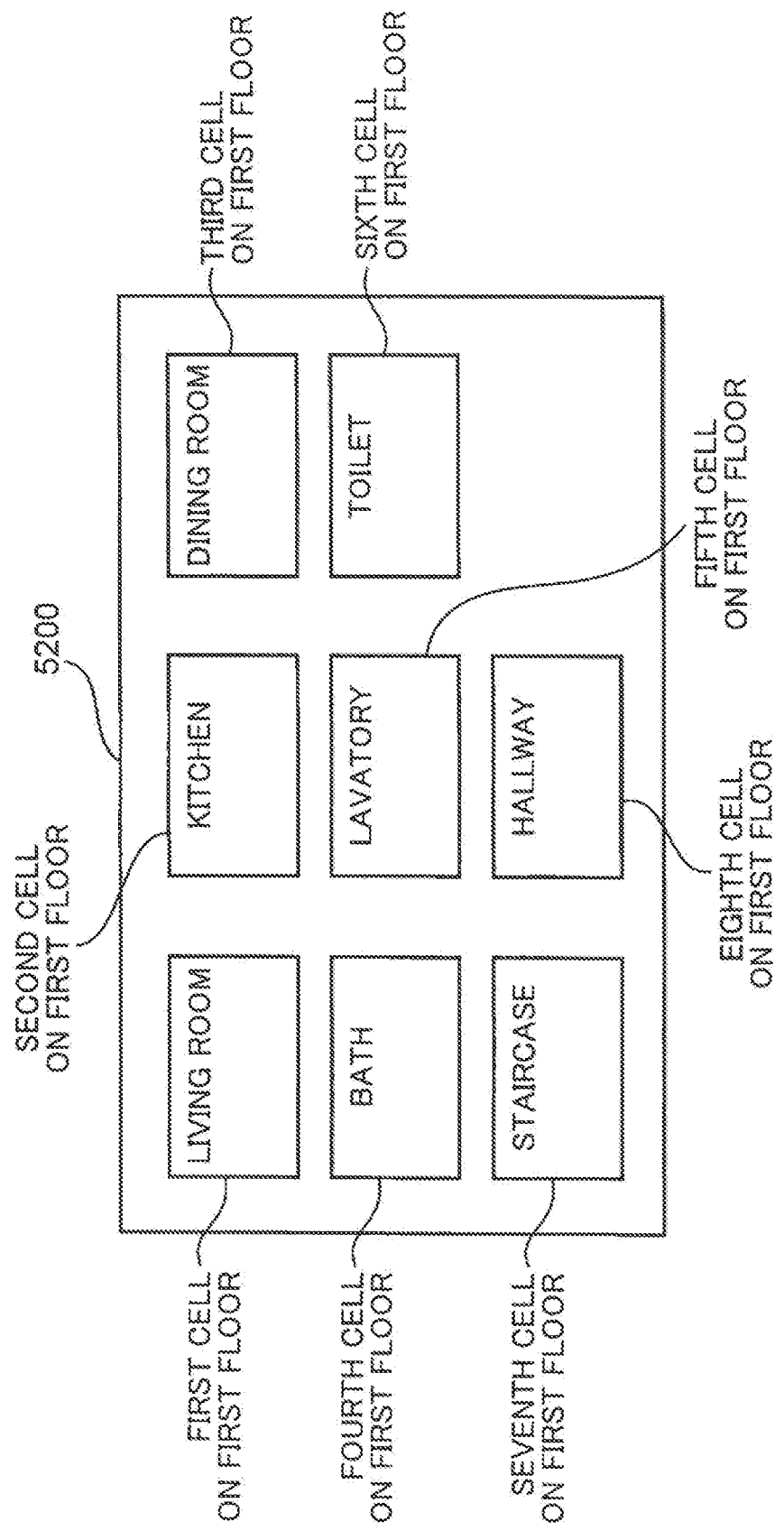
FIG. 69 is a diagram showing an example of the correspondence between the display position in the room information shown in FIG. 67 and the floor plan.

FIG. 69 is a diagram showing an example of the correspondence between the display position 6804 in the room information 6800 and the floor plan 5200. As shown in FIG. 69, the order of the blocks on the floor plan 5200 is prescribed such that the block in the first row and the first column corresponds to the first cell, the block in the first row and the second column corresponds to the second cell, the block in the first row and the third column corresponds to the third cell, the block in the second row and the first column corresponds to the fourth cell, and so forth.

For example, the room with a room ID 6801 of A has a display position 6804 of "FIRST CELL ON FIRST FLOOR". Therefore, as shown in FIG. 69, the display control section 103 interprets the block in the first cell (in the first row and the first column) on the floor plan 5201 for the first floor as the living room.

In the example of FIG. 69, the blocks are disposed in three horizontal lines, and therefore the cell in the second row and the first column corresponds to the fourth cell, and the cell in the third row and the first column corresponds to the seventh cell. It should be noted, however, that this is merely exemplary. For example, in the case where the cells are arranged in four columns in the horizontal direction, the correlation between the order of the cells and the arrangement positions of the blocks is changed as appropriate in accordance with the number of blocks in the horizontal direction, and the cell in the second row and the first column corresponds to the fifth cell, and the cell in the third row and the first column corresponds to the ninth cell.

FIG. 70 is a diagram showing the configuration of a device list 4700 managed by the server 300 for a case where the floor plan 5200 shown in FIG. 52 is adopted. It is not necessary for the floor plan 5200 to indicate the arrangement position of the device 200 in the room. Therefore, in the device list 4700 shown in FIG. 70, unlike FIG. 34, the room type 6802 is registered in the arrangement 4704. The device list 4700 shown in FIG. 70 is otherwise the same as the device list 4700 shown in FIG. 34. For example, the air conditioner with a device ID 4701 of A is disposed in the living room, and therefore "LIVING ROOM" is registered in the arrangement 4704. In the example of FIG. 70, the room type 6802 is adopted as the arrangement 4704. However, any other information that specifies a room may be registered. For example, the room ID 6801 may be adopted as the arrangement 4704.

FIG. 71 is a diagram showing the configuration of a device list 3100 managed by the home controller 100 for a case where the floor plan 5200 shown in FIG. 52 is adopted. Also in the device list 3100 of FIG. 71, for the same reason as that for the device list 4700 of FIG. 70, the room type 6802 is registered in the arrangement 3104. The device list 3100 of FIG. 71 is otherwise the same as the device list 3100 shown in FIG. 35. Also in FIG. 71, the room ID 6801 may be adopted as the arrangement 3104.

Next, the device list 3100 for a case where the plan view of a certain room is displayed in the case where a pinch-out operation is performed on the room on the basic screen of the floor plan 5900 as shown in FIG. 62 will be described. In this case, the room information 6800 shown in FIG. 68 may include an item of the plan view of the room. Then, image data for the plan view of the relevant room may be registered in the item of the plan view of the room. For the plan view of the room, as shown in FIG. 33, the origin may be set at the left end of the room, for example, the X axis and the Y axis may be set in the horizontal direction and the vertical direction, respectively, and the position of the room may be represented by the X and Y coordinates.

Meanwhile, not only the room type 6802 but also the coordinate in the room is registered in the arrangement 3104 of the device list 3100 shown in FIG. 71. This allows the display control section 103 to discriminate from the content of the arrangement 3104 at what position on the plan view representing the room the device icon 501 is to be disposed.

In the present disclosure, the server 300 is not an essential constituent element, and various types of information managed by the server 300 (such as the home information 2700 and the state of the devices 200) may be managed by the home controller 100. This allows the present disclosure described above to be embodied without the server 300. In this case, it is not necessary for the home controller 100 to manage information on the entire house, and it is only necessary to manage information related to the devices 200 controlled by the home controller 100 and the house in which the devices 200 are disposed.

(Device Icon Arranging Process 1)

Next, a device icon arranging process 1 in which a device icon is automatically arranged on a floor plan will be described.

Figure 72:
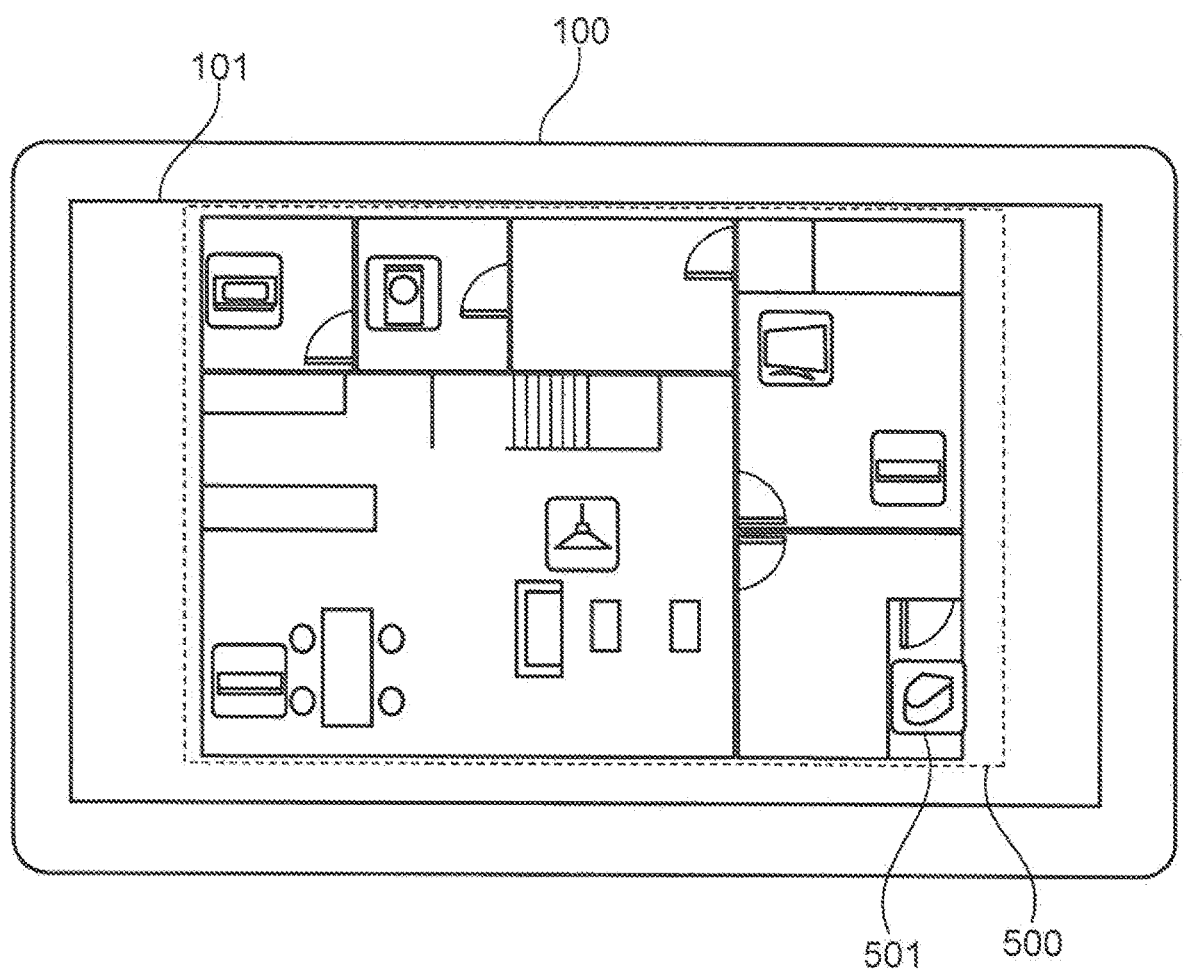
FIG. 72 is a diagram showing an example of a basic screen that is displayed on a display of a home controller.
Figure 73:
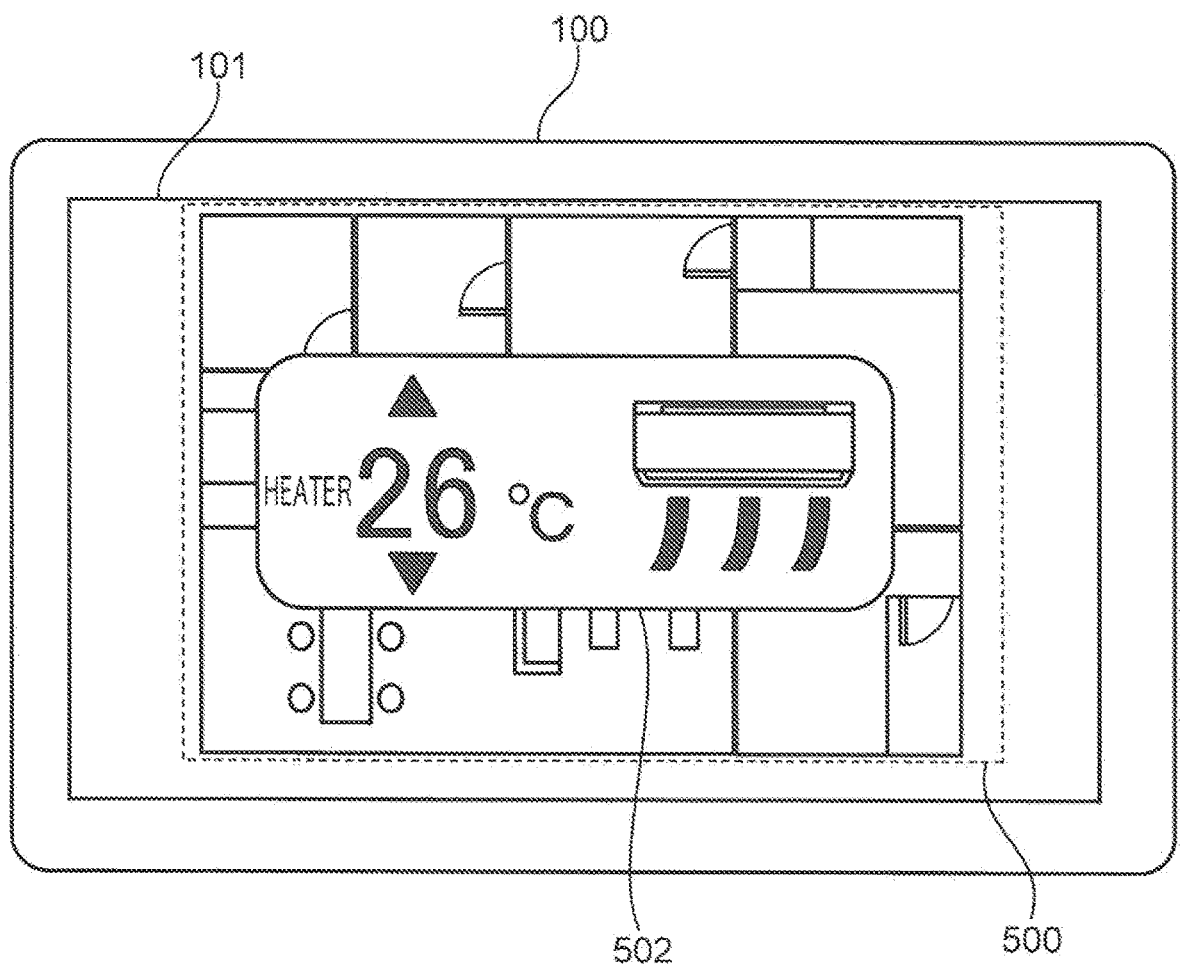
FIG. 73 is a diagram showing a configuration of a display state of a device control screen of a home controller.

FIG. 72 is a diagram showing an example of a basic screen that is displayed on the display 101 of the home controller 100, and FIG. 73 is a diagram showing a configuration of a display state of the device control screen 502 of the home controller 100.

On the basic screen shown in FIG. 72, when the touch panel control section 102 senses that the user has selected the device icon 501, the display control section 103 displays the device control screen 502 corresponding to the selected device icon 501 on the display 101. The device control screen 502 is unique to each device 200 and is a control screen for controlling the device 200 or performing state confirmation of the device 200. For example, FIG. 73 shows an example where a device icon of an air conditioner has been selected by the user, in which case a temperature setting or an air flow direction of the air conditioner is controlled using the device control screen 502 of the air conditioner. Moreover, in FIG. 73, while a device icon is not arranged on the display 101, a device icon may be displayed outside of a display region of the device control screen 502 as shown in FIGS. 11 to 16.

Next, a flow of a process for newly registering a device 200 in a home control system (information management system) will be described with reference to the drawings. The home control system connects to a network which controls one or more target devices managed in association with a same building ID, and manages information of the one or more target devices.

FIG. 74 is a sequence diagram showing a flow of a displaying process for displaying a device icon corresponding to a device to be newly registered on a floor plan.

First, when the device 200 is newly arranged in a prescribed room inside the house, the communication control section 217 of the device 200 transmits a device new registration request to the server 300 (S70301).

Figure 75A:
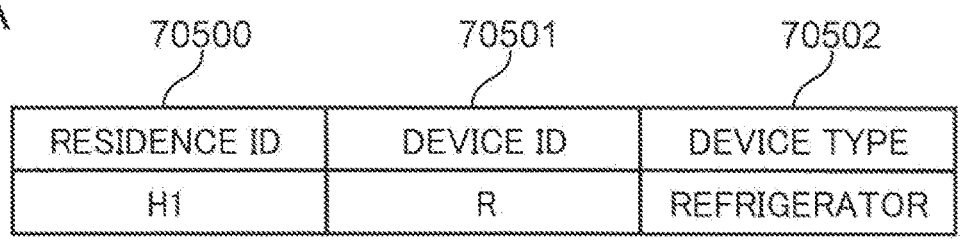
FIG. 75A is a diagram showing an example of a device new registration request that is transmitted when a refrigerator is newly registered.
Figure 75B:
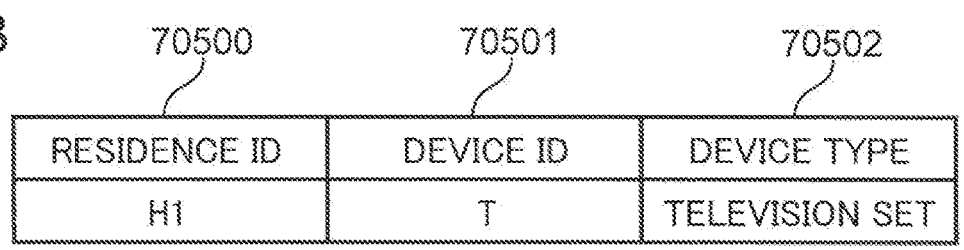
FIG. 75B is a diagram showing an example of a device new registration request that is transmitted when a television set is newly registered.
Figure 75C:
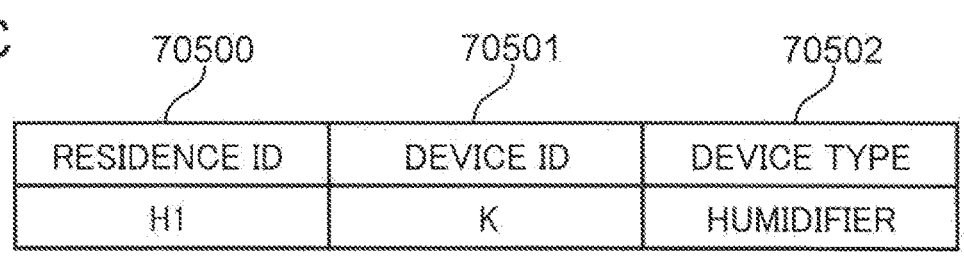
FIG. 75C is a diagram showing an example of a device new registration request that is transmitted when a humidifier is newly registered.

FIG. 75A is a diagram showing an example of a device new registration request that is transmitted when a refrigerator is newly registered, FIG. 75B is a diagram showing an example of a device new registration request that is transmitted when a television set is newly registered, and FIG. 75C is a diagram showing an example of a device new registration request that is transmitted when a humidifier is newly registered. As shown in FIGS. 75A to 75C, the device new registration request includes a residence ID 70500 for identifying a residence in which the device 200 is arranged, a device ID 70501 for identifying the device 200, and a device type 70502 for identifying a type of the device 200.

When the device 200 is newly arranged in a prescribed room inside the house, the communication control section 217 of the device 200 inquires a residence ID to the home controller 100, acquires the residence ID from the home controller 100, and creates a device new registration request.

Moreover, while the communication control section 217 of the device 200 acquires the residence ID from the home controller 100 in the present embodiment, the present disclosure is not particularly limited thereto. When the device 200 and the server 300 are connected to each other via a gateway installed in the home, the gateway may provide the residence ID. Specifically, the communication control section 217 of the device 200 may transmit a device new registration request including the device ID 70501 and the device type 70502, and the gateway may include the residence ID in the device new registration request from the device 200 and transmit the device new registration request to the server 300. Alternatively, the device 200 may accept input of a residence ID by the user.

Next, the device control section 302 of the server 300 receives the device new registration request from the device 200 and performs an initial arrangement deciding process for deciding an arrangement position on the floor plan of a device icon corresponding to the device 200 to be newly registered (S70302). Moreover, the initial arrangement deciding process by the server 300 will be described later.

The device control section 302 of the server 300 then transmits arrangement information indicating the arrangement position of the device icon decided by the initial arrangement deciding process to the home controller 100 (S70303).

Next, the display control section 103 of the home controller 100 receives the arrangement information transmitted by the server 300, displays a device icon corresponding to the newly registered device 200 on the floor plan based on the received arrangement information, and updates the display screen (S70304).

The initial arrangement deciding process shown in FIG. 74 will now be described in greater detail.

Figure 76:
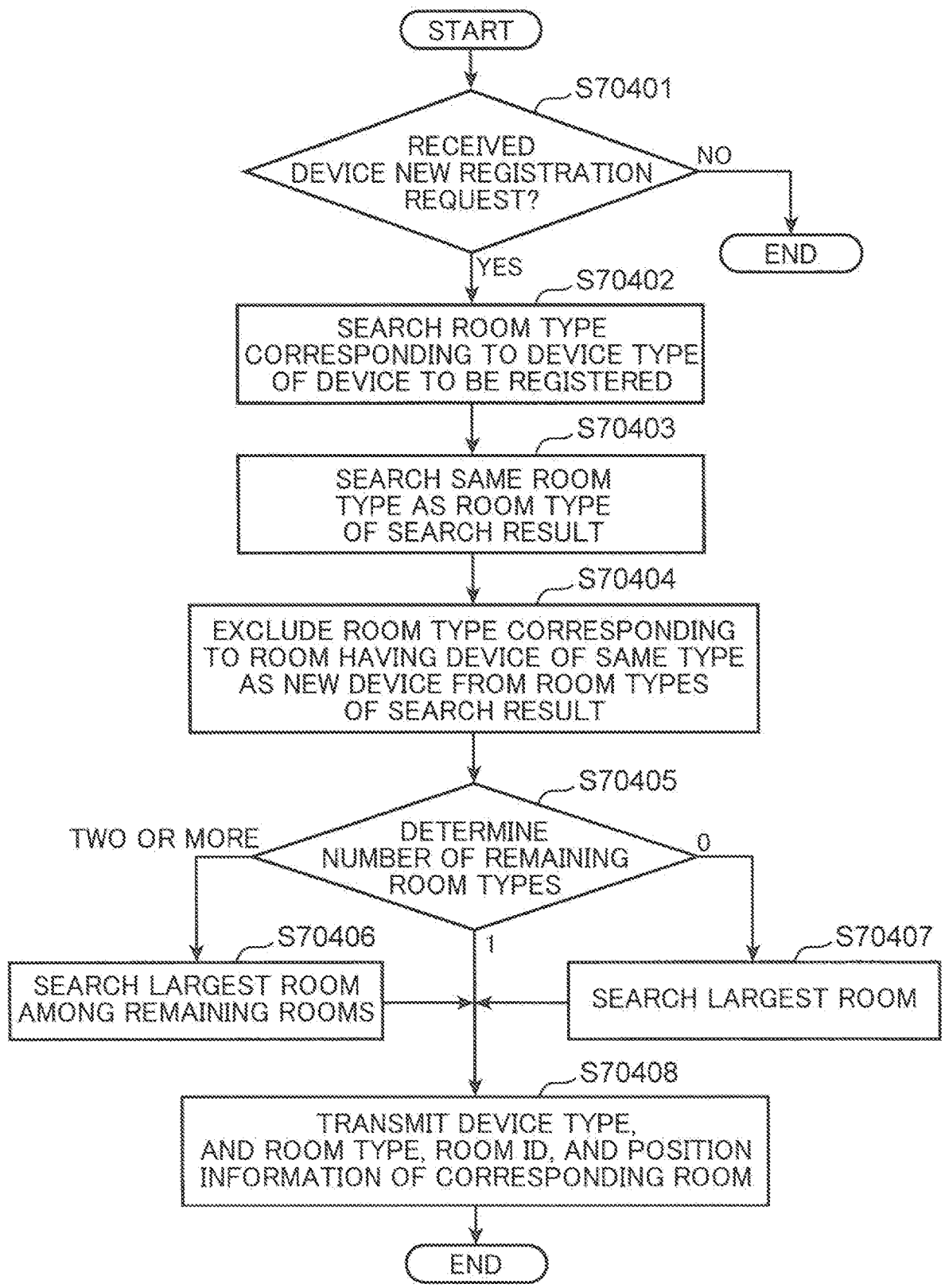
FIG. 76 is a flow chart for explaining an initial arrangement deciding process by a server.

FIG. 76 is a flow chart for explaining an initial arrangement deciding process by the server 300.

First, the device control section 302 determines whether or not the device new registration request from the device 200 has been received (S70401). The server 300 receives, from one target device among the one or more target devices via the network, a device new registration request (registration notification information) representing that the one target device has been newly registered in the home control system (information management system).

At this point, when it is determined that the device new registration request from the device 200 has not been received (NO in S70401), the process is finished.

On the other hand, when it is determined that the device new registration request from the device 200 has been received (YES in S70401), the device control section 302 searches for a room type corresponding to the device type of the device 200 to be registered (S70402). In this case, the storage section 304 of the server 300 stores, in advance, a reference table that associates a device type and a room type with each other.

FIG. 77 is a diagram showing an example of a reference table 70600 that associates a device type 70601 and a room type 70602 with each other. As shown in FIG. 77, the device type 70601 and the room type 70602 are associated with each other. The storage section 304 is constituted by one memory and manages the device type 70601 (first information) indicating types of one or more device icons representing the one or more target devices and the room type 70602 (second information) indicating an attribute of each of the one or more rooms in association with each other. For example, the room type "kitchen" is associated with the device type "refrigerator", the room type "toilet" is associated with the device type "toilet seat apparatus", the room types "living room" and "bedroom" are associated with the device type "air conditioner", and the room types "living room", "child room", and "bedroom" are associated with the device type "television set".

In the example shown in FIG. 77, the refrigerator and the toilet seat apparatus are respectively constituted by one tuple, the air conditioner is constituted by two tuples, and the television set is constituted by three tuples. Moreover, in the case of a device type such as a humidifier for which a room where the device type is arranged is not specified, a room type need not be associated. Specifically, the storage section 304 does not store data that associates the device type "humidifier" with a room type.

The device control section 302 searches for a room type corresponding to the device type 70502 included in the received device new registration request in the reference table 70600.

Moreover, while FIG. 77 shows one memory managing a device type and a room type in association with each other, the present disclosure is not particularly limited thereto and two or more memories may manage a device type and a room type in association with each other.

FIGS. 78A to 78C are diagrams showing an example in which device types and room types are managed by three reference tables. FIG. 78A is a diagram showing an example of a first reference table 706001 that associates a device ID 706011 and a device type name 706012 with each other, FIG. 78B is a diagram showing an example of a second reference table 706002 that associates a room ID 706013 and a room type name 706014 with each other, and FIG. 78C is a diagram showing an example of a third reference table 706003 that associates a device ID 706015 and a room ID 706016 with each other.

The first reference table 706001 associates the device ID 706011 for identifying the device 200 and the device type name 706012 representing the name of the type of the device 200 with each other. The second reference table 706002 associates the room ID 706013 for identifying a room and the room type name 706014 representing the name of an attribute of the room with each other. The third reference table 706003 associates the device ID 706015 for identifying the device 200 and the room ID 706016 for identifying a room with each other. The first reference table 706001, the second reference table 706002, and the third reference table 706003 may be respectively stored in different memories.

The device control section 302 searches for a room ID corresponding to the device ID 70501 included in the received device new registration request in the third reference table 706003 and searches for a room type name corresponding to the searched room ID in the second reference table 706002.

Next, the device control section 302 searches for a same room type as the room type that is the search result in currently registered room information (S70403).

Figure 79:
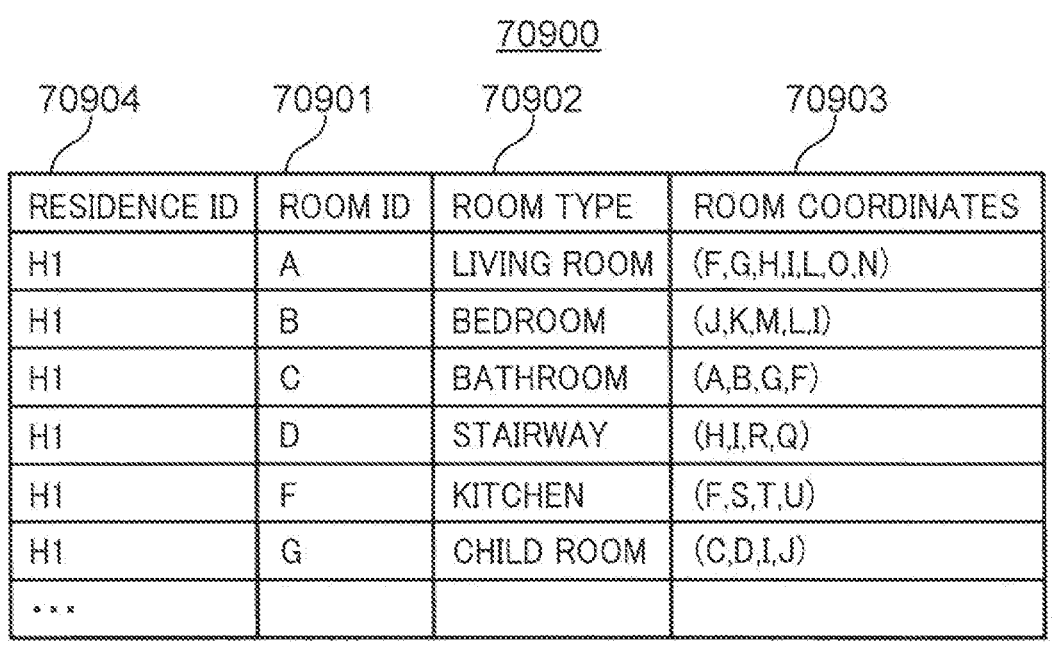
FIG. 79 is a diagram showing an example of room information.

FIG. 79 is a diagram showing an example of room information 70900. The room information 70900 includes a residence ID 70904, a room ID 70901, a room type 70902, and room coordinates 70903. The residence ID 70904 is an identifier for identifying a residence. The room ID 70901 is an identifier for identifying a room on the floor plan 500. The room type 70902 indicates a type of the room. The room coordinates 70903 are expressed by a set of vertex IDs and decide an area of a room on the floor plan 500. For example, a room of which room ID is C is a bathroom and indicates a region formed by connecting vertex IDs in a sequence of A, B, C, and F on the floor plan 500.

The device control section 302 searches for a same room type as the room type that is the search result in currently registered room information 70900.

Next, the device control section 302 excludes a room type corresponding to a room in which a device of a same type as the device 200 to be newly registered is already installed from the room types that are the search result (S70404). The chance of the newly registered device 200 being installed is low in a room in which a device of a same type as the device 200 to be newly registered is already installed. Therefore, a room in which a device of a same type as the device 200 to be newly registered is already installed is excluded from installation candidates of the device 200 to be newly registered.

FIG. 80 is a diagram showing a device list 70700 that is managed by the server 300. As shown in FIG. 80, the device list 70700 includes a residence ID 70706, a device ID 70701, a device type 70702, a model number 70703, a room ID 70704, and an arrangement 70705.

The residence ID 70706 is an identifier of a residence. The device ID 70701 is an identifier of the device 200. The device type 70702 indicates a type of the device 200. The model number 70703 indicates a model number of the device 200. The room ID 70704 is an identifier of a room in which the device 200 is installed. The arrangement 70705 is coordinates which are expressed by an (X coordinate, Y coordinate, floor number) format and indicates an arrangement position on the floor plan 500 of the device icon 501 corresponding to the device 200. Moreover, the device list 70700 may include capability information 4705 and a control command transmission destination 4706 as shown in FIG. 34. Alternatively, the device list 70700 may include a room type representing an attribute of a room in which the device 200 is to be arranged.

The device control section 302 refers to the device list 70700, identifies a room ID corresponding to a same device type as the device type of the device 200 to be newly registered, and identifies a room type corresponding to the identified room ID. The device control section 302 excludes the identified room type from the room types searched in step S70403.

Next, the device control section 302 determines the number of remaining room types (S70405). In this case, when it is determined that the number of remaining room types is two or more ("two or more" in S70405), the device control section 302 searches for a largest room among the remaining room types (S70406). At this point, the device control section 302 searches for room IDs of the remaining room types and calculates an area of each room of the remaining room types based on vertex information 70800 and room information 70900. In addition, the device control section 302 searches for a room with the largest area among the calculated areas of the respective rooms of the remaining room types.

Figure 81:
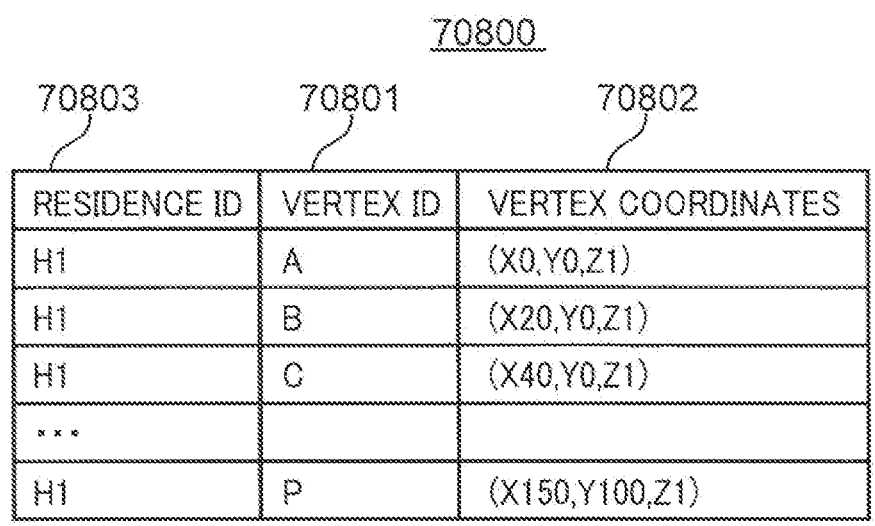
FIG. 81 is a diagram showing an example of vertex information.

FIG. 81 is a diagram showing an example of the vertex information 70800. As shown in FIG. 81, the vertex information 70800 includes a residence ID 70803, a vertex ID 70801, and vertex coordinates 70802. The residence ID 70803 is an identifier of a residence. The vertex ID 70801 is an identifier for identifying a vertex on the floor plan 500. The vertex coordinates 70802 are coordinates expressed by a (X coordinate, Y coordinate, floor number) format and determine a position of a vertex such as a partition line shown on the floor plan 500. For example, since a vertex of which vertex ID is B has vertex coordinates expressed as (X20, Y0, Z1), the vertex represents a position on the first floor (floor 1) of which X coordinate is 20 and Y coordinate is 0.

Figure 82:
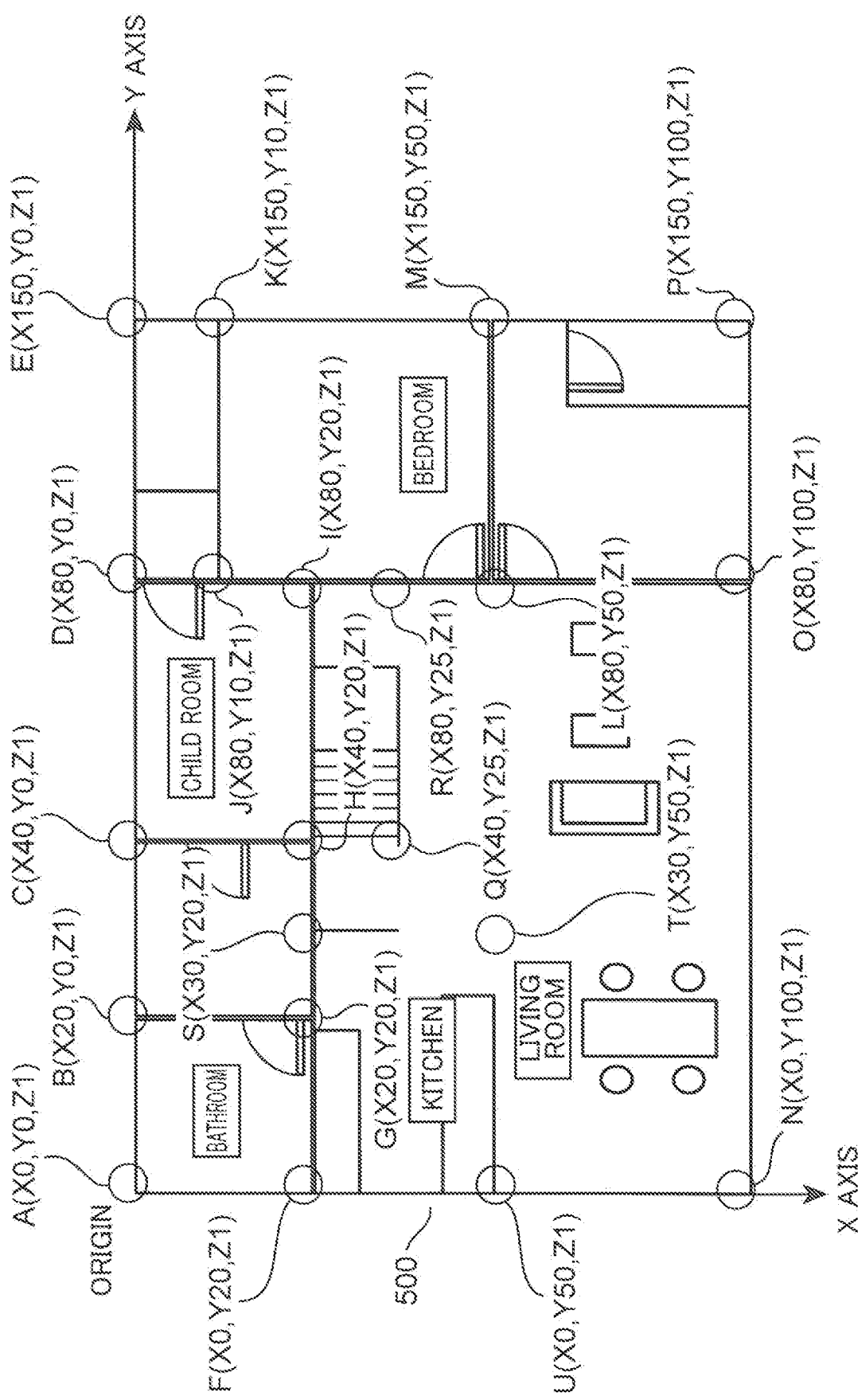
FIG. 82 is a diagram showing a correspondence relationship between each vertex registered in vertex information and a floor plan.

FIG. 82 is a diagram showing a correspondence relationship between each vertex registered in the vertex information 70800 and the floor plan 500. Note that, in FIG. 82, a top left vertex of the floor plan 500 is assumed to be an origin (both X coordinate and Y coordinate are 0). For example, since vertex coordinates of a vertex with a vertex ID of A are expressed as (X0, Y0, Z1), the vertex is positioned on the origin. In addition, since vertex coordinates of a vertex with a vertex ID of B are expressed as (X20, Y0, Z1), the vertex is positioned at a top right vertex of the bathroom.

The server 300 includes the vertex information 70800 and the room information 70900. Therefore, by plotting vertices indicated by the vertex information 70800 on image data of the floor plan 500 and connecting vertices indicated by room coordinates 70903 in the room information 70900, the device control section 302 can identify a region of a room represented on the floor plan 500 and calculate an area of the identified region.

On the other hand, when it is determined that the number of remaining room types is zero ("zero" in S70405), the device control section 302 searches for a largest room among all rooms (S70407). At this point, the device control section 302 calculates areas of all rooms based on the vertex information 70800 and the room information 70900. In addition, the device control section 302 searches for a room with the largest area among the areas of all rooms.

In addition, when it is determined that the number of remaining room types is one ("one" in S70405), when a largest room among the remaining room types is searched in step S70406 or when a largest room among all rooms is searched in step S70407, the device control section 302 transmits arrangement information including a device type indicating a type of the device icon, a room type of a corresponding room, a room ID of the corresponding room, and position information representing a position of the corresponding room on the floor plan to the home controller 100 (S70408).

Moreover, in a similar manner to the room coordinates 70903, position information is expressed by a set of vertex IDs 70801 and indicates a room on the floor plan 500 in which is displayed a device icon 501 corresponding to the device 200 to be newly registered. In addition, for example, an arrangement position of the device icon 501 corresponding to the device 200 to be newly registered is decided at a position that does not overlap with other device icons in the room.

When it is determined that the number of remaining room types is one, the device control section 302 searches for a room ID and position information of the one remaining room type and transmits arrangement information including a device type indicating a type of the device icon, the one remaining room type, the searched room ID, and position information representing coordinates of the one remaining room to the home controller 100.

In addition, when a largest room among the remaining room types is searched in step S70406, the device control section 302 transmits arrangement information including a device type indicating a type of the device icon, a room type of the largest room among the remaining room types, a room ID of the largest room among the remaining room types, and position information representing coordinates of the largest room among the remaining room types to the home controller 100.

Furthermore, when a largest room among all rooms is searched in step S70407, the device control section 302 transmits arrangement information including a device type indicating a type of the device icon, a room type of the largest room among the rooms, a room ID of the largest room among the rooms, and position information representing coordinates of the largest room among the rooms to the home controller 100.

Moreover, the device control section 302 may store a room type of a corresponding room, a room ID of the corresponding room, and position information representing coordinates of the corresponding room in the device list 70700.

As described above, using one or two or more memories that manage, in association with each other, the device type 70601 (first information) indicating types of one or more device icons representing each of one or more target devices and the room type 70602 (second information) indicating an attribute of each of the one or more rooms included in a display screen representing a floor plan of a residence (building) indicated by a residence ID (building ID), an attribute of a room corresponding to a type of a device icon representing one target device is determined based on the received device new registration request (registration notification information).

In addition, a device type (third information) indicating a type of a device icon representing the one target device and a room type (fourth information) indicating the determined attribute of the room are transmitted via the network to the home controller 100 (information apparatus) which is managed in association with the same residence ID and which displays a display screen representing the floor plan 500 on the display 101. Based on the device type (third information) and the room type (fourth information), the device icon representing the one target device is displayed in a region on the display screen corresponding to a room that corresponds to the device icon on the display 101 of the home controller 100 (information apparatus).

Furthermore, the one or two or more memories further manage position information (fifth information) of each of one or more rooms on the floor plan. Using the position information (fifth information), position information indicating a region corresponding to a room that corresponds to a type of the device icon representing the one target device is determined. In addition, the determined position information is transmitted to the home controller 100 (information apparatus) via the network. Based on the transmitted position information, the device icon representing the one target device is displayed in a region on the display screen corresponding to a room that corresponds to the device icon on the display 101 of the home controller 100 (information apparatus).

Moreover, based on the device type 70601 (first information), when it is determined that the device icon representing the one target device may potentially correspond to a plurality of rooms among the one or more rooms, a largest room among the plurality of potentially corresponding rooms is determined as the room corresponding to a type of the device icon representing the one target device. Subsequently, a room type (fourth information) indicating the determined attribute of the room is transmitted to the home controller 100 (information apparatus) via the network.

A specific displaying process of a device icon will now be described.

Figure 83:
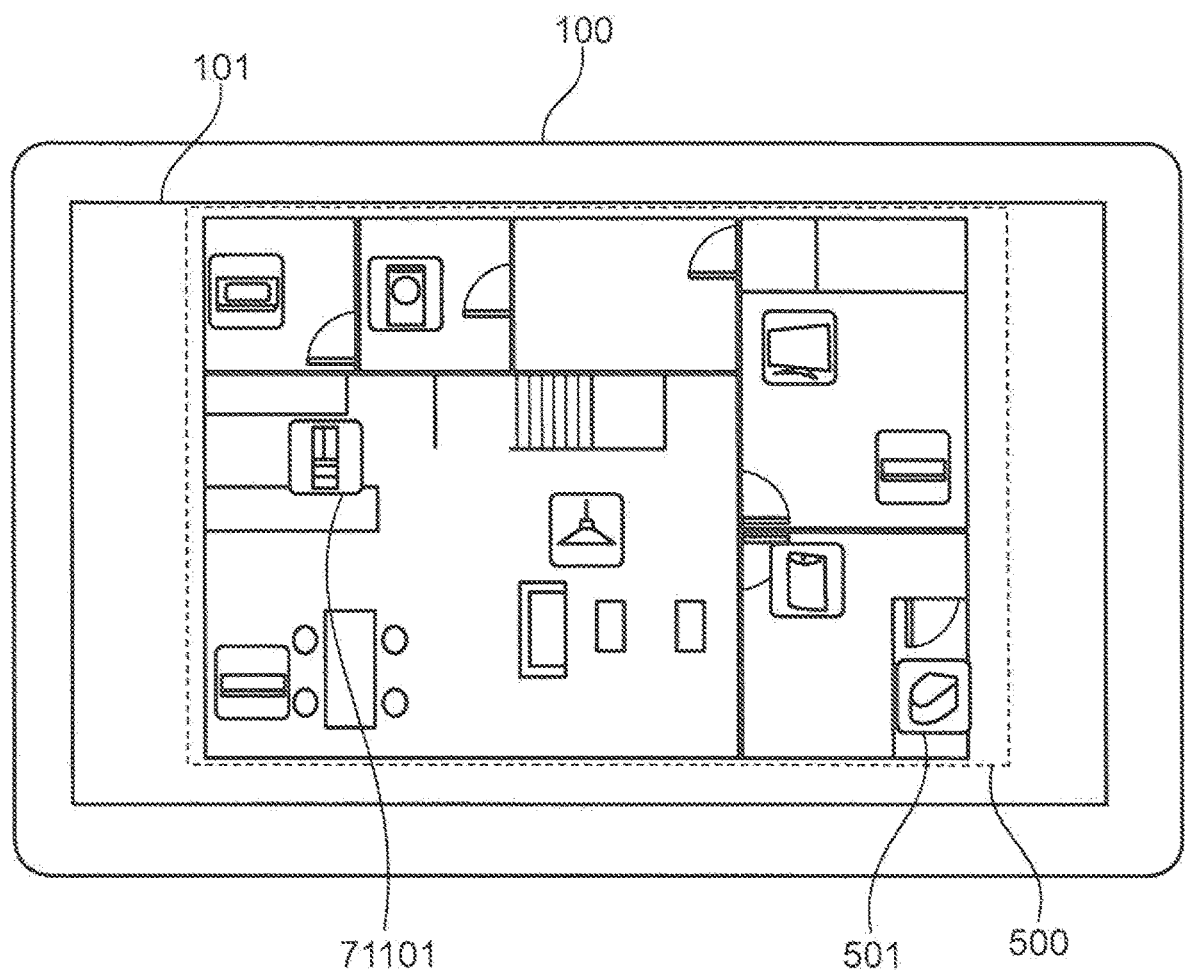
FIG. 83 is a diagram showing an example of a display screen of a home controller when a device to be newly registered is a refrigerator.

FIG. 83 is a diagram showing an example of a display screen of a home controller when a device to be newly registered is a refrigerator. In the following description, the device to be newly registered is a refrigerator and the device list 70700 does not store data corresponding to the refrigerator. In addition, only the room type "kitchen" is associated with the device type "refrigerator".

First, the device control section 302 determines whether or not a device new registration request has been received from the refrigerator that has been newly installed in the residence. In this case, the server 300 receives the device new registration request shown in FIG. 75A from the refrigerator.

Next, the device control section 302 searches for a room type corresponding to the device type 70502 included in the received device new registration request in the reference table 70600 (FIG. 77). In this case, since the device type 70502 is a refrigerator, the device control section 302 extracts the room type "kitchen" from the reference table 70600.

The device control section 302 then searches for a same room type as the room type that is the search result in currently registered room information 70900 (FIG. 79). In this case, since the room type that is the search result is the kitchen, the device control section 302 selects the kitchen from the room information 70900.

Next, the device control section 302 excludes a room type corresponding to a room in which a device of a same type as the device 200 to be newly registered is already installed from the room types that are the search result. In this case, since the refrigerator is not stored in the device list 70700, only the room type that is the search result (kitchen) is retained.

Therefore, the number of remaining room types is determined as one, and the device control section 302 searches for a room ID (F) and position information (room coordinates) of the one remaining room type (kitchen). Subsequently, the device control section 302 transmits arrangement information including a device type (refrigerator) indicating a type of the device icon, the one remaining room type (kitchen), the searched room ID, and position information representing coordinates of the one remaining room to the home controller 100.

Upon receiving the arrangement information, the display control section 103 of the home controller 100 displays a device icon 71101 of the newly registered refrigerator on the floor plan 500 based on the arrangement information. In this case, the device icon 71101 of the refrigerator is displayed in a region on the display screen corresponding to the kitchen. In this manner, since a room corresponding to the refrigerator is uniquely determined, the device icon 71101 of the refrigerator is displayed in the kitchen.

As described above, when the device icon representing one target device is determined to be a refrigerator icon representing a refrigerator based on the device type 70601 (first information) indicating types of one or more device icons presenting each of one or more target devices, the refrigerator icon is displayed in a region on the display screen corresponding to the kitchen.

Figure 84:
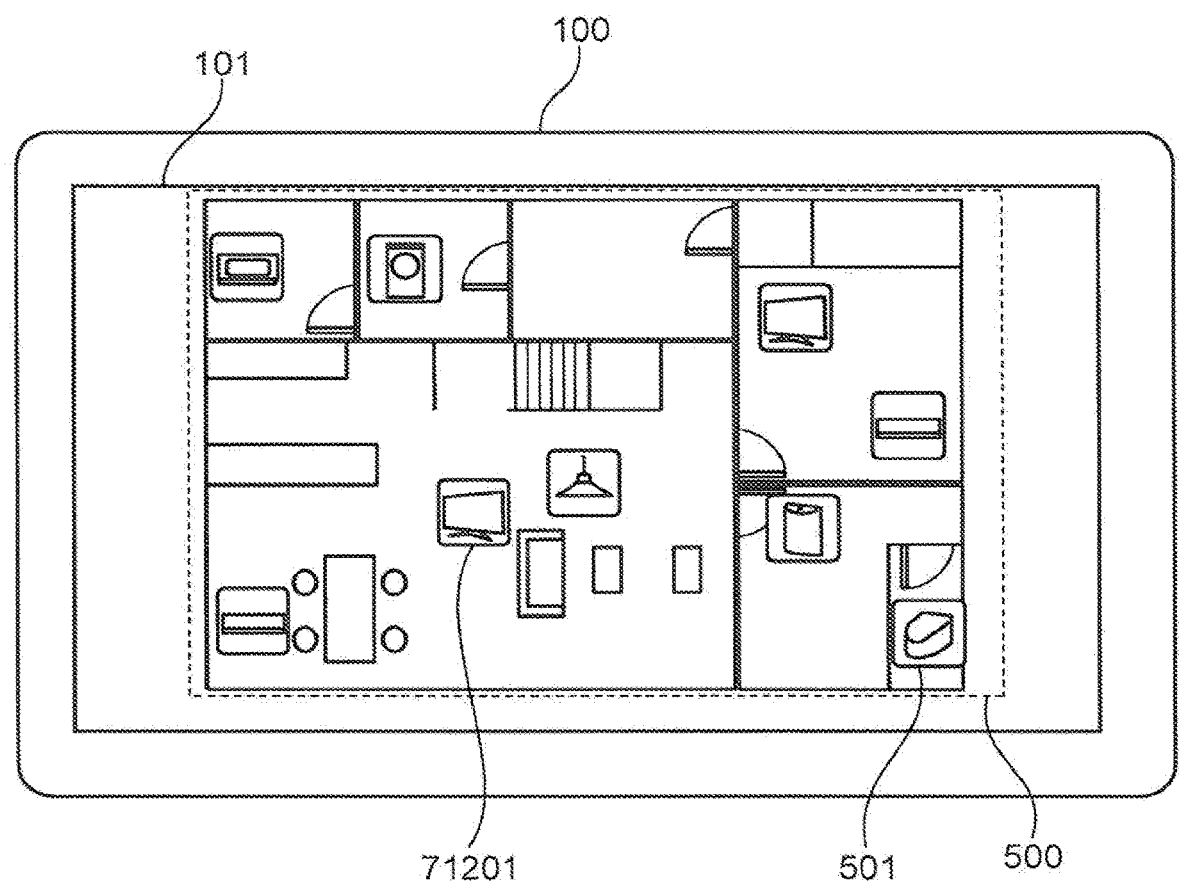
FIG. 84 is a diagram showing an example of a display screen of a home controller when a device to be newly registered is a television set.

FIG. 84 is a diagram showing an example of a display screen of a home controller when a device to be newly registered is a television set. In the following description, the device to be newly registered is a television set and the device list 70700 stores data representing that one television set is already arranged in the bedroom. In addition, the room types "living room", "child room", and "bedroom" are associated with the device type "television set".

First, the device control section 302 determines whether or not a device new registration request has been received from the television set that has been newly installed in the residence. In this case, the server 300 receives the device new registration request shown in FIG. 75B from the television set.

Next, the device control section 302 searches for a room type corresponding to the device type 70502 included in the received device new registration request in the reference table 70600 (FIG. 77). In this case, since the device type 70502 is a television set, the device control section 302 extracts the three room types "living room", "child room", and "bedroom" from the reference table 70600.

The device control section 302 then searches for a same room type as the room type that is the search result in currently registered room information 70900 (FIG. 79). In this case, since the room types that are the search result are the living room, the child room, and the bedroom, the device control section 302 searches for the living room, the child room, and the bedroom in the room information 70900.

Next, the device control section 302 excludes a room type corresponding to a room in which a device of a same type as the device 200 to be newly registered is already installed from the room types that are the search result. In this case, since a television set is already arranged in the bedroom, the living room and the child room remain among the room types that are the search result.

Therefore, a determination is made that the number of remaining room types is two or more, and the device control section 302 searches for the room IDs of the remaining room types and calculates an area of each room of the remaining room types based on the vertex information 70800 and the room information 70900. In this case, since the two remaining room types are the living room and the child room, the device control section 302 calculates the areas of the living room and the child room.

In addition, the device control section 302 searches for a room with the largest area among the calculated areas of the respective rooms of the remaining room types. In this case, since the area of the living room is larger than the area of the child room, the device control section 302 selects the living room as the room with the largest area among the areas of the respective rooms of the remaining room types. Subsequently, the device control section 302 transmits arrangement information including a device type (television set) indicating a type of the device icon, a room type (living room) of a largest room among the remaining room types, a room ID of the largest room among the remaining room types, and position information representing coordinates of the largest room among the remaining room types to the home controller 100.

Upon receiving the arrangement information, the display control section 103 of the home controller 100 displays a device icon 71201 of the newly registered television set on the floor plan 500 based on the arrangement information. In this case, the device icon 71201 of the television set is displayed in a region on the display screen corresponding to the living room. In this manner, since there are two or more rooms corresponding to the television set, the device icon 71201 of the television set is displayed in the living room that is the largest room among the two or more rooms (the living room and the child room).

As described above, when the device icon representing one target device is determined to be a television set icon representing a television set based on the device type 70601 (first information) indicating types of one or more device icons representing each of one or more target devices, the television set icon is displayed in a region on the display screen corresponding to the living room.

Figure 85:
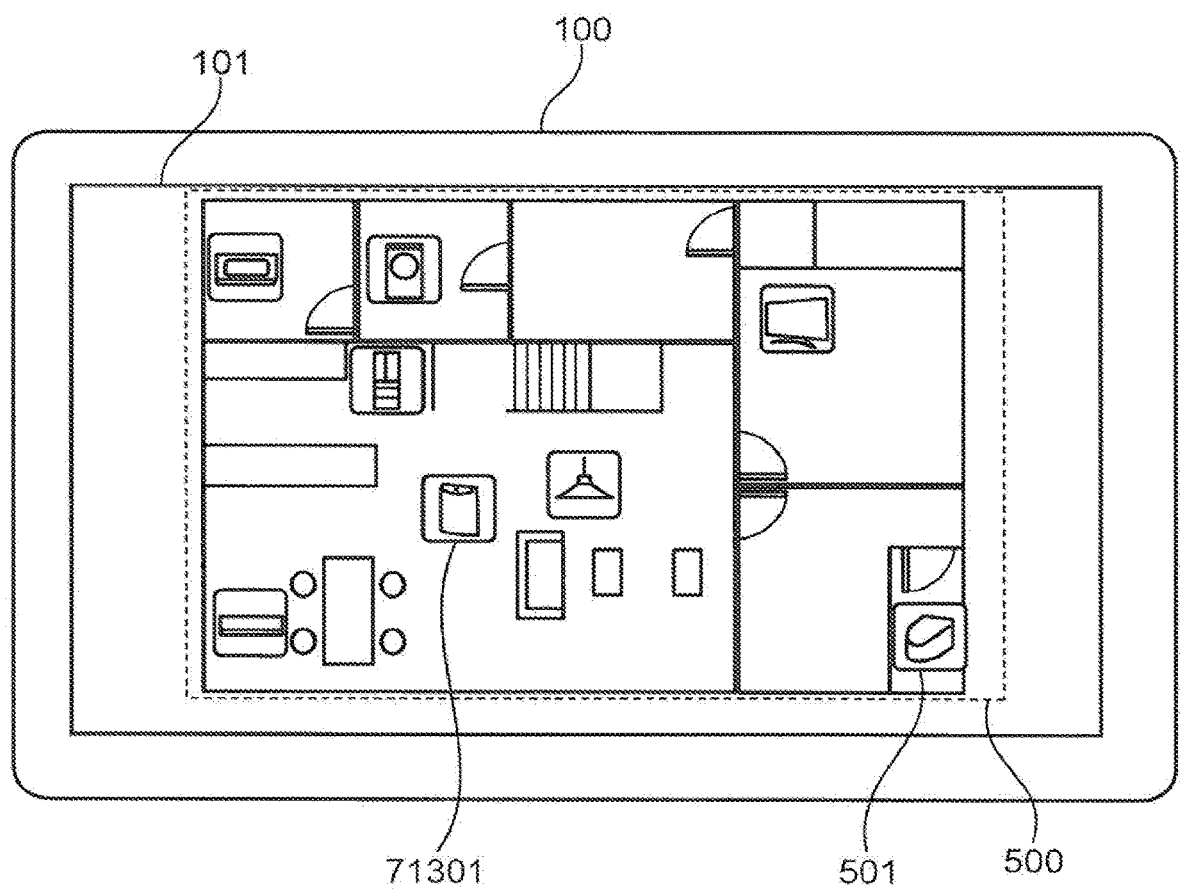
FIG. 85 is a diagram showing an example of a display screen of a home controller when a device to be newly registered is a humidifier.

FIG. 85 is a diagram showing an example of a display screen of a home controller when a device to be newly registered is a humidifier. In the following description, the device to be newly registered is a humidifier and the device list 70700 does not store data corresponding to the humidifier. In addition, a room type is not associated with the device type "humidifier".

First, the device control section 302 determines whether or not a device new registration request has been received from the humidifier that has been newly installed in the residence. In this case, the server 300 receives the device new registration request shown in FIG. 75C from the humidifier.

Next, the device control section 302 searches for a room type corresponding to the device type 70502 included in the received device new registration request in the reference table 70600 (FIG. 77). In this case, while the device type 70502 is the humidifier, there is no room type corresponding to the "humidifier" in the reference table 70600. Therefore, the device control section 302 does not extract a room type corresponding to the humidifier.

The device control section 302 then searches for a same room type as the room type that is the search result in currently registered room information 70900 (FIG. 79). In this case, since there is no room type that is the search result, the device control section 302 does not select a room type from the room information 70900.

Next, the device control section 302 excludes a room type corresponding to a room in which a device of a same type as the device 200 to be newly registered is already installed from the room types that are the search result. In this case, since the humidifier is not stored in the device list 70700 and there is no corresponding room type, no room type remains.

Therefore, the number of remaining room types is determined as zero and the device control section 302 calculates areas of all rooms based on the vertex information 70800 and the room information 70900. In addition, the device control section 302 searches for a room with the largest area among the areas of all rooms. In this case, since the area of the living room is larger than the areas of other rooms, the device control section 302 selects the living room as the room with the largest area among the areas of all rooms. Subsequently, the device control section 302 transmits arrangement information including a device type (humidifier) indicating a type of the device icon, a room type (living room) of a largest room among all room types, a room ID of the largest room among all room types, and position information representing coordinates of the largest room among all room types to the home controller 100.

Upon receiving the arrangement information, the display control section 103 of the home controller 100 displays a device icon 71301 of the newly registered humidifier on the floor plan 500 based on the arrangement information. In this case, the device icon 71301 of the humidifier is displayed in a region on the display screen corresponding to the living room. As described above, since the humidifier does not have a corresponding room, the device icon 71301 of the humidifier is displayed in the living room that is a largest room among all rooms.

Next, another example of the initial arrangement deciding process shown in FIG. 74 will be described.

Figure 86:
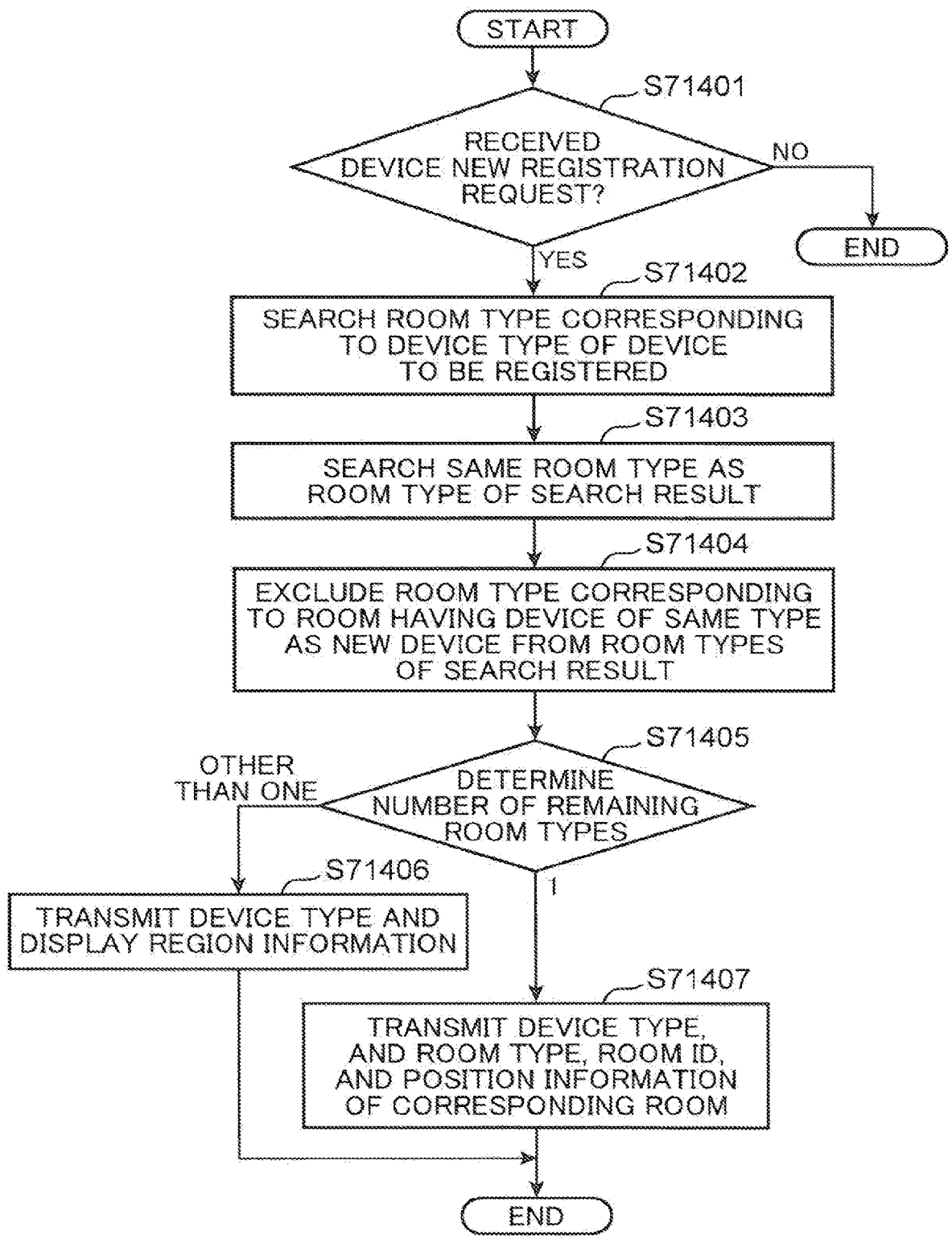
FIG. 86 is a flow chart for explaining another example of an initial arrangement deciding process by a server.

FIG. 86 is a flow chart for explaining another example of the initial arrangement deciding process by the server 300. Since the process performed in steps S71401 to S71404 in FIG. 86 is the same as the process performed in steps S70401 to S70404 shown in FIG. 76, a description thereof will be omitted.

The device control section 302 determines the number of remaining room types (S71405). In this case, when the number of remaining room types is determined to be other than one or, in other words, when the number of remaining room types is determined to be zero or two or more ("other than one" in S71405), the device control section 302 transmits arrangement information including a device type indicating a type of a device icon representing one target device and display region information indicating a prescribed region on the display screen (S71406).

Moreover, for example, the prescribed region on the display screen is a region outside the display region of the floor plan 500 in the display screen.

On the other hand, when it is determined that the number of remaining room types is one ("one" in S71405), the device control section 302 searches for a room ID and position information of the one remaining room type and transmits arrangement information including a device type indicating a type of the device icon, a room type of a corresponding room, a room ID of the corresponding room, and position information representing a position of the corresponding room on the floor plan to the home controller 100 (S71407).

As described above, when there is a room corresponding to a type of a device icon representing one target device, a device type (third information) indicating a type of the device icon representing one target device and a room type (fourth information) indicating the determined attribute of the room are transmitted via the network to the home controller 100 (information apparatus) which is managed in association with the same residence ID (building ID) and which displays a display screen representing the floor plan on the display. Meanwhile, when there is no room corresponding to the type of the device icon representing the one target device, a device type (third information) indicating a type of the device icon representing the one target device and display region information (fifth information) indicating a prescribed region on the display screen are transmitted via the network to the home controller 100 (information apparatus).

Subsequently, based on the device type (third information) and the room type (fourth information), the device icon representing the one target device is displayed in a region on the display screen corresponding to a room that corresponds to the device icon on the display 101 of the home controller 100 (information apparatus). In addition, based on the device type (third information) and the display region information (fifth information), the device icon representing the one target device is displayed in a region on the display screen corresponding to the prescribed region.

A specific displaying process of a device icon will now be described.

Figure 87:
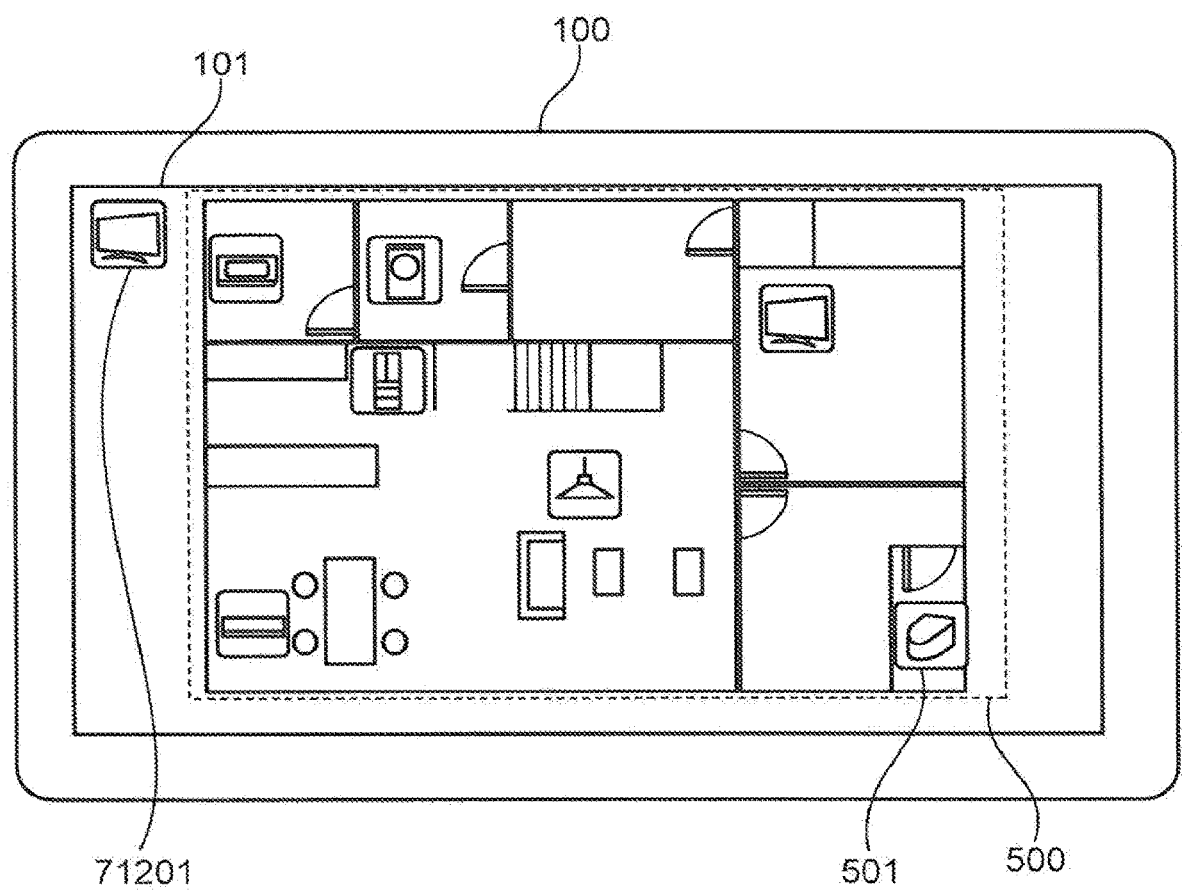
FIG. 87 is a diagram showing an example of a display screen of a home controller when a device to be newly registered is a television set.

FIG. 87 is a diagram showing an example of a display screen of a home controller when a device to be newly registered is a television set. In the following description, the device to be newly registered is a television set and the device list 70700 stores data representing that one television set is already arranged in the bedroom. In addition, the room types "living room", "child room", and "bedroom" are associated with the device type "television set".

Moreover, a process up to determining the number of remaining room types is the same as the process described with reference to FIG. 84.

The device control section 302 excludes a room type corresponding to a room in which a device of a same type as the device 200 to be newly registered is already installed from the room types that are the search result. In this case, since a television set is already arranged in the bedroom, the living room and the child room remain among the room types that are the search result.

Therefore, the number of remaining room types is determined to be other than one and the device control section 302 transmits arrangement information including a device type (television set) indicating a type of a device icon representing the one target device and display region information indicating a prescribed region on the display screen to the home controller 100. Moreover, the prescribed region on the display screen is a region outside the display region of the floor plan 500.

Upon receiving the arrangement information, the display control section 103 of the home controller 100 displays the device icon 71201 of the newly registered television set on the display 101 based on the arrangement information. In this case, the device icon 71201 of the television set is displayed in a region outside the display region of the floor plan 500. As described above, since there are two or more rooms corresponding to the television set, the device icon 71201 of the television set is displayed in a region outside the display region of the floor plan 500.

Figure 88:
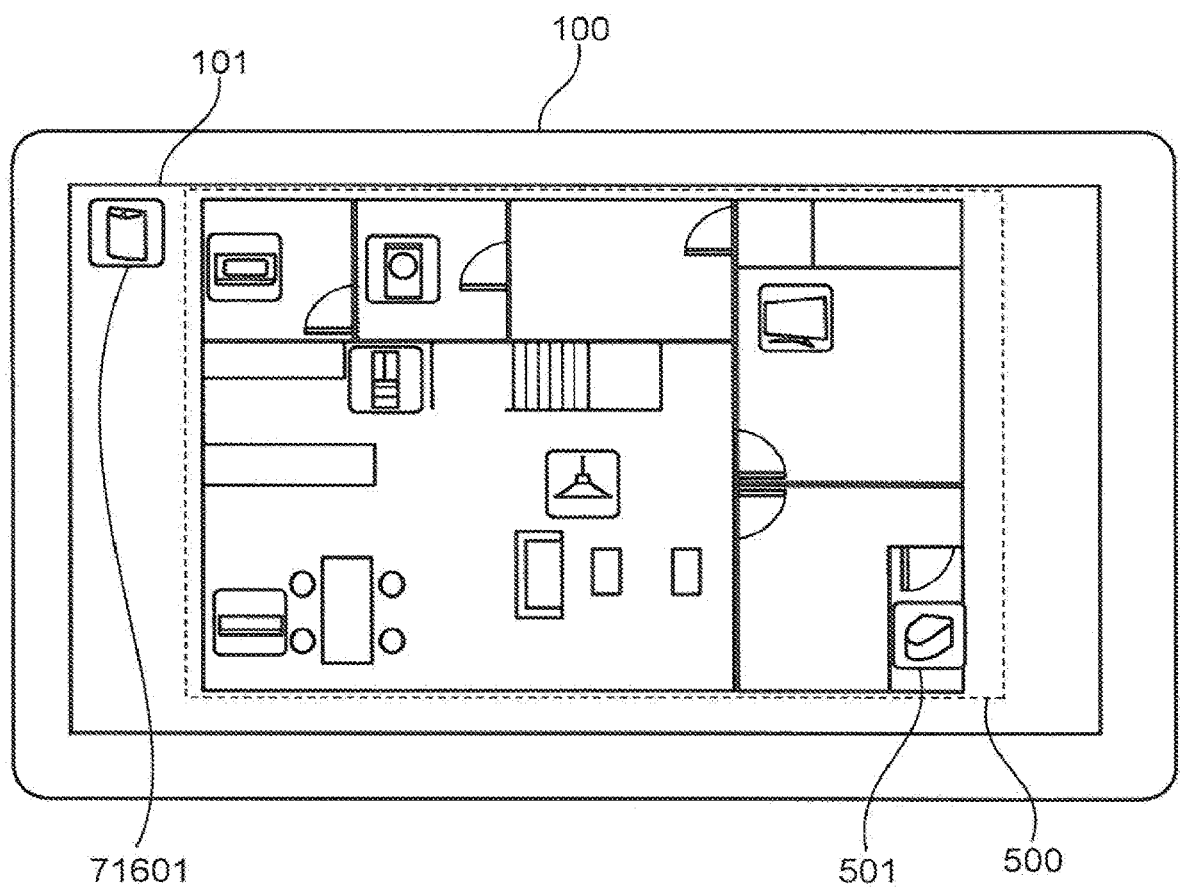
FIG. 88 is a diagram showing an example of a display screen of a home controller when a device to be newly registered is a humidifier.

FIG. 88 is a diagram showing an example of a display screen of a home controller when a device to be newly registered is a humidifier. In the following description, the device to be newly registered is a humidifier and the device list 70700 does not store data corresponding to the humidifier. In addition, a room type is not associated with the device type "humidifier".

Moreover, a process up to determining the number of remaining room types is the same as the process described with reference to FIG. 85.

The device control section 302 excludes a room type corresponding to a room in which a device of a same type as the device 200 to be newly registered is already installed from the room types that are the search result. In this case, since the humidifier is not stored in the device list 70700 and there is no corresponding room type, no room type remains.

Therefore, the number of remaining room types is determined to be zero and the device control section 302 transmits arrangement information including a device type (humidifier) indicating a type of a device icon representing the one target device and display region information indicating a prescribed region on the display screen to the home controller 100.

Upon receiving the arrangement information, the display control section 103 of the home controller 100 displays the device icon 71601 of the newly registered humidifier on the display 101 based on the arrangement information. In this case, the device icon 71601 of the humidifier is displayed in a region outside the display region of the floor plan 500. As described above, since there are no rooms corresponding to the humidifier, the device icon 71601 of the humidifier is displayed in a region outside the display region of the floor plan 500.

Moreover, while the device icon of a newly registered device is displayed in a region outside the display region of the floor plan 500 when the number of remaining room types is other than one in the description of FIGS. 86 to 88, the present disclosure is not particularly limited thereto. When the number of remaining room types is other than one, the device icon of a newly registered device may be displayed in a region corresponding to a largest room among the one or more rooms included in the floor plan 500. In this case, a display result is the same as the display result shown in FIG. 84.

In addition, when the one or more device icons include two or more device icons of the same type, one device icon among the two or more device icons of the same type may be displayed in a region on the display screen corresponding to a room that corresponds to the one device icon and the other device icons may be displayed in a prescribed region on the display screen. For example, where there are two device icons of a television set, one device icon among the two device icons may be displayed in a region on the display screen corresponding to the bedroom which corresponds to the one device icon and the other device icon may be displayed in a region outside the display region of the floor plan 500. In this case, a display result is the same as the display result shown in FIG. 87. Moreover, the other device icons may be displayed in a region corresponding to a largest room among the one or more rooms included in the floor plan 500.

While a bird's eye view representing positions and shapes of rooms constituting each floor in a planar manner is adopted as the floor plan 500 in the description given above, the present embodiment is not limited thereto and a diagram showing what kind of and how many rooms are on each floor in a simplified manner may also be adopted as a floor plan.

Figure 89:
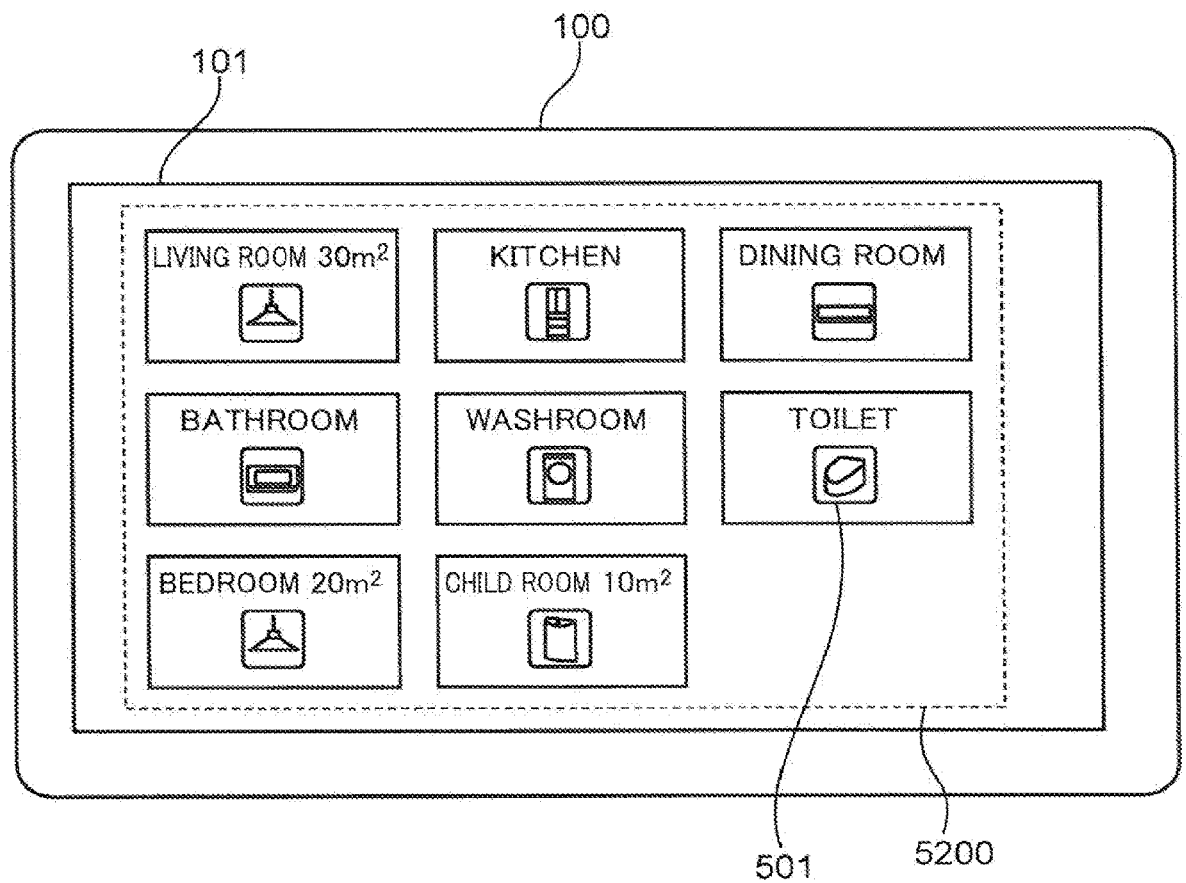
FIG. 89 is a diagram showing a floor plan with a different pattern.

Hereinafter, a different pattern of a floor plan will be specifically described. FIG. 89 is a diagram showing a floor plan 5200 with a different pattern. On the floor plan 5200, one room constituting one floor is represented by one square block and respective rooms on one floor are arranged in a matrix pattern. In addition, sizes of the respective blocks are the same, and a name and an area of a room are described in each block.

For example, the floor plan 5200 includes the respective rooms of a living room, a kitchen, a dining room, a bathroom, a washroom, a toilet, a bedroom, and a child room. In addition, a device icon 501 of an actually arranged device 200 is displayed in each room. For example, the device icon 501 of an illumination device displayed in the living room signifies that an illumination device is installed in the living room.

Even when such a floor plan 5200 is displayed, a device icon of a device to be newly registered can be displayed in the same manner as described earlier.

Figure 90:
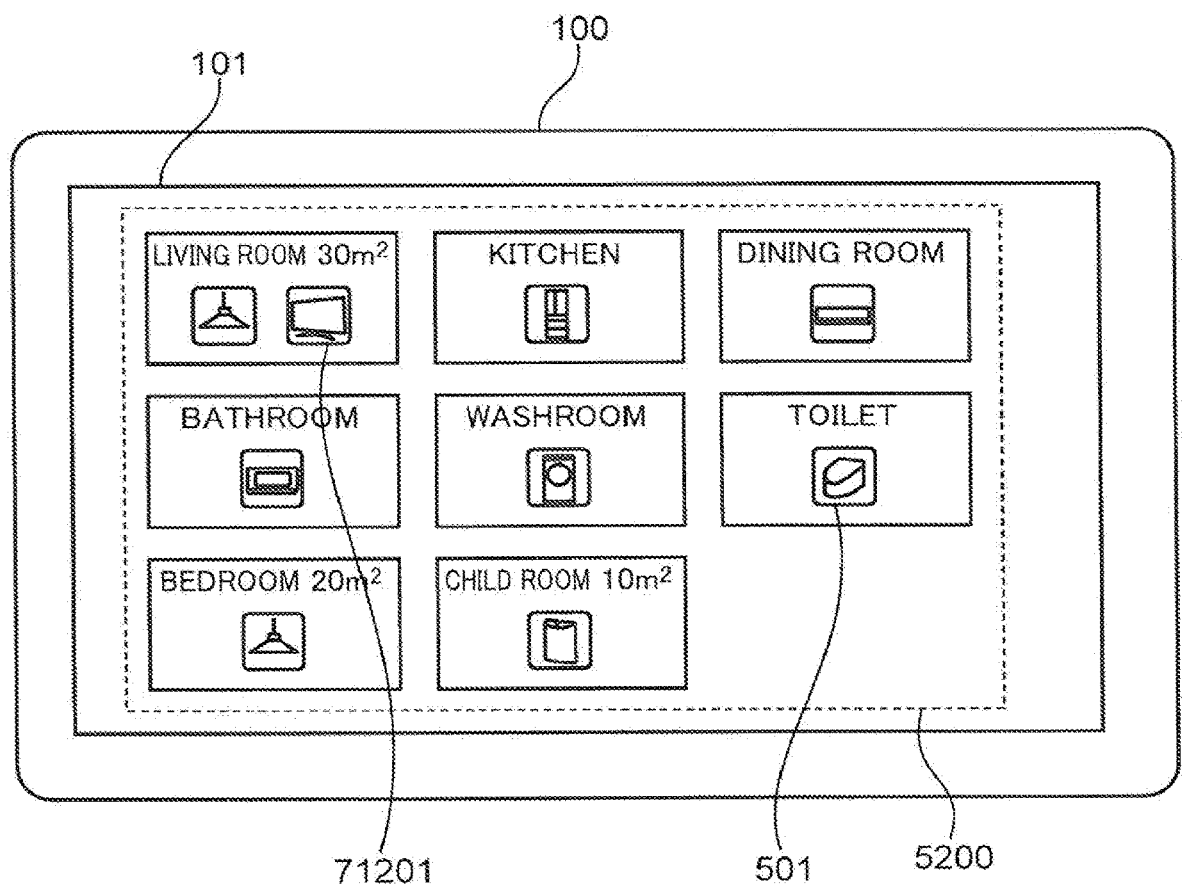
FIG. 90 is a diagram for explaining an example of displaying a device icon of a newly registered device on the floor plan with a different pattern.

FIG. 90 is a diagram for explaining an example of displaying a device icon of a device to be newly registered on the floor plan 5200 with a different pattern.

On the floor plan 5200 shown in FIG. 90, a display method of a device icon when a device is to be newly registered is almost the same as the display method of a device icon on the floor plan 500 described earlier. A difference is that an area of each room is stored in advance in association to each room. When searching for a largest room among the remaining rooms in step S70406 or when searching for a largest room among all rooms in step S70407 in FIG. 76, the device control section 302 reads out and uses areas stored in advance instead of calculating areas from vertex coordinates and the like.

In FIG. 90, a device icon 71201 of a newly registered television set is displayed on the floor plan 5200. When the television set is newly registered, a television set is not arranged in any of the rooms. Therefore, the device icon 71201 of the newly registered television set is displayed in a region corresponding to the living room which is the largest room among the living room, the bedroom, and the child room.

While an arrangement position of a device icon corresponding to a device to be newly registered is decided by the server 300 in the description given above, the present disclosure is not particularly limited thereto and the arrangement position may be decided by the home controller 100. A process for deciding an arrangement position of a device icon corresponding to a device to be newly registered by the home controller 100 will now be described with reference to FIG. 91.

Figure 91:
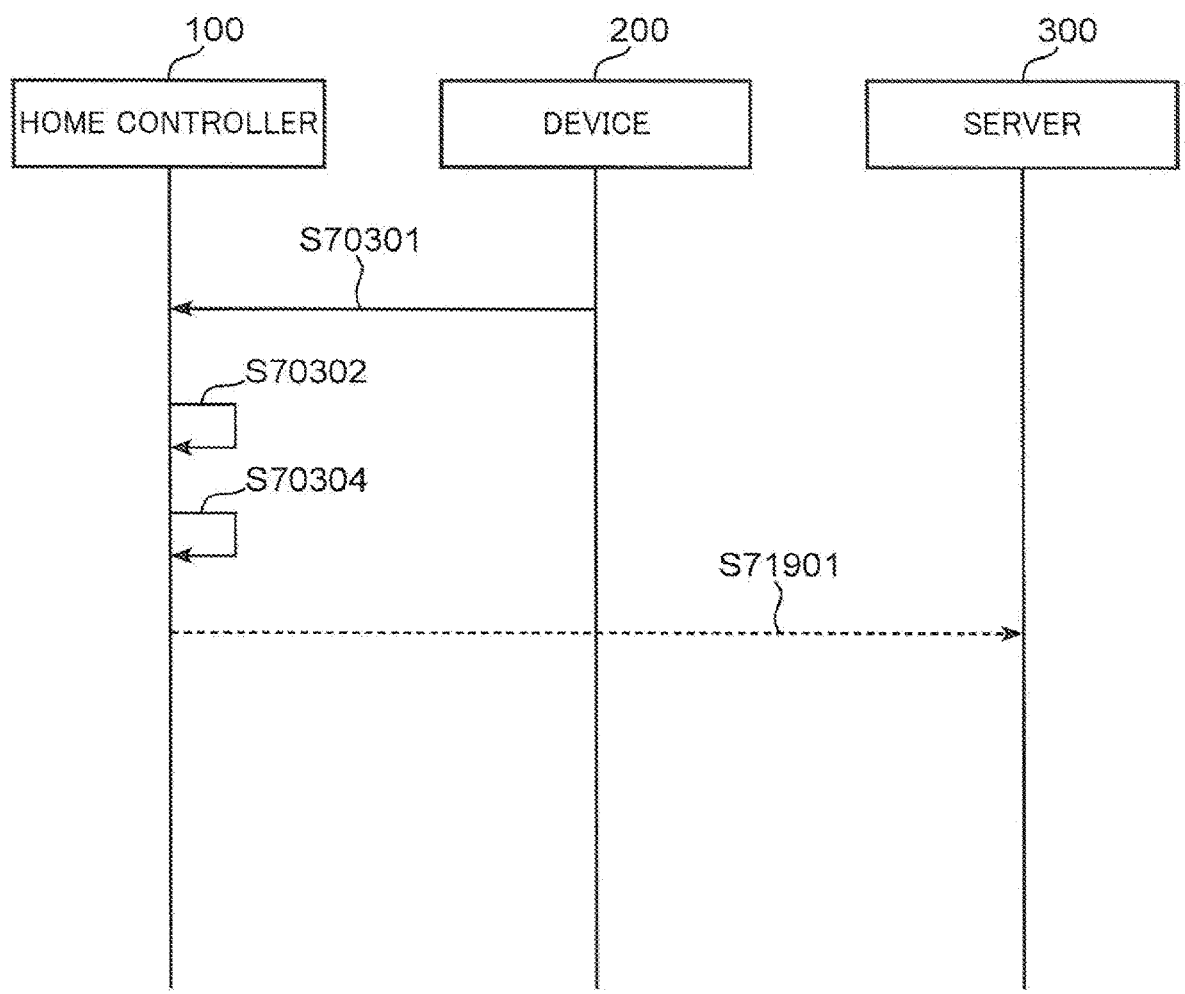
FIG. 91 is a sequence diagram showing a flow of a process by the home controller for deciding an arrangement position of a device icon corresponding to a device to be newly registered.

FIG. 91 is a sequence diagram showing a flow of a process by the home controller 100 for deciding an arrangement position of a device icon corresponding to a device to be newly registered.

When the device 200 is newly arranged in a prescribed room inside the house, the communication control section 217 of the device 200 transmits a device new registration request to the home controller 100 (S70301).

Next, the device management section 105 of the home controller 100 receives the device new registration request from the device 200 and performs an initial arrangement deciding process for deciding an arrangement position on the floor plan of a device icon corresponding to the device 200 to be newly registered (S70302). Moreover, the initial arrangement deciding process by the home controller 100 will be described later.

Next, the display control section 103 of the home controller 100 displays a device icon corresponding to the newly registered device 200 on the floor plan based on the decided arrangement position and updates the display screen (S70304).

The device management section 105 of the home controller 100 then transmits arrangement information indicating the arrangement position of the device icon decided by the initial arrangement deciding process to the server 300 (S71901). The device control section 302 of the server 300 updates a device list based on the received arrangement information. Moreover, the home controller 100 need not transmit the arrangement information to the server 300. In addition, when the arrangement information is not transmitted to the server 300, the home control system need not include the server 300.

The initial arrangement deciding process shown in FIG. 91 will now be described in greater detail.

Figure 92:
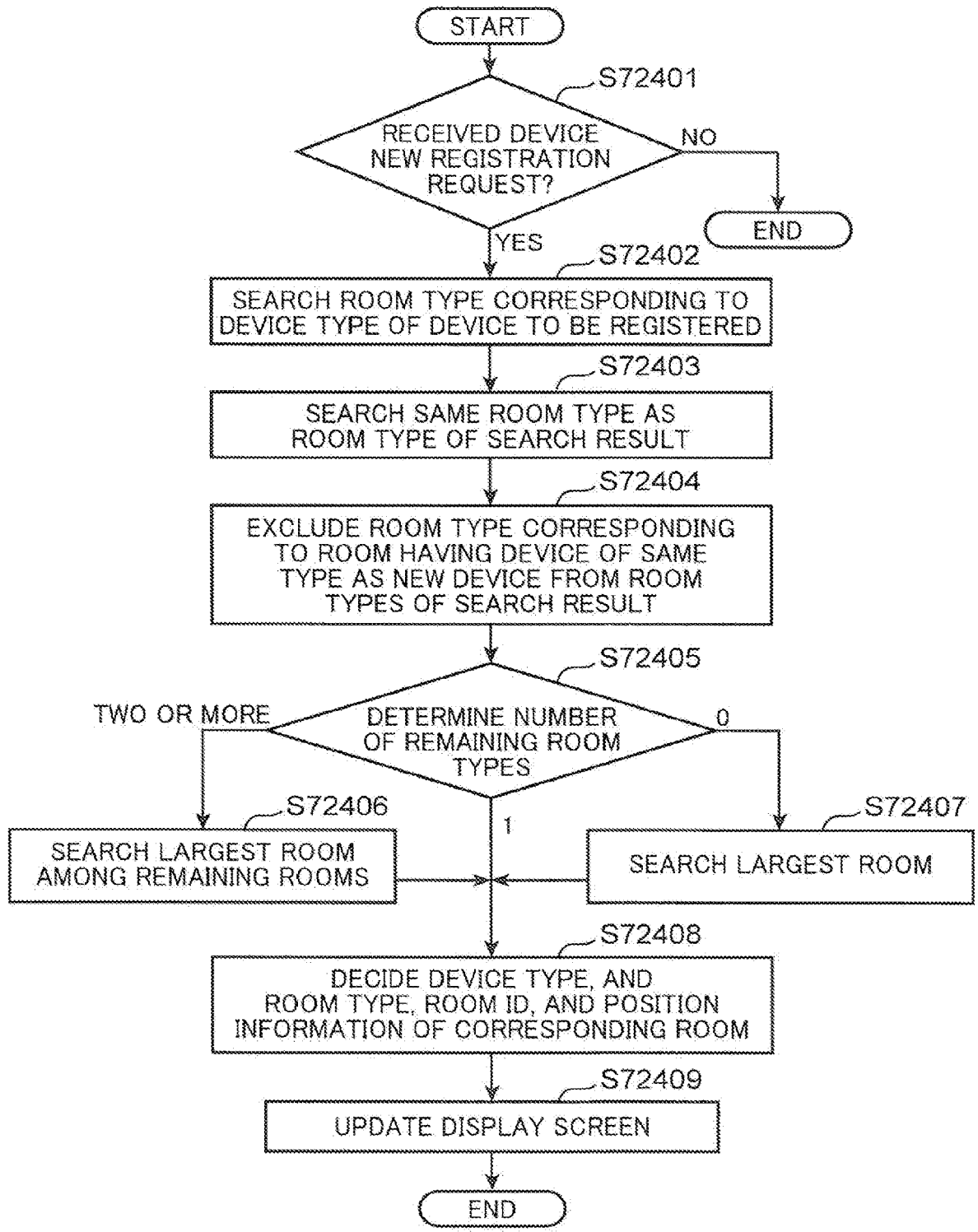
FIG. 92 is a flow chart for explaining an initial arrangement deciding process by a home controller.

FIG. 92 is a flow chart for explaining an initial arrangement deciding process by the home controller 100.

Since the process performed in steps S72401 to S72407 in FIG. 92 is the same as the process performed in steps S70401 to S70407 shown in FIG. 76, a description thereof will be omitted. In addition, the device management section 105 of the home controller 100 executes the process of steps S72401 to S72407 in place of the device control section 302 of the server 300. Furthermore, the home controller 100 stores the reference table 70600 (FIG. 77), the room information 70900 (FIG. 79), the device list 70700 (FIG. 80), and the vertex information 70800 (FIG. 81).

When it is determined that the number of remaining room types is one ("one" in S72405), when a largest room among the remaining room types is searched in step S72406, or when a largest room among all rooms is searched in step S72407, the device management section 105 decides a device type indicating a type of the device icon, a room type of a corresponding room, a room ID of the corresponding room, and position information representing a position of the corresponding room on the floor plan (S72408).

When it is determined that the number of remaining room types is one, the device management section 105 searches for a room ID and position information of the one remaining room type and decides a device type indicating a type of the device icon, the one remaining room type, the searched room ID, and position information representing coordinates of the one remaining room.

In addition, when a largest room among the remaining room types is searched in step S72406, the device management section 105 decides a device type indicating a type of the device icon, a room type of the largest room among the remaining room types, a room ID of the largest room among the remaining room types, and position information representing coordinates of the largest room among the remaining room types.

Furthermore, when a largest room among all rooms is searched in step S72407, the device management section 105 decides a device type indicating a type of the device icon, a room type of the largest room among the rooms, a room ID of the largest room among the rooms, and position information representing coordinates of the largest room among the rooms.

Next, the display control section 103 displays a device icon corresponding to the newly registered device 200 on the floor plan based on the decided device type, room type, room ID, and position information and updates the display screen (S72409).

Moreover, the display control section 103 displays a display screen representing the floor plan 500 including one or more rooms on the display 101. In addition, the display control section 103 uses one or two or more memories that manage, in association with each other, a device type (first information) indicating types of one or more device icons representing each of one or more target devices and a room type (second information) indicating an attribute of each of the one or more rooms and displays the one or more device icons in a region on the display screen corresponding to a room that corresponds to each of the one or more device icons in accordance with the types of the one or more device icons.

Furthermore, when selection of any of the one or more device icons is sensed in a region corresponding to any of the rooms included in the floor plan 500, the display control section 103 displays a control screen for at least any of operation and state confirmation of a target device corresponding to the selected device icon on the display screen representing the floor plan 500. Subsequently, based on an operation on the control screen, the communication control section 107 outputs a control command for at least any of the operation and the state confirmation of the target device corresponding to the selected device icon to the network.

In addition, the display control section 103 may use a device type (first information) and a room type (second information) to determine a room corresponding to each of one or more device icons in accordance with the types of the one or more device icons. Furthermore, the display control section 103 may display each of the one or more device icons in a region on the display screen corresponding to the determined room.

In addition, the one or two or more memories may further manage position information (third information) of each of one or more rooms on the floor plan 500. The display control section 103 may determine a region corresponding to each of the one or more rooms using the position information (third information). Furthermore, the display control section 103 may display one or more device icons in a region on the display screen corresponding to a room that corresponds to each of the one or more device icons in accordance with the types of the one or more device icons.

In addition, the display control section 103 may use a device type (first information) and a room type (second information) to determine a room corresponding to each of one or more device icons in accordance with the types of the one or more device icons. Furthermore, the display control section 103 may determine a region corresponding to each of the one or more rooms using the position information (third information). The display control section 103 may display each of the one or more device icons in a region on the display screen corresponding to the determined room.

In addition, when it is determined that one device icon among the one or more device icons may potentially correspond to a plurality of rooms among the one or more rooms based on the device type (first information), the display control section 103 may display the one device icon in a region on the display screen corresponding to a largest room among the plurality of potentially corresponding rooms.

Furthermore, when the one device icon is determined to be a television set icon representing a television set based on the device type (first information), the display control section 103 may display the television set icon in a region on the display screen corresponding to the living room.

In addition, when it is determined that a type of one device icon among one or more device icons is a type to be displayed on the display screen for the first time and that the one device icon may potentially correspond to a plurality of rooms among the one or more rooms based on the device type (first information), the display control section 103 may display the one device icon in a region on the display screen corresponding to a largest room among the plurality of potentially corresponding rooms.

Furthermore, when it is determined that a type of one device icon among one or more device icons is a type to be displayed on the display screen for the first time and that the one device icon is a television set icon representing a television set based on the device type (first information), the display control section 103 may display the television set icon in a region on the display screen corresponding to the living room.

In addition, when the one device icon among the one or more device icons is determined to be a refrigerator icon representing a refrigerator based on the device type (first information), the display control section 103 may display the refrigerator icon in a region on the display screen corresponding to the kitchen.

Subsequently, another example of the initial arrangement deciding process shown in FIG. 91 will be described in greater detail.

Figure 93:
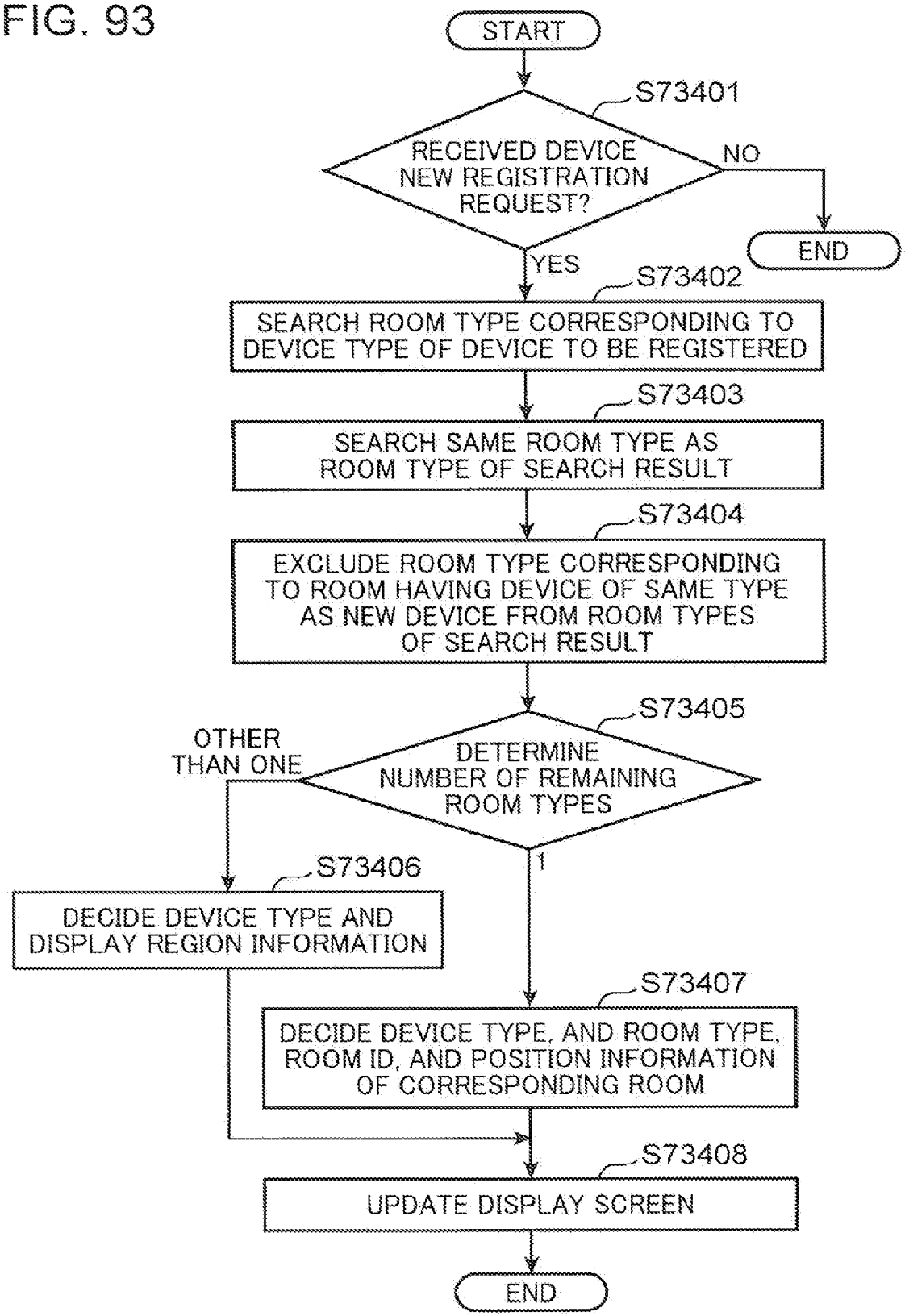
FIG. 93 is a flow chart for explaining another example of an initial arrangement deciding process by a home controller.

FIG. 93 is a flow chart for explaining another example of the initial arrangement deciding process by the home controller 100.

Since the process performed in steps S73401 to S73405 in FIG. 93 is the same as the process performed in steps S71401 to S71405 shown in FIG. 86, a description thereof will be omitted. In addition, the device management section 105 of the home controller 100 executes the process of steps S73401 to S73405 in place of the device control section 302 of the server 300. Furthermore, the home controller 100 stores the reference table 70600 (FIG. 77), the room information 70900 (FIG. 79), the device list 70700 (FIG. 80), and the vertex information 70800 (FIG. 81).

When the number of remaining room types is determined to be other than one or, in other words, when the number of remaining room types is determined to be zero or two or more ("other than one" in S73405), the device management section 105 decides a device type indicating a type of a device icon representing one target device and display region information indicating a prescribed region on the display screen (S73406).

Moreover, for example, the prescribed region on the display screen is a region outside the display region of the floor plan 500 in the display screen.

On the other hand, when it is determined that the number of remaining room types is one ("one" in S73405), the device management section 105 searches for a room ID and position information of the one remaining room type and decides a device type indicating a type of the device icon, a room type of a corresponding room, a room ID of the corresponding room, and position information representing a position of the corresponding room on the floor plan (S73407).

Next, the display control section 103 displays a device icon corresponding to the newly registered device 200 and updates the display screen (S73408). At this point, when it is determined that the number of remaining room types is other than one, the display control section 103 displays a device icon corresponding to the newly registered device 200 outside the floor plan based on the device type and display region information and updates the display screen. On the other hand, when it is determined that the number of remaining room types is one, the display control section 103 displays a device icon corresponding to the newly registered device 200 on the floor plan based on the decided device type, room type, room ID, and position information, and updates the display screen.

Moreover, the display control section 103 displays a display screen representing the floor plan 500 including one or more rooms on the display 101. In addition, the display control section 103 uses one or two or more memories that manage, in association with each other, a device type (first information) indicating types of one or more device icons representing each of one or more target devices and a room type (second information) indicating an attribute of each of the one or more rooms to display a device icon with a corresponding room to the type of the device icon among the one or more device icons in a region on the display screen corresponding to the room that corresponds to the device icon and to display a device icon without a corresponding room to the type of the device icon among the one or more device icons in a prescribed region on the display screen.

Furthermore, when selection of any of the one or more device icons is sensed in a region corresponding to any of the rooms included in the floor plan 500, the display control section 103 displays a control screen for at least any of operation and state confirmation of a target device corresponding to the selected device icon on the display screen representing the floor plan 500. Subsequently, based on an operation on the control screen, the communication control section 107 outputs a control command for at least any of the operation and the state confirmation of the target device corresponding to the selected device icon to the network.

In addition, when the one or more device icons include two or more device icons of the same type, the display control section 103 may display one device icon among the two or more device icons of the same type in a region on the display screen corresponding to a room that corresponds to the one device icon and the other device icons to be displayed in a prescribed region on the display screen.

Moreover, the prescribed region may be a region outside the display region of the floor plan 500 in the display screen. Alternatively, the prescribed region may be a region corresponding to a largest room among the one or more rooms included in the floor plan 500.

In addition, while the device 200 transmits a device new registration request to the server 300 in the sequence diagram shown in FIG. 74, the present disclosure is not particularly limited thereto and the device 200 may transmit a device new registration request to the home controller 100 and the home controller 100 may transmit a device arrangement request for requesting that a display position of a device icon corresponding to a newly registered device be determined to the server 300. A process for deciding an arrangement position of a device icon corresponding to a device to be newly registered by the server 300 when the device 200 transmits a device new registration request to the home controller 100 will now be described with reference to FIG. 94.

Figure 94:
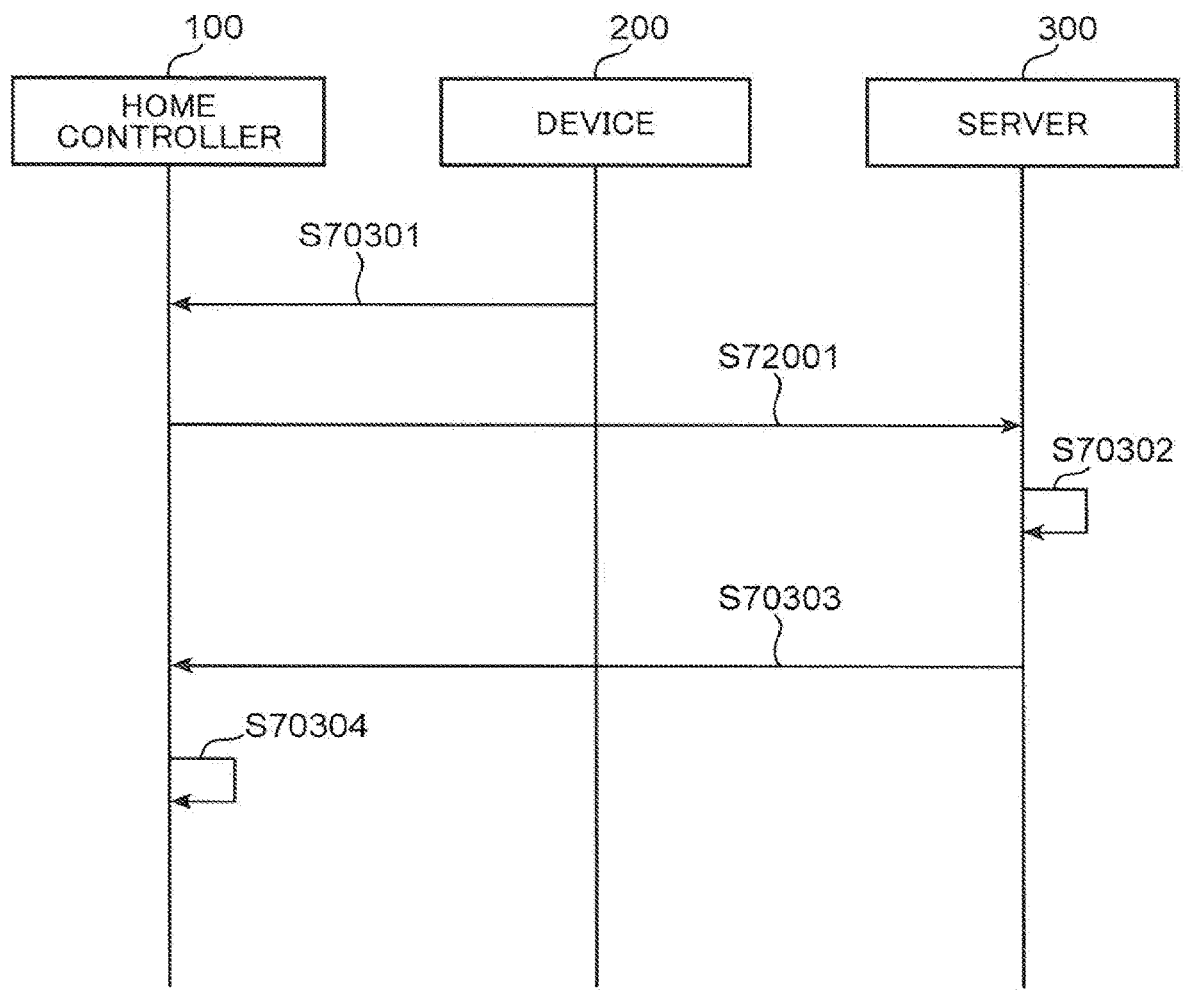
FIG. 94 is a sequence diagram showing a flow of a process by a server for deciding an arrangement position of a device icon corresponding to a device to be newly registered when the device transmits a device new registration request to a home controller.

FIG. 94 is a sequence diagram showing a flow of a process by the server 300 for deciding an arrangement position of a device icon corresponding to a device to be newly registered when the device 200 transmits a device new registration request to the home controller 100.

When the device 200 is newly arranged in a prescribed room inside the house, the communication control section 217 of the device 200 transmits a device new registration request to the home controller 100 (S70301). In this case, the device new registration request includes a device ID and a device type.

Next, the communication control section 107 of the home controller 100 receives the device new registration request transmitted by the device 200 and transmits a device arrangement request for requesting that a display position of a device icon corresponding to a newly registered device be decided to the server 300 (S72001). In this case, the device arrangement request includes a residence ID, a device ID, and a device type. The communication control section 107 creates a device arrangement request in which a residence ID is added to the device ID and the device type included in the received device new registration request and transmits the device arrangement request.

Next, the device control section 302 of the server 300 receives the device arrangement request from the device 200 and performs an initial arrangement deciding process for deciding an arrangement position on the floor plan of a device icon corresponding to the device 200 to be newly registered (S70302). Moreover, the initial arrangement deciding process is as described earlier.

The device control section 302 of the server 300 then transmits arrangement information indicating the arrangement position of the device icon decided by the initial arrangement deciding process to the home controller 100 (S70303).

Next, the display control section 103 of the home controller 100 receives the arrangement information transmitted by the server 300, displays a device icon corresponding to the newly registered device 200 on the floor plan based on the received arrangement information, and updates the display screen (S70304).

In addition, while the device 200 transmits a device new registration request to the home controller 100 in the sequence diagram shown in FIG. 91, the present disclosure is not particularly limited thereto and the device 200 may transmit a device new registration request to the server 300 and the server 300 may transmit a device arrangement request for requesting that a display position of a device icon corresponding to a newly registered device be decided to the home controller 100. A process for deciding an arrangement position of a device icon corresponding to a device to be newly registered by the home controller 100 when the device 200 transmits a device new registration request to the server 300 will now be described with reference to FIG. 95.

Figure 95:
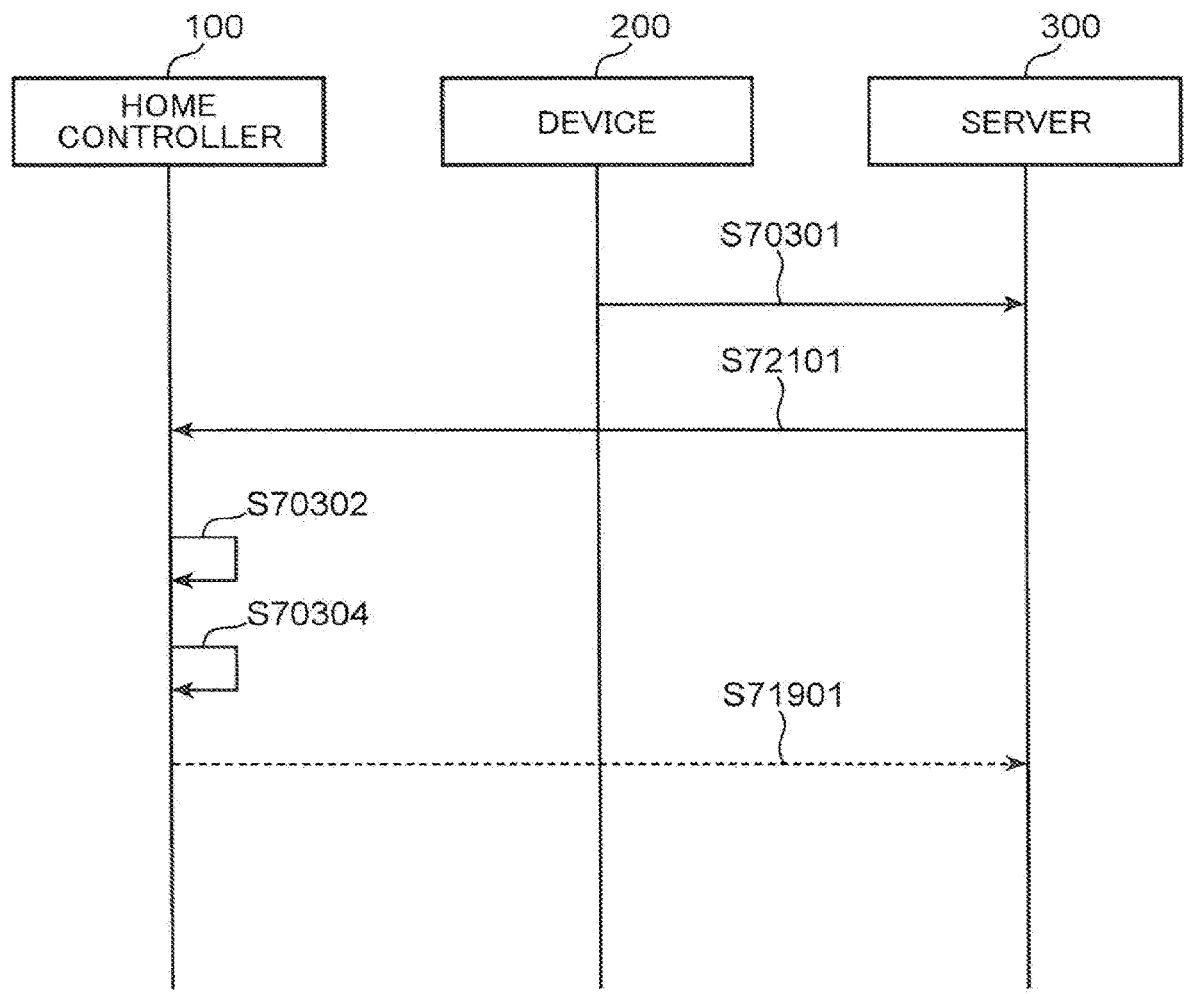
FIG. 95 is a sequence diagram showing a flow of a process by a home controller for deciding an arrangement position of a device icon corresponding to a device to be newly registered when the device transmits a device new registration request to a server.

FIG. 95 is a sequence diagram showing a flow of a process by the home controller 100 for deciding an arrangement position of a device icon corresponding to a device to be newly registered when the device 200 transmits a device new registration request to the server 300.

When the device 200 is newly arranged in a prescribed room inside the house, the communication control section 217 of the device 200 transmits a device new registration request to the server 300 (S70301). The device new registration request includes a residence ID, a device ID, and a device type.

Next, the device control section 302 of the server 300 receives the device new registration request from the device 200 and transmits a device arrangement request for requesting that a display position of a device icon corresponding to a newly registered device be decided to the home controller 100 (S72101). At this point, the device control section 302 stores the newly registered device in a device list. The device arrangement request includes a residence ID, a device ID, and a device type.

Next, the device management section 105 of the home controller 100 receives the device arrangement request from the server 300 and performs an initial arrangement deciding process for deciding an arrangement position on the floor plan of a device icon corresponding to the device 200 to be newly registered (S70302). Moreover, the initial arrangement deciding process is as described earlier.

Next, the display control section 103 of the home controller 100 displays a device icon corresponding to the newly registered device 200 on the floor plan based on the decided arrangement position and updates the display screen (S70304).

The device management section 105 of the home controller 100 then transmits arrangement information indicating the arrangement position of the device icon decided by the initial arrangement deciding process to the server 300 (S71901). The device control section 302 of the server 300 updates a device list based on the received arrangement information. Moreover, the home controller 100 need not transmit the arrangement information to the server 300.

(Device Icon Arranging Process 2)

Next, a device icon arranging process 2 in which a device icon is automatically arranged on a floor plan will be described.

Figure 96:
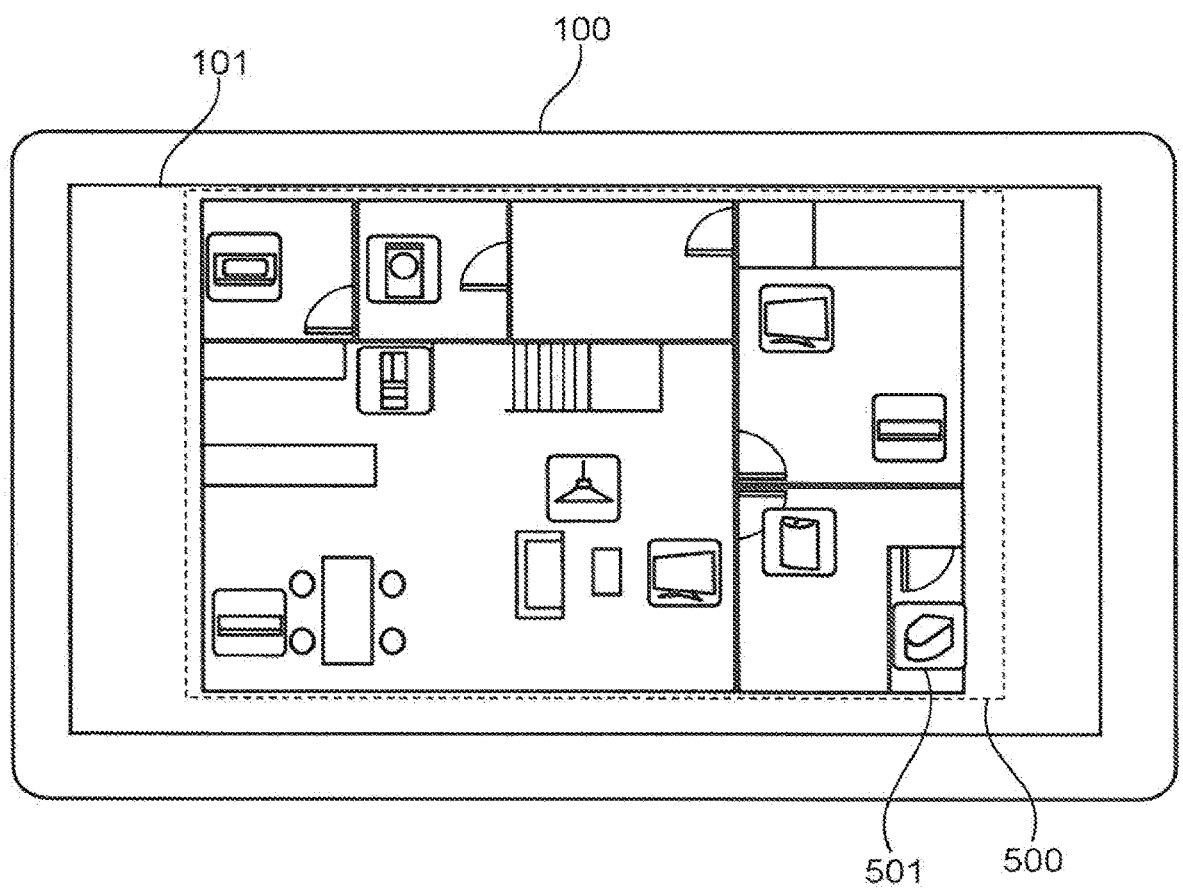
FIG. 96 is a diagram showing an example of a basic screen that is displayed on a display of a home controller.
Figure 97:
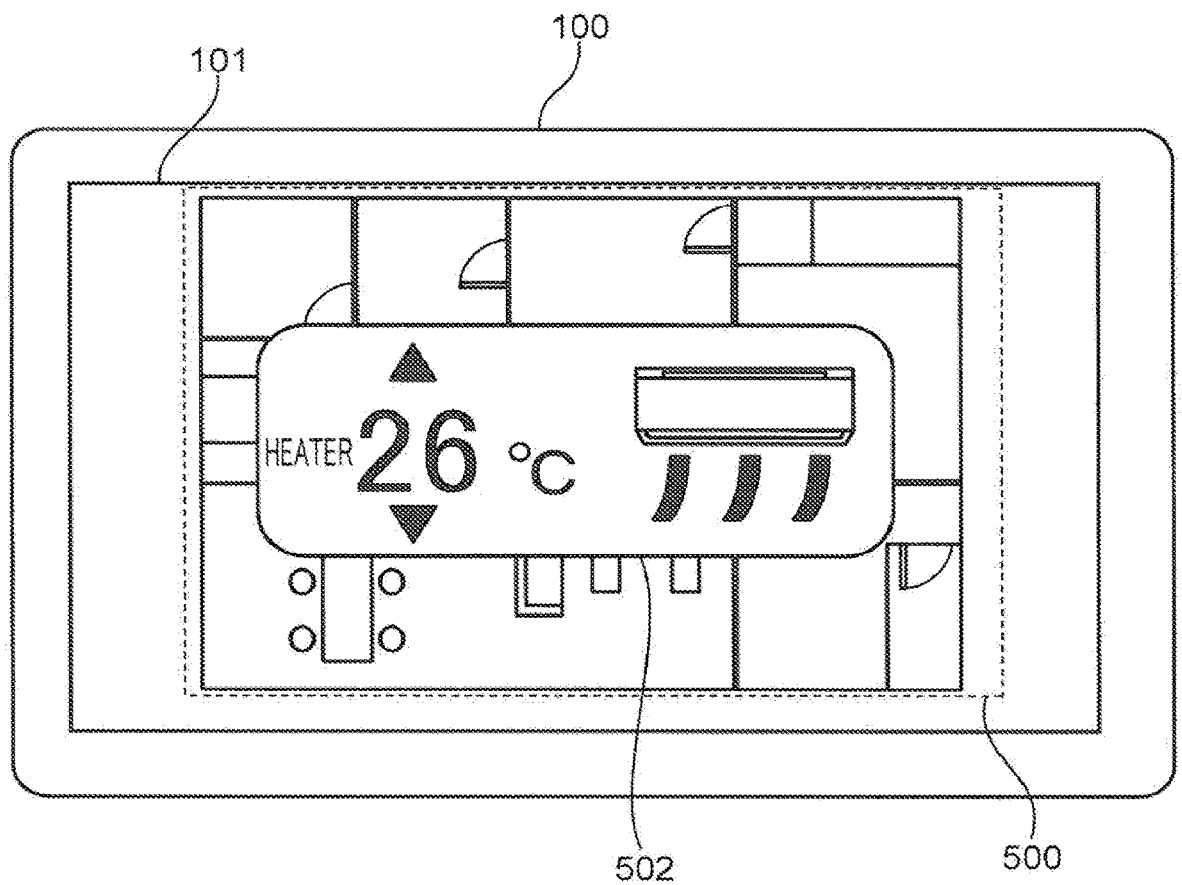
FIG. 97 is a diagram showing a configuration of a display state of a device control screen of a home controller.

FIG. 96 is a diagram showing an example of a basic screen that is displayed on the display 101 of the home controller 100, and FIG. 97 is a diagram showing a configuration of a display state of the device control screen 502 of the home controller 100.

On the basic screen shown in FIG. 96, when the touch panel control section 102 senses that the user has selected the device icon 501, the display control section 103 displays the device control screen 502 corresponding to the selected device icon 501 on the display 101. The device control screen 502 is unique to each device 200 and is a control screen for controlling the device 200 or performing state confirmation of the device 200. For example, FIG. 97 shows an example where a device icon of an air conditioner has been selected by the user, in which case a temperature setting or an air flow direction of the air conditioner is controlled using the device control screen 502 of the air conditioner. Moreover, in FIG. 97, while a device icon is not arranged on the display 101, a device icon may be displayed outside of a display region of the device control screen 502 as shown in FIGS. 11 to 16.

Next, a flow of a process for newly registering a device 200 in a home control system (information management system) will be described with reference to the drawings. The home control system connects to a network which controls one or more target devices managed in association with a same building ID, and manages information of the one or more target devices.

Figure 98:
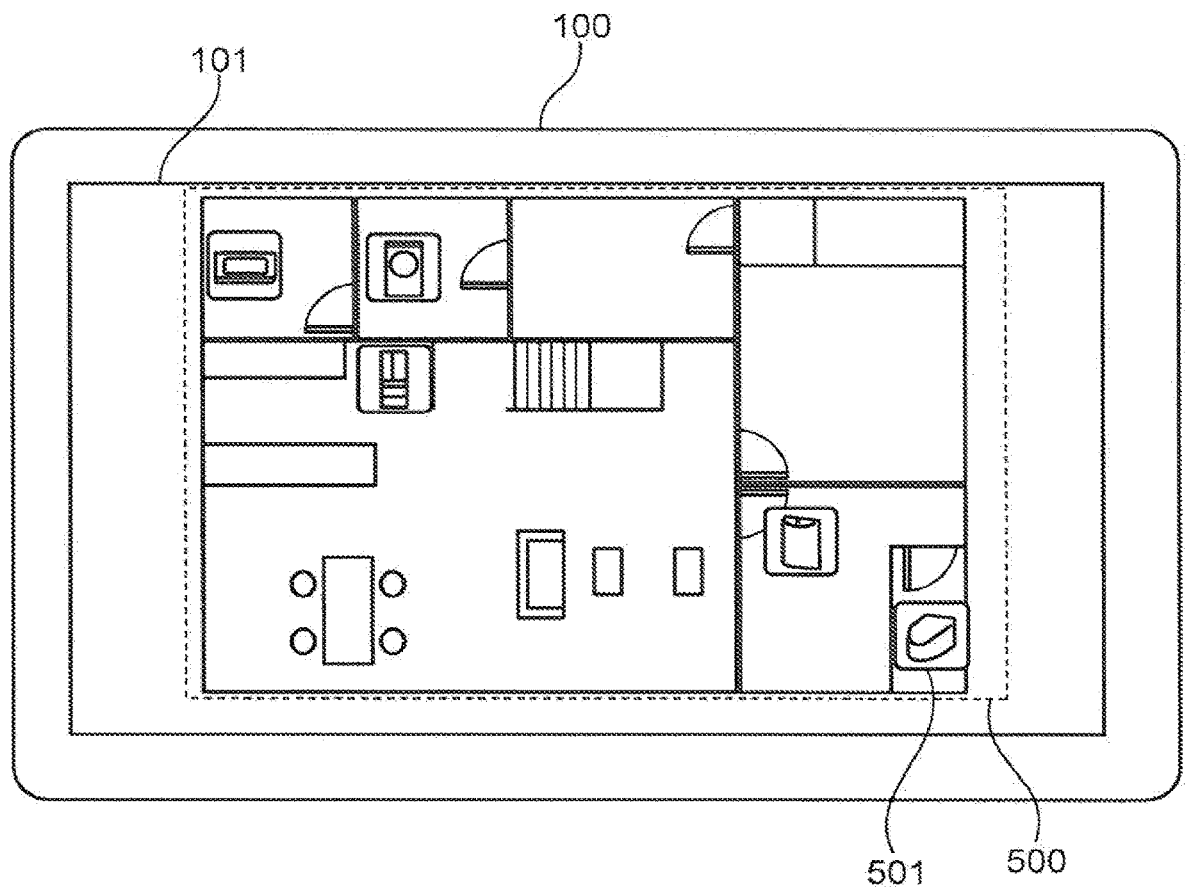
FIG. 98 is a diagram showing an example of a display screen that is displayed on a display of a home controller before a device is newly registered.

FIG. 98 is a diagram showing an example of a display screen that is displayed on the display 101 of the home controller 100 before a device is newly registered. As shown in FIG. 98, the floor plan 500 is displayed on the display 101 of the home controller 100. A device icon 501 corresponding to a device arranged in each room is displayed on the floor plan 500.

Figure 99:
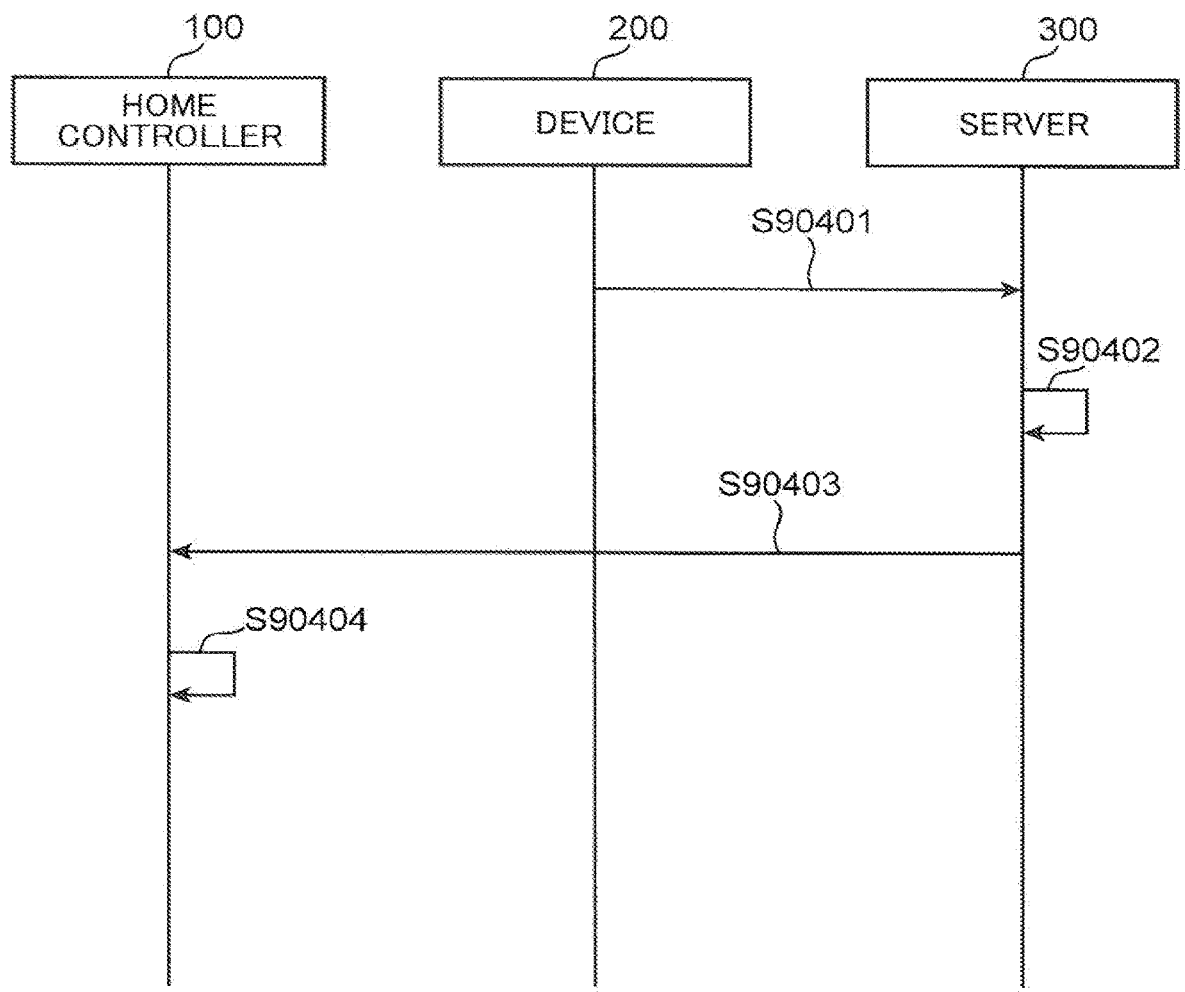
FIG. 99 is a sequence diagram showing a flow of a displaying process for displaying a device icon corresponding to a device to be newly registered on a floor plan.

FIG. 99 is a sequence diagram showing a flow of a displaying process for displaying a device icon corresponding to a device to be newly registered on a floor plan.

First, when the device 200 is newly arranged in a prescribed room inside the house, the communication control section 217 of the device 200 transmits a device new registration request to the server 300 (S90401).

FIG. 100 is a diagram showing an example of a device new registration request that is transmitted when a television set is to be newly registered. As shown in FIG. 100, the device new registration request includes a residence ID 90600 for identifying a residence in which the device 200 is to be arranged, a device ID 90601 for identifying the device 200, a device type 90602 for identifying a type of the device 200, and a performance 90603 representing the performance of the device 200. In the case of a television set, a performance thereof represents a screen size. The performance 90603 shown in FIG. 100 indicates that the television set has a 65 v size.

When the device 200 is newly arranged in a prescribed room inside the house, the communication control section 217 of the device 200 inquires a residence ID to the home controller 100, acquires the residence ID from the home controller 100, and creates a device new registration request.

Moreover, while the communication control section 217 of the device 200 acquires the residence ID from the home controller 100 in the present embodiment, the present disclosure is not particularly limited thereto. When the device 200 and the server 300 are connected to each other via a gateway installed in the home, the gateway may provide the residence ID. Specifically, the communication control section 217 of the device 200 may transmit a device new registration request including the device ID 70501 and the device type 70502, and the gateway may include the residence ID in the device new registration request from the device 200 and transmit the device new registration request to the server 300. Alternatively, the device 200 may accept input of a residence ID by the user.

Next, the device control section 302 of the server 300 receives the device new registration request from the device 200 and performs an initial arrangement deciding process for deciding an arrangement position on the floor plan of a device icon corresponding to the device 200 to be newly registered (S90402). Moreover, the initial arrangement deciding process by the server 300 will be described later.

The device control section 302 of the server 300 then transmits arrangement information indicating the arrangement position of the device icon decided by the initial arrangement deciding process to the home controller 100 (S90403).

Next, the display control section 103 of the home controller 100 receives the arrangement information transmitted by the server 300, displays a device icon corresponding to the newly registered device 200 on the floor plan based on the received arrangement information, and updates the display screen (S90404).

The initial arrangement deciding process shown in FIG. 99 will now be described in greater detail.

Figure 101:
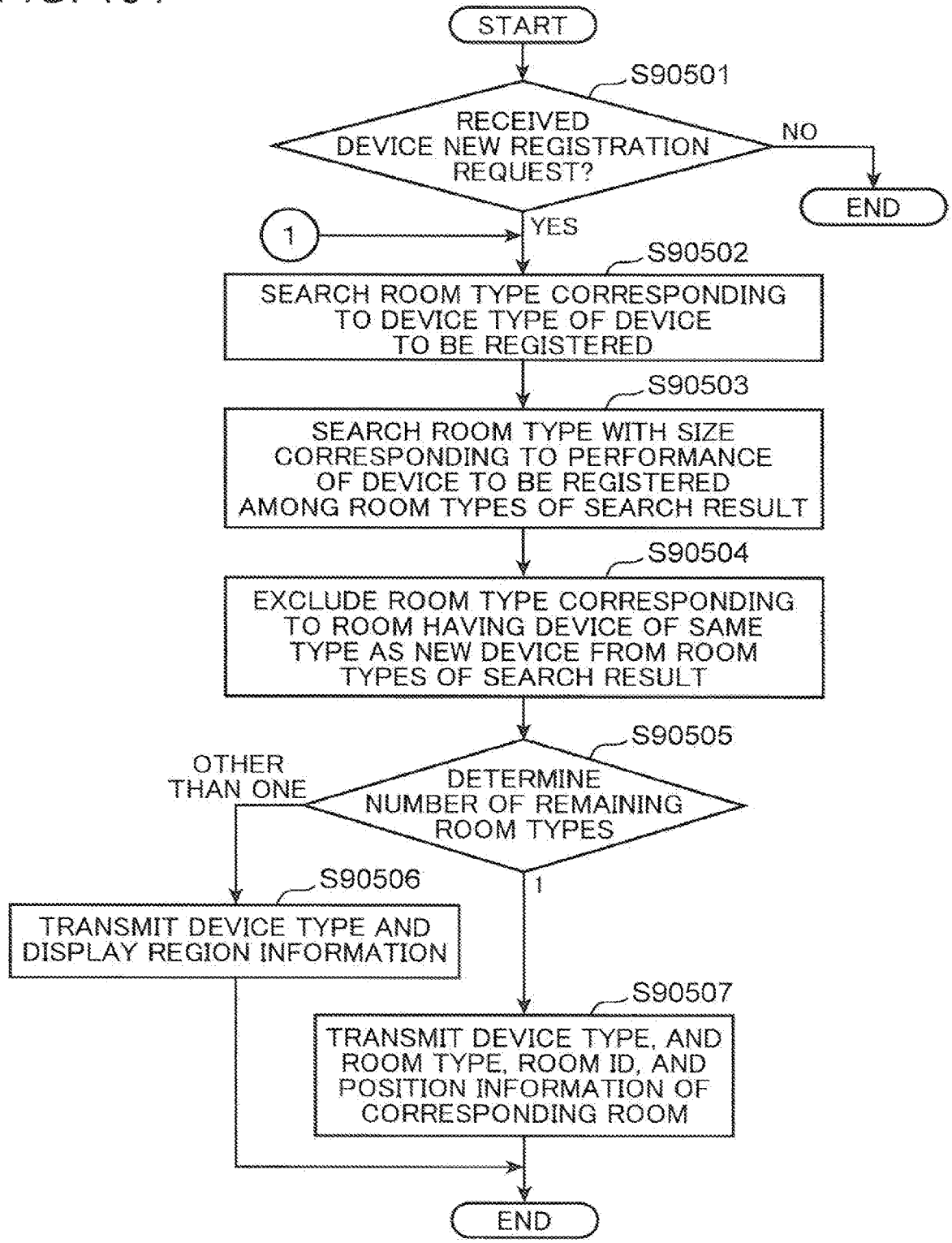
FIG. 101 is a flow chart for explaining an initial arrangement deciding process by a server.

FIG. 101 is a flow chart for explaining an initial arrangement deciding process by the server 300.

First, the device control section 302 determines whether or not the device new registration request from the device 200 has been received (S90501). The server 300 receives, from one target device among the one or more target devices via the network, a device new registration request (registration notification information) representing that the one target device has been newly registered in the home control system (information management system).

At this point, when it is determined that the device new registration request from the device 200 has not been received (NO in S90501), the process is finished.

On the other hand, when it is determined that the device new registration request from the device 200 has been received (YES in S90501), the device control section 302 searches for a room type corresponding to the device type of the device 200 to be registered (S90502). In this case, the storage section 304 of the server 300 stores, in advance, a reference table that associates a device type and a room type with each other.

FIG. 102 is a diagram showing an example of a reference table 906100 that associates a device type 906101 and a room type 906102 with each other. As shown in FIG. 102, the device type 906101 and the room type 906102 are associated with each other. The storage section 304 is constituted by one memory and manages the device type 906101 (first information) indicating types of one or more device icons representing the one or more target devices and the room type 906102 (second information) indicating an attribute of each of the one or more rooms in association with each other. For example, the room type "kitchen" is associated with the device type "refrigerator", the room type "toilet" is associated with the device type "toilet seat apparatus", the room types "living room", "child room", and "bedroom" are associated with the device type "air conditioner", and the room types "living room", "child room", and "bedroom" are associated with the device type "television set".

In the example shown in FIG. 102, the refrigerator and the toilet seat apparatus are respectively constituted by one tuple, the air conditioner is constituted by three tuples, and the television set is constituted by three tuples. Moreover, in the case of a device type such as a humidifier for which a room where the device type is arranged is not specified, a room type need not be associated. Specifically, the storage section 304 does not store data that associates the device type "humidifier" with a room type.

The device control section 302 searches for a room type corresponding to the device type 90602 included in the received device new registration request in the reference table 906100.

Moreover, while FIG. 102 shows one memory managing a device type and a room type in association with each other, the present disclosure is not particularly limited thereto and two or more memories may manage a device type and a room type in association with each other.

FIGS. 103A to 103C are diagrams showing an example in which device types and room types are managed by three reference tables. FIG. 103A is a diagram showing an example of a first reference table 906201 that associates a device ID 906111 and a device type name 906112 with each other, FIG. 103B is a diagram showing an example of a second reference table 906202 that associates a room ID 906113 and a room type name 906114 with each other, and FIG. 103C is a diagram showing an example of a third reference table 906203 that associates a device ID 906115 and a room ID 906116 with each other.

The first reference table 906201 associates the device ID 906111 for identifying the device 200 and the device type name 906112 representing the name of the type of the device 200 with each other. The second reference table 906202 associates the room ID 906113 for identifying a room and the room type name 906114 representing the name of an attribute of the room with each other. The third reference table 906203 associates the device ID 906115 for identifying the device 200 and the room ID 906116 for identifying a room with each other. The first reference table 906201, the second reference table 906202, and the third reference table 906203 may be respectively stored in different memories.

The device control section 302 searches for a room ID corresponding to the device ID 90601 included in the received device new registration request in the third reference table 906203 and searches for a room type name corresponding to the searched room ID in the second reference table 906202.

Next, the device control section 302 searches for a room type with a size corresponding to the performance of the device to be registered among the room types that are search results (S90503). In this case, the storage section 304 of the server 300 stores, in advance, a reference table that associates a device performance and a room size with each other.

FIG. 104 is a diagram showing an example of a reference table that associates a device performance and a room size with each other. As shown in FIG. 104, a performance ID 90701 for identifying a performance of a device, a performance 90702 representing the performance of the device, a smallest room size 90703, and a largest room size 90704 are associated with each other. Moreover, the performance shown in FIG. 104 represents the performance of a television set and, more specifically, a screen size.

For example, a smallest room size "0 $m^2$" and a largest room size "10 $m^2$" are associated with the performance "32 v", a smallest room size "7 $m^2$" and a largest room size "10 $m^2$" are associated with the performance "37 v", a smallest room size "10 $m^2$" and a largest room size "13 $m^2$" are associated with the performance "40 v", and a smallest room size "10 $m^2$" and a largest room size "13 $m^2$" are associated with the performance "42 v".

In other words, a size range of 0 to 10 $m^2$ is associated with the performance "32 v" and a size range of 7 to 10 $m^2$ is associated with the performance "37 v".

FIG. 105 is a diagram showing an example of the vertex information 90800. As shown in FIG. 105, the vertex information 90800 includes a residence ID 90803, a vertex ID 90801, and vertex coordinates 90802. The residence ID 90803 is an identifier of a residence. The vertex ID 90801 is an identifier for identifying a vertex on the floor plan 500. The vertex coordinates 90802 are coordinates expressed by a (X coordinate. Y coordinate, floor number) format and indicate a position of a vertex such as a partition line represented on the floor plan 500. For example, since a vertex of which vertex ID is B has vertex coordinates expressed as (X20, Y0, Z1), the vertex represents a position on the first floor (floor 1) of which X coordinate is 20 and Y coordinate is 0.

FIG. 106 is a diagram showing an example of room information 90900. The room information 90900 includes a residence ID 90904, a room ID 90901, a room type 90902, and room coordinates 90903. The residence ID 90904 is an identifier for identifying a residence. The room ID 90901 is an identifier for identifying a room on the floor plan 500. The room type 90902 indicates a type of the room. The room coordinates 90903 are expressed by a set of vertex IDs and decide an area of a room on the floor plan 500. For example, a room of which room ID is C is a bathroom and represents a region formed by connecting vertex IDs in a sequence of A, B, G and F on the floor plan 500.

Moreover, while a size of a room is described in the room information 90900 shown in FIG. 106, information regarding the size of the room is not included in the room information 90900. In FIG. 106, while the size of a room is described for the sake of brevity, the size of the room is calculated based on vertex coordinates or the like.

Figure 107:
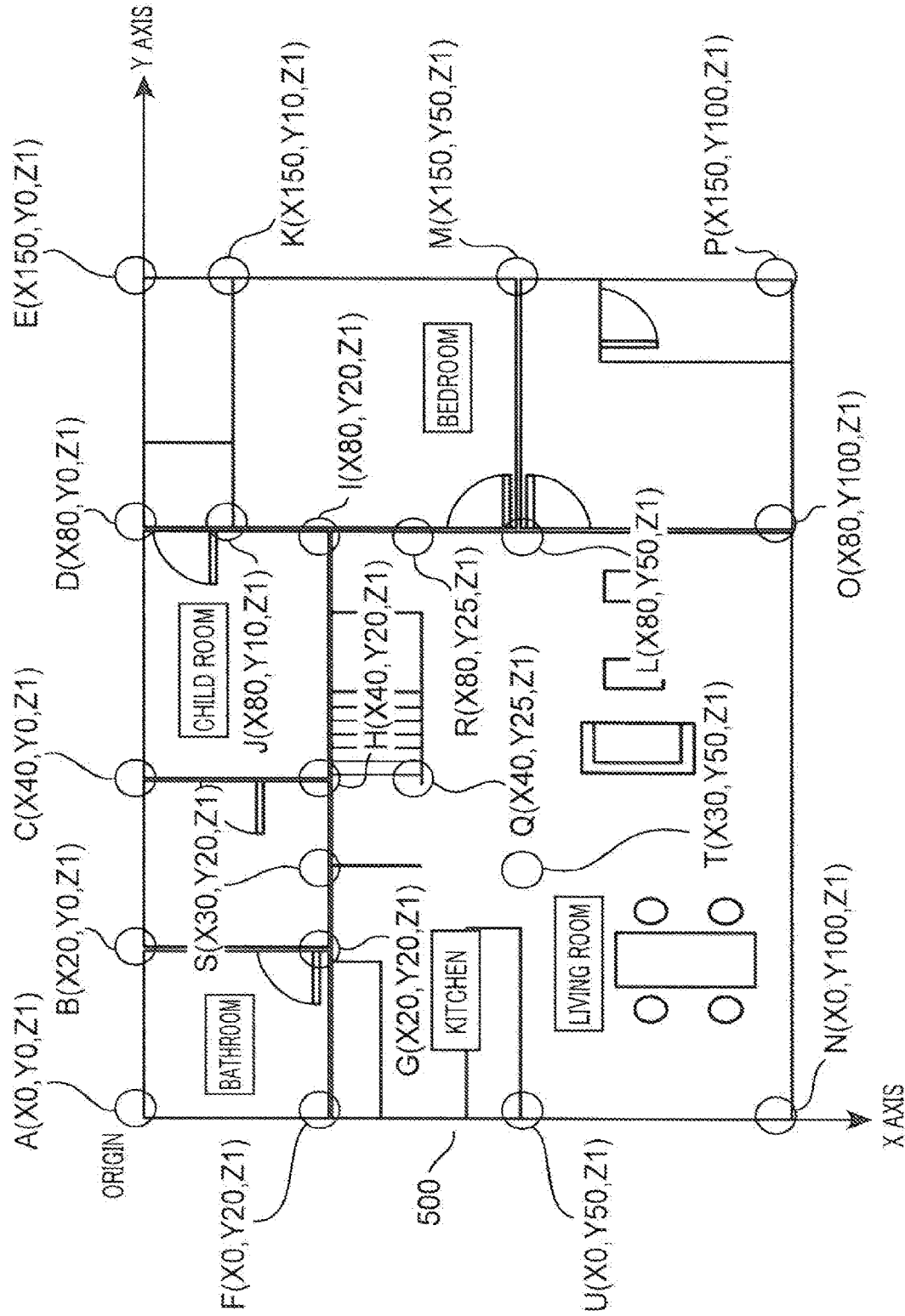
FIG. 107 is a diagram showing a correspondence relationship between each vertex registered in vertex information and a floor plan.

FIG. 107 is a diagram showing a correspondence relationship between each vertex registered in the vertex information 90800 and the floor plan 500. Note that, in FIG. 107, a top left vertex of the floor plan 500 is assumed to be an origin (both X coordinate and Y coordinate are 0). For example, since vertex coordinates of a vertex with a vertex ID of A are expressed as (X0, Y0, Z1), the vertex is positioned on the origin. In addition, since vertex coordinates of a vertex with a vertex ID of B are expressed as (X20, Y0, Z1), the vertex is positioned at a top right vertex of the bathroom.

The server 300 includes the vertex information 90800 and the room information 90900. Therefore, by plotting vertices indicated by the vertex information 70800 on image data of the floor plan 500 and connecting vertices indicated by room coordinates 70903 in the room information 70900, the device control section 302 can identify a region of the room represented on the floor plan 500 and calculate an area of the identified region. The sizes shown in FIG. 106 indicate areas of the respective rooms as calculated by the device control section 302.

The device control section 302 calculates an area of a room type corresponding to a device type of the device to be registered based on the vertex information 90800 and the room information 90900. In addition, the device control section 302 searches for a size range of a room corresponding to the performance of the device to be registered in the reference table 90700. Subsequently, the device control section 302 searches for a room type corresponding to an area included in the searched size range among the calculated areas of room types.

Next, the device control section 302 excludes a room type corresponding to a room in which a device of a same type as the device 200 to be newly registered is already installed from the room types that are the search result (S90504). The chance of the newly registered device 200 being installed is low in a room in which a device of a same type as the device 200 to be newly registered is already installed. Therefore, a room in which a device of a same type as the device 200 to be newly registered is already installed is excluded from installation candidates of the device 200 to be newly registered.

The device control section 302 refers to the device list 70700 (FIG. 80), identifies a room ID corresponding to a same device type as the device type of the device 200 to be newly registered, and identifies a room type corresponding to the identified room ID. The device control section 302 excludes the identified room type from the room types searched in step S90503.

Next, the device control section 302 determines the number of remaining room types (S90505). In this case, when the number of remaining room types is determined to be other than one or, in other words, when the number of remaining room types is determined to be zero or two or more ("other than one" in S90505), the device control section 302 transmits arrangement information including a device type indicating a type of a device icon representing one target device and display region information indicating a prescribed region on the display screen (S90506).

Moreover, for example, the prescribed region on the display screen is a region outside the display region of the floor plan 500 in the display screen.

On the other hand, when it is determined that the number of remaining room types is one ("one" in S90505), the device control section 302 searches for a room ID and position information of the one remaining room type and transmits arrangement information including a device type indicating a type of the device icon, a room type of a corresponding room, a room ID of the corresponding room, and position information representing a position of the corresponding room on the floor plan to the home controller 100 (S90507).

As described above, using one or two or more memories that manage, in association with each other, a device type (first information) indicating types of one or more device icons representing each of one or more target devices, performance information (second information) indicating a performance of a target device corresponding to the one or more device icons, and a room type (third information) indicating an attribute of each of the one or more rooms included in a display screen representing a floor plan of a building indicated by a same residence ID (building ID), an attribute of a room corresponding to a type of a device icon representing one target device and to a performance of the one target device is determined based on the received device new registration request (registration notification information).

In addition, a device type (fourth information) indicating a type of a device icon representing the one target device and a room type (fifth information) indicating the determined attribute of the room are transmitted via the network to the home controller 100 (information apparatus) which is managed in association with the same residence ID (building ID) and which displays a display screen representing a floor plan on a display.

Based on the device type (fourth information) and the room type (fifth information), the device icon representing the one target device is displayed in a region on the display screen corresponding to a room that corresponds to the device icon on the display 101 of the home controller 100 (information apparatus).

Furthermore, the one or two or more memories further manage position information (sixth information) of each of the one or more rooms on the floor plan. Using the position information (sixth information), position information of a room corresponding to a type of a device icon representing one target device and to a performance of the one target device is determined. In addition, the determined position information is transmitted to the home controller 100 (information apparatus) via the network. Based on the transmitted position information, the device icon representing the one target device is displayed in a region on the display screen corresponding to a room that corresponds to the device icon on the display 101 of the home controller 100 (information apparatus).

A specific displaying process of a device icon will now be described.

First, a specific displaying process of a device icon corresponding to a large-sized television set will be described.

Figure 108:
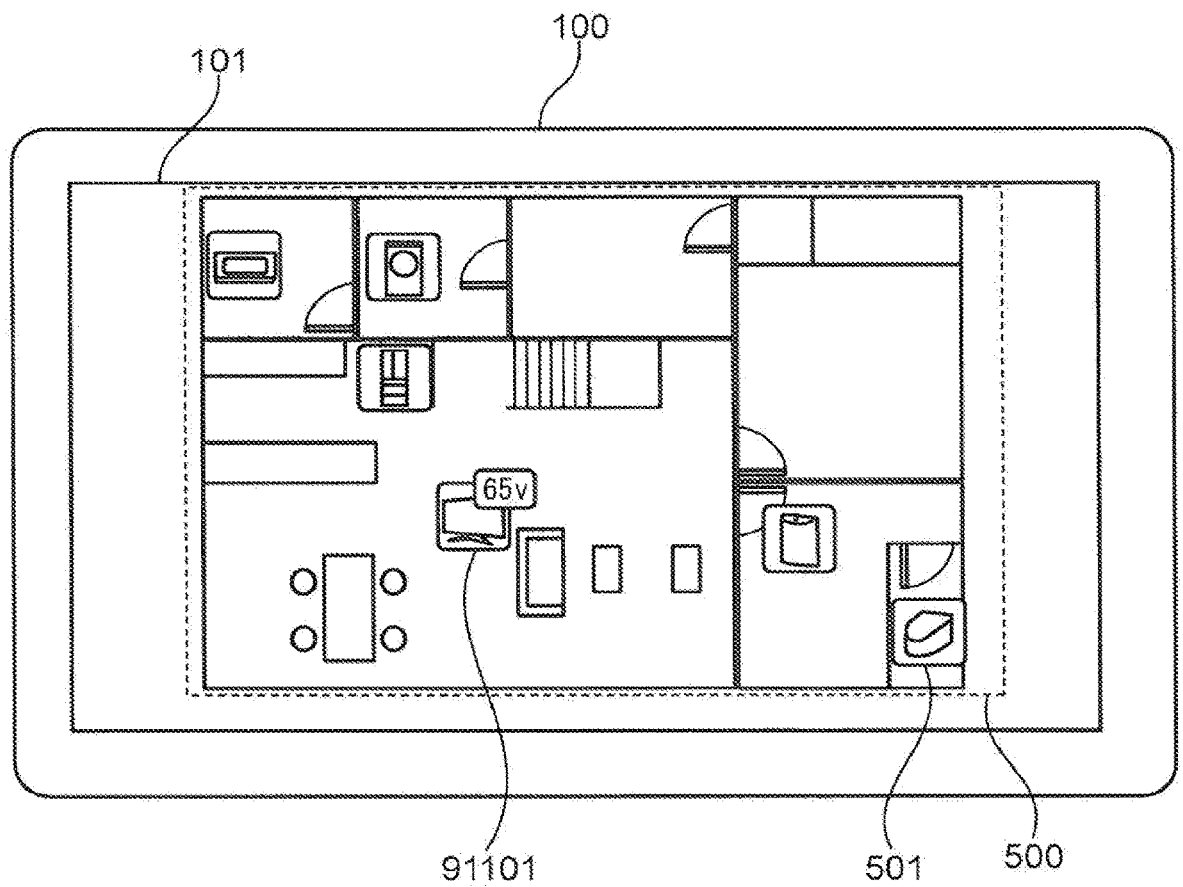
FIG. 108 is a diagram showing an example of a display screen of a home controller when a device to be newly registered is a large-sized television set.

FIG. 108 is a diagram showing an example of a display screen of a home controller when a device to be newly registered is a large-sized television set. In the following description, a device to be newly registered is a large-sized television set and a performance (screen size) of the device to be newly registered is 65 v. In addition, a television set is not arranged in any of the rooms in the residence prior to the television set being newly arranged. Furthermore, the room types "living room", "child room", and "bedroom" are associated with the device type "television set".

First, the device control section 302 determines whether or not a device new registration request has been received from a device that has been newly installed in the residence.

In this case, the server 300 receives the device new registration request shown in FIG. 100 from the television set.

Next, the device control section 302 searches for a room type corresponding to the device type 90602 included in the received device new registration request in the reference table 906100 (FIG. 102). In this case, since the device type 90602 is a television set, the device control section 302 extracts the three room types "living room", "child room", and "bedroom" from the reference table 906100.

The device control section 302 then calculates areas of the living room, the child room, and the bedroom corresponding to the television set to be registered based on the vertex information 90800 and the room information 90900. For example, the area of the living room is 40 m$^2$, the area of the child room is 14 m$^2$, and the area of the bedroom is 18 m$^2$. In addition, the device control section 302 searches for a size range of a room corresponding to the performance of the television set to be registered in the reference table 90700. For example, a size range of a room corresponding to the 65 v size is 26 to 99 m$^2$. Subsequently, the device control section 302 searches for a room type corresponding to an area included in the searched size range among the calculated areas of the living room, the child room, and the bedroom. As a result, the living room (40 m$^2$) is extracted as the room type corresponding to an area included in the searched size range (26 to 99 m$^2$).

Next, the device control section 302 excludes a room type corresponding to a room in which a device of a same type as the television set to be newly registered is already installed from the room types that are the search result. In this case, since a television set is not arranged in any of the rooms, only the living room that is the room type of the search result remains.

Therefore, the number of remaining room types is determined as one, and the device control section 302 searches for a room ID (A) and position information (room coordinates) of the one remaining room type (living room). Subsequently, the device control section 302 transmits arrangement information including a device type (television set) indicating a type of the device icon, the one remaining room type (living room), the searched room ID, and position information representing coordinates of the one remaining room to the home controller 100.

Upon receiving the arrangement information, the display control section 103 of the home controller 100 displays a device icon 91101 of the newly registered television set on the floor plan 500 based on the arrangement information. In this case, the device icon 91101 of the television set is displayed in a region on the display screen corresponding to the living room. In this manner, since a room corresponding to the television set is uniquely determined, the device icon 91101 of the television set is displayed in the living room.

Moreover, each of the one or more device icons displayed in a region on the display screen corresponding to a room that corresponds to each of the one or more device icons may include information indicating a performance of a target device. Specifically, as shown in FIG. 108, "65 v" that is information representing a screen size (65 v) of the television set is displayed in a top right portion of the device icon 91101 of the television set.

Next, a specific displaying process of a device icon corresponding to a small-sized television set will be described.

Figure 110:
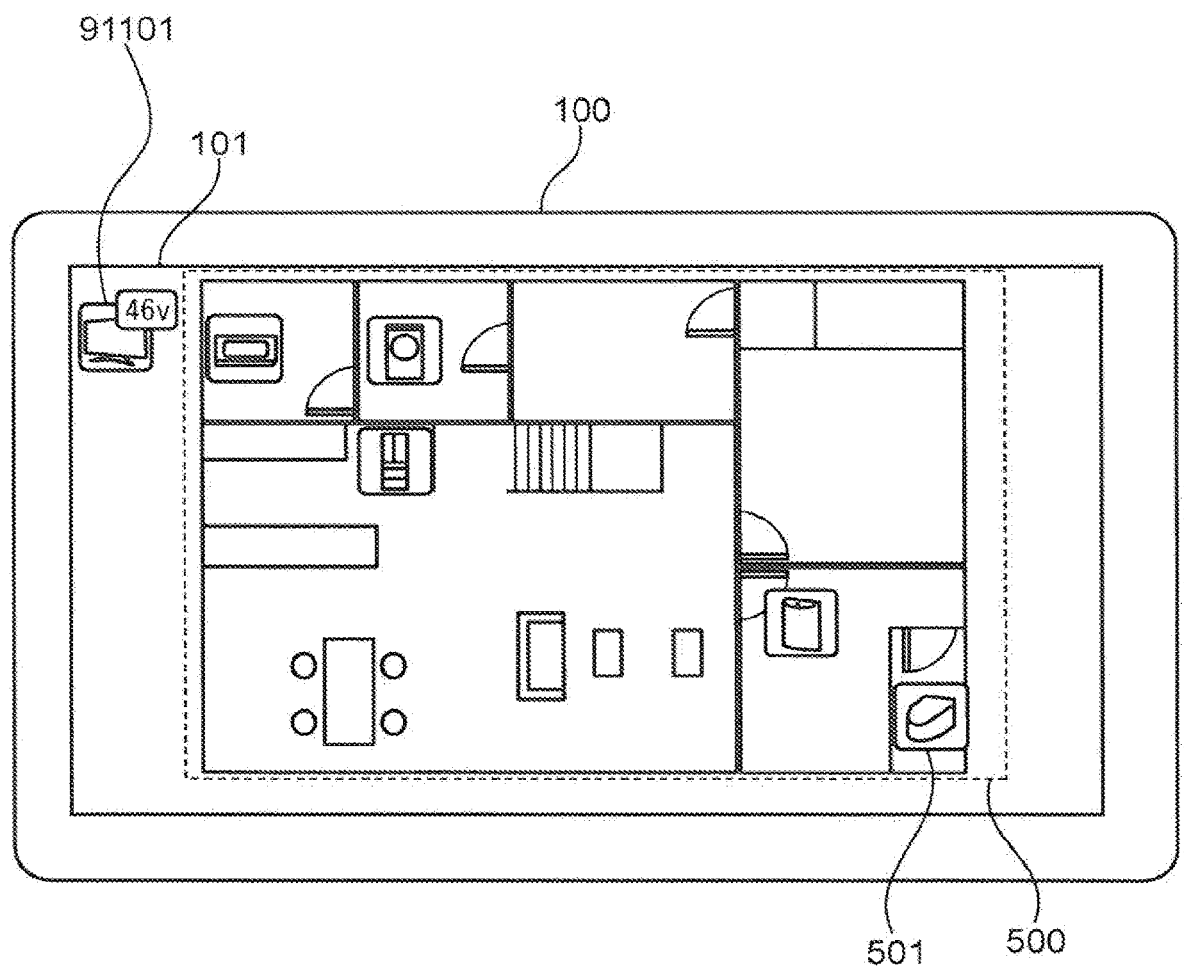
FIG. 110 is a diagram showing an example of a display screen of a home controller when a device to be newly registered is a small-sized television set.

FIG. 109 is a diagram showing an example of a device new registration request when a device to be newly registered is a small-sized television set, and FIG. 110 is a diagram showing an example of a display screen of a home controller when a device to be newly registered is a small-sized television set. In the following description, a device to be newly registered is a television set and a performance (screen size) of the device to be newly registered is 46 v. In addition, a television set is not arranged in any of the rooms in the residence prior to the television set being newly arranged. Furthermore, the room types "living room", "child room", and "bedroom" are associated with the device type "television set".

First, the device control section 302 determines whether or not a device new registration request has been received from the device that has been newly installed in the residence. In this case, the server 300 receives the device new registration request shown in FIG. 109 from the television set.

Next, the device control section 302 searches for a room type corresponding to the device type 90602 included in the received device new registration request in the reference table 906100 (FIG. 102). In this case, since the device type 90602 is a television set, the device control section 302 extracts the three room types "living room", "child room", and "bedroom" from the reference table 906100.

The device control section 302 then calculates areas of the living room, the child room, and the bedroom corresponding to the television set to be registered based on the vertex information 90800 and the room information 90900. For example, the area of the living room is 40 $m^2$, the area of the child room is 14 $m^2$, and the area of the bedroom is 18 $m^2$. In addition, the device control section 302 searches for a size range of a room corresponding to the performance of the television set to be registered in the reference table 90700. For example, a size range of a room corresponding to the 46 v size is 13 to 18 $m^2$. Subsequently, the device control section 302 searches for a room type corresponding to an area included in the searched size range among the calculated areas of the living room, the child room, and the bedroom. As a result, the child room (14 $m^2$) and the bedroom (18 $m^2$) are extracted as room types corresponding to an area included in the searched size range (13 to 18 $m^2$).

Next, the device control section 302 excludes a room type corresponding to a room in which a device of a same type as the television set to be newly registered is already installed from the room types that are the search result. In this case, since a television set is not arranged in any of the rooms, the child room and the bedroom among the room types that are the search result remain.

Therefore, the number of remaining room types is determined to be other than one and the device control section 302 transmits arrangement information including a device type (television set) indicating a type of a device icon representing the one target device and display region information indicating a prescribed region on the display screen to the home controller 100. Moreover, the prescribed region on the display screen is a region outside the display region of the floor plan 500.

Upon receiving the arrangement information, the display control section 103 of the home controller 100 displays the device icon 91101 of the newly registered television set on the display 101 based on the arrangement information. In this case, the device icon 91101 of the television set is displayed in a region outside the display region of the floor plan 500. As described above, since there are two or more rooms corresponding to the small-sized television set, the device icon 91101 of the television set is displayed in a region outside the display region of the floor plan 500.

Next, a specific displaying process of a device icon corresponding to an air conditioner will be described.

Figure 111:
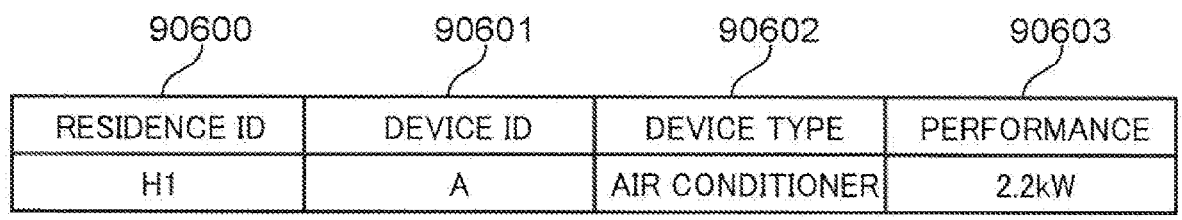
FIG. 111 is a diagram showing an example of a device new registration request when a device to be newly registered is an air conditioner.
Figure 113:
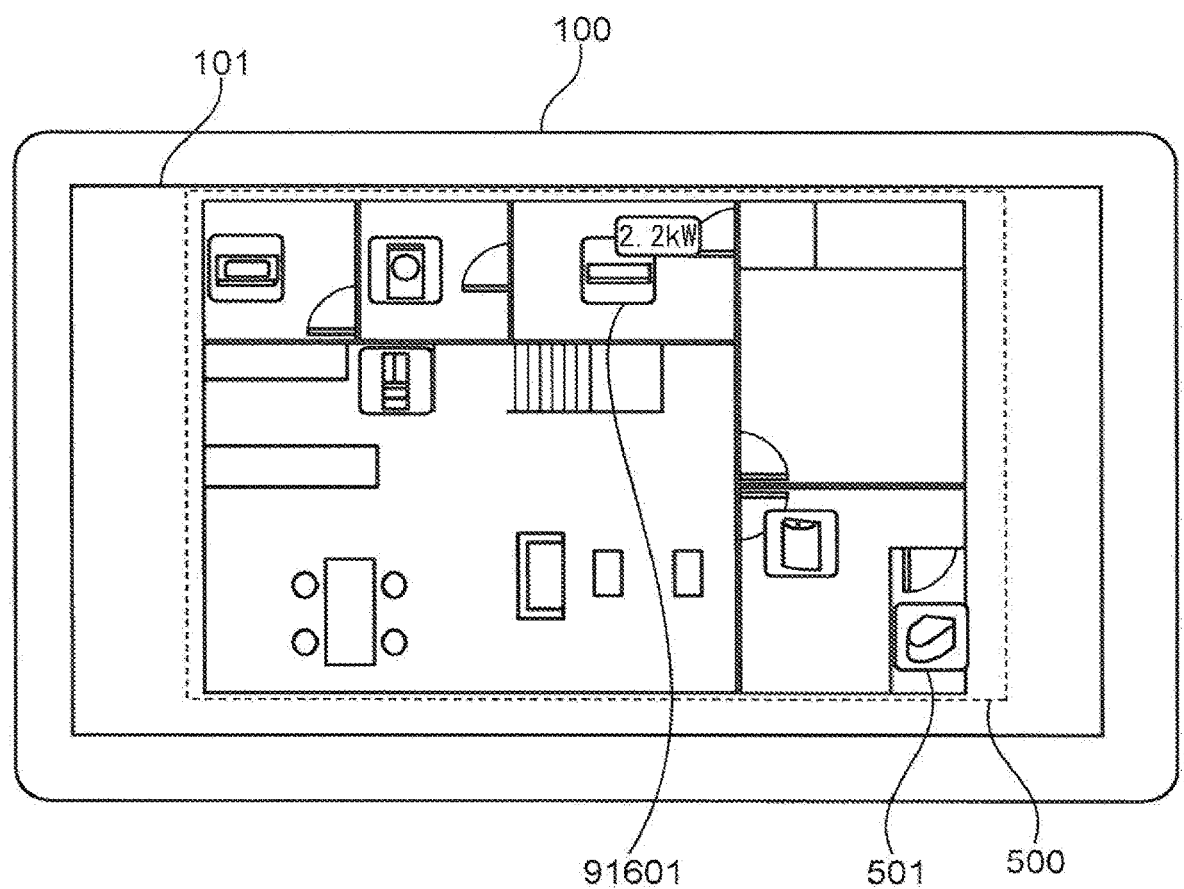
FIG. 113 is a diagram showing an example of a display screen of a home controller when a device to be newly registered is an air conditioner.

FIG. 111 is a diagram showing an example of a device new registration request when a device to be newly registered is an air conditioner, FIG. 112 is a diagram showing an example of a reference table that associates a device performance and a room size with each other when a device type is an air conditioner, and FIG. 113 is a diagram showing an example of a display screen of a home controller when a device to be newly registered is an air conditioner. In the following description, a device to be newly registered is an air conditioner and a performance (maximum output) of the device to be newly registered is 2.2 kW. In addition, an air conditioner is not arranged in any of the rooms in the residence prior to the air conditioner being newly arranged. Furthermore, the room types "living room", "child room", and "bedroom" are associated with the device type "air conditioner".

First, the device control section 302 determines whether or not a device new registration request has been received from the device that has been newly installed in the residence. In this case, the server 300 receives the device new registration request shown in FIG. 111 from the air conditioner.

Next, the device control section 302 searches for a room type corresponding to the device type 90602 included in the received device new registration request in the reference table 906100 (FIG. 102). In this case, since the device type 90602 is an air conditioner, the device control section 302 extracts the three room types "living room", "child room", and "bedroom" from the reference table 906100.

The device control section 302 then calculates areas of the living room, the child room, and the bedroom corresponding to the air conditioner to be registered based on the vertex information 90800 and the room information 90900. For example, the area of the living room is 40 $m^2$, the area of the child room is 14 $m^2$, and the area of the bedroom is 18 $m^2$. In addition, the device control section 302 searches for a size range of a room corresponding to the performance of the air conditioner to be registered in the reference table 91500.

As shown in FIG. 112, a performance ID 91501 for identifying a performance of a device, a performance 91502 representing the performance of the device, a smallest room size 91503, and a largest room size 91504 are associated with each other. Moreover, the performance shown in FIG. 112 represents the performance of an air conditioner and, more specifically, a maximum output.

For example, a smallest room size "10 $m^2$" and a largest room size "15 $m^2$" are associated with the performance "2.2 kW", a smallest room size "12 $m^2$" and a largest room size "17 $m^2$" are associated with the performance "2.5 kW", a smallest room size "13 $m^2$" and a largest room size "20 m" are associated with the performance "2.8 kW", and a smallest room size "17 $m^2$" and a largest room size "25 $m^2$" are associated with the performance "3.6 kW".

In other words, a size range of 10 to 15 $m^2$ is associated with the performance "2.2 kW" and a size range of 12 to 17 $m^2$ is associated with the performance "2.5 kW".

For example, a size range of a room corresponding to 2.2 kW is 10 to 15 $m^2$. Subsequently, the device control section 302 searches for a room type corresponding to an area included in the searched size range among the calculated areas of the living room, the child room, and the bedroom. As a result, the child room (14 $m^2$) is extracted as the room type corresponding to an area included in the searched size range (10 to 15 $m^2$).

Next, the device control section 302 excludes a room type corresponding to a room in which a device of a same type as the air conditioner to be newly registered is already installed from the room types that are the search result. In this case, since an air conditioner is not arranged in any of the rooms, only the child room that is a room type that is the search result remains.

Therefore, the number of remaining room types is determined as one, and the device control section 302 searches for a room ID (G) and position information (room coordinates) of the one remaining room type (child room). Subsequently, the device control section 302 transmits arrangement information including a device type (air conditioner) indicating a type of the device icon, the one remaining room type (child room), the searched room ID, and position information representing coordinates of the one remaining room to the home controller 100.

Upon receiving the arrangement information, the display control section 103 of the home controller 100 displays a device icon 91601 of the newly registered air conditioner on the floor plan 500 based on the arrangement information. In this case, the device icon 91601 of the air conditioner is displayed in a region on the display screen corresponding to the child room. In this manner, since a room corresponding to the air conditioner is uniquely determined, the device icon 91101 of the air conditioner is displayed in the child room.

Next, a specific displaying process of a device icon corresponding to an illumination device will be described.

Figure 116:
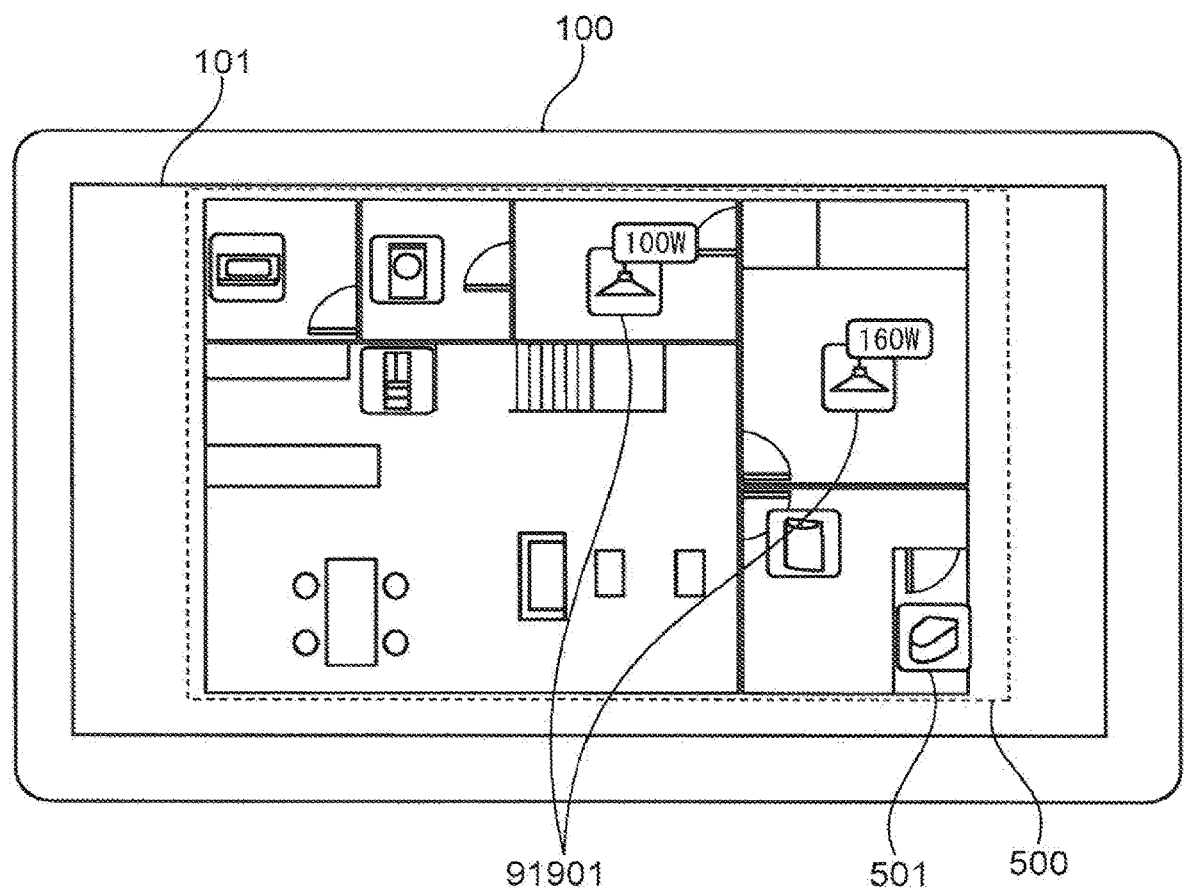
FIG. 116 is a diagram showing an example of a display screen of a home controller when devices to be newly registered are two illumination devices.

FIG. 114 is a diagram showing an example of a device new registration request when devices to be newly registered are two illumination devices, FIG. 115 is a diagram showing an example of a reference table that associates a device performance and a room size with each other when a device type is an illumination device, and FIG. 116 is a diagram showing an example of a display screen of a home controller when devices to be newly registered are two illumination devices. In the following description, devices to be newly registered are two illumination devices and performances (power consumption) of the devices to be newly registered are 100 W and 160 W, respectively. In addition, an illumination device is not arranged in any of the rooms in the residence prior to the two illumination devices being newly arranged. Furthermore, the room types "living room", "child room", and "bedroom" are associated with the device type "illumination device".

First, the device control section 302 determines whether or not a device new registration request has been received from the device that has been newly installed in the residence. In this case, the server 300 receives the two device new registration requests shown in FIG. 114 from the two illumination devices.

Moreover, when device new registration requests are received from a plurality of devices of a same type, the device control section 302 individually processes each device.

Next, the device control section 302 searches for a room type corresponding to the device type 90602 included in each received device new registration request in the reference table 906100. In this case, since the device type 90602 is an illumination device, the device control section 302 extracts the three room types "living room", "child room", and "bedroom" from the reference table 906100.

The device control section 302 then calculates areas of the living room, the child room, and the bedroom corresponding to the illumination device to be registered based on the vertex information 90800 and the room information 90900. For example, the area of the living room is 40 m$^2$, the area of the child room is 14 m$^2$, and the area of the bedroom is 18 m$^2$. In addition, the device control section 302 searches for a size range of a room corresponding to the performance of the illumination device to be registered in the reference table 91800 (FIG. 115).

As shown in FIG. 115, a performance ID 91801 for identifying a performance of a device, a performance 91802 representing the performance of the device, a smallest room size 91803, and a largest room size 91804 are associated with each other. Moreover, the performance shown in FIG. 115 represents the performance of an illumination device and, more specifically, power consumption. In addition, while the performance of an illumination device according to the present embodiment is expressed by power consumption, the present disclosure is not particularly limited thereto and the performance of an illumination device may instead be expressed by maximum illuminance.

For example, a smallest room size "0 m$^2$" and a largest room size "7 m$^2$" are associated with the performance "40 W", a smallest room size "7 m$^2$" and a largest room size "10 m$^2$" are associated with the performance "62 W", a smallest room size "10 m$^2$" and a largest room size "13 m$^2$" are associated with the performance "72 W", and a smallest room size "13 m$^2$" and a largest room size "17 m$^2$" are associated with the performance "100 W".

In other words, a size range of 0 to 7 m$^2$ is associated with the performance "40 W" and a size range of 7 to 10 m$^2$ is associated with the performance "62 W".

For example, a size range of a room corresponding to 100 W is 13 to 17 m$^2$ and a size range of a room corresponding to 160 W is 17 to 23 m$^2$. Subsequently, the device control section 302 searches for a room type corresponding to an area included in the searched size range among the calculated areas of the living room, the child room, and the bedroom. As a result, the child room (14 m$^2$) is extracted as the searched room type corresponding to an area included in the size range (13 to 17 m$^2$) of a room corresponding to 100 W, and the bedroom (18 m$^2$) is extracted as the searched room type corresponding to an area included in the size range (17 to 23 m$^2$) of a room corresponding to 160 W.

Next, the device control section 302 excludes a room type corresponding to a room in which a device of a same type as the illumination device to be newly registered is already installed from the room types that are the search result. In this case, since an illumination device is not arranged in any of the rooms, the child room that is a room type of the search result remains with respect to the 100 W illumination device and the bedroom that is a room type of the search result remains with respect to the 160 W illumination device.

Therefore, for each illumination device, the number of remaining room types is determined as one, and the device control section 302 searches for a room ID (G) and position information (room coordinates) of the one remaining room type (child room) for the 100 W illumination device. In addition, for the 160 W illumination device, the device control section 302 searches for a room ID (B) and position information (room coordinates) of the one remaining room type (bedroom). Subsequently, the device control section 302 transmits first arrangement information including a device type (100 W illumination device) indicating a type of the device icon, the one remaining room type (child room), the searched room ID, and position information representing coordinates of the one remaining room and second arrangement information including a device type (160 W illumination device) indicating a type of the device icon, the one remaining room type (bedroom), the searched room ID, and position information representing coordinates of the one remaining room to the home controller 100.

Upon receiving the arrangement information, the display control section 103 of the home controller 100 displays device icons 91901 and 91902 of the two newly registered illumination devices on the floor plan 500 based on the arrangement information. In this case, the device icon 91901 of one illumination device is displayed in a region on the display screen corresponding to the child room and the device icon 91902 of the other illumination device is displayed in a region on the display screen corresponding to the bedroom. In this manner, since rooms corresponding to the two illumination devices are respectively uniquely determined, the device icons 91901 and 91902 of the two illumination devices are respectively displayed in the child room and the bedroom.

As described above, device new registration requests (registration notification information) representing that two or more target devices among one or more target devices have been newly registered in the home control system (information management system) are received from the two or more target devices via the network. When it is determined that the types of two or more device icons representing each of the two or more target devices are the same based on device types (first information), an attribute of a room corresponding to each of the two or more device icons is determined in accordance with performance of each of the two or more target devices based on room types (second information). Subsequently, for each of the two or more device icons, a device type (fourth information) indicating a type of each of the two or more device icons and a room type (fifth information) indicating an attribute of each room are transmitted via the network to the home controller 100 (information apparatus). In addition, based on the device type (fourth information) and the room type (fifth information), the two or more device icons are displayed in a region on the display screen corresponding to a room that corresponds to each of the two or more device icons on the display 101 of the home controller 100 (information apparatus).

Next, an initial arrangement deciding process for deciding arrangement positions of a plurality of device icons corresponding to a plurality of devices of a same type will be described.

Figure 117:
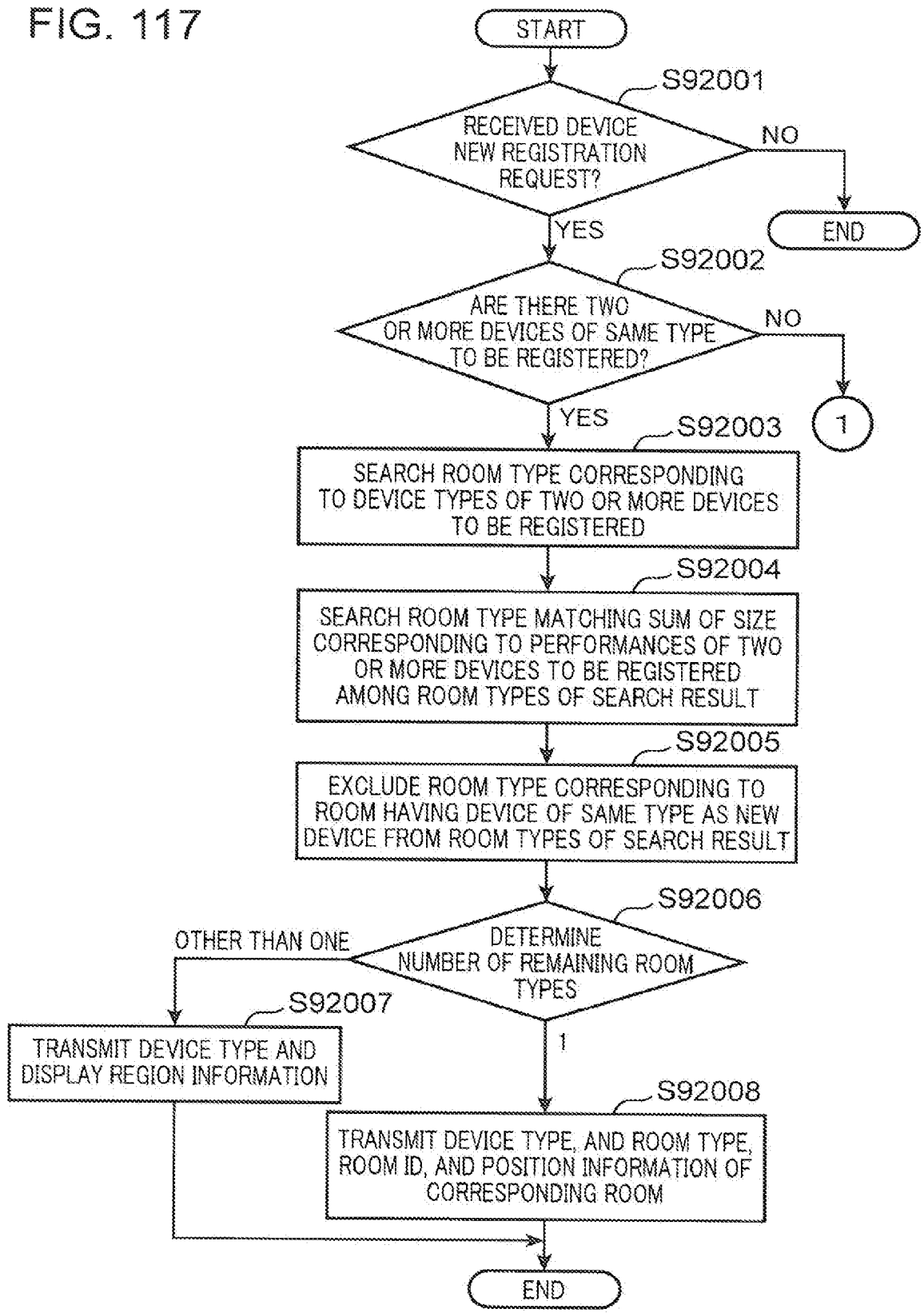
FIG. 117 is a flow chart for explaining an initial arrangement deciding process for deciding arrangement positions of a plurality of device icons corresponding to a plurality of devices of a same type.

FIG. 117 is a flow chart for explaining an initial arrangement deciding process for deciding arrangement positions of a plurality of device icons corresponding to a plurality of devices of a same type.

First, the device control section 302 determines whether or not the device new registration request from the device 200 has been received (S92001).

At this point, when it is determined that the device new registration request from the device 200 has not been received (NO in S92001), the process is finished.

On the other hand, when it is determined that the device new registration request from the device 200 has been received (YES in S92001), the device control section 302 determines whether or not there are two or more devices to be registered and that the devices are of the same type (S92002). At this point, when it is determined that there is one device to be registered or that there are two or more devices to be registered but the devices are not of the same type (NO in S92002), a transition is made to the process of step S90502 in FIG. 101. Subsequently, the process of step S90502 and thereafter is executed.

On the other hand, when it is determined that there are two or more devices to be registered and that the devices are of the same type (YES in S92002), the device control section 302 searches for a room type corresponding to the device type of the two or more devices 200 to be registered (S92003). The device control section 302 searches for a room type corresponding to the device type 90602 included in the received device new registration request in the reference table 906100.

Next, the device control section 302 searches for a room type matching a total size corresponding to the performances of the two or more devices to be registered from the room types that are search results (S92004). For example, when the devices to be registered are a 100 W illumination device and a 160 W illumination device, a reference table 91800 shown in FIG. 115 is used. In this case, a total size corresponding to performances of the 100 W illumination device and the 160 W illumination device are expressed by a size (30 m$^2$) combining a smallest room size (13 m$^2$) corresponding to 100 W and a smallest room size (17 m$^2$) corresponding to 160 W and a size (40 m$^2$) combining a largest room size (17 m$^2$) corresponding to 100 W and a largest room size (23 m$^2$) corresponding to 160 W. In other words, a size range of 30 to 40 m$^2$ is associated with the performances of the 100 W illumination device and the 160 W illumination device.

The device control section 302 calculates an area of a room type corresponding to a device type of the two or more devices to be registered based on the vertex information 90800 and the room information 90900. In addition, the device control section 302 searches for a size range representing a range between a sum of smallest sizes and a sum of largest sizes corresponding to each performance of the two or more devices to be registered in a reference table. Subsequently, the device control section 302 searches for a room type corresponding to an area included in the searched size range among the calculated areas of room types.

Next, the device control section 302 excludes a room type corresponding to a room in which a device of a same type as the device 200 to be newly registered is already installed from the room types that are the search result (S92005).

The device control section 302 then determines the number of remaining room types (S92006). In this case, when the number of remaining room types is determined to be other than one or, in other words, when the number of remaining room types is determined to be zero or two or more ("other than one" in S92006), the device control section 302 transmits arrangement information including a device type indicating a type of device icons representing the two or more devices and display region information indicating a prescribed region on the display screen (S92007).

Moreover, for example, the prescribed region on the display screen is a region outside the display region of the floor plan 500 in the display screen.

On the other hand, when it is determined that the number of remaining room types is one ("one" in S92006), the device control section 302 searches for a room ID and position information of the one remaining room type and transmits arrangement information including a device type indicating a type of the device icon, a room type of a corresponding room, a room ID of the corresponding room, and position information representing a position of the corresponding room on the floor plan to the home controller 100 (S92008).

As described above, device new registration requests (registration notification information) representing that two or more target devices among one or more target devices have been newly registered in the home control system (information management system) are received from the two or more target devices via the network. When it is determined that the types of two or more device icons representing each of the two or more target devices are the same based on device types (first information), a sum of respective performances of the two or more device icons is determined based on the second information and an attribute of one room with a size corresponding to the determined sum of performances is determined. Subsequently, a device type (fourth information) indicating a type of the two or more device icons and a room type (fifth information) indicating an attribute of the one room are transmitted via the network to the home controller 100 (information apparatus). In addition, based on the device type (fourth information) and the room type (fifth information), the two or more device icons are displayed in a region on the display screen corresponding to the one room on the display 101 of the home controller 100 (information apparatus).

Next, a specific displaying process of two or more device icons corresponding to two or more illumination devices will be described.

Figure 118:
FIG. 118 is a diagram showing an example of a device new registration request when devices to be newly registered are two illumination devices.
Figure 119:
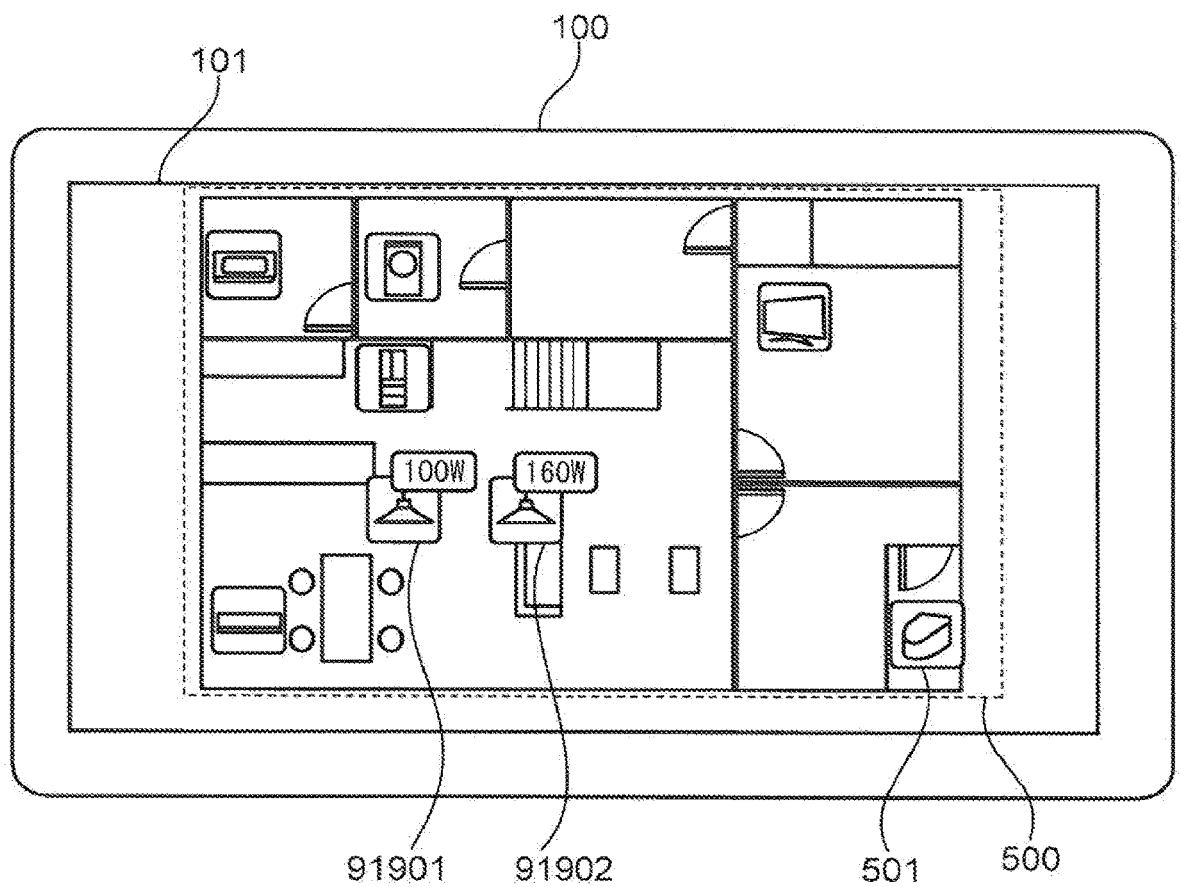

FIG. 118 is a diagram showing an example of a device new registration request when devices to be newly registered are two illumination devices, and FIG. 119 is a diagram showing an example of a display screen of a home controller when devices to be newly registered are two illumination devices. In the following description, devices to be newly registered are two illumination devices and performances (power consumption) of the devices to be newly registered are 100 W and 160 W, respectively. In addition, an illumination device is not arranged in any of the rooms in the residence prior to the two illumination devices being newly arranged. Furthermore, the room types "living room", "child room", and "bedroom" are associated with the device type "illumination device".

First, the device control section 302 determines whether or not a device new registration request has been received from the device that has been newly installed in the residence. In this case, the server 300 receives the device new registration requests shown in FIG. 118 from one of the two illumination devices. When two or more devices are to be newly registered, one device among the two or more devices transmits a device new registration request summarizing devices types, performances, and the like of all devices. Moreover, when the device new registration request is to be transmitted from the device 200 to the server 300 via the home controller 100, the home controller 100 may transmit a device new registration request summarizing devices types, performances, and the like of the two or more devices.

Next, the device control section 302 determines whether or not there are two or more devices to be registered and that the devices are of the same type. When there are two or more devices of the same type included in the device new registration request, the device control section 302 determines that there are two or more devices to be registered and that the devices are of the same type. Moreover, when it is determined that there are two or more devices to be registered but the devices are not of the same type, the device control section 302 individually processes each device.

Since the device new registration request shown in FIG. 118 includes information related to two illumination devices, the device control section 302 determines that there are two or more devices to be registered and that the devices are of the same type.

Next, the device control section 302 searches for a room type corresponding to the device type 90602 included in the received device new registration request in the reference table 906100. In this case, since the device type 90602 is an illumination device, the device control section 302 extracts the three room types "living room", "child room", and "bedroom" from the reference table 906100.

The device control section 302 then calculates areas of the living room, the child room, and the bedroom corresponding to the two illumination devices to be registered based on the vertex information 90800 and the room information 90900. For example, the area of the living room is 40 m$^2$, the area of the child room is 14 m$^2$, and the area of the bedroom is 18 m$^2$. In addition, the device control section 302 searches for a size range corresponding to the performances of the two illumination devices to be registered in the reference table 91800 (FIG. 115).

For example, a size range corresponding to 100 W is 13 to 17 m$^2$ and a size range corresponding to 160 W is 17 to 23 m$^2$. Therefore, a size range combining the size range corresponding to 100 W with the size range corresponding to 160 W is 30 to 40 m$^2$. Subsequently, the device control section 302 searches for a room type corresponding to an area included in the searched size range among the calculated areas of the living room, the child room, and the bedroom. As a result, the living room (40 m$^2$) is extracted as the room type corresponding to an area included in the searched size range (30 to 40 m$^2$) corresponding to the two illumination devices.

Next, the device control section 302 excludes a room type corresponding to a room in which a device of a same type as the two illumination devices to be newly registered is already installed from the room types that are the search result. In this case, since an illumination device is not arranged in any of the rooms, the living room that is the room type of the search result remains.

Therefore, the number of remaining room types is determined as one, and the device control section 302 searches for a room ID (A) and position information (room coordinates) of the one remaining room type (living room). Subsequently, the device control section 302 transmits arrangement information including device types (100 W and 160 W illumination devices) indicating the types of the two device icons, the one remaining room type (living room), the searched room ID, and position information representing coordinates of the one remaining room to the home controller 100.

Upon receiving the arrangement information, the display control section 103 of the home controller 100 displays device icons 91901 and 91902 of the two newly registered illumination devices on the floor plan 500 based on the arrangement information. In this case, the device icons 91901 and 91902 of the two illumination devices are both displayed in a region on the display screen corresponding to the living room. In this manner, since rooms corresponding to the two illumination devices are respectively uniquely determined, the device icons 91901 and 91902 of the two illumination devices are respectively displayed in the living room.

While a bird's eye view representing positions and shapes of rooms constituting each floor in a planar manner is adopted as the floor plan 500 in the description given above, the present embodiment is not limited thereto and a diagram showing what kind of and how many rooms are on each floor in a simplified manner may also be adopted as a floor plan.

Figure 120:
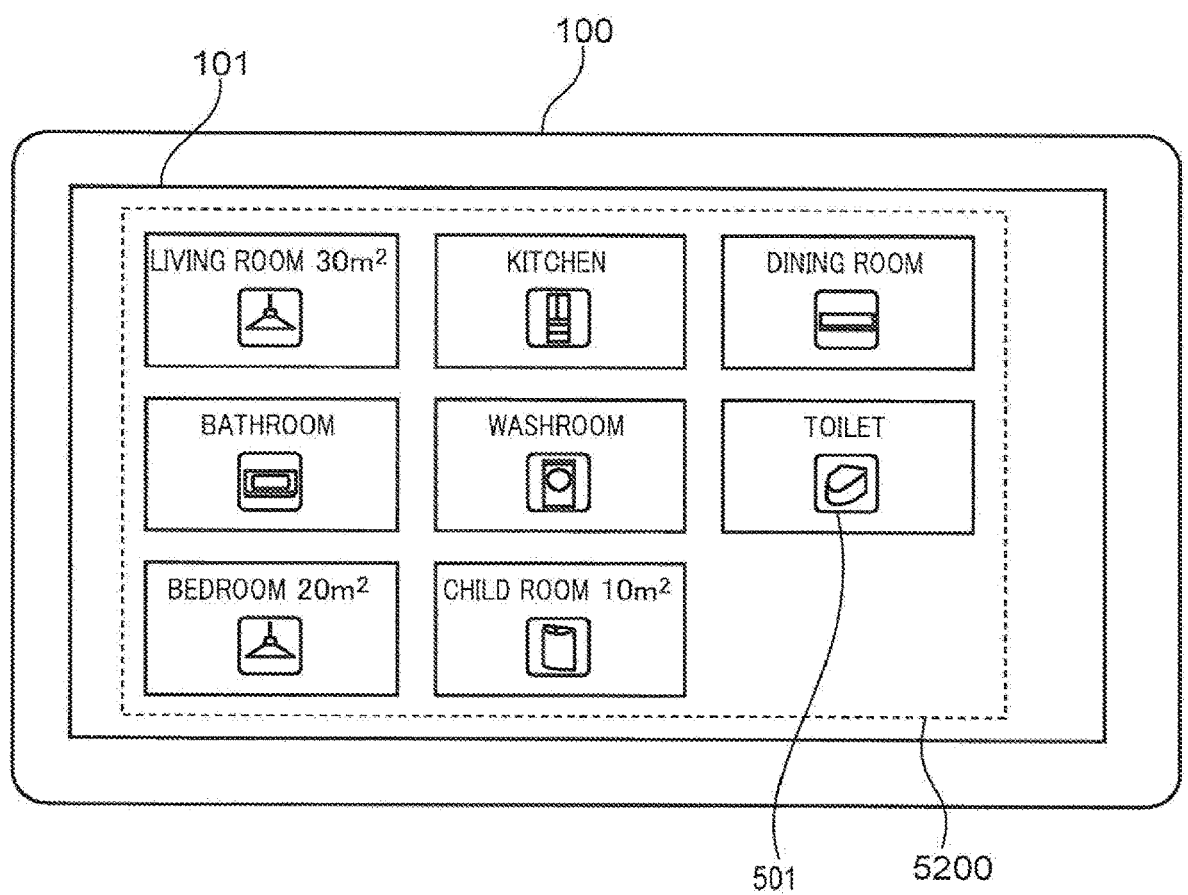

Hereinafter, a different pattern of a floor plan will be specifically described. FIG. 120 is a diagram showing a floor plan 5200 with a different pattern. On the floor plan 5200, one room constituting one floor is represented by one square block and respective rooms on one floor are arranged in a matrix pattern. In addition, sizes of the respective blocks are the same, and a name and an area of a room are described in each block.

For example, the floor plan 5200 includes the respective rooms of a living room, a kitchen, a dining room, a bathroom, a washroom, a toilet, a bedroom, and a child room. In addition, a device icon 501 of an actually arranged device 200 is displayed in each room. For example, the device icon 501 of an illumination device displayed in the living room signifies that an illumination device is installed in the living room.

Even when such a floor plan 5200 is displayed, a device icon of a device to be newly registered can be displayed in the same manner as described earlier.

Figure 121:
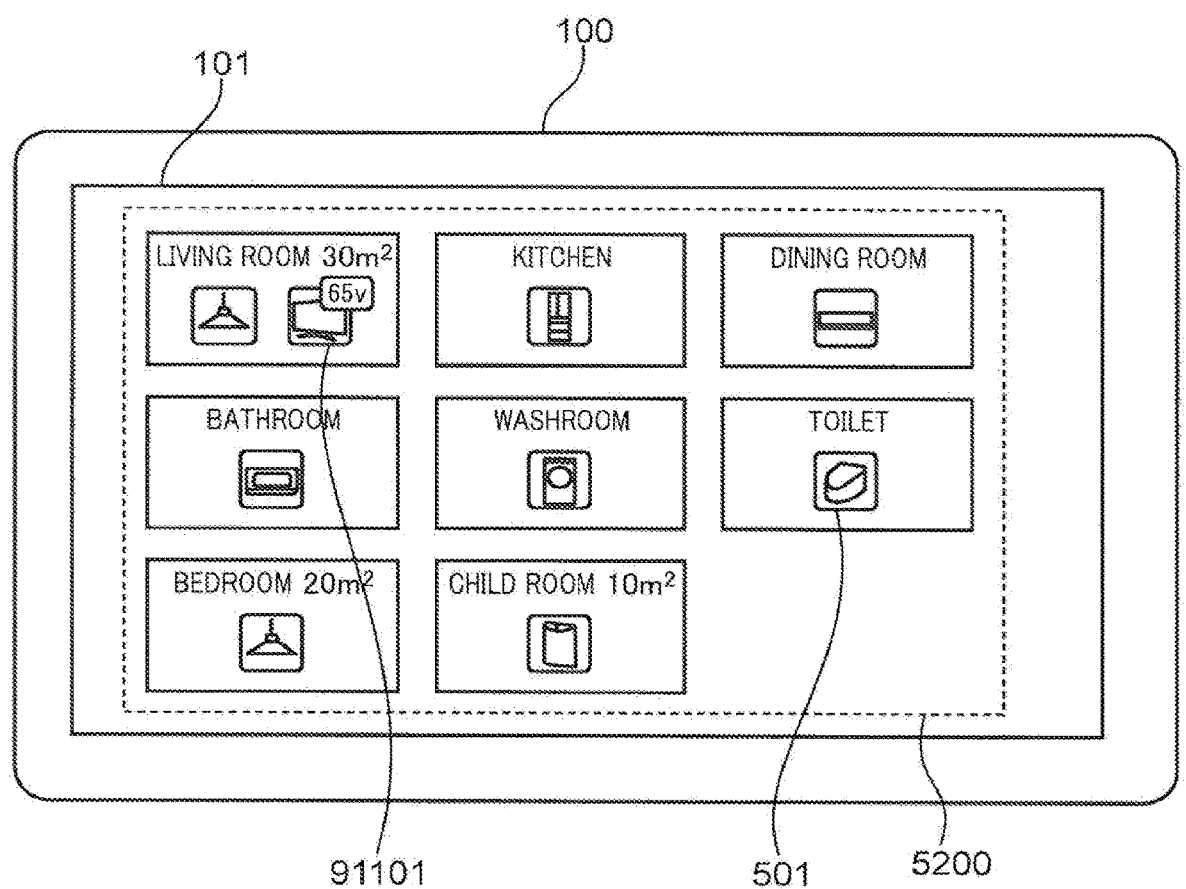

FIG. 121 is a diagram for explaining an example of displaying a device icon of a device to be newly registered on the floor plan 5200 with a different pattern.

On the floor plan 5200 shown in FIG. 121, a display method of a device icon when a device is to be newly registered is almost the same as the display method of a device icon on the floor plan 500 described earlier. A difference is that an area of each room is stored in advance in association to each room. When calculating a size of each room in step S90503 in FIG. 101, the device control section 302 reads out and utilizes an area stored in advance instead of calculating an area based on vertex coordinates or the like.

In FIG. 121, a device icon 91101 of a newly registered television set is displayed on the floor plan 5200. A performance of the newly registered television set is 65 v. Therefore, the device icon 91101 of the newly registered television set is displayed in a region corresponding to the living room of which size is in accordance with the performance of the newly registered television set.

While an arrangement position of a device icon corresponding to a device to be newly registered is decided by the server 300 in the description given above, the present disclosure is not particularly limited thereto and the arrangement position may be decided by the home controller 100. A process for deciding an arrangement position of a device icon corresponding to a device to be newly registered by the home controller 100 will now be described with reference to FIG. 122.

Figure 122:
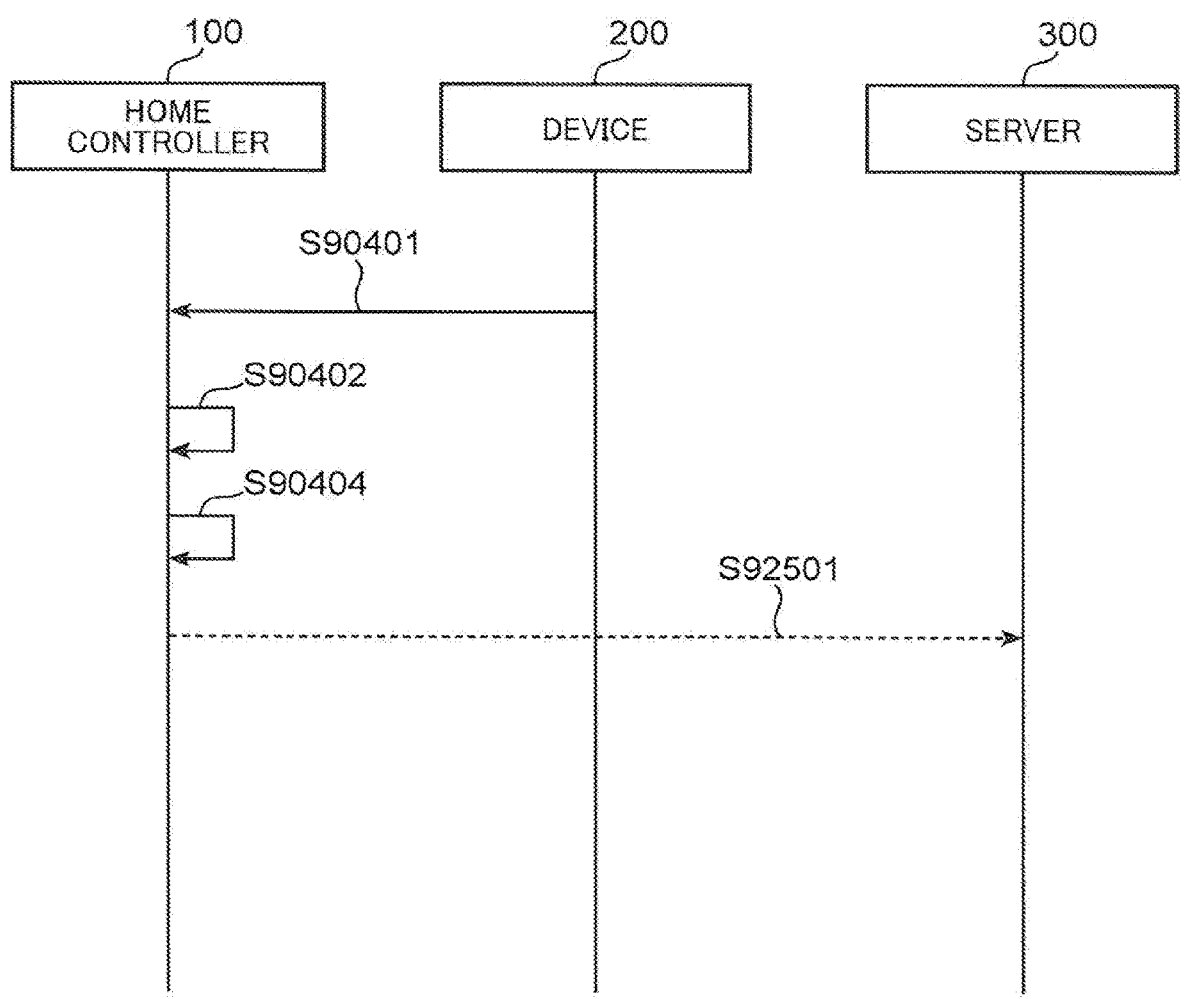

FIG. 122 is a sequence diagram showing a flow of a process by the home controller 100 for deciding an arrangement position of a device icon corresponding to a device to be newly registered.

When a device 200 is newly arranged in a prescribed room inside the house, the communication control section 217 of the device 200 transmits a device new registration request to the home controller 100 (S90401).

Next, the device management section 105 of the home controller 100 receives the device new registration request from the device 200 and performs an initial arrangement deciding process for deciding an arrangement position on the floor plan of a device icon corresponding to the device 200 to be newly registered (S90402). Moreover, the initial arrangement deciding process by the home controller 100 will be described later.

Next, the display control section 103 of the home controller 100 displays a device icon corresponding to the newly registered device 200 on the floor plan based on the decided arrangement position and updates the display screen (S90404).

The device management section 105 of the home controller 100 then transmits arrangement information indicating the arrangement position of the device icon decided by the initial arrangement deciding process to the server 300 (S92501). The device control section 302 of the server 300 updates a device list based on the received arrangement information. Moreover, the home controller 100 need not transmit the arrangement information to the server 300. In addition, when the arrangement information is not transmitted to the server 300, the home control system need not include the server 300.

The initial arrangement deciding process shown in FIG. 122 will now be described in greater detail.

Figure 123:
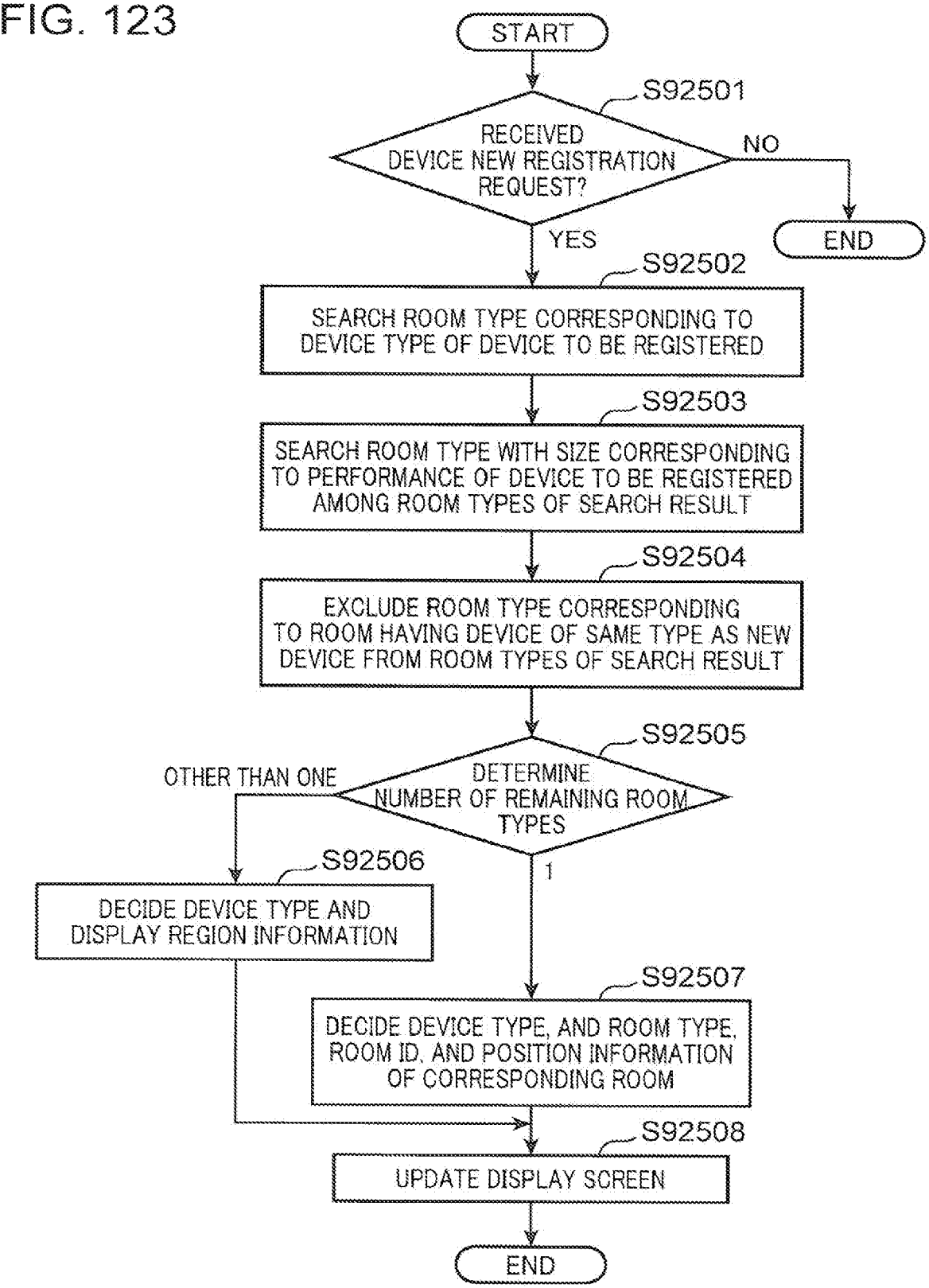

FIG. 123 is a flow chart for explaining an initial arrangement deciding process by the home controller 100.

Since the process performed in steps S92501 to S92505 shown in FIG. 123 is the same as the process performed in steps S90501 to S90505 shown in FIG. 101, a description thereof will be omitted. In addition, the device management section 105 of the home controller 100 executes the process of steps S92501 to S92505 in place of the device control section 302 of the server 300. Furthermore, the home controller 100 stores the reference table 906100 (FIG. 102), the reference table 90700 (FIG. 104), the reference table 91500 (FIG. 112), the reference table 91800 (FIG. 115), the room information 90900 (FIG. 106), and the vertex information 90800 (FIG. 105).

When the number of remaining room types is determined to be other than one or, in other words, when the number of remaining room types is determined to be zero or two or more ("other than one" in S92505), the device management section 105 decides a device type indicating a type of a device icon representing one target device and display region information indicating a prescribed region on the display screen (S92506).

Moreover, for example, the prescribed region on the display screen is a region outside the display region of the floor plan 500 in the display screen.

On the other hand, when it is determined that the number of remaining room types is one ("one" in S92505), the device management section 105 searches for a room ID and position information of the one remaining room type and decides a device type indicating a type of the device icon, a room type of a corresponding room, a room ID of the corresponding room, and position information representing a position of the corresponding room on the floor plan (S92507).

Next, the display control section 103 displays a device icon corresponding to the newly registered device 200 and updates the display screen (S92508). At this point, when it is determined that the number of remaining room types is other than one, the display control section 103 displays a device icon corresponding to the newly registered device 200 outside the floor plan based on the device type and display region information and updates the display screen. On the other hand, when it is determined that the number of remaining room types is one, the display control section 103 displays a device icon corresponding to the newly registered device 200 on the floor plan based on the decided device type, room type, room ID, and position information, and updates the display screen.

Moreover, the display control section 103 displays a display screen representing the floor plan 500 including one or more rooms on the display 101. In addition, using one or two or more memories that manage, in association with each other, a device type (first information) indicating types of one or more device icons representing each of one or more target devices, performance information (second information) indicating a performance of a target device corresponding to the one or more device icons, and a room type (third information) indicating an attribute of each of the one or more rooms, the display control section 103 displays the one or more device icons in a region on the display screen corresponding to a room that corresponds to each of the one or more device icons in accordance with the types of the one or more device icons and the performances of the target device corresponding to the one or more device icons.

Furthermore, when selection of any of the one or more device icons is sensed in a region corresponding to any of the rooms included in the floor plan 500, the display control section 103 displays a control screen for at least any of operation and state confirmation of a target device corresponding to the selected device icon on the display screen representing the floor plan 500. Subsequently, based on an operation on the control screen, the communication control section 107 outputs a control command for at least any of the operation and the state confirmation of the target device corresponding to the selected device icon to the network.

In addition, when the one or more device icons include two or more device icons of the same type, based on the performance information (second information), the display control section 103 may display each of the two or more device icons of the same type in a region on the display screen corresponding to a room with a size corresponding to a performance of a target device that corresponds to each of the two or more device icons of the same type in accordance with the performance of the target device corresponding to each of the two or more device icons of the same type.

Furthermore, when it is determined that two or more device icons of the same type are included in the one or more device icons based on the device type (first information), the display control section 103 may determine a room with a size corresponding to a performance of a target device corresponding to each of the two or more device icons of the same type and display each of the two or more device icons of the same type in a region on the display screen corresponding to each determined room based on the performance information (second information) and the room type (third information).

In addition, the one or two or more memories may further manage position information (fourth information) of each of one or more rooms on the floor plan 500. The display control section 103 may determine a region corresponding to each of the one or more rooms using the position information (fourth information). Furthermore, the display control section 103 may display one or more device icons in a region on the display screen corresponding to a room that corresponds to each of the one or more device icons in accordance with the types of the one or more device icons and a performance of a target device corresponding to the one or more device icons.

In addition, when the one or more device icons include two or more device icons of the same type, the display control section 103 may determine a sum of performances of target devices corresponding to at least two device icons among the two or more device icons of the same type based on the performance information (second information). Furthermore, in accordance with the determined sum of performances, the display control section 103 may display each of the at least two device icons among the two or more device icons of the same type in a region on the display screen corresponding to a room with a size corresponding to the calculated sum of performances.

In addition, when it is determined that two or more device icons of the same type are included in the one or more device icons based on the device type (first information), the display control section 103 may determine a sum of performances of target devices corresponding to at least two device icons among the two or more device icons of the same type based on the performance information (second information). Furthermore, the display control section 103 may determine a room with a size corresponding to the performances of target devices corresponding to at least two device icons among the two or more device icons of the same type based on the calculated sum of performances and the room type (third information). Moreover, the display control section 103 may display each of the at least two device icons among the two or more device icons of the same type in a region on the display screen corresponding to the determined room.

In addition, while the device 200 transmits a device new registration request to the server 300 in the sequence diagram shown in FIG. 99, the present disclosure is not particularly limited thereto and the device 200 may transmit a device new registration request to the home controller 100 and the home controller 100 may transmit a device arrangement request for requesting that a display position of a device icon corresponding to a newly registered device be decided to the server 300. A process for deciding an arrangement position of a device icon corresponding to a device to be newly registered by the server 300 when the device 200 transmits a device new registration request to the home controller 100 will now be described with reference to FIG. 124.

Figure 124:
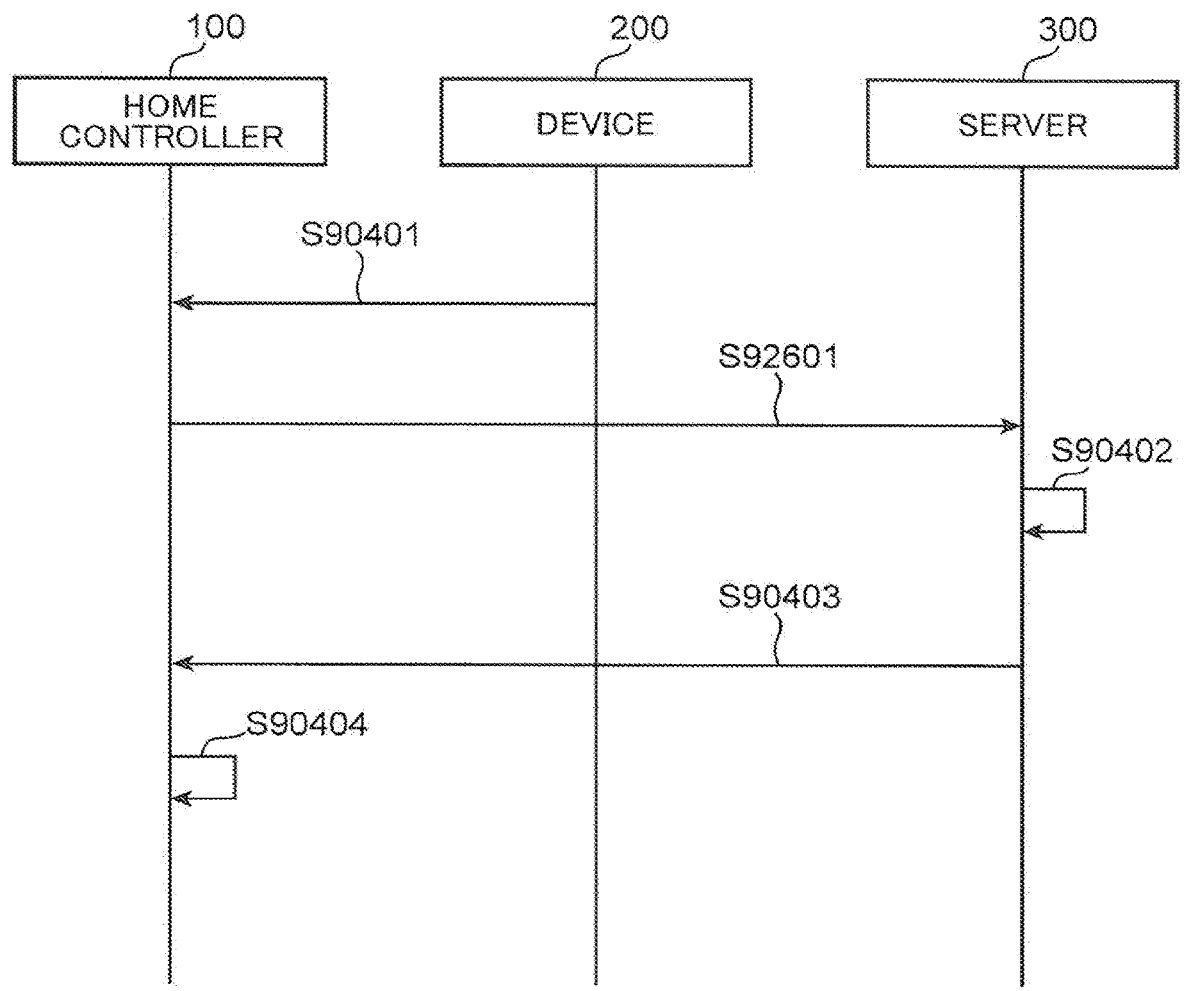

FIG. 124 is a sequence diagram showing a flow of a process by the server 300 for deciding an arrangement position of a device icon corresponding to a device to be newly registered when the device 200 transmits a device new registration request to the home controller 100.

When a device 200 is newly arranged in a prescribed room inside the house, the communication control section 217 of the device 200 transmits a device new registration request to the home controller 100 (S90401). In this case, the device new registration request includes a device ID and a device type.

Next, the communication control section 107 of the home controller 100 receives the device new registration request transmitted by the device 200 and transmits a device arrangement request for requesting that a display position of a device icon corresponding to a newly registered device be decided to the server 300 (S92601). In this case, the device arrangement request includes a residence ID, a device ID, and a device type. The communication control section 107 creates a device arrangement request in which a residence ID is added to the device ID and the device type included in the received device new registration request and transmits the device arrangement request.

Next, the device control section 302 of the server 300 receives the device arrangement request from the device 200 and performs an initial arrangement deciding process for deciding an arrangement position on the floor plan of a device icon corresponding to the device 200 to be newly registered (S90402). Moreover, the initial arrangement deciding process is as described earlier.

The device control section 302 of the server 300 then transmits arrangement information indicating the arrangement position of the device icon decided by the initial arrangement deciding process to the home controller 100 (S90403).

Next, the display control section 103 of the home controller 100 receives the arrangement information transmitted by the server 300, displays a device icon corresponding to the newly registered device 200 on the floor plan based on the received arrangement information, and updates the display screen (S90404).

In addition, while the device 200 transmits a device new registration request to the home controller 100 in the sequence diagram shown in FIG. 122, the present disclosure is not particularly limited thereto and the device 200 may transmit a device new registration request to the server 300 and the server 300 may transmit a device arrangement request for requesting that a display position of a device icon corresponding to a newly registered device be decided to the home controller 100. A process for deciding an arrangement position of a device icon corresponding to a device to be newly registered by the home controller 100 when the device 200 transmits a device new registration request to the server 300 will now be described with reference to FIG. 125.

Figure 125:
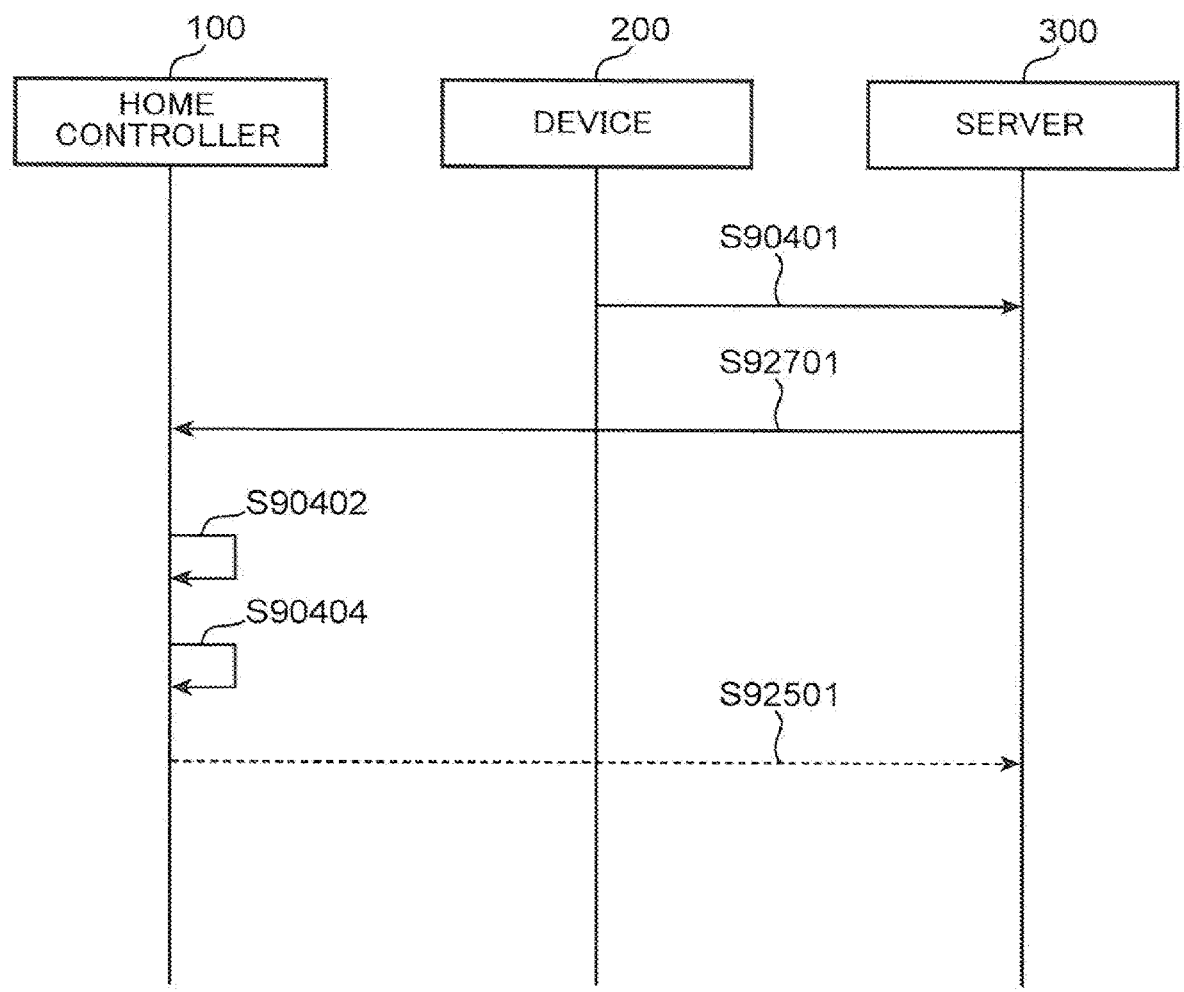

FIG. 125 is a sequence diagram showing a flow of a process by the home controller 100 for deciding an arrangement position of a device icon corresponding to a device to be newly registered when the device 200 transmits a device new registration request to the server 300.

When the device 200 is newly arranged in a prescribed room inside the house, the communication control section 217 of the device 200 transmits a device new registration request to the server 300 (S90401). The device new registration request includes a residence ID, a device ID, and a device type.

Next, the device control section 302 of the server 300 receives the device new registration request from the device 200 and transmits a device arrangement request for requesting that a display position of a device icon corresponding to a newly registered device be decided to the home controller 100 (S92701). At this point, the device control section 302 stores the newly registered device in a device list. The device arrangement request includes a residence ID, a device ID, and a device type.

Next, the device management section 105 of the home controller 100 receives the device arrangement request from the server 300 and performs an initial arrangement deciding process for deciding an arrangement position on the floor plan of a device icon corresponding to the device 200 to be newly registered (S90402). Moreover, the initial arrangement deciding process is as described earlier.

Next, the display control section 103 of the home controller 100 displays a device icon corresponding to the newly registered device 200 on the floor plan based on the decided arrangement position and updates the display screen (S90404).

The device management section 105 of the home controller 100 then transmits arrangement information indicating the arrangement position of the device icon decided by the initial arrangement deciding process to the server 300 (S92501). The device control section 302 of the server 300 updates a device list based on the received arrangement information. Moreover, the home controller 100 need not transmit the arrangement information to the server 300.

(Device icon arranging process 3) Next, a device icon arranging process 3 in which a device icon is automatically arranged on a floor plan will be described.

Figure 126:
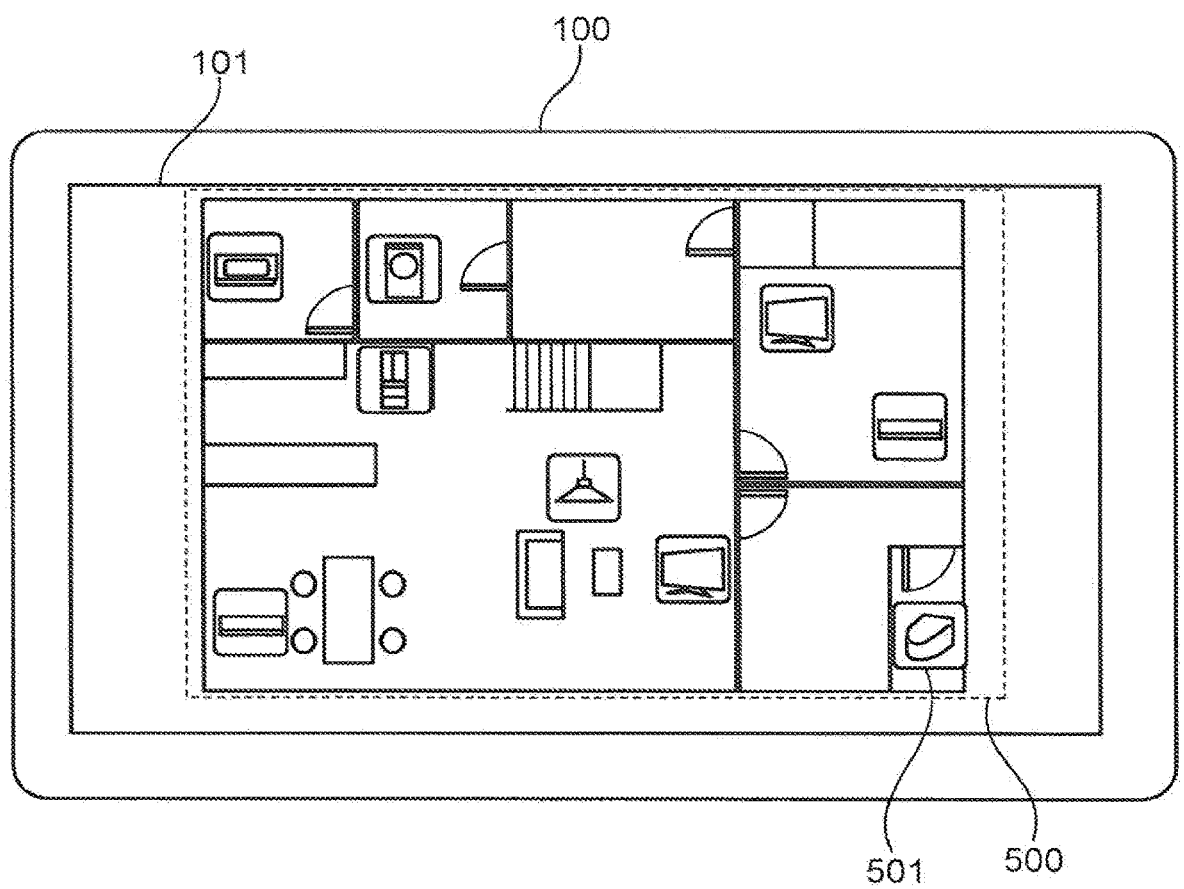
Figure 127:
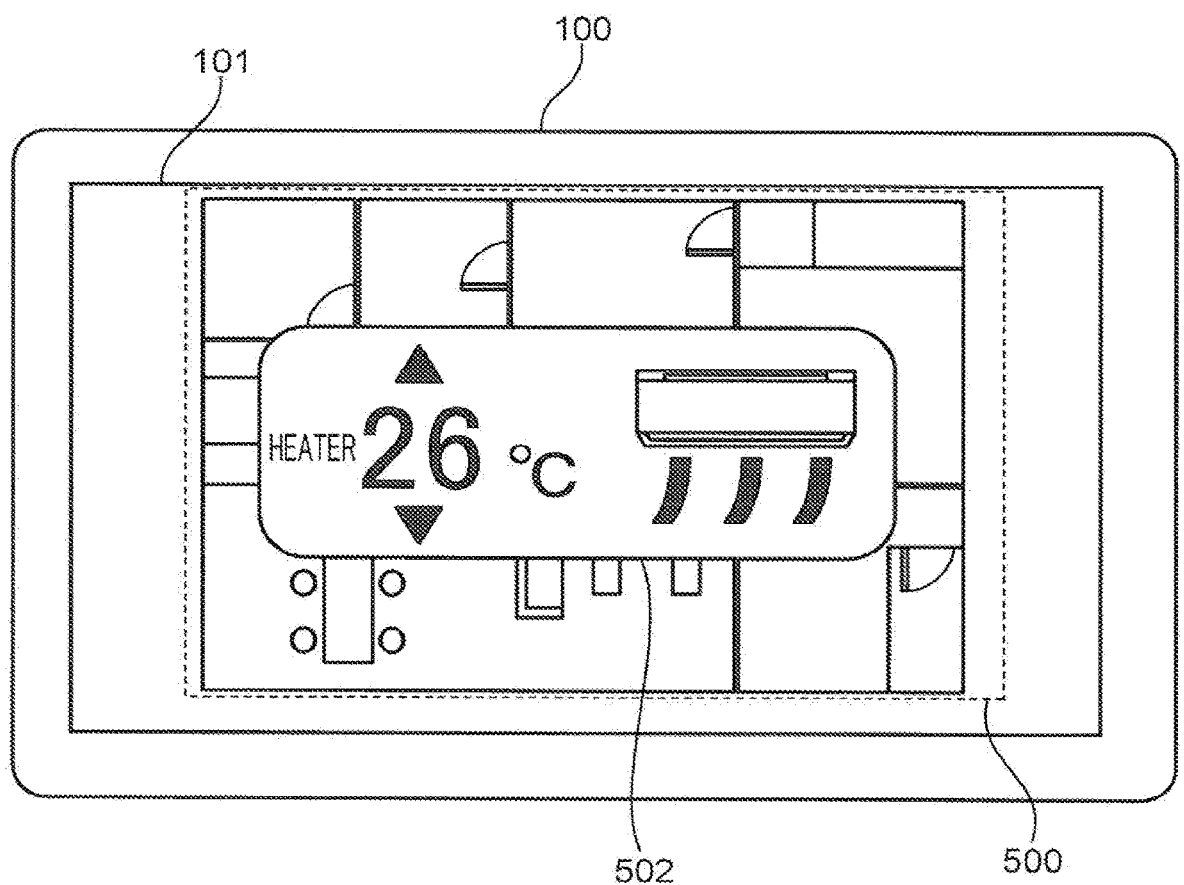

FIG. 126 is a diagram showing an example of a basic screen that is displayed on the display 101 of the home controller 100, and FIG. 127 is a diagram showing a configuration of a display state of the device control screen 502 of the home controller 100.

On the basic screen shown in FIG. 126, when the touch panel control section 102 senses that the user has selected the device icon 501, the display control section 103 displays the device control screen 502 corresponding to the selected device icon 501 on the display 101. The device control screen 502 is unique to each device 200 and is a control screen for controlling the device 200 or performing state confirmation of the device 200. For example, FIG. 127 shows an example where a device icon of an air conditioner has been selected by the user, in which case a temperature setting or an air flow direction of the air conditioner is controlled using the device control screen 502 of the air conditioner. Moreover, in FIG. 127, while a device icon is not arranged on the display 101, a device icon may be displayed outside of a display region of the device control screen 502 as shown in FIGS. 11 to 16.

Next, a flow of a process for newly registering a device 200 in a home control system (information management system) will be described with reference to the drawings. The home control system connects to a network which controls one or more target devices managed in association with a same building ID, and manages information of the one or more target devices.

Figure 128:
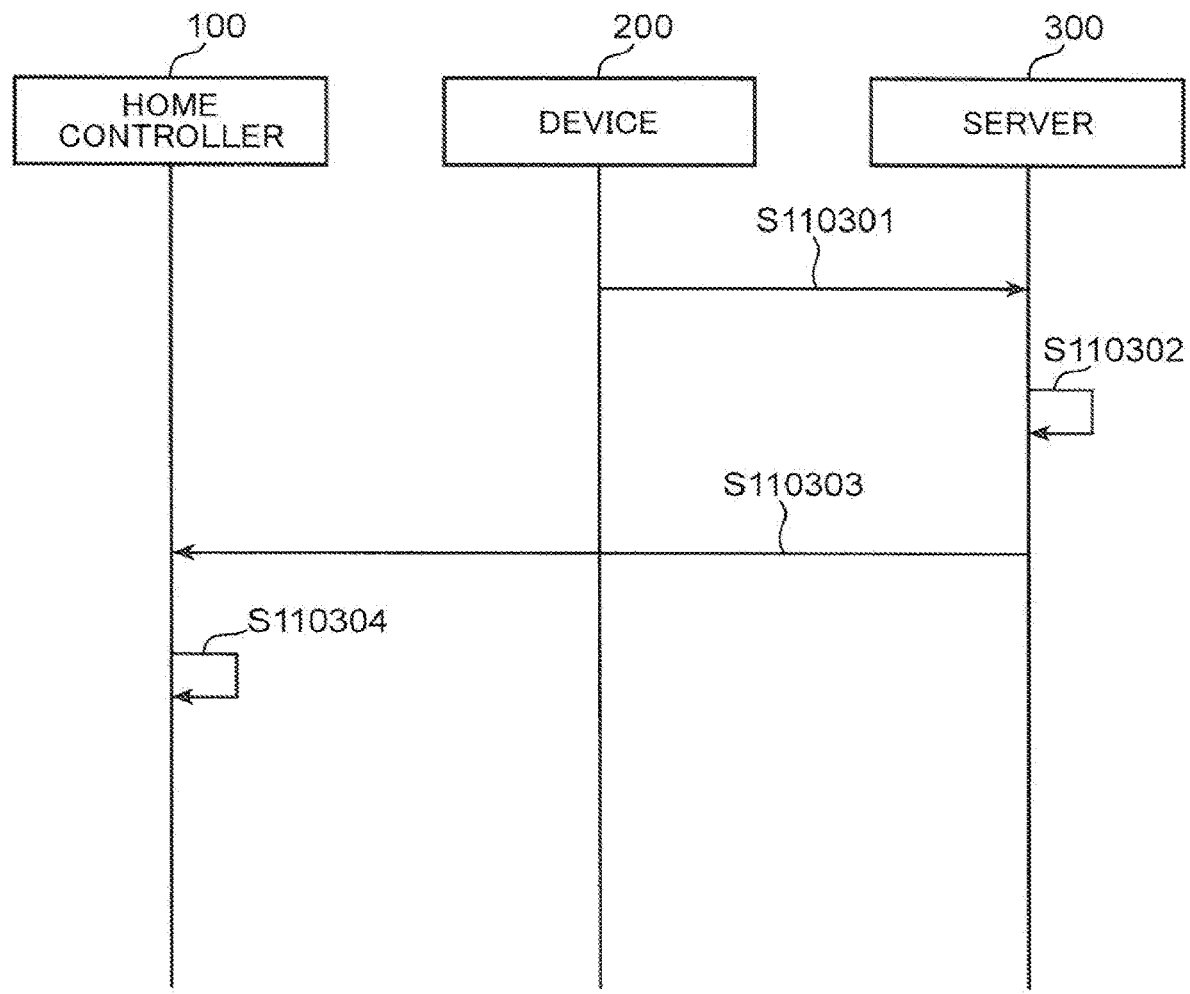

FIG. 128 is a sequence diagram showing a flow of a displaying process for displaying a device icon corresponding to a device to be newly registered on a floor plan.

First, when the device 200 is newly arranged in a prescribed room inside the house, the communication control section 217 of the device 200 transmits a device new registration request to the server 300 (S110301).

FIG. 129 is a diagram showing an example of a device new registration request that is transmitted when a microwave oven is to be newly registered. As shown in FIG. 129, the device new registration request includes a residence ID 110500 for identifying a residence in which the device 200 is arranged, a device ID 110501 for identifying the device 200, and a device type 110502 for identifying a type of the device 200.

When the device 200 is newly arranged in a prescribed room inside the house, the communication control section 217 of the device 200 inquires a residence ID to the home controller 100, acquires the residence ID from the home controller 100, and creates a device new registration request.

Moreover, while the communication control section 217 of the device 200 acquires the residence ID from the home controller 100 in the present embodiment, the present disclosure is not particularly limited thereto. When the device 200 and the server 300 are connected to each other via a gateway installed in the home, the gateway may provide the residence ID. Specifically, the communication control section 217 of the device 200 may transmit a device new registration request including the device ID 70501 and the device type 70502, and the gateway may include the residence ID in the device new registration request from the device 200 and transmit the device new registration request to the server 300. Alternatively, the device 200 may accept input of a residence ID by the user.

Next, the device control section 302 of the server 300 receives the device new registration request from the device 200 and performs an initial arrangement deciding process for deciding an arrangement position on the floor plan of a device icon corresponding to the device 200 to be newly registered (S110302). Moreover, the initial arrangement deciding process by the server 300 will be described later.

The device control section 302 of the server 300 then transmits arrangement information indicating the arrangement position of the device icon decided by the initial arrangement deciding process to the home controller 100 (S110303).

Next, the display control section 103 of the home controller 100 receives the arrangement information transmitted by the server 300, displays a device icon corresponding to the newly registered device 200 on the floor plan based on the received arrangement information, and updates the display screen (S110304).

The initial arrangement deciding process shown in FIG. 128 will now be described in greater detail.

Figure 130:
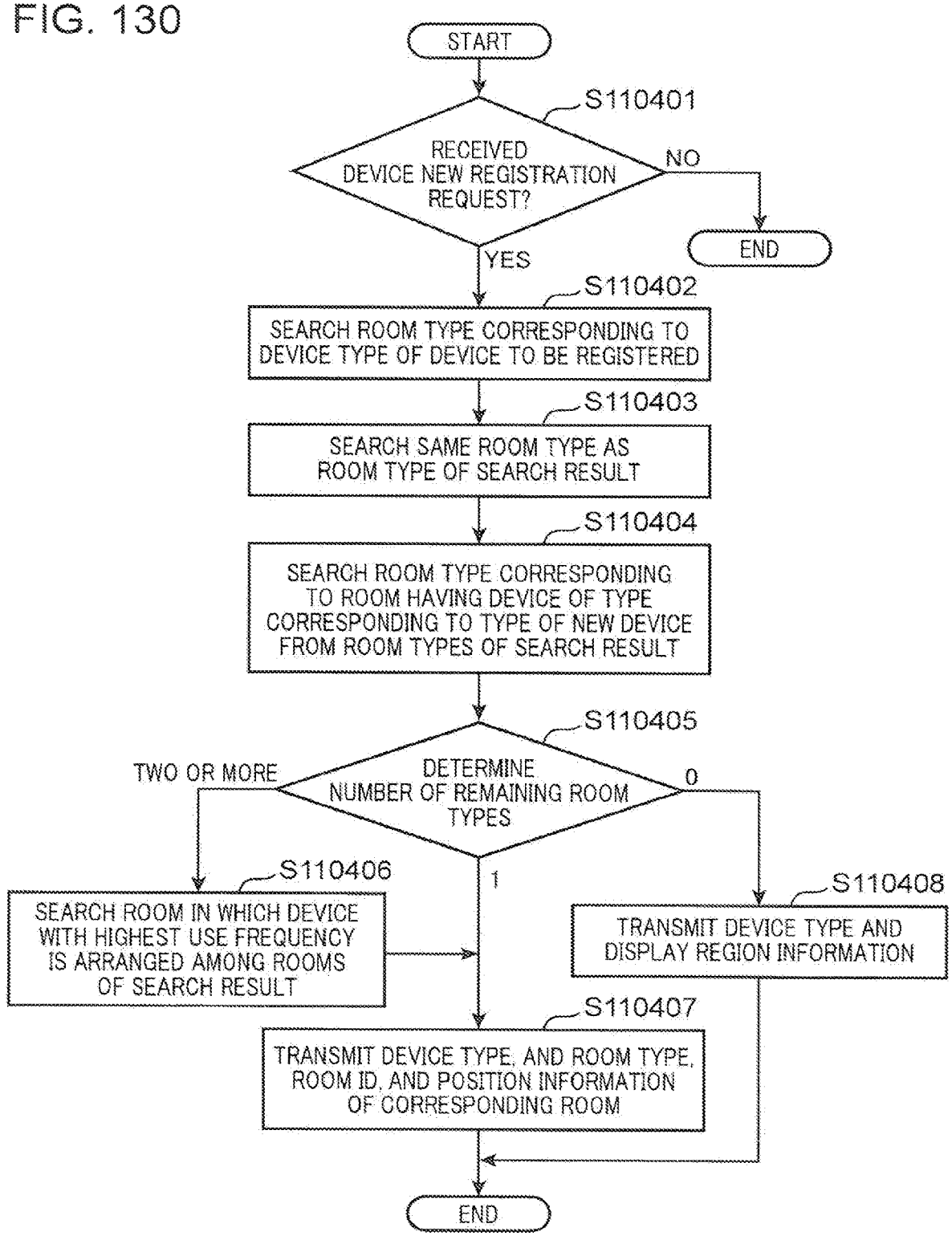

FIG. 130 is a flow chart for explaining an initial arrangement deciding process by the server 300.

First, the device control section 302 determines whether or not the device new registration request from the device 200 has been received (S110401). The server 300 receives, from one target device among the one or more target devices via the network, a device new registration request (registration notification information) representing that the one target device has been newly registered in the home control system (information management system).

At this point, when it is determined that the device new registration request from the device 200 has not been received (NO in S110401), the process is finished.

On the other hand, when it is determined that the device new registration request from the device 200 has been received (YES in S110401), the device control section 302 searches for a room type corresponding to the device type of the device 200 to be registered (S110402). In this case, the storage section 304 of the server 300 stores, in advance, a reference table that associates a device type and a room type with each other.

FIG. 131 is a diagram showing an example of a reference table 110600 that associates a device type 110601 and a room type 110602 with each other. As shown in FIG. 131, the device type 110601 and the room type 110602 are associated with each other. The storage section 304 is constituted by one memory and manages the device type 110601 (first information) indicating types of one or more device icons representing the one or more target devices and the room type 110602 (second information) indicating an attribute of each of the one or more rooms in association with each other. For example, the room type "kitchen" is associated with the device type "refrigerator", the room type "toilet" is associated with the device type "toilet seat apparatus", the room types "living room" and "bedroom" are associated with the device type "air conditioner", and the room types "living room", "child room", and "bedroom" are associated with the device type "television set".

In the example shown in FIG. 131, the refrigerator and the toilet seat apparatus are respectively constituted by one tuple, the air conditioner is constituted by two tuples, and the television set is constituted by three tuples. Moreover, in the case of a device type such as a humidifier for which a room where the device type is arranged is not specified, a room type need not be associated. Specifically, the storage section 304 does not store data that associates the device type "humidifier" with a room type.

The device control section 302 searches for a room type corresponding to the device type 110502 included in the received device new registration request in the reference table 110600.

Moreover, while FIG. 131 shows one memory managing a device type and a room type in association with each other, the present disclosure is not particularly limited thereto and two or more memories may manage a device type and a room type in association with each other.

FIGS. 132A to 132C are diagrams showing an example in which device types and room types are managed by three reference tables. FIG. 132A is a diagram showing an example of a first reference table 1106001 that associates a device ID 1106011 and a device type name 1106012 with each other, FIG. 132B is a diagram showing an example of a second reference table 1106002 that associates a room ID 1106013 and a room type name 1106014 with each other, and FIG. 132C is a diagram showing an example of a third reference table 1106003 that associates a device ID 1106015 and a room ID 1106016 with each other.

1 The first reference table 1106001 associates the device ID 1106011 for identifying the device 200 and the device type name 1106012 representing the name of the type of the device 200 with each other. The second reference table 1106002 associates the room ID 1106013 for identifying a room and the room type name 1106014 representing the name of an attribute of the room with each other. The third reference table 1106003 associates the device ID 1106015 for identifying the device 200 and the room ID 1106016 for identifying a room with each other. The first reference table 1106001, the second reference table 1106002, and the third reference table 1106003 may be respectively stored in different memories.

The device control section 302 searches for a room ID corresponding to the device ID 110501 included in the received device new registration request in the third reference table 1106003 and searches for a room type name corresponding to the searched room ID in the second reference table 1106002.

Next, the device control section 302 searches for a same room type as the room type that is the search result in currently registered room information (S110403).

FIG. 133 is a diagram showing an example of room information 111000. The room information 111000 includes a residence ID 111004, a room ID 111001, a room type 111002, and room coordinates 111003. The residence ID 111004 is an identifier for identifying a residence. The room ID 111001 is an identifier for identifying a room on the floor plan 500. The room type 111002 indicates a type of the room. The room coordinates 111003 are expressed by a set of vertex IDs and decide an area of a room on the floor plan 500. For example, a room of which room ID is C is a bathroom and indicates a region formed by connecting vertex IDs in a sequence of A, B, G and F on the floor plan 500.

FIG. 134 is a diagram showing an example of the vertex information 110910. As shown in FIG. 134, the vertex information 110910 includes a residence ID 110913, a vertex ID 110911, and vertex coordinates 110912. The residence ID 110913 is an identifier of a residence. The vertex ID 110911 is an identifier for identifying a vertex on the floor plan 500. The vertex coordinates 110912 are coordinates expressed by a (X coordinate, Y coordinate, floor number) format and indicate a position of a vertex such as a partition line represented on the floor plan 500. For example, since a vertex of which vertex ID is B has vertex coordinates expressed as (X20, Y0, Z1), the vertex represents a position on the first floor (floor 1) of which X coordinate is 20 and Y coordinate is 0.

FIG. 135 is a diagram showing a correspondence relationship between each vertex registered in the vertex information 110910 and the floor plan 500. Note that, in FIG. 135, a top left vertex of the floor plan 500 is assumed to be an origin (both X coordinate and Y coordinate are 0). For example, since vertex coordinates of a vertex with a vertex ID of A are expressed as (X0, Y0, Z1), the vertex is positioned on the origin. In addition, since vertex coordinates of a vertex with a vertex ID of B are expressed as (X20, Y0, Z1), the vertex is positioned at a top right vertex of the bathroom.

The device control section 302 searches for a same room type as the room type that is the search result in currently registered room information 111000.

Next, the device control section 302 searches for a room type corresponding to a room in which a device of a type associated with the type of the device 200 to be newly registered is already installed among the room types that are the search result (S110404).

FIG. 136 is a diagram showing an example of a device type reference table 110700 that is managed by a server.

The device type reference table 110700 shown in FIG. 136 associates, with each other, a first device type 110701 and a second device type 110702 that is in a relationship of being displayed in a same room as a room in which a device icon of the first device type is displayed. For example, a second device type "microwave oven" is associated with a first device type "refrigerator", a second device type "induction cooker" is associated with the first device type "refrigerator", and a second device type "content reproducing machine" is associated with a first device type "television set". In the example shown in FIG. 136, the microwave oven, the induction cooker, and the content reproducing machine are respectively constituted by one tuple.

The microwave oven and the refrigerator are likely to be arranged in a same room (for example, the kitchen), the induction cooker and the refrigerator are likely to be arranged in a same room (for example, the kitchen), and the content reproducing machine and the television set are likely to be arranged in a same room (for example, the living room). Therefore, when a device to be newly registered is a microwave oven, by identifying a room in which is currently arranged a refrigerator that is likely to be arranged together with the microwave oven, a room in which the microwave oven is to be arranged can be identified.

FIG. 137 is a diagram showing a device list 110800 that is managed by the server 300. As shown in FIG. 137, the device list 110800 includes a residence ID 110806, a device ID 110801, a device type 110802, a model number 110803, a room ID 110804, and an arrangement 110805.

The residence ID 110806 is an identifier of a residence. The device ID 110801 is an identifier of the device 200. The device type 110802 indicates a type of the device 200. The model number 110803 indicates a model number of the device 200. The room ID 110804 is an identifier of a room in which the device 200 is installed. The arrangement 110805 is coordinates which are expressed by an (X coordinate, Y coordinate, floor number) format and indicates an arrangement position on the floor plan 500 of the device icon 501 corresponding to the device 200. Moreover, the device list 110800 may include capability information 4705 and a control command transmission destination 4706 as shown in FIG. 34. Alternatively, the device list 110800 may include a room type representing an attribute of a room in which the device 200 is arranged.

The device control section 302 refers to the device type reference table 110700 and determines whether or not a device type of the device 200 to be newly registered is the second device type. When it is determined that the device type of the device 200 to be newly registered is the second device type, the device control section 302 identifies the first device type that is associated with the second device type. Subsequently, the device control section 302 refers to the device list 110800, identifies a room ID corresponding to a room in which a device of the identified first device type is already being installed, and extracts a room type corresponding to the identified room ID from the room types that are the search result. Moreover, when the device type of the device 200 to be newly registered is not the second device type, the device control section 302 does not identify the first device type and does not extract a room type from room types that are the search result.

Next, the device control section 302 determines the number of room types that are the search result (S110405). At this point, when it is determined that the number of room types that are the search result is two or more ("two or more" in S110405), the device control section 302 searches for a room type corresponding to a room in which is arranged a device with highest use frequency among the room types that are the search result (S110406).

FIG. 138 is a diagram showing an example of a use frequency management table 110900 that is managed by the server 300. As shown in FIG. 138, the use frequency management table 110900 includes a residence ID 110905, a device ID 110901, a registration date 110902, the number of times power has been turned on 110903, and a viewing time 110904. The use frequency management table 110900 shown in FIG. 138 indicates a use frequency of a television set.

The device control section 302 calculates a use frequency of a device corresponding to a device type that is associated with the device type of the device 200 to be newly registered. The device control section 302 calculates the use frequency of the device by dividing the number of times power has been turned on by the number of days from registration to the present. Subsequently, the device control section 302 searches for a room type corresponding to a room in which is arranged a device with highest calculated use frequency among the room types that are the search result.

Alternatively, the device control section 302 may calculate the use frequency of the device by dividing the viewing time by the number of days from registration to the present.

On the other hand, when it is determined that the number of room types that are the search result is one ("one" in S110405) or when a room type corresponding to a room in which is arranged a device with highest use frequency is searched in step S110406, the device control section 302 transmits arrangement information including a device type indicating a type of the device icon, a room type of a corresponding room, a room ID of the corresponding room, and position information representing a position of the corresponding room on the floor plan to the home controller 100 (S110407).

Moreover, in a similar manner to the room coordinates 111003, position information is expressed by a set of vertex IDs 110911 and indicates a room on the floor plan 500 in which is displayed a device icon 501 corresponding to the device 200 to be newly registered. In addition, for example, a position that does not overlap with other device icons in the room is decided as an arrangement position of the device icon 501 corresponding to the device 200 to be newly registered.

When it is determined that the number of room types that is the search result is one, the device control section 302 searches for a room ID and position information of the one room type that is the search result and transmits arrangement information including a device type indicating a type of the device icon, the one room type that is the search result, the searched room ID, and position information representing coordinates of the one room type that is the search result to the home controller 100.

In addition, when a room type corresponding to a room in which is arranged a device with highest use frequency is searched in step S110406, the device control section 302 transmits arrangement information including a device type indicating a type of the device icon, a room type corresponding to the room in which is arranged the device with highest use frequency, a room ID of the room in which is arranged the device with highest use frequency, and position information representing a position of the room in which is arranged the device with highest use frequency to the home controller 100.

On the other hand, when the number of room types that are the search result is determined to be zero ("zero" in S110405), the device control section 302 transmits arrangement information including a device type indicating a type of a device icon representing the device to be newly registered and display region information indicating a prescribed region on the display screen to the home controller 100 (S110408).

Moreover, for example, the prescribed region on the display screen is a region outside the display region of the floor plan 500 in the display screen.

As described above, using one or two or more memories that manage, in association with each other, a device type (first information) indicating types of one or more device icons representing each of one or more target devices, a room type (second information) indicating an attribute of each of the one or more rooms included in a display screen representing a floor plan of a building indicated by a residence ID (building ID), and a device type reference table (third information) indicating a device icon of a second device type (second type) that is in a relationship of being displayed in a region on the display screen corresponding to a same room as a device icon of a first device type (first type) among types of the one or more device icons, whether or not one device icon is a device icon of the second device type (second type) is determined based on the received device new registration request (registration notification information). Subsequently, when the one device icon is determined as a device icon of the second device type (second type), an attribute of a room corresponding to a device icon of a first device type (first type) is determined.

In addition, a device type (fourth information) indicating a type of the one device icon and a room type (fifth information) indicating the determined attribute of the room are transmitted via the network to the home controller 100 (information apparatus) which is managed in association with the same residence ID (building ID) and which displays a display screen representing the floor plan 500 on the display 101. Based on the device type (fourth information) and the room type (fifth information), the one device icon is displayed in a region on the display screen corresponding to a same room as the room in which the device icon of the first device type (first type) is displayed on the display 101 of the home controller 100 (information apparatus).

Furthermore, when selection of any of the one or more device icons is sensed in a region corresponding to any of the rooms included in the floor plan 500, the home controller 100 (information apparatus) displays a control screen for at least any of operation and state confirmation of a target device corresponding to the selected device icon on the display screen representing the floor plan 500. Subsequently, based on an operation on the control screen, a control command for at least any of the operation and the state confirmation of the target device corresponding to the selected device icon is output to the network.

In addition, the one or two or more memories further manage sixth information indicating that the one device icon is a device icon of the second device type (second type) and seventh information indicating a type of a device icon of the first device type (first type) corresponding to the device icon of the second device type (second type). When the one device icon is determined to be a device icon of the second device type (second type) based on the sixth information, a device icon of the first device type (first type) corresponding to the device icon of the second device type (second type) is determined based on the seventh information. Subsequently, an attribute of a room corresponding to the device icon of the first device type (first type) is determined based on the second information.

Furthermore, device new registration requests (registration notification information) representing that two or more target devices among one or more target devices have been newly registered in the home control system (information management system) are received from the two or more target devices via the network. In this case, when the type of two or more device icons representing each of the two or more target devices are determined to be the same based on the device type (first information), whether or not the two or more device icons are device icons of the second device type (second type) is determined based on the device type reference table (third information). When the two or more device icons are determined as device icons of the second device type (second type), an attribute of a room corresponding to a device icon of the first device type (first type) is determined. Subsequently, a device type (fourth information) indicating a type of the two or more device icons and a room type (fifth information) indicating the determined attribute of the room are transmitted via the network to the home controller 100 (information apparatus). Based on the device type (fourth information) and the room type (fifth information), the two or more device icons are displayed in a region on the display screen corresponding to a same room as the room in which the device icon of the first device type (first type) is displayed on the display 101 of the home controller 100 (information apparatus).

In addition, the one or two or more memories further manage a use frequency management table (eighth information) representing a use frequency of a target device corresponding to a device icon of the first device type (first type). When the one device icon is determined as a device icon of the second device type (second type), a device icon of the first device type (first type) corresponding to the device icon of the second device type (second type) is determined. Furthermore, when the device icon of the second device type (second type) corresponds to a plurality of device icons of the first device type (first type), a target device with highest use frequency among a plurality of target devices corresponding to the plurality of device icons of the first device type (first type) is determined. An attribute of a room corresponding to the device icon of the first device type (first type) representing the target device determined to have the highest use frequency is determined. Subsequently, the device type (fourth information) indicating the type of the one device icon and the room type (fifth information) indicating an attribute of a room corresponding to the device icon of the first device type (first type) representing the target device determined to have the highest use frequency are transmitted to the home controller 100 (information apparatus) via the network.

In addition, the device icon of the first device type (first type) may include a device icon representing a refrigerator and the device icon of the second device type (second type)

may include a device icon representing a microwave oven. Furthermore, the same room may be the kitchen.

In addition, the device icon of the first device type (first type) may include a device icon representing a television set and the device icon of the second device type (second type) may include a device icon representing a content reproducing machine that reproduces contents.

Furthermore, the device icon of the first device type (first type) may include a device icon representing a television set and the device icon of the second device type (second type) may include a device icon representing a content recording machine that records contents.

In addition, the device icon of the first device type (first type) may include a device icon representing a television set, the device icon of the second device type (second type) may include a device icon representing a content recording machine that records contents, and the same room may be the living room.

Furthermore, the use frequency management table (eighth information) may include information indicating turning on or off power of a target device corresponding to the device icon of the first device type (first type).

In addition, the target device corresponding to the device icon of the first device type (first type) may be a television set, and the use frequency management table (eighth information) may include information indicating a viewing history of the television set.

A specific displaying process of a device icon corresponding to a microwave oven will now be described.

FIG. 139 is a diagram showing an example of a display screen of a home controller when a device to be newly registered is a microwave oven. In the following description, the device to be newly registered is a microwave oven and a refrigerator has already been arranged. In addition, only the room type "kitchen" is associated with the device type "microwave oven".

First, the device control section 302 determines whether or not a device new registration request has been received from the microwave oven that has been newly installed in the residence. In this case, the server 300 receives the device new registration request shown in FIG. 129 from the microwave oven.

Next, the device control section 302 searches for a room type corresponding to the device type 110502 included in the received device new registration request in the reference table 110600 (FIG. 131). In this case, since the device type 110502 is a microwave oven, the device control section 302 extracts the room type "kitchen" from the reference table 110600.

The device control section 302 then searches for a same room type as the room type that is the search result in currently registered room information 111000 (FIG. 133). In this case, since the room type that is the search result is the kitchen, the device control section 302 selects the kitchen from the room information 111000.

Next, the device control section 302 searches for a room type corresponding to a room in which a device of a type associated with the type of the device 200 to be newly registered is already installed among the room types that are the search result. The device control section 302 refers to the device type reference table 110700 and determines whether or not a device type of the device 200 to be newly registered is the second device type. In this case, since the device type of the device 200 to be newly registered is a microwave oven and a microwave oven is of the second device type, it is determined that the device type of the device 200 to be newly registered is the second device type.

The device control section 302 identifies the first device type that is associated with the second device type. In this case, since the refrigerator is associated with the microwave oven, the device control section 302 determines the refrigerator as the first device type. Subsequently, the device control section 302 refers to the device list 110800, identifies a room ID corresponding to a room (kitchen) in which a device (refrigerator) of the identified first device type is already being installed, and extracts a room type (kitchen) corresponding to the identified room ID from the room types that are the search result.

Next, the device control section 302 determines the number of room types that are the search result. In this case, since only one room type (kitchen) is extracted as the search result, the number of room types that are the search result is determined to be one and the device control section 302 searches for a room ID (F) and position information (room coordinates) of the one room type (kitchen) that is the search result. Subsequently, the device control section 302 transmits arrangement information including a device type (microwave oven) indicating a type of the device icon, the one room type (kitchen) that is the search result, the searched room ID, and position information representing coordinates of the one room that is the search result to the home controller 100.

Upon receiving the arrangement information, the display control section 103 of the home controller 100 displays a device icon 111201 of the newly registered microwave oven on the floor plan 500 based on the arrangement information. In this case, the device icon 111201 of the microwave oven is displayed in a region on the display screen corresponding to the kitchen. As described above, the microwave oven is associated with the refrigerator and the device icon 111201 of the microwave oven is displayed in the kitchen based on a room type of the room in which the refrigerator is already arranged.

Next, a specific displaying process of a device icon corresponding to a content reproducing machine will be described.

FIG. 140 is a diagram showing an example of a device new registration request when a device to be newly registered is a content reproducing machine, and FIG. 141 is a diagram showing an example of a display screen of a home controller when a device to be newly registered is a content reproducing machine. In the following description, the device to be newly registered is a content reproducing machine and television sets have already been respectively arranged in the living room and the bedroom. Furthermore, use frequency of the television set arranged in the living room is higher than use frequency of the television set arranged in the bedroom. Furthermore, the room types "living room", "bedroom", and "child room" are associated with the device type "content reproducing machine".

First, the device control section 302 determines whether or not a device new registration request has been received from the content reproducing machine that has been newly installed in the residence. In this case, the server 300 receives the device new registration request shown in FIG. 140 from the content reproducing machine.

Next, the device control section 302 searches for a room type corresponding to the device type 110502 included in the received device new registration request in the reference table 110600 (FIG. 131). In this case, since the device type 110502 is a content reproducing machine, the device control section 302 extracts the room types "living room", "bedroom", and "child room" from the reference table 110600.

The device control section 302 then searches for a same room type as the room type that is the search result in currently registered room information 111000 (FIG. 133). In this case, since the room types that are the search result are the living room, the bedroom, and the child room, the device control section 302 selects the living room, the bedroom, and the child room from the room information 111000.

1 Next, the device control section 302 searches for a room type corresponding to a room in which a device of a type associated with the type of the device 200 to be newly registered is already installed among the room types (the living room, the bedroom, and the child room) that are the search result. The device control section 302 refers to the device type reference table 110700 and determines whether or not a device type of the device 200 to be newly registered is the second device type. In this case, since the device type of the device 200 to be newly registered is a content reproducing machine and a content reproducing machine is of the second device type, it is determined that the device type of the device 200 to be newly registered is the second device type.

The device control section 302 identifies the first device type that is associated with the second device type. In this case, since the content reproducing machine is associated with a television set, the device control section 302 determines the television set as the first device type. Subsequently, the device control section 302 refers to the device list 110800, identifies a room ID corresponding to rooms (living room and bedroom) in which a device (television set) of the identified first device type is already being installed, and extracts room types (living room and bedroom) corresponding to the identified room ID from the room types that are the search result.

Next, the device control section 302 determines the number of room types that are the search result. In this case, since two room types (living room and bedroom) are extracted as a search result, the number of room types that are the search result is determined as two or more and the device control section 302 searches for a room type corresponding to a room in which is arranged a device with highest use frequency among the room types that are the search result. In this case, since the use frequency of the television set arranged in the living room is higher than the use frequency of the television set arranged in the bedroom, the living room is extracted as the room type corresponding to a room in which is arranged the television set with highest use frequency.

Subsequently, the device control section 302 transmits arrangement information including a device type (content reproducing machine) indicating a type of the device icon, the room type (living room) that is the search result, the searched room ID, and position information representing coordinates of the room that is the search result to the home controller 100.

Upon receiving the arrangement information, the display control section 103 of the home controller 100 displays a device icon 111401 of the newly registered content reproducing machine on the floor plan 500 based on the arrangement information. In this case, the device icon 111401 of the content reproducing machine is displayed in a region on the display screen corresponding to the living room. In this manner, the content reproducing machine is associated with the television set, and television sets are arranged in a plurality of rooms. A room in which is arranged the television set with highest use frequency is searched among the plurality of rooms in which television sets are already arranged. Based on a room type of the searched room, the device icon 111401 of the content reproducing machine is displayed in the living room.

While a bird's eye view representing positions and shapes of rooms constituting each floor in a planar manner is adopted as the floor plan 500 in the description given above, the present embodiment is not limited thereto and a diagram showing what kind of and how many rooms are on each floor in a simplified manner may also be adopted as a floor plan.

Hereinafter, a different pattern of a floor plan will be specifically described. FIG. 142 is a diagram showing a floor plan 5200 with a different pattern. On the floor plan 5200, one room constituting one floor is represented by one square block and respective rooms on one floor are arranged in a matrix pattern. In addition, sizes of the respective blocks are the same, and a name and an area of a room are described in each block. Moreover, the area need not be described.

For example, the floor plan 5200 includes the respective rooms of a living room, a kitchen, a dining room, a bathroom, a washroom, a toilet, a bedroom, and a child room. In addition, a device icon 501 of an actually arranged device 200 is displayed in each room. For example, the device icon 501 of an illumination device displayed in the living room signifies that an illumination device is installed in the living room.

Even when such a floor plan 5200 is displayed, a device icon of a device to be newly registered can be displayed in the same manner as described earlier.

FIG. 143 is a diagram for explaining an example of displaying a device icon of a device to be newly registered on the floor plan 5200 with a different pattern.

On the floor plan 5200 shown in FIG. 143, a display method of a device icon when a device is to be newly registered is almost the same as the display method of a device icon on the floor plan 500 described earlier.

In FIG. 143, a device icon 111201 of a newly registered microwave oven is displayed on the floor plan 5200. A refrigerator that has already been registered is associated with the microwave oven to be newly registered. Therefore, the device icon 111201 of the newly registered microwave oven is displayed in a region corresponding to the kitchen that is a same room as the room in which the refrigerator is arranged.

While an arrangement position of a device icon corresponding to a device to be newly registered is decided by the server 300 in the description given above, the present disclosure is not particularly limited thereto and the arrangement position may be decided by the home controller 100. A process for deciding an arrangement position of a device icon corresponding to a device to be newly registered by the home controller 100 will now be described with reference to FIG. 144.

FIG. 144 is a sequence diagram showing a flow of a process by the home controller 100 for deciding an arrangement position of a device icon corresponding to a device to be newly registered.

When a device 200 is newly arranged in a prescribed room inside the house, the communication control section 217 of the device 200 transmits a device new registration request to the home controller 100 (S110301).

Next, the device management section 105 of the home controller 100 receives the device new registration request from the device 200 and performs an initial arrangement deciding process for deciding an arrangement position on the floor plan of a device icon corresponding to the device 200 to be newly registered (S110302). Moreover, the initial arrangement deciding process by the home controller 100 will be described later.

Next, the display control section 103 of the home controller 100 displays a device icon corresponding to the newly registered device 200 on the floor plan based on the decided arrangement position and updates the display screen (S110304).

The device management section 105 of the home controller 100 then transmits arrangement information indicating the arrangement position of the device icon decided by the initial arrangement deciding process to the server 300 (S111701). The device control section 302 of the server 300 updates a device list based on the received arrangement information. Moreover, the home controller 100 need not transmit the arrangement information to the server 300. In addition, when the arrangement information is not transmitted to the server 300, the home control system need not include the server 300.

The initial arrangement deciding process shown in FIG. 144 will now be described in greater detail.

FIG. 145 is a flow chart for explaining an initial arrangement deciding process by the home controller 100.

Since the process performed in steps S112001 to S112006 in FIG. 145 is the same as the process performed in steps S110401 to S110406 shown in FIG. 130, a description thereof will be omitted. In addition, the device management section 105 of the home controller 100 executes the process of steps S112001 to S112006 in place of the device control section 302 of the server 300. Furthermore, the home controller 100 stores the reference table 110600 (FIG. 131), the room information 111000 (FIG. 133), the device list 110800 (FIG. 137), the vertex information 110910 (FIG. 134), the device type reference table (FIG. 136), and the use frequency management table 110900 (FIG. 138).

When it is determined that the number of room types that are the search result is one ("one" in S112005) or when a room type corresponding to a room in which is arranged a device with highest use frequency is searched in step S112006, the device control section 302 decides a device type indicating a type of the device icon, a room type of a corresponding room, a room ID of the corresponding room, and position information representing a position of the corresponding room on the floor plan (S112007).

When it is determined that the number of room types that are the search result is one, the device control section 302 searches for a room ID and position information of the one room type that is the search result and decides a device type indicating a type of the device icon, the one room type that is the search result, the searched room ID, and position information representing coordinates of the one room type that is the search result.

In addition, when a room type corresponding to a room in which is arranged a device with highest use frequency is searched in step S112006, the device control section 302 decides a device type indicating a type of the device icon, a room type corresponding to the room in which is arranged a device with highest use frequency, a room ID of the room in which is arranged a device with highest use frequency, and position information representing a position of the room in which is arranged a device with highest use frequency.

On the other hand, when the number of room types that are the search result is determined to be zero ("zero" in S112005), the device control section 302 decides a device type indicating a type of a device icon representing the device to be newly registered and display region information indicating a prescribed region on the display screen (S112008).

Moreover, for example, the prescribed region on the display screen is a region outside the display region of the floor plan 500 in the display screen.

Next, the display control section 103 displays a device icon corresponding to the newly registered device 200 and updates the display screen (S112009). At this point, when it is determined that the number of room types that are the search result is zero, the display control section 103 displays a device icon corresponding to the newly registered device 200 outside the floor plan based on the device type and display region information and updates the display screen. On the other hand, when it is determined that the number of remaining room types is one or two or more, the display control section 103 displays a device icon corresponding to the newly registered device 200 on the floor plan based on the decided device type, room type, room ID, and position information, and updates the display screen.

Moreover, the display control section 103 displays a display screen representing the floor plan 500 including one or more rooms on the display 101. In addition, the display control section 103 uses one or two or more memories that manage, in association with each other, a device type (first information) indicating types of one or more device icons representing each of one or more target devices and a room type (second information) indicating an attribute of each of the one or more rooms and displays the one or more device icons in a region on the display screen corresponding to a room that corresponds to each of the one or more device icons in accordance with the types of the one or more device icons.

Furthermore, when selection of any of the one or more device icons is sensed in a region corresponding to any of the rooms included in the floor plan 500, the display control section 103 displays a control screen for at least any of operation and state confirmation of a target device corresponding to the selected device icon on the display screen representing the floor plan 500. Subsequently, based on an operation on the control screen, the communication control section 107 outputs a control command for at least any of the operation and the state confirmation of the target device corresponding to the selected device icon to the network.

In addition, the one or more device icons include a device icon of a first device type (first type) and a device icon of a second device type (second type) that is in a relationship of being displayed in a region on the display screen corresponding to a same room as a room in which the device icon of the first device type (first type) is displayed.

When one device icon among the one or more device icons is determined to be a device icon of the second device type (second type), the display control section 103 displays the one device icon in a region on the display screen corresponding to a same room as a room in which the device icon of the first device type (first type) is displayed.

In addition, the one or two or more memories further manage third information indicating that the one device icon is a device icon of the second device type (second type) and fourth information indicating a type of a device icon of the first device type (first type) corresponding to the device icon of the second device type (second type). When the one device icon is determined to be a device icon of the second device type (second type) based on the third information, the display control section 103 determines a room in which the device icon of the first device type (first type) is displayed based on the fourth information. Furthermore, the display control section 103 displays the one device icon in a region on the display screen corresponding to a same room as the determined room.

In addition, when one or two or more device icons among the one or more device icons are determined to be device icons of the second device type (second type), the display control section 103 may display the one or two or more device icons in a region on the display screen corresponding to a same room as the room in which the device icon of the first device type (first type) is displayed.

Furthermore, the device icon of the first device type (first type) may include a device icon representing a refrigerator and the device icon of the second device type (second type) may include a device icon representing a microwave oven. Moreover, the same room may be the kitchen.

In addition, the device icon of the first device type (first type) may include a device icon representing a television set and the device icon of the second device type (second type) may include a device icon representing a content reproducing machine that reproduces contents.

Furthermore, the device icon of the first device type (first type) may include a device icon representing a television set and the device icon of the second device type (second type) may include a device icon representing a content recording machine that records contents. Moreover, the same room may be the living room.

In addition, while the device 200 transmits a device new registration request to the server 300 in the sequence diagram shown in FIG. 128, the present disclosure is not particularly limited thereto and the device 200 may transmit a device new registration request to the home controller 100 and the home controller 100 may transmit a device arrangement request for requesting that a display position of a device icon corresponding to a newly registered device be decided to the server 300. A process for deciding an arrangement position of a device icon corresponding to a device to be newly registered by the server 300 when the device 200 transmits a device new registration request to the home controller 100 will now be described with reference to FIG. 146.

FIG. 146 is a sequence diagram showing a flow of a process by the server 300 for deciding an arrangement position of a device icon corresponding to a device to be newly registered when the device 200 transmits a device new registration request to the home controller 100.

When a device 200 is newly arranged in a prescribed room inside the house, the communication control section 217 of the device 200 transmits a device new registration request to the home controller 100 (S110301). In this case, the device new registration request includes a device ID and a device type.

Next, the communication control section 107 of the home controller 100 receives the device new registration request transmitted by the device 200 and transmits a device arrangement request for requesting that a display position of a device icon corresponding to a newly registered device be decided to the server 300 (S111801). In this case, the device arrangement request includes a residence ID, a device ID, and a device type. The communication control section 107 creates a device arrangement request in which a residence ID is added to the device ID and the device type included in the received device new registration request and transmits the device arrangement request.

Next, the device control section 302 of the server 300 receives the device arrangement request from the device 200 and performs an initial arrangement deciding process for deciding an arrangement position on the floor plan of a device icon corresponding to the device 200 to be newly registered (S110302). Moreover, the initial arrangement deciding process is as described earlier.

The device control section 302 of the server 300 then transmits arrangement information indicating the arrangement position of the device icon decided by the initial arrangement deciding process to the home controller 100 (S110303).

Next, the display control section 103 of the home controller 100 receives the arrangement information transmitted by the server 300, displays a device icon corresponding to the newly registered device 200 on the floor plan based on the received arrangement information, and updates the display screen (S110304).

In addition, while the device 200 transmits a device new registration request to the home controller 100 in the sequence diagram shown in FIG. 144, the present disclosure is not particularly limited thereto and the device 200 may transmit a device new registration request to the server 300 and the server 300 may transmit a device arrangement request for requesting that a display position of a device icon corresponding to a newly registered device be decided to the home controller 100. A process for deciding an arrangement position of a device icon corresponding to a device to be newly registered by the home controller 100 when the device 200 transmits a device new registration request to the server 300 will now be described with reference to FIG. 147.

FIG. 147 is a sequence diagram showing a flow of a process by the home controller 100 for deciding an arrangement position of a device icon corresponding to a device to be newly registered when the device 200 transmits a device new registration request to the server 300.

When the device 200 is newly arranged in a prescribed room inside the house, the communication control section 217 of the device 200 transmits a device new registration request to the server 300 (S110301). The device new registration request includes a residence ID, a device ID, and a device type.

Next, the device control section 302 of the server 300 receives the device new registration request from the device 200 and transmits a device arrangement request for requesting that a display position of a device icon corresponding to a newly registered device be decided to the home controller 100 (S111901). At this point, the device control section 302 stores the newly registered device in a device list. The device arrangement request includes a residence ID, a device ID, and a device type.

The device management section 105 of the home controller 100 then receives the device arrangement request from the server 300 and performs an initial arrangement deciding process for deciding an arrangement position on the floor plan of a device icon corresponding to the device 200 to be newly registered (S110302). Moreover, the initial arrangement deciding process is as described earlier.

Next, the display control section 103 of the home controller 100 displays a device icon corresponding to the newly registered device 200 on the floor plan based on the decided arrangement position and updates the display screen (S110304).

The device management section 105 of the home controller 100 then transmits arrangement information indicating the arrangement position of the device icon decided by the initial arrangement deciding process to the server 300 (S111701). The device control section 302 of the server 300 updates a device list based on the received arrangement information. Moreover, the home controller 100 need not transmit the arrangement information to the server 300.

(Device icon arranging process 4) Next, a device icon arranging process 4 in which a device icon is automatically arranged on a floor plan will be described.

FIG. 148 is a diagram showing an example of a first floor plan 5001 and FIG. 149 is a diagram showing an example of a second floor plan 5002.

The first floor plan 5001 shown in FIG. 148 and the second floor plan 5002 shown in FIG. 149 differ from each other in room arrangements.

FIG. 150 is a diagram showing a display screen corresponding to a first residence that is displayed on the display 101 of the home controller 100. FIG. 151 is a diagram showing a display screen corresponding to a second residence that is displayed on the display 101 of the home controller 100, and FIG. 152 is a diagram showing a display screen corresponding to a third residence that is displayed on the display 101 of the home controller 100.

While the display screen shown in FIG. 150 and the display screen shown in FIG. 151 both display the first floor plan 5001 and share same arrangement positions of rooms, the display screens differ from each other in arrangement positions of the device icon 501. The display screen shown in FIG. 152 displays the second floor plan 5002 that differs from the floor plans shown in FIGS. 150 and 151.

For example, on the display screen shown in FIG. 150, a device icon of an air conditioner is displayed in a region corresponding to a western style room 1 but the device icon is not displayed in a region corresponding to a western style room 2. By comparison, on the display screen shown in FIG. 151, a device icon is not displayed in a region corresponding to the western style room 1 but device icons of a television set and an air conditioner are displayed in a region corresponding to the western style room 2. In this manner, even when layouts are the same, arrangements of devices as well as positions of displayed device icons differ from one residence to another.

Next, a flow of a process for newly registering the device 200 in a home control system (information management system) will be described with reference to the drawings. The home control system connects to a network which controls one or more target devices managed in association with a same building ID, and manages information of the one or more target devices.

FIG. 153 is a diagram showing an example of a display screen that is displayed on the display 101 of the home controller 100 before a device is newly registered. As shown in FIG. 153, the first floor plan 5001 is displayed on the display 101 of the home controller 100. A device icon 501 corresponding to a device arranged in each room is displayed on the first floor plan 5001.

FIG. 154 is a sequence diagram showing a flow of a displaying process for displaying a device icon corresponding to a device to be newly registered on a floor plan.

First, when the device 200 is newly arranged in a prescribed room inside the house, the communication control section 217 of the device 200 transmits a device new registration request to the server 300 (S120701).

FIG. 155 is a diagram showing an example of a device new registration request that is transmitted when an air conditioner is to be newly registered. As shown in FIG. 155, the device new registration request includes a residence ID 120901 for identifying a residence in which the device 200 is to be arranged, a device ID 120902 for identifying the device 200, and a device type 120903 for identifying a type of the device 200.

When the device 200 is newly arranged in a prescribed room inside the house, the communication control section 217 of the device 200 inquires a residence ID to the home controller 100, acquires the residence ID from the home controller 100, and creates a device new registration request.

Moreover, while the communication control section 217 of the device 200 acquires the residence ID from the home controller 100 in the present embodiment, the present disclosure is not particularly limited thereto. When the device 200 and the server 300 are connected to each other via a gateway installed in the home, the gateway may provide the residence ID. Specifically, the communication control section 217 of the device 200 may transmit a device new registration request including the device ID 120902 and the device type 120903, and the gateway may include the residence ID in the device new registration request from the device 200 and transmit the device new registration request to the server 300. Alternatively, the device 200 may accept input of a residence ID by the user.

Next, the device control section 302 of the server 300 receives the device new registration request from the device 200 and performs an initial arrangement deciding process for deciding an arrangement position on the floor plan of a device icon corresponding to the device 200 to be newly registered (S120702). Moreover, the initial arrangement deciding process by the server 300 will be described later.

The device control section 302 of the server 300 then transmits arrangement information indicating the arrangement position of the device icon decided by the initial arrangement deciding process to the home controller 100 (S120703).

Next, the display control section 103 of the home controller 100 receives the arrangement information transmitted by the server 300, displays a device icon corresponding to the newly registered device 200 on the floor plan based on the received arrangement information, and updates the display screen (S120704).

The initial arrangement deciding process shown in FIG. 154 will now be described in greater detail.

FIG. 156 is a flow chart for explaining an initial arrangement deciding process by the server 300.

First, the device control section 302 determines whether or not the device new registration request from the device 200 has been received (S120801). The server 300 receives, from one target device among the one or more target devices via the network, a device new registration request (registration notification information) representing that the one target device has been newly registered in the home control system (information management system).

At this point, when it is determined that the device new registration request from the device 200 has not been received (NO in S120801), the process is finished.

On the other hand, when it is determined that the device new registration request from the device 200 has been received (YES in S120801), the device control section 302 determines a floor plan corresponding to the residence in which the newly registered device 200 is to be arranged (S120802).

FIG. 157 is a diagram showing an example of a layout type reference table 121000 that is managed by the server 300. As shown in FIG. 157, the layout type reference table 121000 associates a residence ID 121001 and a layout type 121002 with each other. The layout type 121002 represents a type of layout.

The device control section 302 refers to the layout type reference table 121000 and determines a layout type associated with the residence ID included in the device new registration request.

Next, the device control section 302 extracts a candidate of a room in which the registered device is to be arranged (S120803).

FIG. 158 is a diagram showing an example of a device list 121100 that is managed by the server 300. As shown in FIG. 158, the device list 121100 includes a residence ID 121101, a device ID 121102, a device type 121103, an arrangement 121104, and an installation room 121105.

The residence ID 121101 is an identifier of a residence. The device ID 121102 is an identifier of the device 200. The device type 121103 indicates a type of the device 200. The arrangement 121104 is coordinates which are expressed by an (X coordinate, Y coordinate, floor number) format and indicates an arrangement position on the floor plan 500 of the device icon 501 corresponding to the device 200. The installation room 121105 indicates a name of a room in which a device is installed. Moreover, the device list 121100 may include capability information 4705 and a control command transmission destination 4706 as shown in FIG. 34. Alternatively, the device list 121100 may include a model number of the device 200.

FIG. 159 is a diagram showing an example of the layout management table 121200 representing a correspondence relationship between a device type and a room for each floor plan. As shown in FIG. 159, the layout management table 121200 associates, with each other, a layout type 121201, a device type 121202, a room 121203, and an installation ratio 121204. The layout type 121201 indicates a type of layout. The device type 121202 indicates a type of the device 200. The room 121203 indicates a name of a room candidate in which the device 200 is to be installed. The installation ratio 121204 indicates a ratio at which a device indicated by the device type 121202 is installed in a room indicated by the room 121203.

The device control section 302 refers to the layout management table 121200 and extracts room candidates corresponding to a device type of a device to be registered with respect to the floor plan determined in step S120802. For example, when the layout type is "A" and the device type is "air conditioner", the device control section 302 extracts the "living room", the "western style room 1", and the "western style room 2" as room candidates.

Next, the device control section 302 excludes a room in which a device of a same type as the device 200 to be newly registered is already installed from the room candidates in which the newly registered device 200 is to be installed (S120804). The chance of the newly registered device 200 being installed is low in a room in which a device of a same type as the device 200 to be newly registered is already installed. Therefore, a room in which a device of a same type as the device 200 to be newly registered is already installed is excluded from installation candidates of the device 200 to be newly registered.

The device control section 302 refers to the device list 121100 and excludes a room corresponding to a same device type as the device type of the device 200 to be newly registered from the room candidates extracted in step S120803.

Next, the device control section 302 calculates an installation ratio of a device type for each layout type and for each room (S120805).

Based on the device list 121100 and the layout type reference table 121000, the device control section 302 calculates a ratio at which a prescribed device is installed in a prescribed room in a prescribed layout for each layout type and for each room. For example, a plurality of residence IDs are associated with the layout type "A". A plurality of device types are further associated with a residence ID "1" among the plurality of residence IDs. Two installation rooms, the "living room" and the "western style room 1", are associated with a device type "air conditioner" among the plurality of device types. In this manner, the device control section 302 aggregates the number of residences corresponding to the layout type "A" and the number of residences which correspond to the layout type "A" and in which the device type "air conditioner" is installed in the living room. Accordingly, a ratio at which the device type "air conditioner" is installed in the living room among the layout type "A" can be calculated. In a similar manner, the device control section 302 calculates a ratio at which the device type "air conditioner" is installed in the western style room 1 and the western style room 2 among the layout type "A".

As shown in FIG. 159, the ratio at which the device type "air conditioner" is installed in the "living room" among the layout type "A" is, for example, 80%, the ratio at which the device type "air conditioner" is installed in the "western style room 1" among the layout type "A" is, for example, 40%, and the ratio at which the device type "air conditioner" is installed in the "western style room 2" among the layout type "A" is, for example, 10%.

Moreover, the device control section 302 stores the installation ratio of a device type calculated for each layout type and for each room in the layout management table 121200 and updates the layout management table 121200.

Next, the device control section 302 determines the number of rooms remaining after the exclusion in step S120804 (S120806). In this case, when it is determined that the number of remaining rooms is two or more ("two or more" in S120806), the device control section 302 searches for a room with a highest installation ratio among the remaining rooms (S120807). The device control section 302 refers to the layout management table 121200 and searches for a room with a highest installation ratio among the remaining rooms.

On the other hand, when it is determined that the number of remaining rooms is one ("one" in S120806) or when a room with a highest installation ratio among the remaining rooms is searched in step S120807, the device control section 302 transmits arrangement information including a device type indicating a type of a device icon and a room type of the one remaining room or the room with the highest installation ratio to the home controller 100 (S120808).

When it is determined that the number of remaining rooms is one, the device control section 302 transmits arrangement information including a device type indicating a type of a device icon and the one remaining room type to the home controller 100.

In addition, when a room with a highest installation ratio among the remaining rooms is searched in step S120807, the device control section 302 transmits arrangement information including a device type indicating a type of a device icon and a room type of the room with the highest installation ratio among the remaining rooms to the home controller 100.

Furthermore, when the number of remaining room types is determined to be zero ("zero" in S120806), the device control section 302 transmits arrangement information including a device type indicating a type of a device icon and display region information indicating a prescribed region on the display screen (S120809).

Moreover, for example, the prescribed region on the display screen is a region outside the display region of the floor plan 500 in the display screen.

When the number of remaining rooms is one or zero, the installation ratio of a device type is not used. Therefore, after the process of step S120804, a transition is made to the process of step S120806 without performing the process of step S120805, and when the number of remaining rooms is determined to be two or more in step S120806, the process of step S120805 may be performed.

As described above, a residence ID (first information) capable of identifying a type of a floor plan of a residence (building) displayed on the display 101 of the home controller 100 (information apparatus) is received from the home controller 100 (information apparatus) via the network. A floor plan of a same type as the type of the floor plan indicated by the residence ID (first information) is determined using a first database that manages a layout type (second information) indicating a type of each floor plan. Using a second database that manages, for each type of floor plan, an installation ratio (third information) indicating a frequency at which each of one or more device icons is displayed in each of one or more rooms included in a floor plan, one or more device icons to be displayed on a floor plan determined to be of the same type and a room in which each of the one or more device icons is to be displayed are decided.

In addition, a device type (fourth information) indicating the decided one or more device icons and a room type (fifth information) indicating a room in which each of the decided one or more device icons is to be displayed are transmitted to the home controller 100 (information apparatus) via the network. Based on the device type (fourth information) and the room type (fifth information), the one or more device icons are displayed in a region on the display screen corresponding to each of the one or more device icons representing a floor plan on the display 101 of the home controller 100 (information apparatus).

Furthermore, using a third database that manages a device list (sixth information) indicating, for each type of floor plan, in which room each device icon is displayed, a frequency at which each of the one or more device icons is displayed in each of the one or more rooms is calculated for each type of floor plan.

In addition, the residence ID (first information) and a device type (seventh information) indicating a type of a new device icon to be newly displayed on a floor plan indicated by the residence ID (first information) are received from the home controller 100 (information apparatus) via the network. Using the second database, a room in which a device icon of a type indicated by the device type (seventh information) is already displayed is excluded from room candidates in which a device icon of the type indicated by the device type (seventh information) is to be displayed on a floor plan of a type indicated by the residence ID (first information). When a plurality of room candidates remain, a room with a highest frequency of the device icon of the type indicated by the device type (seventh information) being displayed is decided among the plurality of room candidates and the room type (fifth information) indicating the decided room is transmitted to the home controller 100 (information apparatus) via the network. Based on the room type (fifth information) and the device type (seventh information), the new device icon is displayed in a region on the display screen corresponding to the decided room on the display 101 of the home controller 100 (information apparatus).

In addition, when one room candidate remains, the one room candidate is decided as a room in which a device icon of a type indicated by the device type (seventh information) is to be displayed, and the room type (fifth information) indicating the decided room is transmitted to the home controller 100 (information apparatus) via the network. Based on the room type (fifth information) and the device type (seventh information), the new device icon is displayed in a region on the display screen corresponding to the decided room on the display 101 of the home controller 100 (information apparatus).

Furthermore, when there is no remaining room candidate, a region outside the floor plan of a type indicated by the residence ID (first information) is decided as a region in which a device icon of a type indicated by the device type (seventh information) is to be displayed, and the room type (fifth information) indicating the decided region is transmitted to the home controller 100 (information apparatus) via the network. Based on the room type (fifth information) and the device type (seventh information), the new device icon is displayed in a region outside the floor plan on the display 101 of the home controller 100 (information apparatus).

A specific displaying process of a device icon will now be described.

FIG. 160 is a diagram showing an example of a display screen of a home controller when a device to be newly registered is an air conditioner. In the following description, the device to be newly registered is an air conditioner and is to be registered in residence ID "5". In addition, the device list 121100 stores data representing that one air conditioner is already arranged in the living room.

First, the device control section 302 determines whether or not a device new registration request has been received from the refrigerator that has been newly installed in the residence. In this case, the server 300 receives the device new registration request shown in FIG. 155 from the air conditioner.

Next, the device control section 302 refers to the layout type reference table 121000 (FIG. 157) and determines a layout type associated with the residence ID included in the device new registration request. In this case, since the residence ID included in the device new registration request is "5", the layout type "A" is selected. The layout type "A" corresponds to the first floor plan 5001 shown in FIG. 148.

The device control section 302 then refers to the layout management table 121200 (FIG. 159) and extracts room candidates corresponding to a device type of the device to be registered with respect to the determined floor plan. In this case, since the layout type is "A" and the device type is "air conditioner", the device control section 302 extracts the "living room", the "western style room 1", and the "western style room 2" as room candidates.

Next, the device control section 302 refers to the device list 121100 (FIG. 158) and excludes a room corresponding to a same device type as the device type of the device 200 to be newly registered from the extracted room candidates. In this case, since an air conditioner is already arranged in the living room in the residence of which residence ID is "5" on the device list 121100, the device control section 302 excludes the "living room" from the candidates "living room", the "western style room 1", and the "western style room 2". As a result, the "western style room 1" and the "western style room 2" remain as room candidates in which the newly registered device is to be installed.

Subsequently, based on the device list 121100 (FIG. 158) and the layout type reference table 121000 (FIG. 157), the device control section 302 calculates a ratio at which a prescribed device is installed in a prescribed room in a prescribed layout for each layout type and for each room. As a result, when the layout type is "A", the ratio at which an air conditioner is installed in the living room is, for example, 80%, the ratio at which an air conditioner is installed in the western style room 1 is, for example, 40%, and the ratio at which an air conditioner is installed in the western style room 2 is, for example, 10%.

Next, the device control section 302 determines the number of remaining rooms. In this case, since the "western style room 1" and the "western style room 2" remain as candidates in which the newly registered device is to be installed, it is determined that the number of remaining rooms is two or more.

Subsequently, the device control section 302 refers to the layout management table 121200 (FIG. 159) and searches for a room with a highest installation ratio among the remaining rooms. In this case, when the layout type is "A", the ratio at which an air conditioner is installed in the "western style room 1" is 40% and the ratio at which an air conditioner is installed in the "western style room 2" is 10%. Therefore, the device control section 302 selects the "western style room 1" with the highest installation ratio among the remaining "western style room 1" and "western style room 2".

Next, the device control section 302 transmits arrangement information including a device type (air conditioner) indicating a type of a device icon and a room type (western style room 1) of a room with the highest installation ratio among the remaining rooms to the home controller 100.

Upon receiving the arrangement information, the display control section 103 of the home controller 100 displays a device icon 121301 of the newly registered air conditioner on the first floor plan 5001 based on the arrangement information. In this case, the device icon 121301 of the air conditioner is displayed in a region on the display screen corresponding to the western style room 1. As described above, a display position of the device icon 121301 of the air conditioner is decided as a room with the highest installation ratio on a same floor plan among a plurality of room candidates.

Subsequently, another example of the initial arrangement deciding process shown in FIG. 154 will be described.

FIG. 161 is a flow chart for explaining another example of the initial arrangement deciding process by the server 300. Since the process performed in steps S121401 to S121407 in FIG. 161 is the same as the process performed in steps S120801 to S120807 shown in FIG. 156, a description thereof will be omitted.

When it is determined that the number of remaining rooms is one ("one" in S121406) or when a room with the highest installation ratio among the remaining rooms is searched in step S121407, the device control section 302 calculates an average arrangement position where a device icon of each device is to be displayed for each floor plan and for each room (S121408).

FIG. 162 is a diagram showing an example of the layout management table 121500 representing a correspondence relationship between a device type and a room for each floor plan. As shown in FIG. 162, the layout management table 121500 associates, with each other, a layout type 121201, a device type 121202, a room 121203, an installation ratio 121204, and an average arrangement position 121501. The average arrangement position 121501 indicates a display position where a device icon indicated by the device type 121202 is displayed in a region on the display screen corresponding to a room indicated by the room 121203.

The device control section 302 refers to the device list 121100, extracts an arrangement position (arrangement 121104) in each room of each device icon in all residences having a same layout type, and respectively calculates an average of the extracted arrangement positions. The device control section 302 stores the calculated average arrangement position in the layout management table 121500 and updates the layout management table 121500.

Next, the device control section 302 transmits arrangement information including a device type indicating a type of a device icon, a room type of the one remaining room or the room with the highest installation ratio, and a calculated average arrangement position corresponding to the device type and the room type to the home controller 100 (S121409).

When it is determined in step S121406 that the number of remaining rooms is one, the device control section 302 transmits arrangement information including a device type indicating a type of a device icon, the one remaining room type, and the calculated average arrangement position to the home controller 100.

In addition, when a room with a highest installation ratio among the remaining rooms is searched in step S121407, the device control section 302 transmits arrangement information including a device type indicating a type of a device icon, a room type of the room with the highest installation ratio among the remaining rooms, and the calculated average arrangement position to the home controller 100.

Since the process of step S121410 is the same as the process of step S120809 shown in FIG. 156, a description thereof will be omitted.

As described above, the layout management table 121500 (second database) further manages an average arrangement position of a device icon in each room. A room type (fifth information) indicating a decided room and an average arrangement position (eighth information) of a device icon in the decided room are transmitted to the home controller 100 (information apparatus) via the network. In addition, based on the room type (fifth information), the device type (seventh information), and the average arrangement position (eighth information), the new device icon is displayed at an average arrangement position in a region on the display screen corresponding to the decided room on the display 101 of the home controller 100 (information apparatus).

A specific displaying process of a device icon will now be described.

FIG. 163 is a diagram showing an example of a display screen of a home controller when a device to be newly registered is an air conditioner. In the following description, the device to be newly registered is an air conditioner and is to be registered in residence ID "5". The device list 121100 stores data representing that one air conditioner is already arranged in the living room.

Since a process from receiving a device new registration request to searching for a room with a highest installation ratio among remaining rooms are the same as the displaying process described with reference to FIG. 160, a description thereof will be omitted.

The device control section 302 refers to the device list 121100 (FIG. 158), extracts an arrangement position (arrangement 121104) of a device icon in all residences having a same layout type, and calculates an average of the extracted arrangement positions. For example, the device control section 302 extracts an arrangement position of a device icon of an air conditioner in each room in all residences with a layout type of "A" and calculates an average of the extracted arrangement positions for each room. As a result, for example, an average arrangement position of a device icon of an air conditioner to be arranged in the living room is (X10, Y90, Z1), an average arrangement position of a device icon of an air conditioner to be arranged in the western style room 1 is (X140, Y40, Z1), and an average arrangement position of a device icon of an air conditioner to be arranged in the western style room 2 is (X90, Y15, Z1).

Next, the device control section 302 transmits arrangement information including a device type (air conditioner) indicating a type of a device icon, a room type (western style room 1) with the highest installation ratio among the remaining rooms, and a calculated average arrangement position (X140, Y40, Z1) to the home controller 100.

Upon receiving the arrangement information, the display control section 103 of the home controller 100 displays a device icon 121301 of the newly registered air conditioner on the first floor plan 5001 based on the arrangement information. In this case, the device icon 121301 of the air conditioner is displayed in a region on the display screen corresponding to the western style room 1. In addition, the device icon 121301 of the air conditioner is displayed at a position expressed as (X140, Y40, Z1). As described above, a display position of the device icon 121301 of the air conditioner is decided in a room with the highest installation ratio on a same floor plan among a plurality of room candidates and at an average arrangement position among a plurality of same floor plans.

While a bird's eye view representing positions and shapes of rooms constituting each floor in a planar manner is adopted as the first floor plan 5001 and the second floor plan 5002 in the description given above, the present embodiment is not limited thereto and a diagram showing what kind of and how many rooms are on each floor in a simplified manner may also be adopted as a floor plan.

Hereinafter, a different pattern of a floor plan will be specifically described. FIG. 164 is a diagram showing a floor plan 5200 with a different pattern. On the floor plan 5200, one room constituting one floor is represented by one square block and respective rooms on one floor are arranged in a matrix pattern. In addition, sizes of the respective blocks are the same, and a name and an area of a room are described in each block.

For example, the floor plan 5200 includes the respective rooms of a living room, a kitchen, a dining room, a bathroom, a washroom, a toilet, a bedroom, and a child room. In addition, a device icon 501 of an actually arranged device 200 is displayed in each room. For example, the device icons 501 of an illumination device and an air conditioner displayed in the living room signify that an illumination device and an air conditioner are installed in the living room.

Even when such a floor plan 5200 is displayed, a device icon of a device to be newly registered can be displayed in the same manner as described earlier.

FIG. 165 is a diagram for explaining an example of displaying a device icon of a device to be newly registered on the floor plan 5200 with a different pattern.

On the floor plan 5200 shown in FIG. 165, a display method of a device icon when a device is to be newly registered is almost the same as the display method of a device icon on the floor plan 500 described earlier.

In FIG. 165, a device icon 121301 of a newly registered air conditioner is displayed on the floor plan 5200. A display position of the device icon 121301 of the newly registered air conditioner is decided in a room with the highest installation ratio on a same floor plan among a plurality of room candidates. Therefore, the device icon 121301 of the newly registered air conditioner is displayed in a region corresponding to the bedroom that has the highest installation ratio among a plurality of room candidates (the bedroom and the child room) excluding the living room in which an air conditioner has already been arranged.

While an arrangement position of a device icon corresponding to a device to be newly registered is decided by the server 300 in the description given above, the present disclosure is not particularly limited thereto and the arrangement position may be decided by the home controller 100. A process for deciding an arrangement position of a device icon corresponding to a device to be newly registered by the home controller 100 will now be described with reference to FIG. 166.

FIG. 166 is a sequence diagram showing a flow of a process by the home controller 100 for deciding an arrangement position of a device icon corresponding to a device to be newly registered.

When a device 200 is newly arranged in a prescribed room inside the house, the communication control section 217 of the device 200 transmits a device new registration request to the home controller 100 (S120701).

Next, the device management section 105 of the home controller 100 receives the device new registration request from the device 200 and performs an initial arrangement deciding process for deciding an arrangement position on the floor plan of a device icon corresponding to the device 200 to be newly registered (S120702).

Subsequently, the display control section 103 of the home controller 100 displays a device icon corresponding to the newly registered device 200 on the floor plan based on the decided arrangement position and updates the display screen (S120704).

The device management section 105 of the home controller 100 then transmits arrangement information indicating the arrangement position of the device icon decided by the initial arrangement deciding process to the server 300 (S121901). The device control section 302 of the server 300 updates a device list based on the received arrangement information. Moreover, the home controller 100 need not transmit the arrangement information to the server 300. In addition, when the arrangement information is not transmitted to the server 300, the home control system need not include the server 300.

In addition, while the device 200 transmits a device new registration request to the server 300 in the sequence diagram shown in FIG. 154, the present disclosure is not particularly limited thereto and the device 200 may transmit a device new registration request to the home controller 100 and the home controller 100 may transmit a device arrangement request for requesting that a display position of a device icon corresponding to a newly registered device be decided to the server 300. A process for deciding an arrangement position of a device icon corresponding to a device to be newly registered by the server 300 when the device 200 transmits a device new registration request to the home controller 100 will now be described with reference to FIG. 167.

FIG. 167 is a sequence diagram showing a flow of a process by the server 300 for deciding an arrangement position of a device icon corresponding to a device to be newly registered when the device 200 transmits a device new registration request to the home controller 100.

When a device 200 is newly arranged in a prescribed room inside the house, the communication control section 217 of the device 200 transmits a device new registration request to the home controller 100 (S120701). In this case, the device new registration request includes a device ID and a device type.

Next, the communication control section 107 of the home controller 100 receives the device new registration request transmitted by the device 200 and transmits a device arrangement request for requesting that a display position of a device icon corresponding to a newly registered device be decided to the server 300 (S122001). In this case, the device arrangement request includes a residence ID, a device ID, and a device type. The communication control section 107 creates a device arrangement request in which a residence ID is added to the device ID and the device type included in the received device new registration request and transmits the device arrangement request.

Next, the device control section 302 of the server 300 receives the device arrangement request from the device 200 and performs an initial arrangement deciding process for deciding an arrangement position on the floor plan of a device icon corresponding to the device 200 to be newly registered (S120702). Moreover, the initial arrangement deciding process is as described earlier.

The device control section 302 of the server 300 then transmits arrangement information indicating the arrangement position of the device icon decided by the initial arrangement deciding process to the home controller 100 (S120703).

Next, the display control section 103 of the home controller 100 receives the arrangement information transmitted by the server 300, displays a device icon corresponding to the newly registered device 200 on the floor plan based on the received arrangement information, and updates the display screen (S120704).

In addition, while the device 200 transmits a device new registration request to the home controller 100 in the sequence diagram shown in FIG. 166, the present disclosure is not particularly limited thereto and the device 200 may transmit a device new registration request to the server 300 and the server 300 may transmit a device arrangement request for requesting that a display position of a device icon corresponding to a newly registered device be decided to the home controller 100. A process for deciding an arrangement position of a device icon corresponding to a device to be newly registered by the home controller 100 when the device 200 transmits a device new registration request to the server 300 will now be described with reference to FIG. 168.

FIG. 168 is a sequence diagram showing a flow of a process by the home controller 100 for deciding an arrangement position of a device icon corresponding to a device to be newly registered when the device 200 transmits a device new registration request to the server 300.

When the device 200 is newly arranged in a prescribed room inside the house, the communication control section 217 of the device 200 transmits a device new registration request to the server 300 (S120701). The device new registration request includes a residence ID, a device ID, and a device type.

Next, the device control section 302 of the server 300 receives the device new registration request from the device 200 and transmits a device arrangement request for requesting that a display position of a device icon corresponding to a newly registered device be decided to the home controller 100 (S122101). At this point, the device control section 302 stores the newly registered device in a device list. The device arrangement request includes a residence ID, a device ID, and a device type.

Next, the device management section 105 of the home controller 100 receives the device arrangement request from the server 300 and performs an initial arrangement deciding process for deciding an arrangement position on the floor plan of a device icon corresponding to the device 200 to be newly registered (S120702).

Subsequently, the display control section 103 of the home controller 100 displays a device icon corresponding to the newly registered device 200 on the floor plan based on the decided arrangement position and updates the display screen (S120704).

The device management section 105 of the home controller 100 then transmits arrangement information indicating the arrangement position of the device icon decided by the initial arrangement deciding process to the server 300 (S121901). The device control section 302 of the server 300 updates a device list based on the received arrangement information. Moreover, the home controller 100 need not transmit the arrangement information to the server 300.

As described above,
a first aspect of the present disclosure provides
a method for controlling information apparatus having a
   display and being connected to a network, over which
   one or more target devices are controlled,
the method causing a computer of the information apparatus to:
display on the display a display screen representing a floor
   plan including one or more rooms;
using at least one memory that associates first information
   with second information, the first information indicating a type of each of one or more device icons representing the one or more target devices and the second
   information indicating an attribute of each of the one or
   more rooms, display each of the one or more device
   icons in a region on the display screen corresponding to
   a room that corresponds to each of the one or more
   device icons in accordance with the type of each of the
   one or more device icons;
when selection of any of the one or more device icons is
   sensed in a region corresponding to any of the rooms
   included in the floor plan, display a control screen for
   at least any of operation and state confirmation of a
   target device corresponding to the selected device icon
   on the display screen representing the floor plan; and
output to the network a control command for at least any
   of the operation and the state confirmation of the target
   device corresponding to the selected device icon, based
   on an operation on the control screen.

According to the first aspect described above, using at least one memory associates first information with second information, the first information indicating a type of each of one or more device icons representing the one or more target devices and the second information indicating an attribute of each of the one or more rooms, each of the one or more device icons are displayed in a region on the display screen corresponding to a room that corresponds to each of the one or more device icons in accordance with the type of each of the one or more device icons.

Accordingly, for example, when the target device is a refrigerator, a device icon representing a refrigerator is displayed in a region on the display screen corresponding to a kitchen. In addition, when the target device is a toilet seat apparatus with a washing function, a device icon representing a toilet seat apparatus with a washing function is displayed in a region on the display screen corresponding to a toilet.

Therefore, since the user is not required to set a correspondence relationship between a device icon and a room corresponding to the device icon, an erroneous operation of displaying a device icon in a region other than a region corresponding to a room that corresponds to the device icon by mistake can be reliably prevented.

In the first aspect described above, for example, the room corresponding to each of the one or more device icons may be determined in accordance with the type of each of the one or more device icons using the first information and the second information, and each of the one or more device icons may be displayed in a region on the display screen corresponding to the determined room.

In the first aspect described above, for example, the at least one memory may further store third information indicating a position of each of the one or more rooms on the floor plan, the region corresponding to each of the one or more rooms may be determined using the third information, and each of the one or more device icons may be displayed in the region on the display screen corresponding to the room that corresponds to each of the one or more device icons in accordance with the type of each of the one or more device icons.

In the first aspect described above, for example, the at least one memory may further store third information indicating position of each of the one or more rooms on the floor plan, the room corresponding to each of the one or more device icons may be determined, in accordance with the type of each of the one or more device icons using the first information and the second information, a region corresponding to each of the one or more rooms may be determined using the third information, and each of the one or more device icons may be displayed in a region on the display screen corresponding to the determined room.

In the first aspect described above, for example, when it is determined that one device icon among the one or more device icons corresponds to a plurality of rooms among the one or more rooms based on the first information, the one device icon may be displayed in a region on the display screen corresponding to a largest room among the plurality of the corresponding rooms.

According to the first aspect described above, when it is determined that one device icon among the one or more device icons representing each of one or more target devices corresponds to a plurality of rooms among the one or more rooms, the one device icon is displayed in a region on the display screen corresponding to a largest room among the plurality of the corresponding rooms.

Accordingly, for example, when the target device is a television set and a device icon representing the television set corresponds to a plurality of rooms such as a living room, a study, and a bedroom, the device icon is displayed in a region on the display screen corresponding to a largest room among the plurality of the corresponding rooms such as the living room.

Therefore, for example, since the device icon representing the television set is displayed in a region corresponding to the living room without requiring the user to set a correspondence relationship between the device icon and a room corresponding to the device icon, erroneous operations of displaying the device icon in a region other than a region corresponding to a room that corresponds to the device icon by mistake can be reduced. In addition, if a display position of the device icon must be changed, for example, the device icon can be moved into a region corresponding to a room such as a bedroom that differs from the living room by a user's operation after the device icon is displayed. In this case, since a user's operation is only accepted when the display position must be changed, operations by the user can be made less complicated.

In addition, since the device icon is displayed in a region on the display screen corresponding to a largest room such as the living room among the plurality of corresponding rooms, the device icon is to be displayed at a most likely display position. In other words, the device icon is to be displayed at a position where a change in display position is least likely. Therefore, since the device icon can be displayed without involving a setting made by the user and the likelihood of the display position of the device icon being changed is low, erroneous operations by the user can be significantly reduced.

Furthermore, since the device icon is displayed in a region on the display screen corresponding to a largest room such as the living room among the plurality of corresponding rooms, a situation where a large number of device icons are displayed in a mixed manner in a small region can be avoided. Therefore, a misrecognition in which a desired device icon is mixed among a large number of device icons in a small region and a display position of the desired device icon cannot be recognized can be prevented.

Furthermore, in the first aspect described above, for example, when the one device icon is determined to be a television set icon representing a television set based on the first information, the television set icon may be displayed in a region on the display screen corresponding to the living room.

In the first aspect described above, for example, when it is determined that a type of one device icon among the one or more device icons is a type to be displayed on the display screen for the first time and that the one device icon potentially corresponds to a plurality of rooms among the one or more rooms based on the first information, the one device icon may be displayed in a region on the display screen corresponding to a largest room among the plurality of potentially corresponding rooms.

According to the first aspect described above, when it is determined that a type of one device icon among one or more device icons is a type to be displayed on the display screen for the first time and that the one device icon potentially corresponds to a plurality of rooms among the one or more rooms based on the first information, the one device icon is displayed in a region on the display screen corresponding to a largest room among the plurality of potentially corresponding rooms.

Accordingly, for example, when the target device is a television set and a device icon representing the television set potentially corresponds to a plurality of rooms such as a living room, a study, and a bedroom, the device icon is initially displayed in a region on the display screen corresponding to a largest room among the plurality of potentially corresponding rooms such as the living room.

Therefore, for example, since the device icon representing the television set is displayed in a region corresponding to the living room as a position of initial display without requiring the user to set a correspondence relationship between the device icon and a room corresponding to the device icon by manual input, erroneous operations of displaying the device icon in a region other than a region corresponding to a room that corresponds to the device icon by mistake can be reduced. In addition, if a display position of the device icon must be changed, for example, the device icon can be moved into a region corresponding to a room such as a bedroom that differs from the living room by a user's operation after the device icon is displayed. In this case, since a user's operation is only accepted when the display position must be changed, operations by the user can be made less complicated.

Furthermore, since the device icon is displayed in a region on the display screen corresponding to a largest room such as the living room among the plurality of potentially corresponding rooms, the device icon is to be initially displayed at a most likely display position. In other words, the device icon is to be initially displayed at a position where a change in display position is least likely. Therefore, since the device icon can be displayed without involving a setting made by the user and the likelihood of the display position of the device icon being changed is low, erroneous operations by the user can be significantly reduced.

Furthermore, since the device icon is displayed in a region on the display screen corresponding to a largest room such as the living room among the plurality of potentially corresponding rooms, a situation where a large number of device icons are displayed in a mixed manner in a small region can be avoided. Therefore, a misrecognition in which a device icon to be initially displayed is mixed among a large number of device icons in a small region and a display position of the device icon to be initially displayed cannot be recognized can be prevented.

In the first aspect described above, for example, when it is determined that a type of one device icon among the one or more device icons is a type to be newly displayed on the display screen and that the one device icon is a television set icon representing a television set based on the first information, the television set icon may be displayed in a region on the display screen corresponding to the living room.

In the first aspect described above, for example, when one device icon among the one or more device icons is determined to be a refrigerator icon representing a refrigerator based on the first information, the refrigerator icon may be displayed in a region on the display screen corresponding to the kitchen.

Another mode of the first aspect is
a method for providing information in an information management system which is connected to a network that controls one or more target devices associated with a same building ID and which manages information on the one or more target devices, the method including:
receiving registration notification representing that one target device among the one or more target devices has been newly registered in the information management system, from the one target device via the network;
using at least one memory that associates first information with second information, the first information indicating a type of each of one or more device icons representing each of the one or more target devices and the second information indicating an attribute of each of one or more rooms included in a display screen representing a floor plan of a building indicated by the building ID, determine an attribute of a room corresponding to a type of a device icon representing the one target device based on the received registration notification information; and
transmitting, via the network, third information indicating the type of the device icon representing the one target device and fourth information indicating the determined attribute of the room, to an information apparatus which is associated with the same building ID and which displays the display screen representing the floor plan on a display, the device icon representing the one target device being displayed in a region on the display screen corresponding to a room that corresponds to the device icon at the information apparatus based on the third information and the fourth information.

According to the other mode described above, using at least one memory that associates first information with second information, the first information indicating a type of each of one or more device icons representing each of the one or more target devices and the second information indicating an attribute of each of one or more rooms included in a display screen representing a floor plan of a building indicated by a building ID, an attribute of a room corresponding to a type of a device icon representing one target device is determined based on received registration notification information. Accordingly, the device icon representing the one target device is displayed in a region on the display screen corresponding to a room that corresponds to the device icon on a display of an information apparatus.

Accordingly, for example, when the target device is a refrigerator, a device icon representing the refrigerator is displayed in a region on the display screen corresponding to a kitchen. In addition, when the target device is a toilet seat apparatus with a washing function, a device icon representing the toilet seat apparatus with a washing function is displayed in a region on the display screen corresponding to a toilet.

Therefore, since the user is not required to set a correspondence relationship between a device icon and a room corresponding to the device icon, an erroneous operation of displaying a device icon in a region other than a region corresponding to a room that corresponds to the device icon by mistake can be reliably prevented.

In the other mode described above, for example, when selection of any of the one or more device icons is sensed by the information apparatus in a region corresponding to any of the rooms included in the floor plan, a control screen may be displayed for at least any of operation and state confirmation of a target device corresponding to the selected device icon, on the display screen representing the floor plan at the information apparatus, and a control command may be output for at least any of the operation and the state confirmation of the target device corresponding to the selected device icon, from the information apparatus to the network based on an operation on the control screen.

In the other mode described above, for example, the at least one memory may further store fifth information indicating position of each of the one or more rooms on the floor plan, the method further comprising: determining position information indicating a region corresponding to a room that corresponds to the type of the device icon representing the one target device, using the fifth information, and transmitting the determined position information to the information apparatus via the network, the device icon representing the one target device being displayed in the region on the display screen corresponding to the room that corresponds to the device icon, at the information apparatus based on the transmitted position information.

In the other mode described above, for example, when it is determined that the device icon representing the one target device corresponds to a plurality of rooms among the one or more rooms based on the first information, a largest room among the plurality of the corresponding rooms may be determined as a room corresponding to the type of the device icon representing the one target device, and information indicating an attribute of the determined room may be transmitted as the fourth information to the information apparatus via the network.

According to the other mode described above, when it is determined that a device icon representing one target device potentially corresponds to a plurality of rooms among one or more rooms, a largest room among the plurality of potentially corresponding rooms is determined as a room corresponding to a type of the device icon representing the one target device.

Accordingly, for example, when the target device is a television set and a device icon representing the television set potentially corresponds to a plurality of rooms such as a living room, a study, and a bedroom, the device icon is displayed in a region on the display screen corresponding to a largest room among the plurality of potentially corresponding rooms such as the living room.

Therefore, for example, since the device icon representing the television set is displayed in a region corresponding to the living room without requiring the user to set a correspondence relationship between the device icon and a room corresponding to the device icon, erroneous operations of displaying the device icon in a region other than a region corresponding to a room that corresponds to the device icon by mistake can be reduced. In addition, if a display position of the device icon must be changed, for example, the device icon can be moved into a region corresponding to a room such as a bedroom that differs from the living room by a user's operation after the device icon is displayed. In this case, since a user's operation is only accepted when the display position must be changed, operations by the user can be made less complicated.

Furthermore, since the device icon is displayed in a region on the display screen corresponding to a largest room such as the living room among the plurality of potentially corresponding rooms, the device icon is to be displayed at a most likely display position. In other words, the device icon is to be displayed at a position where a change in display position is least likely. Therefore, since the device icon can be displayed without involving a setting made by the user and the likelihood of the display position of the device icon being changed is low erroneous operations by the user can be significantly reduced.

In addition, since the device icon is displayed in a region on the display screen corresponding to a largest room such as the living room among the plurality of potentially corresponding rooms, a situation where a large number of device icons are displayed in a mixed manner in a small region can be avoided. Therefore, a misrecognition in which a desired device icon is mixed among a large number of device icons in a small region and a display position of the desired device icon cannot be recognized can be prevented.

In the other mode described above, for example, when the device icon representing the one target device is determined to be a refrigerator icon representing a refrigerator based on the first information, the refrigerator icon may be displayed in a region on the display screen corresponding to the kitchen, at the information apparatus.

In the other mode described above, for example, when the device icon representing the one target device is determined to be a television set icon representing a television set based on the first information, the television set icon may be displayed in a region on the display screen corresponding to the living room.

A second aspect of the present disclosure provides
a method for controlling information apparatus having a display and being connected to a network, over which one or more target devices are controlled.
the method causing a computer of the information apparatus to:
display on the display a display screen representing a floor plan including one or more rooms;
using at least one memory that associates first information with second information, the first information indicating a type of each of one or more device icons representing the one or more target devices and the second information indicating an attribute of each of the one or more rooms to display a device icon having a room that corresponds to a type of a device icon among the one or more device icons in a region on the display screen corresponding to a room that corresponds to the device icon and display a device icon not having a room that corresponds to the type of the device icon among the one or more device icons in a prescribed region on the display screen;
when selection of any of the one or more device icons is sensed in a region corresponding to any of the rooms included in the floor plan, display a control screen for at least any of operation and state confirmation of a target device corresponding to the selected device icon on the display screen representing the floor plan; and
output to the network a control command for at least any of the operation and the state confirmation of the target device corresponding to the selected device icon, based on an operation on the control screen.

According to the second aspect described above, using at least one memory that associates first information with second information, the first information indicating a type of each of device icons representing each of the one or more target devices and the second information indicating an attribute of each of the one or more rooms, a device icon having a room that corresponds to a type of a device icon among one or more device icons is displayed in a region on the display screen corresponding to a room that corresponds to the device icon.

Accordingly, for example, when the type of the target device is a refrigerator and a room corresponding to the refrigerator is a kitchen, a device icon representing the refrigerator is displayed in a region on the display screen corresponding to the kitchen. In addition, when the type of the target device is a toilet seat apparatus with a washing function and a room corresponding to the toilet seat apparatus with a washing function is a toilet, a device icon representing the toilet seat apparatus with a washing function is displayed in a region on the display screen corresponding to the toilet.

Therefore, since the user is not required to set a correspondence relationship between a device icon and a room corresponding to the device icon, an erroneous operation of displaying a device icon in a region other than a region corresponding to a room that corresponds to the device icon by mistake can be reliably prevented.

On the other hand, a device icon not having a room that corresponds to a type of the device icon among the one or more device icons is displayed in a prescribed region on the display screen.

Accordingly, for example, when the target device is a humidifier and a room is not associated with the humidifier, a device icon representing the humidifier is displayed in a region outside of a frame of a display region of a floor plan or in a prescribed region such as a region corresponding to a living room.

In this case, since a display position of the device icon is likely to be changed, for example, the device icon is displayed in a region outside of a frame of a display region of a floor plan where the device icon can be easily recognized or in a region corresponding to a living room which offers a large display region and enables the device icon to be recognized even when other device icons are displayed. Accordingly, a device icon of a type of which display position is likely to be changed is displayed based on the assumption that the display position is to be changed by the user. Therefore, by displaying a device icon of a type of which display position is likely to be changed based on the assumption that the display position is to be changed by the user and by suppressing involvement of a user's operation, erroneous operations in which the device icon is erroneously displayed in a region that differs from a region corresponding to a room that corresponds to the device icon can be reduced.

In the second aspect described above, for example, the prescribed region may be a region outside of a display region of the floor plan among the display screen.

In the second aspect described above, for example, the prescribed region may be a region corresponding to a largest room among one or more rooms included in the floor plan.

In the second aspect described above, for example, when the one or more device icons include two or more device icons of the same type, one device icon among the two or more device icons of the same type may be displayed in a region on the display screen corresponding to a room that corresponds to the one device icon and the other device icon may be displayed in a prescribed region on the display screen.

In the second aspect described above, for example, the prescribed region may be a region outside of a display region of the floor plan among the display screen.

In the second aspect described above, for example, the prescribed region may be a region corresponding to a largest room among one or more rooms included in the floor plan.

Another mode of the second aspect provides
a method for providing information in an information management system which is connected to a network that controls one or more target devices associated with a same building ID and which manages information on the one or more target devices, the method including:
receiving registration notification representing that one target device among the one or more target devices has been newly registered in the information management system, from the one target device via the network;
using at least one memory that associates first information with second information, the first information indicating a type of each of one or more device icons representing each of the one or more target devices and the second information indicating an attribute of each of one or more rooms included in a display screen representing a floor plan of a building indicated by the building ID, determine an attribute of a room corresponding to a type of a device icon representing the one target device based on the received registration notification information;
when there is a room corresponding to a type of the device icon representing the one target device, transmitting, via the network, third information indicating the type of the device icon representing the one target device and fourth information indicating the determined attribute of the room, to an information apparatus which is managed in association with the same building ID and which displays the display screen representing the floor plan on a display, and when there is no room corresponding to a type of the device icon representing the one target device, transmitting the third information indicating the type of the device icon representing the one target device and fifth information indicating a prescribed region on the display screen to the information apparatus via the network; and
displaying the device icon representing the one target device in a region on the display screen corresponding to a room that corresponds to the device icon on the display of the information apparatus based on the third information and the fourth information or displaying the device icon representing the one target device in a region on the display screen corresponding to the prescribed region on the display of the information apparatus based on the third information and the fifth information.

According to the other mode described above, when there is a room corresponding to a type of a device icon representing one target device, third information indicating the type of the device icon representing the one target device and fourth information indicating a determined attribute of a room are transmitted via the network to an information apparatus which is associated with a same building ID and which displays a display screen representing a floor plan on a display. In addition, when there is no room corresponding to the type of the device icon representing the one target device, the third information indicating the type of the device icon representing the one target device and fifth information indicating a prescribed region on the display screen are transmitted via the network to the information apparatus. Accordingly, the device icon representing the one target device is displayed in a region on the display screen corresponding to a room that corresponds to the device icon based on the third information and the fourth information on the display of the information apparatus. In addition, based on the third information and the fifth information, the device icon representing the one target device is displayed in a region on the display screen corresponding to the prescribed region on the display of the information apparatus.

Accordingly, for example, when the type of the target device is a refrigerator and a room corresponding to the refrigerator is a kitchen, a device icon representing the refrigerator is displayed in a region on the display screen corresponding to the kitchen. In addition, when the type of the target device is a toilet seat apparatus with a washing function and a room corresponding to the toilet seat apparatus with a washing function is a toilet, a device icon representing the toilet seat apparatus with a washing function is displayed in a region on the display screen corresponding to the toilet.

Therefore, since the user is not required to set a correspondence relationship between a device icon and a room corresponding to the device icon, an erroneous operation of displaying a device icon in a region other than a region corresponding to a room that corresponds to the device icon by mistake can be reliably prevented.

On the other hand, where there is no room corresponding to a type of a device icon representing one target device, the device icon representing the one target device is displayed in a prescribed region on the display screen.

Accordingly, for example, when the target device is a humidifier and a room is not associated with the humidifier, a device icon representing the humidifier is displayed in a region outside of a frame of a display region of a floor plan or in a prescribed region such as a region corresponding to a living room.

In this case, since a display position of the device icon is likely to be changed, for example, the device icon is displayed in a region outside of a frame of a display region of a floor plan where the device icon can be easily recognized or in a region corresponding to a living room which offers a large display region and enables the device icon to be recognized even when other device icons are displayed. Accordingly, a device icon of a type of which display position is likely to be changed is displayed based on the assumption that the display position is to be changed by the user. Therefore, by displaying a device icon of a type of which display position is likely to be changed based on the assumption that the display position is to be changed by the user and by suppressing involvement of a user's operation, erroneous operations in which the device icon is erroneously displayed in a region that differs from a region corresponding to a room that corresponds to the device icon can be reduced.

In the other mode described above, for example, when selection of any of the one or more device icons is sensed by the information apparatus in a region corresponding to any of the rooms included in the floor plan, a control screen may be displayed for at least any of operation and state confirmation of a target device corresponding to the selected device icon, on the display screen representing the floor plan at the information apparatus, and a control command may be output for at least any of the operation and the state confirmation of the target device corresponding to the selected device icon to the network based on an operation on the control screen.

In the other mode described above, for example, the prescribed region may be a region outside of a display region of the floor plan among the display screen.

In the other mode described above, for example, the prescribed region may be a region corresponding to a largest room among one or more rooms included in the floor plan.

In the other mode described above, for example, when the one or more device icons include two or more device icons of the same type, one device icon among the two or more device icons of the same type may be displayed in a region on the display screen corresponding to a room that corresponds to the one device icon and the other device icon may be displayed in a prescribed region on the display screen.

In the other mode described above, for example, the prescribed region may be a region outside of a display region of the floor plan among the display screen.

In the other mode described above, for example, the prescribed region may be a region corresponding to a largest room among one or more rooms included in the floor plan.

A third aspect of the present disclosure provides
a method for controlling information apparatus having a display and being connected to a network, over which one or more target devices are controlled,
the method causing a computer of the information apparatus to:
display on the display a display screen representing a floor plan including one or more rooms;
using at least one memory that associates first information with second information, the first information indicating a type of each of one or more device icons representing the one or more target devices, the second information indicating a performance of a target device corresponding to the one or more device icons, and third information indicating an attribute of each of the one or more rooms, display each of the one or more device icons in a region on the display screen corresponding to a room that corresponds to each of the one or more device icons in accordance with the type of each of the one or more device icons and the performance of the target device corresponding to the one or more device icons;
when selection of any of the one or more device icons is sensed in a region corresponding to any of the rooms included in the floor plan, display a control screen for at least any of operation and state confirmation of a target device corresponding to the selected device icon on the display screen representing the floor plan; and
output to the network a control command for at least any of the operation and the state confirmation of the target device corresponding to the selected device icon, based on an operation on the control screen.

According to the present third aspect, using at least one memory that associates first information with second information, the first information indicating a type of each of one or more device icons representing each of one or more target devices, the second information indicating a performance of a target device corresponding to the one or more device icons, and third information indicating an attribute of each of the one or more rooms, the one or more device icons are displayed in a region on the display screen corresponding to a room that corresponds to each of the one or more device icons in accordance with the type of each of the one or more device icons and the performance of the target device corresponding to the one or more device icons.

Accordingly, for example, when the target device is a television set, in accordance with a size of a display screen of the television set, a device icon representing the television set is displayed in a region on the display screen corresponding to a living room or a bedroom.

In addition, when the target device is an air conditioner, in accordance with a maximum output of the air conditioner, a device icon representing an air conditioner is displayed in a region on the display screen corresponding to a room that corresponds to the maximum output.

Therefore, since the user is not required to set a correspondence relationship between a device icon and a room corresponding to the device icon, an erroneous operation of displaying a device icon in a region other than a region corresponding to a room that corresponds to the device icon by mistake can be reliably prevented.

Furthermore, since a room in which a device icon is to be displayed is determined in consideration of a performance of a target device corresponding to one or more device icons, even when there are a plurality of rooms with an attribute including a possibility of a device icon being displayed therein, the device icon can be displayed in a region on the display screen corresponding to a room in accordance with a performance of a target device corresponding to the device icon.

Therefore, even when there are a plurality of rooms with an attribute including a possibility of a device icon being displayed therein, an erroneous operation of displaying a device icon in a region corresponding to a room that does not match a performance of a target device corresponding to the device icon by mistake can be prevented without having to require the user to set a correspondence relationship between the device icon and a room corresponding to the device icon.

In the third aspect described above, for example, when the one or more device icons include two or more device icons of the same type, based on the second information, each of the two or more device icons of the same type may be displayed in a region on the display screen corresponding to a room with a size corresponding to a performance of a target device corresponding to each of the two or more device icons of the same type in accordance with the performance of the target device corresponding to each of the two or more device icons of the same type.

In the third aspect described above, for example, when it is determined that two or more device icons of the same type are included in the one or more device icons based on the first information, a room with a size corresponding to a performance of a target device corresponding to each of the two or more device icons of the same type may be determined and each of the two or more device icons of the same type may be displayed in a region on the display screen corresponding to each determined room based on the second information and the third information.

In the third aspect described above, for example, the at least one memory may further store fourth information indicating a position of each of the one or more rooms on the floor plan, the region corresponding to each of the one or more rooms may be determined using the fourth information, and each of the one or more device icons may be displayed in the region on the display screen corresponding to the room that corresponds to each of the one or more device icons in accordance with the type of each of the one or more device icons and a performance of a target device corresponding to the one or more device icons.

In the third aspect described above, for example, when the one or more device icons include two or more device icons of the same type, a sum of performances of target devices corresponding to at least two device icons among the two or more device icons of the same type may be determined based on the second information, and each of the at least two device icons among the two or more device icons of the same type may be displayed in accordance with the determined sum of performances in a region on the display screen corresponding to a room with a size that corresponds to the calculated sum of performances.

According to the third aspect described above, for example, when there are two illumination devices as target devices, a device icon representing each of the two illumination devices is displayed in accordance with a sum of performances (for example, power consumption) of the two illumination devices in a region on the display screen corresponding to one room such as a living room that corresponds to the sum of performances.

Accordingly, for example, when two or more target devices of a same type are to be installed in a living room that is a relatively spacious room, an erroneous operation where a part of two or more device icons is separately displayed in a region corresponding to another room can be prevented.

Therefore, since the user is not required to set a correspondence relationship between a device icon and a room corresponding to the device icon, an erroneous operation of displaying a device icon in a region other than a region corresponding to a room that corresponds to the device icon by mistake can be reliably prevented.

In the third aspect described above, for example, when it is determined that the one or more device icons include two or more device icons of the same type based on the first information, a sum of performances of target devices corresponding to at least two device icons among the two or more device icons of the same type may be determined based on the second information, a room of a size corresponding to performances of the target devices corresponding to at least two device icons among the two or more device icons of the same type may be determined based on the determined sum of performances and the third information, and each of the at least two device icons among the two or more device icons of the same type may be displayed in a region on the display screen corresponding to the determined room.

In the third aspect described above, for example, the device icon may include an illumination device icon that represents an illumination device and a performance of the illumination device corresponding to the illumination device icon may include power consumption of the illumination device.

In the third aspect described above, for example, the device icon may include a television set icon that represents a television set and a performance of the television set corresponding to the television set icon may include a screen size of the television set.

In the third aspect described above, for example, the device icon may include an air conditioner icon that represents an air conditioner and a performance of the air conditioner corresponding to the air conditioner icon may include a maximum output of the air conditioner.

In the third aspect described above, for example, each of the one or more device icons displayed in a region on the display screen corresponding to a room that corresponds to each of the one or more device icons may include information indicating a performance of a target device.

Another mode of the third aspect provides a method for providing information in an information management system which is connected to a network that controls one or more target devices associated with a same building ID and which manages information on the one or more target devices, the method including:

receiving registration notification representing that one target device among the one or more target devices has been newly registered in the information management system, from the one target device via the network;

using at least one memory that associates first information with second information, the first information indicating a type of each of one or more device icons representing each of the one or more target devices, the second information indicating a performance of a target device corresponding to the one or more device icons, and third information indicating an attribute of each of one or more rooms included in a display screen representing a floor plan of a building indicated by the same building ID to determine an attribute of a room corresponding to a type of a device icon representing the one target device and to a performance of the one target device based on the received registration notification information; and transmitting fourth information indicating the type of the device icon representing the one target device and fifth information indicating the determined attribute of the room to an information apparatus which is associated with the same building ID and which displays a display screen representing the floor plan on a display via the network, the device icon representing the one target device being displayed in a region on the display screen corresponding to a room that corresponds to the device icon at the information apparatus based on the fourth information and the fifth information.

According to the present other mode, using at least one memory that associates first information with second information, the first information indicating a type of each of one or more device icons representing each of the one or more target devices, the second information indicating a performance of a target device corresponding to the one or more device icons, and third information indicating an attribute of each of the one or more rooms included in a display screen representing a floor plan of a building indicated by a same building ID, an attribute of a room corresponding to a type of a device icon representing one target device and to a performance of the one target device is determined based on the received registration notification information. Accordingly, the device icon representing the one target device is displayed in a region on the display screen corresponding to a room that corresponds to the device icon on a display of an information apparatus.

Accordingly, for example, when the target device is a television set, in accordance with a size of a display screen of the television set, a device icon representing the television set is displayed in a region on the display screen corresponding to a living room or a bedroom.

In addition, when the target device is an air conditioner, in accordance with a maximum output of the air conditioner, a device icon representing the air conditioner is displayed in a region on the display screen corresponding to a room that corresponds to the maximum output.

Therefore, since the user is not required to set a correspondence relationship between a device icon and a room corresponding to the device icon, an erroneous operation of displaying a device icon in a region other than a region corresponding to a room that corresponds to the device icon by mistake can be reliably prevented.

In the other mode described above, for example, when selection of any of the one or more device icons is sensed by the information apparatus in a region corresponding to any of the rooms included in the floor plan, a control screen for at least any of operation and state confirmation of a target device corresponding to the selected device icon may be displayed on the display screen representing the floor plan, and a control command for at least any of the operation and the state confirmation of the target device corresponding to the selected device icon may be output to the network based on an operation on the control screen.

In the other mode described above, for example, the at least one memory may further store sixth information indicating position of each of the one or more rooms on the floor plan, the method further comprising: determining position information of a room that corresponds to a type of a device icon representing the one target device and to a performance of the one target device, using the sixth information, and transmitting the determined position information to the information apparatus via the network, the device icon representing the one target device being displayed in the region on the display screen corresponding to the room that corresponds to the device icon at the information apparatus based on the transmitted position information.

In the other mode described above, for example, registration notification information representing that two or more target devices among the one or more target devices has been newly registered in the information management system may be received from the two or more target devices via the network; when it is determined that types of two or more device icons representing each of the two or more target devices are the same based on the first information, an attribute of a room corresponding to each of the two or more device icons may be determined in accordance with a performance of each of the two or more target devices based on the second information; the fourth information indicating a type of each of the two or more device icons and the fifth information indicating an attribute of each room may be transmitted with respect to each of the two or more device icons to the information apparatus via the network; and the two or more device icons may be displayed in a region on the display screen corresponding to a room that corresponds to each of the two or more device icons based on the fourth information and fifth information on the display of the information apparatus.

According to the present other mode, when it is determined that the types of two or more device icons are the same based on the first information, an attribute of a room corresponding to each of the two or more device icons is determined in accordance with a performance of each of the two or more target devices based on the second information. Accordingly, the two or more device icons are displayed in a region on the display screen corresponding to a room that corresponds to each of the two or more device icons on a display of an information apparatus.

As a result, for example, when the types of two or more device icons are illumination devices, it is determined in accordance of a performance (for example, power consumption) of each of the two or more illumination devices that a room corresponding to a device icon representing one illumination device among the two or more illumination devices is a living room and a room corresponding to a device icon representing another illumination device is a bedroom.

Therefore, even when types of two or more device icons are the same, an erroneous operation where each of the two or more device icons is displayed in a region corresponding to a room that does not correspond to a performance of each of two or more target devices can be prevented without involving a setting operation by the user.

In the other mode described above, for example, registration notification information representing that two or more target devices among the one or more target devices has been newly registered in the information management system may be received from the two or more target devices via the network; when it is determined that types of two or more device icons representing each of the two or more target devices are the same based on the first information, a sum of performances of each of the two or more target devices is determined and an attribute of one room corresponding to the determined sum of performances may be determined based on the second information; the fourth information indicating a type of each of the two or more device icons and the fifth information indicating an attribute of the one room may be transmitted to the information apparatus via the network; and the two or more device icons may be displayed in a region on the display screen corresponding to the one room based on the fourth information and fifth information on the display of the information apparatus.

According to the present other mode, when it is determined that the types of two or more device icons representing each of the two or more target devices are the same based on the first information, an attribute of one room corresponding to a sum of performances of each of the two or more target devices is determined based on the second information. Based on the determined types of two or more device icons and the determined attribute of the one room, the two or more device icons are displayed in a region on the display screen corresponding to the one room on the display of the information apparatus.

Accordingly, for example, when there are two illumination devices as target devices, a device icon representing each of the two illumination devices is displayed in accordance with a sum of performances (for example, power consumption) of the two illumination devices in a region on the display screen corresponding to one room such as a living room that corresponds to the sum of performances.

Therefore, for example, when two or more target devices of a same type are to be installed in a living room that is a relatively spacious room, an erroneous operation where a part of two or more device icons is separately displayed in a region corresponding to another room can be prevented.

As a result, since the user is not required to set a correspondence relationship between a device icon and a room corresponding to the device icon, an erroneous operation of displaying a device icon in a region other than a region corresponding to a room that corresponds to the device icon by mistake can be reliably prevented.

In the other mode described above, for example, the device icon may include an illumination device icon that represents an illumination device and a performance of the illumination device corresponding to the illumination device icon may include power consumption of the illumination device.

In the other mode described above, for example, the device icon may include a television set icon that represents a television set and a performance of the television set corresponding to the television set icon may include a screen size of the television set.

In the other mode described above, for example, the device icon may include an air conditioner icon that represents an air conditioner and a performance of the air conditioner corresponding to the air conditioner icon may include a maximum output of the air conditioner.

In the other mode described above, for example, each of the one or more device icons displayed in a region on the display screen corresponding to a room that corresponds to each of the one or more device icons may include information indicating a performance of a target device.

A fourth aspect of the present disclosure provides
a method for controlling information apparatus having a display and being connected to a network, over which one or more target devices are controlled,
the method causing a computer of the information apparatus to:
display on the display a display screen representing a floor plan including one or more rooms;
using at least one memory that associates first information with second information, the first information indicating a type of each of one or more device icons representing the one or more target devices and the second information indicating an attribute of each of the one or more rooms, display each of the one or more device icons in a region on the display screen corresponding to a room that corresponds to each of the one or more device icons in accordance with the type of each of the one or more device icons;
when selection of any of the one or more device icons is sensed in a region corresponding to any of the rooms included in the floor plan, display a control screen for at least any of operation and state confirmation of a target device corresponding to the selected device icon on the display screen representing the floor plan; and
output to the network a control command for at least any of the operation and the state confirmation of the target device corresponding to the selected device icon, based on an operation on the control screen, wherein
the one or more device icons include a device icon of a first type and a device icon of a second type that is in a relationship of being displayed in a region on the display screen corresponding to a same room as a room in which the device icon of the first type is displayed, and
when it is determined that one device icon among the one or more device icons is the device icon of the second type, the one device icon is displayed in a region on the display screen corresponding to a same room as a room in which the device icon of the first type is displayed.

According to the present fourth aspect, the one or more device icons include a device icon of a first type and a device icon of a second type that is in a relationship of being displayed in a region on the display screen corresponding to a same room as a room in which the device icon of the first type is displayed. In addition, when it is determined that one device icon among the one or more device icons is the device icon of the second type, the one device icon is displayed in a region on the display screen corresponding to a same room as a room in which the device icon of the first type is displayed.

Accordingly, for example, when the device icon of the first type is a device icon representing a television set and the device icon of the second type is a device icon representing a content reproducing machine such as a DVD player, the device icon representing the content reproducing machine is displayed in a region on the display screen corresponding to a same room as a room in which the device icon representing the television set is displayed.

As described above, a display position of the device icon of the second type (for example, a device icon representing a content reproducing machine) is determined by focusing on the fact that the device icon of the second type is in a relationship of being displayed in a region on the display screen corresponding to a same room as a room in which the device icon of the first type (for example, a device icon representing a television set) is displayed.

Therefore, since the user is not required to set a correspondence relationship between a device icon and a room corresponding to the device icon, an erroneous operation of displaying a device icon in a region other than a region corresponding to a room that corresponds to the device icon by mistake can be reliably prevented.

In the fourth aspect described above, for example, the at least one memory may further store third information indicating that the one device icon is the device icon of the second type and fourth information indicating a type of the device icon of the first type that corresponds to the device icon of the second type, and when the one device icon is determined to be the device icon of the second type based on the third information, a room in which the device icon of the first type is being displayed may be determined based on the fourth information and the one device icon may be displayed in a region on the display screen corresponding to a same room as the determined room.

In the fourth aspect described above, for example, when one or two or more device icons among the one or more device icons are determined to be device icons of the second type, the one or two or more device icons may be displayed in a region on the display screen corresponding to a same room as a room in which the device icon of the first type is displayed.

In the fourth aspect described above, for example, the device icon of the first type may include a device icon representing a refrigerator and the device icon of the second type may include a device icon representing a microwave oven.

In the fourth aspect described above, for example, the same room may be a kitchen.

In the fourth aspect described above, for example, the device icon of the first type may include a device icon representing a television set and the device icon of the second type may include a device icon representing a content reproducing machine that reproduces contents.

In the fourth aspect described above, for example, the device icon of the first type may include a device icon representing a television set and the device icon of the second type may include a device icon representing a content recording machine that records contents.

In the fourth aspect described above, for example, the same room may be a living room.

Another mode of the fourth aspect provides a method for providing information in an information management system which is connected to a network that controls one or more target devices associated with a same building ID and which manages information on the one or more target devices, the method including:

receiving registration notification representing that one target device among the one or more target devices has been newly registered in the information management system, from the one target device via the network;

using at least one memory that associates first information with second information, the first information indicating a type of each of one or more device icons representing each of the one or more target devices, the second information indicating an attribute of each of one or more rooms included in a display screen representing a floor plan of a building indicated by the building ID, and third information indicating a device icon of a second type that is in a relationship of being displayed in a region on the display screen corresponding to a same room as a device icon of a first type among types of the one or more device icons to determine whether or not the one device icon is a device icon of the second type;

determining an attribute of a room corresponding to the device icon of the first type when the one device icon is determined to be a device icon of the second type;

transmitting fourth information indicating a type of the one device icon and fifth information indicating the determined attribute of the room to an information apparatus which is associated with the same building ID and which displays a display screen representing the floor plan on a display via the network; and displaying the one device icon in a region on the display screen corresponding to a same room as a room in which the device icon of the first type is displayed based on the fourth information and the fifth information at the information apparatus.

According to the present other aspect, using at least one memory that associates first information with second information, the first information indicating a type of each of one or more device icons representing each of the one or more target devices, the second information indicating an attribute of each of one or more rooms included in a display screen representing a floor plan of a building indicated by a same building ID, and third information indicating a device icon of a second type that is in a relationship of being displayed in a region on the display screen corresponding to a same room as a device icon of a first type among types of the one or more device icons, whether or not one device icon representing one target device is a device icon of the second type based on the received registration notification information. When the one device icon is determined to be a device icon of the second type, an attribute of a room corresponding to the device icon of the first type is determined. Based on the determined attribute, one device icon is displayed in a region on the display screen corresponding to a same room as the room in which the device icon of the first type is displayed at the information apparatus.

Accordingly, for example, when the device icon of the first type is a device icon representing a television set and the device icon of the second type is a device icon representing a content reproducing machine such as a DVD player, the device icon representing the content reproducing machine is displayed in a region on the display screen corresponding to a same room as a room in which the device icon representing the television set is displayed.

As described above, a display position of the device icon of the second type (for example, a device icon representing a content reproducing machine) is determined by focusing on the fact that the device icon of the second type is in a relationship of being displayed in a region on the display screen corresponding to a same room as a room in which the device icon of the first type (for example, a device icon representing a television set) is displayed.

Therefore, since the user is not required to set a correspondence relationship between a device icon and a room corresponding to the device icon, an erroneous operation of displaying a device icon in a region other than a region corresponding to a room that corresponds to the device icon by mistake can be reliably prevented.

In the other mode described above, for example, when selection of any of the one or more device icons is sensed by the information apparatus in a region corresponding to any of the rooms included in the floor plan, a control screen for at least any of operation and state confirmation of a target device corresponding to the selected device icon may be displayed on the display screen representing the floor plan, and a control command for at least any of the operation and the state confirmation of the target device corresponding to the selected device icon may be output to the network based on an operation on the control screen.

In the other mode described above, for example, the at least one memory may further store sixth information indicating that the one device icon is the device icon of the second type and seventh information indicating a type of the device icon of the first type that corresponds to the device icon of the second type, and when the one device icon is determined to be the device icon of the second type based on the sixth information, the device icon of the first type that corresponds to the device icon of the second type may be determined based on the seventh information and a room corresponding to the device icon of the first type may be determined based on the second information.

In the other mode described above, for example, registration notification information representing that two or more target devices among the one or more target devices has been newly registered in the information management system may be received from the two or more target devices via the network; when it is determined that types of two or more device icons representing each of the two or more target devices are the same based on the first information, whether or not the two or more device icons are device icons of the second type may be determined based on the third information; when the two or more device icons are determined to be device icons of the second type, an attribute of a room corresponding to the device icon of the first type may be determined; the fourth information indicating types of the two or more device icons and the fifth information indicating the determined attribute of the room may be transmitted to the information apparatus via the network; and the two or more device icons may be displayed in a region on the display screen corresponding to a same room as a room in which the device icon of the first type is displayed based on the fourth information and fifth information on the display of the information apparatus.

According to the present other mode, when it is determined that types of two or more device icons representing each of two or more target devices are the same and the two or more device icons are determined to be device icons of the second type, an attribute of a room corresponding to the device icon of the first type is determined.

Accordingly, for example, when each of the two or more device icons is a device icon representing a content reproducing machine such as a DVD player and the device icon of the second type is a device icon representing a content reproducing machine, device icons representing two or more content reproducing machines are displayed in a region on the display screen corresponding to a same room as a room in which the device icon of the first type (for example, a device icon representing a television set) is displayed.

As described above, even when each of the two or more device icons is the device icon of the second type (for example, a device icon representing a content reproducing machine), a display position of the device icon of the second type is determined by focusing on a relationship between the device icon of the first type (for example, a device icon representing a television set) and the device icon of the second type.

Therefore, since the user is not required to set a correspondence relationship between a device icon and a room corresponding to the device icon, an erroneous operation where a part of two or more device icons is mistakenly displayed in a region corresponding to a room other than a room corresponding to the two or more device icons can be prevented.

In the other mode described above, for example, the at least one memory may further store eighth information representing a use frequency of a target device corresponding to the device icon of the first type, when the one device icon is determined to be the device icon of the second type, the device icon of the first type corresponding to the device icon of the second type may be determined, when the device icon of the second type corresponds to a plurality of device icons of the first type, a target device with a highest use frequency among a plurality of target devices corresponding to the plurality of device icons of the first type may be determined, an attribute of a room corresponding to the device icon of the first type that represents the target device determined to have the highest use frequency may be determined, and the fourth information indicating a type of the one device icon and the fifth information indicating an attribute of a room corresponding to the device icon of the first type that represents the target device determined to have the highest use frequency may be transmitted to the information apparatus via the network.

According to the present other mode, when the device icon of the second type corresponds to a plurality of device icons of the first type, a target device with a highest use frequency among a plurality of target devices corresponding to the plurality of device icons of the first type is determined. Based on the determination, the device icon of the second type is displayed in a region on the display screen corresponding to a room that corresponds to the device icon of the first type that represents the target device determined to have the highest use frequency.

Accordingly, for example, when the device icon of the second type is a device icon representing a content reproducing machine, the device icon of the first type is a device icon representing a television set, and the device icon representing the content reproducing machine corresponds to a plurality of device icons representing a television set, a television set with a highest use frequency among a plurality of television sets is determined, and the device icon of the second type (for example, a device icon representing a content reproducing machine) is displayed in a region on the display screen corresponding to a room such as a living room that corresponds to a device icon representing the television set with the highest use frequency.

Therefore, even when the device icon of the second type representing a content reproducing machine corresponds to a plurality of device icons of the first type representing a plurality of television sets, the device icon of the second type can be displayed in a room where the device icon is likely to be displayed by utilizing a relationship between the device icon of the first type (for example, a device icon representing a television set) and the device icon of the second type (for example, a device icon representing a content reproducing machine) without requiring the user to set a correspondence relationship between a device icon and a room corresponding to the device icon.

As a result, erroneous operations where the device icon of the second type is mistakenly displayed on a room that differs from an appropriate room can be reduced.

In the other mode described above, for example, the device icon of the first type may include a device icon representing a refrigerator and the device icon of the second type may include a device icon representing a microwave oven.

In the other mode described above, for example, the same room may be a kitchen.

In the other mode described above, for example, the device icon of the first type may include a device icon representing a television set and the device icon of the second type may include a device icon representing a content reproducing machine that reproduces contents.

In the other mode described above, for example, the device icon of the first type may include a device icon representing a television set and the device icon of the second type may include a device icon representing a content recording machine that records contents.

In the other mode described above, for example, the device icon of the first type may include a device icon representing a television set, the device icon of the second type may include a device icon representing a content recording machine that records contents, and the same room may be a living room.

In the other mode described above, for example, the eighth information may include information indicating turning on or off power of a target device corresponding to the device icon of the first type.

In the other mode described above, for example, a target device corresponding to the device icon of the first type may be a television set and the eighth information may include information indicating a viewing history of the television set.

A fifth aspect of the present disclosure provides
a method for providing information in a network system that is connected to an information apparatus which remotely controls one or more target devices connected inside a building and which has a display, the method including:
receiving first information capable of identifying a type of a floor plan of the building displayed on the display of the information apparatus from the information apparatus via a network;
determining a floor plan of a same type as the type of the floor plan indicated by the first information using a first database that manages second information indicating a type of each floor plan;
using a second database that manages, for each type of floor plan, third information indicating a frequency at which each of the one or more device icons is displayed in each of one or more rooms included in the floor plan to decide the one or more device icons displayed on the floor plan determined to be of the same type and a room in which each of the one or more device icons is displayed;

transmitting fourth information indicating the decided one or more device icons and fifth information indicating the decided room in which each of the one or more device icons is displayed to the information apparatus via the network; and displaying the one or more device icons in a region corresponding to a room that corresponds to each of the one or more device icons on the display screen representing the floor plan on the display of the information apparatus based on the fourth information and the fifth information.

According to the present fifth aspect, a floor plan of a same type as a type of the floor plan indicated by the first information received from the information apparatus is determined using a first database that manages second information indicating a type of each floor plan. Using a second database that manages, for each type of floor plan, third information that associates, with one another, one or more device icons representing one or more target devices, one or more rooms included in a floor plan in which each of the one or more device icons is to be displayed, and a frequency at which each of the one or more device icons is displayed in each of the one or more rooms, one or more device icons displayed on a floor plan determined to be of the same type and a room in which each of the one or more device icons is displayed are decided. Based on the decided one or more device icons and the decided room, the one or more device icons is displayed in a region corresponding to a room which is shown on a display screen representing a floor plan and which corresponds to each of the one or more device icons.

Accordingly, on a floor plan of a same type as a floor plan displayed on the display of the information apparatus, a frequency at which each of the one or more device icons is displayed in each of the one or more rooms is referenced.

For example, in rooms with a same layout type in an apartment, choices of arrangement positions of target devices such as a television set, a washing machine, and a refrigerator are limited by restrictions that apply to the layout. Therefore, arrangement positions of target devices tend to become similar.

Accordingly, for example, display positions of device icons representing respective target devices such as a television set, a washing machine, and a refrigerator are decided by referring to display positions of device icons on floor plans of the same time without requiring the user to set a correspondence relationship between device icons and rooms corresponding to the device icons.

Therefore, since a room in which a device icon is highly frequently displayed is displayed as an initial display position of the display icon while minimizing settings performed by the user, erroneous operations where the device icon is mistakenly displayed in a region that differs from a region corresponding to a room that corresponds to the device icon can be reduced.

In addition, if a display position of the device icon must be changed, for example, the device icon can be moved into a room such as a bedroom that differs from the living room by a user's operation. In this case, since a user's operation is only required when the display position must be changed, operations by the user can be made significantly less complicated.

In the fifth aspect described above, for example, using a third database that manages sixth information indicating, for each type of floor plan, in which room each device icon is displayed, a frequency at which each of the one or more device icons is displayed in each of the one or more rooms may be calculated for each type of floor plan.

In the fifth aspect described above, for example, the first information and seventh information indicating a type of a new device icon to be newly displayed on a floor plan indicated by the first information may be received from the information apparatus via the network, rooms in which a device icon of the type indicated by the seventh information is already displayed may be excluded from room candidates in which a device icon of the type indicated by the seventh information is displayed on a floor plan of a type indicated by the first information using the second database, when a plurality of room candidates remain, a room with a highest frequency at which a device icon of a type indicated by the seventh information is displayed may be decided from the plurality of room candidates, information indicating the decided room may be transmitted as the fifth information to the information apparatus via the network, and the new device icon may be displayed in a region on the display screen corresponding to the decided room based on the fifth information and the seventh information on the display of the information apparatus.

In the fifth aspect described above, for example, the first information and seventh information indicating a type of a new device icon to be newly displayed on a floor plan indicated by the first information may be received from the information apparatus via the network, rooms in which a device icon of the type indicated by the seventh information is already displayed may be excluded from room candidates in which a device icon of the type indicated by the seventh information is displayed on a floor plan of a type indicated by the first information using the second database, when one room candidate remains, the one room candidate is decided as a room in which a device icon of a type indicated by the seventh information is to be displayed, information indicating the decided room may be transmitted as the fifth information to the information apparatus via the network, and the new device icon may be displayed in a region on the display screen corresponding to the decided room based on the fifth information and the seventh information on the display of the information apparatus.

In the fifth aspect described above, for example, the first information and seventh information indicating a type of a new device icon to be newly displayed on a floor plan indicated by the first information may be received from the information apparatus via the network, rooms in which a device icon of the type indicated by the seventh information is already displayed may be excluded from room candidates in which a device icon of the type indicated by the seventh information is displayed on a floor plan of a type indicated by the first information using the second database, when no room candidate remains, the outside of a region of a floor plan of a type indicated by the first information is decided as a region in which a device icon of a type indicated by the seventh information is to be displayed, information indicating the decided region may be transmitted as the fifth information to the information apparatus via the network, and the new device icon may be displayed outside the region of the floor plan based on the fifth information and the seventh information on the display of the information apparatus.

In the fifth aspect described above, for example, the second database may further manage an average arrangement position of device icons in each room, fifth information indicating the decided room and eighth information indicating an average arrangement position of device icons in the decided room may be transmitted to the information apparatus via the network, and the new device icon may be displayed at the average arrangement position in a region on the display screen corresponding to the decided room based on the fifth information, the seventh information, and the eighth information on the display of the information apparatus.

INDUSTRIAL APPLICABILITY

The control method according to the present disclosure is useful as a control method for preferably controlling one or more target devices connected to a network.

The invention claimed is:

1. A method for controlling an information apparatus having a display and being connected to a network, over which one or more target devices are controlled,
the method causing a computer of the information apparatus to:
display, on the display, a display screen representing a floor plan including one or more rooms;
using at least one memory that stores a room attribute reference table and a device type reference table, display one or more device icons representing the one or more target devices on the display screen representing the floor plan;
when selection of a device icon of the one or more device icons is sensed on the display screen representing the floor plan, display a control screen for at least one of operation or state confirmation of a target device corresponding to the selected device icon on the display screen representing the floor plan; and
output, to the network, a control command for the at least one of the operation or the state confirmation of the target device corresponding to the selected device icon, based on an operation on the control screen, wherein
the one or more device icons include a device icon of a first type group and a device icon of a second type group,
the room attribute reference table stores at least one device icon of the first type group, each of the at least one device icon of the first type group being associated with a respective attribute of a respective room of the one or more rooms in the floor plan, and the room attribute reference table does not store the device icon of the second type group,
the device type reference table stores at least one device icon of the second type group, each of the at least one device icon of the second type group being associated with a respective one of the at least one device icon of the first type group, the device type reference table indicating that the device icon of the second type group and the device icon of the first type group are associated in the device type reference table and are to be displayed in a same room, and
the display of the one or more device icons includes:
when one device icon, of the one or more device icons, is newly registered, determining whether or not the one device icon, of the one or more device icons, is the second type group, with reference to the at least one device icon of the second type group stored in the device type reference table, and
in response to determining that the one device icon, of the one or more device icons, is the second type group, acquiring one device icon of the first type group, which is associated with the one device icon of the second type group in the device type reference table, acquiring one attribute of a room associated with the acquired one device icon of the first type group in the room attribute reference table, and displaying the one device icon of the second type group on the display screen in the room of the acquired one attribute, in which the one device icon of the first type group is displayed.

2. The method according to claim 1, wherein
when one or two or more device icons among the one or more device icons are determined to be the second type group, the one or two or more device icons are displayed in a room in which a device icon of the first type group that is associated with the one or two or more device icons of the second type group in the device type reference table is displayed.

3. The method according to claim 1, wherein
the device icon of the first type group includes a device icon representing a refrigerator, and
the device icon of the second type group includes a device icon representing a microwave oven.

4. The method according to claim 3, wherein
the same room is a kitchen.

5. The method according to claim 1, wherein
the device icon of the first type group includes a device icon representing a television set, and
the device icon of the second type group includes a device icon representing a content reproducing machine that reproduces contents.

6. The method according to claim 1, wherein
the device icon of the first type group includes a device icon representing a television set, and
the device icon of the second type group includes a device icon representing a content recording machine that records contents.

7. The method according to claim 5, wherein
the same room is a living room.

8. A method for providing information in an information management system which is connected to a network that controls one or more target devices associated with a same building ID and which manages information on the one or more target devices, the method comprising:
receiving registration notification representing that one target device among the one or more target devices has been newly registered in the information management system, from the one target device via the network;
determining whether a target device icon representing the one target device is a first type group or a second type group, by referencing at least one device icon of the second type group stored in a device type reference table stored in at least one memory,
wherein the device type reference table stores the at least one device icon of the second type group associated with at least one device icon of the first type group, the device type reference table indicating that a device icon of the second type group and a device icon of the first type group are associated in the device type reference table and are to be displayed in a same room;
in response to determining that the target device icon representing the one target device is the second type group, acquiring a target device icon of the first type group associated with the target device icon of the second type group in the device type reference table, and acquiring an attribute of a room, which is associated with the acquired target device icon of the first type group in a room attribute reference table stored in the at least one memory;
wherein the room attribute reference table stores the at least one device icon of the first type group associated with at least one attribute of at least one rooms included in a display screen representing a floor plan of a building indicated by the same building ID, and the room attribute reference table does not store the at least one device icon of the second type group, transmitting a device type of the target device icon representing the one target device and the acquired attribute of the room to an information apparatus which is associated with the same building ID and which displays the display screen representing the floor plan on a display via the network; and displaying, at the information apparatus, the target device icon representing the one target device on the display screen in the room of the acquired attribute, in which the target device icon of the first type group is displayed.

9. The method according to claim 8, wherein when selection of one device icon of one or more device icons is sensed by the information apparatus on the display screen representing the floor plan, a control screen is displayed for at least one of operation or state confirmation of a target device corresponding to the selected one device icon of the one or more device icons, on the display screen representing the floor plan, and a control command for at least one of the operation or the state confirmation of the target device corresponding to the selected one device icon of the one or more device icons is output to the network based on an operation on the control screen.

10. The method according to claim 8, wherein registration notification information representing that two or more target devices among the one or more target devices have been newly registered in the information management system is received from the two or more target devices via the network;

when it is determined that device types of two or more device icons representing each of the two or more target devices are a same device type, whether or not the two or more device icons are the second type group is determined based on the device type reference table;

when the two or more device icons are determined to be the second type group, an attribute of a room associated with a device icon of the first type group, which is associated with the two or more device icons, is acquired by referencing the device type reference table and the room attribute reference table;

the device types of the two or more device icons and the acquired attribute of the room are transmitted to the information apparatus via the network; and the two or more device icons are displayed on the display screen in the room of the acquired attribute.

11. The method according to claim 8, wherein the at least one memory further stores a use frequency of a target device corresponding to the device icon of the first type group, when the target device icon representing the one target device is determined to be the second type group, and when the target device icon of the second type group is associated with a plurality of device icons of the first type group in the device type reference table, a target device with a highest use frequency among a plurality of target devices corresponding to the plurality of device icons of the first type group is determined, and an attribute of a room associated with a device icon of the first type group that represents a target device determined to have a highest use frequency is acquired, and the device type of the target device icon representing the one target device and the acquired attribute of the room, which is associated with the acquired device icon of the first type group that represents the selected target device are transmitted to the information apparatus via the network.

12. The method according to claim 8, wherein the device icon of the first type group includes a device icon representing a refrigerator, and the device icon of the second type group includes a device icon representing a microwave oven.

13. The method according to claim 12, wherein the same room is a kitchen.

14. The method according to claim 8, wherein the device icon of the first type group includes a device icon representing a television set, and the device icon of the second type group includes a device icon representing a content reproducing machine that reproduces contents.

15. The method according to claim 8, wherein the device icon of the first type group includes a device icon representing a television set, and the device icon of the second type group includes a device icon representing a content recording machine that records contents.

16. The method according to claim 8, wherein the device icon of the first type group includes a device icon representing a television set, the device icon of the second type group includes a device icon representing a content recording machine that records contents, and the same room is a living room.

17. The method according to claim 11, wherein the use frequency includes information indicating turning on or off power of the target device corresponding to the device icon of the first type group.

18. The method according to claim 11, wherein the target device corresponding to the device icon of the first type group is a television set, and the use frequency includes information indicating a viewing history of the television set.

19. A non-transitory computer-readable recording medium which stores a program to be executed by an information apparatus having a display and being connected to a network, over which one or more target devices are controlled, the program causing a computer of the information apparatus to:

display, on the display, a display screen representing a floor plan including one or more rooms;

using at least one memory that stores a room attribute reference table and a device type reference table, display one or more device icons representing the one or more target devices on the display screen representing the floor plan;

when selection of a device icon of the one or more device icons is sensed on the display screen representing the floor plan, display a control screen for at least one of operation or state confirmation of a target device corresponding to the selected device icon on the display screen representing the floor plan; and output, to the network, a control command for the at least one of the operation or the state confirmation of the target device corresponding to the selected device icon, based on an operation on the control screen, wherein the one or more device icons include a device icon of a first type group and a device icon of a second type group, the room attribute reference table stores at least one device icon of the first type group, each of the at least one device icon of the first type group being associated with a respective attribute of a respective room of the one or more rooms in the floor plan, and the room attribute reference table does not store the device icon of the second type group, the device type reference table stores at least one device icon of the second type group, each of the at least one device icon of the second type group being associated with a respective one of the at least one device icon of the first type group, the device type reference table indicating that the device icon of the second type group and the device icon of the first type group are associated in the device type reference table and are to be displayed in a same room, and the display of the one or more device icons includes:

when one device icon, of the one or more device icons, is newly registered, determining whether or not the one device icon, of the one or more device icons, is the second type group, with reference to the at least one device icon of the second type group stored in the device type reference table, and in response to determining that the one device icon, of the one or more device icons, is the second type group, acquiring one device icon of the first type group, which is associated with the one device icon of the second type group in the device type reference table, acquiring one attribute of a room associated with the acquired one device icon of the first type group in the room attribute reference table, and displaying the one device icon of the second type group on the display screen in the room of the acquired one attribute, in which the one device icon of the first type group is displayed.

* * * * *